US011990264B2

(12) United States Patent
Shimoichi

(10) Patent No.: US 11,990,264 B2
(45) Date of Patent: May 21, 2024

(54) CHIP INDUCTOR AND METHOD FOR MANUFACTURING THE SAME

(71) Applicant: ROHM CO., LTD., Kyoto (JP)

(72) Inventor: Takuma Shimoichi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 267 days.

(21) Appl. No.: 17/381,633

(22) Filed: Jul. 21, 2021

(65) Prior Publication Data

US 2021/0350970 A1 Nov. 11, 2021

Related U.S. Application Data

(63) Continuation of application No. 15/940,002, filed on Mar. 29, 2018, now Pat. No. 11,094,447.

(30) Foreign Application Priority Data

Mar. 30, 2017 (JP) ................................ 2017-068593
Mar. 31, 2017 (JP) ................................ 2017-070627
Jan. 31, 2018 (JP) ................................ 2018-015350

(51) Int. Cl.
*H01F 27/28* (2006.01)
*H01F 17/00* (2006.01)
(Continued)

(52) U.S. Cl.
CPC ......... *H01F 27/28* (2013.01); *H01F 17/0013* (2013.01); *H01F 27/29* (2013.01);
(Continued)

(58) Field of Classification Search
CPC ...... H01F 27/28; H01F 17/0013; H01F 27/29; H01F 27/292; H01F 27/323; H01F 41/04; H01F 41/041; H01F 41/10; H01F 41/12
(Continued)

(56) References Cited

U.S. PATENT DOCUMENTS

2006/0014303 A1* 1/2006 Takazawa ........... H01F 17/0013 438/1
2014/0145815 A1 5/2014 Ishii et al.
(Continued)

FOREIGN PATENT DOCUMENTS

CN 106486267 A 3/2017
JP H09199365 A 7/1997
(Continued)

OTHER PUBLICATIONS

Japanese Patent Office; Notice of Reasons for Refusal for Japanese Patent Application 2018-015350 (related application); Inoue, Kenichi; Dec. 23, 2021; 6 pages.
(Continued)

*Primary Examiner* — Bickey Dhakal
*Assistant Examiner* — Kazi S Hossain
(74) *Attorney, Agent, or Firm* — XSENSUS LLP

(57) ABSTRACT

A chip inductor includes a sealing body having a mounting surface and a coil conductor sealed in an interior of the sealing body, wherein the coil conductor includes a first coil end exposed from the mounting surface of the sealing body, a second coil end exposed from the mounting surface of the sealing body, and a spiral portion of spiral form connected to the first coil end and the second coil end and routed along a normal direction of the mounting surface of the sealing body from the first coil end and the second coil end.

19 Claims, 71 Drawing Sheets

(51) Int. Cl.

| | |
|---|---|
| ***H01F 27/29*** | (2006.01) |
| ***H01F 27/32*** | (2006.01) |
| ***H01F 41/04*** | (2006.01) |
| ***H01F 41/10*** | (2006.01) |
| ***H01F 41/12*** | (2006.01) |

(52) U.S. Cl.
CPC ......... *H01F 27/292* (2013.01); *H01F 27/323* (2013.01); *H01F 41/04* (2013.01); *H01F 41/041* (2013.01); *H01F 41/10* (2013.01); *H01F 41/122* (2013.01)

(58) Field of Classification Search
USPC ................................. 336/192, 200, 232, 198
See application file for complete search history.

(56) References Cited

U.S. PATENT DOCUMENTS

| | | | | |
|---|---|---|---|---|
| 2015/0034981 | A1* | 2/2015 | Tamagawa | H01L 25/105 361/287 |
| 2015/0287516 | A1* | 10/2015 | Park | H01F 27/292 29/602.1 |
| 2016/0086719 | A1 | 3/2016 | Jeong | |
| 2016/0189840 | A1 | 6/2016 | Ahn et al. | |
| 2017/0006704 | A1 | 1/2017 | Yoshioka et al. | |
| 2017/0110236 | A1 | 4/2017 | Jang et al. | |
| 2017/0126198 | A1* | 5/2017 | Mukai | H03H 7/0115 |
| 2017/0229247 | A1* | 8/2017 | Yoneda | H01F 17/0013 |
| 2017/0301460 | A1* | 10/2017 | Ishida | H01G 4/005 |
| 2018/0096778 | A1 | 4/2018 | Yatabe et al. | |

FOREIGN PATENT DOCUMENTS

| | | | |
|---|---|---|---|
| JP | 2002134321 | A | 5/2002 |
| JP | 2002270428 | A | 9/2002 |
| JP | 2005251590 | A | 9/2005 |
| JP | 2006347782 | A | 12/2006 |
| JP | 2008177254 | A | 7/2008 |
| JP | 2008258467 | A | 10/2008 |
| JP | 2009043777 | A | 2/2009 |
| JP | 2010245185 | A | 10/2010 |
| JP | 2013098378 | A | 5/2013 |
| JP | 2015079958 | A | 4/2015 |
| JP | 2016018812 | A | 2/2016 |
| JP | 2017011044 | A | 1/2017 |
| JP | 2017073536 | A | 4/2017 |
| JP | 2017092447 | A | 5/2017 |
| JP | 2018-174306 | A | 11/2018 |

OTHER PUBLICATIONS

Japanese Patent Office; Decision of Reasons for Refusal for Japanese Patent Application 2018-015350 (related application); Inoue, Kenichi; Jul. 7, 2022; 5 pages.
Japanese Office Action dated Nov. 2, 2023 in corresponding Japanese Patent Application No. 2022-152547 (with machine-generated English translation), 6 pages.

* cited by examiner

CHIP INDUCTOR AND METHOD FOR MANUFACTURING THE SAME

CROSS-REFERENCE TO RELATED APPLICATIONS

This application is a Continuation of U.S. patent application Ser. No. 15/940,002, filed Mar. 29, 2018, entitled CHIP INDUCTOR AND METHOD FOR MANUFACTURING THE SAME, the specifications of which are incorporated by reference herein in their entirety. Furthermore, this application claims the benefit of priority of Japanese Application No. 2017-068593, filed Mar. 30, 2017, and Japanese Application No. 2017-070627, filed Mar. 31, 2017, and Japanese Application No. 2018-015350, filed Jan. 31, 2018, the specifications of which are incorporated by reference herein in their entirety.

BACKGROUND OF THE INVENTION

1. Field of the Invention

The present invention relates to a chip inductor and a method for manufacturing the same.

2. Description of the Related Art

JPH09199365A discloses a chip inductor. The chip inductor includes an insulating substrate. A spiral conductor pattern, having an inner end portion and an outer end portion, is formed on a surface of the insulating substrate. A first terminal electrode is electrically connected to the outer end portion of the conductor pattern. A second terminal electrode is electrically connected to the inner end portion of the conductor pattern.

SUMMARY OF THE INVENTION

A preferred embodiment of the present invention provides a chip inductor including a sealing body having a mounting surface and a coil conductor sealed in an interior of the sealing body, wherein the coil conductor includes a first coil end exposed from the mounting surface of the sealing body, a second coil end exposed from the mounting surface of the sealing body, and a spiral portion of spiral form connected to the first coil end and the second coil end and routed along a normal direction of the mounting surface of the sealing body from the first coil end and the second coil end.

A preferred embodiment of the present invention provides a chip inductor including a sealing body having a mounting surface, a non-mounting surface positioned at an opposite side to the mounting surface, and a connecting surface connecting the mounting surface and the non-mounting surface, and a coil conductor sealed in an interior of the sealing body, wherein the coil conductor includes a first coil end exposed from the connecting surface of the sealing body, a second coil end exposed from the connecting surface of the sealing body, and a spiral portion connected to the first coil end and the second coil end and routed spirally along a normal direction of the mounting surface of the sealing body from the first coil end and the second coil end.

A preferred embodiment of the present invention provides a method for manufacturing a chip inductor that includes a sealing body having a mounting surface, and a coil conductor sealed in an interior of the sealing body, wherein the method for manufacturing the chip inductor comprising steps of preparing a base member having a major surface, forming a first insulator layer which is to be a portion of the sealing body on the major surface of the base member, selectively embedding a conductor in the first insulator layer so as to be routed in a normal direction of the mounting surface of the sealing body to form a first spiral portion of spiral form which is to be a portion of the coil conductor and includes a first coil end to be externally connected and a first coil sub end to be internally connected, forming a second insulator layer which is to be a portion of the sealing body on the first insulator layer, selectively embedding a conductor in the second insulator layer so as to be electrically connected to the first coil sub end of the first spiral portion to form a connecting portion which is to be a portion of the coil conductor, forming a third insulator layer which is to be a portion of the sealing body on the second insulator layer, and selectively embedding a conductor in the third insulator layer so as to be routed in the normal direction of the mounting surface of the sealing body to form a second spiral portion of spiral form which is to be a portion of the coil conductor and includes a second coil end to be externally connected and a second coil sub end to be electrically connected to the connecting portion.

The above-described or yet other objects, features, and effects of the present invention will be clarified by the following description of preferred embodiments made with reference to the accompanying drawings.

DETAILED DESCRIPTION OF THE PREFERRED EMBODIMENTS

Figure 1:
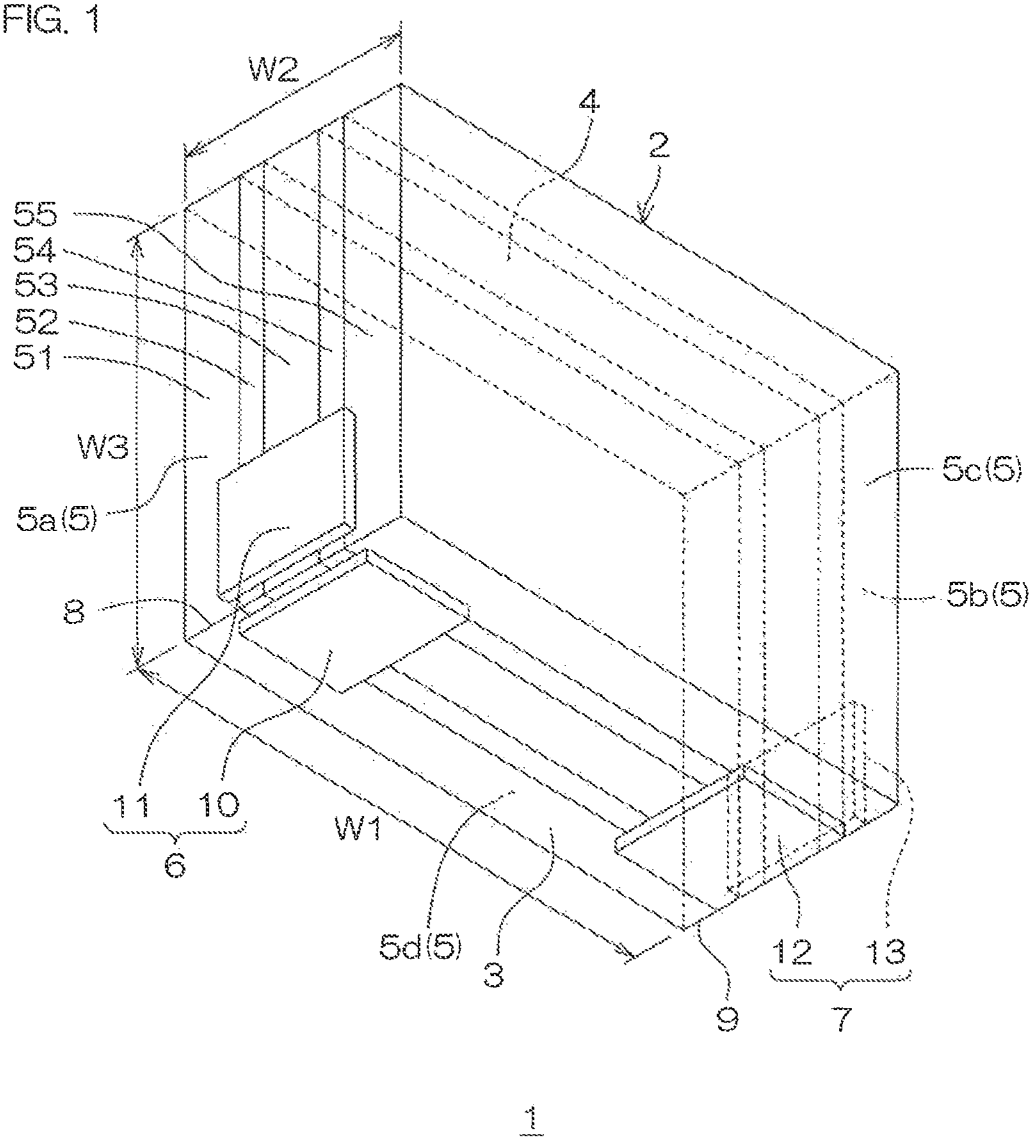
FIG. 1 is a perspective view of a chip inductor according to a first preferred embodiment of the present invention.

A Q value (quality factor) is known as a parameter expressing a characteristic of a chip inductor. The characteristic of a chip inductor is better the higher the Q value. The Q value of a chip inductor is ideally expressed by the formula: "$Q=2\pi fL/R$." In the formula, "f" is a frequency applied to a coil conductor, "L" is an inductance component of the coil conductor, and "R" is a resistance component of the coil conductor.

The inductance component may increase with an increase in the number of turns of the coil conductor. The resistance component may decrease with an increase in cross-sectional area of the coil conductor. These signify that a high Q value is obtained by enlarging the coil conductor.

With a chip inductor with a structure such as disclosed in JPH09199365A, a coil conductor is formed along a surface of a substrate. Therefore, if the coil conductor is to be enlarged, an area of the surface of the substrate must be increased. The chip inductor is consequently enlarged and therefore an area occupied by the chip inductor with respect to a connected object, such as a mounting substrate, etc., increases.

That is, with the chip inductor with the structure such as disclosed in JPH09199365A, there is a structural problem in that when the coil conductor is enlarged, the area occupied by the substrate with respect to a surface of the connected object, such as a mounting substrate, etc., increases two-dimensionally. Such a problem is a hindrance to increasing the Q value of the chip inductor and is also a hindrance to shrinking the mounting substrate and achieving high density mounting on the mounting substrate.

A preferred embodiment of the present invention thus provides a chip inductor and a method for manufacturing the same by which an increase in an area occupied with respect to a connected object, such as a mounting substrate, etc., can be suppressed and the Q value can be improved.

A preferred embodiment of the present invention provides a chip inductor including a sealing body having a mounting surface and a coil conductor sealed in an interior of the sealing body, wherein the coil conductor includes a first coil end exposed from the mounting surface of the sealing body, a second coil end exposed from the mounting surface of the sealing body, and a spiral portion of spiral form connected to the first coil end and the second coil end and routed along a normal direction of the mounting surface of the sealing body from the first coil end and the second coil end.

With the present chip inductor, if the number of turns or a cross-sectional area of the coil conductor is to be increased, the coil conductor can be enlarged three-dimensionally along the normal direction of the mounting surface of the sealing body. The coil conductor can thereby be suppressed from being enlarged two-dimensionally along the mounting surface of the sealing body.

Consequently, an area occupied by the sealing body with respect to a surface of a connected object, such as a mounting substrate, etc., can be suppressed from increasing two-dimensionally. A chip inductor can thus be provided by which an increase in the area occupied with respect to a connected object, such as a mounting substrate, etc., can be suppressed and the Q value can be improved.

A preferred embodiment of the present invention provides a chip inductor including a sealing body having a mounting surface, a non-mounting surface positioned at an opposite side to the mounting surface, and a connecting surface connecting the mounting surface and the non-mounting surface, and a coil conductor sealed in an interior of the sealing body, wherein the coil conductor includes a first coil end exposed from the connecting surface of the sealing body, a second coil end exposed from the connecting surface of the sealing body, and a spiral portion connected to the first coil end and the second coil end and routed spirally along a normal direction of the mounting surface of the sealing body from the first coil end and the second coil end.

With the present chip inductor, if the number of turns or the cross-sectional area of the coil conductor is to be increased, the coil conductor can be enlarged three-dimensionally along the normal direction of the mounting surface of the sealing body. The coil conductor can thereby be suppressed from being enlarged two-dimensionally along the mounting surface of the sealing body.

Consequently, the area occupied by the sealing body with respect to a surface of a connected object, such as a mounting substrate, etc., can be suppressed from increasing two-dimensionally. A chip inductor can thus be provided by which an increase in the area occupied with respect to a connected object, such as a mounting substrate, etc., can be suppressed and the Q value can be improved.

A preferred embodiment of the present invention provides a method for manufacturing a chip inductor that includes a sealing body having a mounting surface, and a coil conductor sealed in an interior of the sealing body, wherein the method for manufacturing the chip inductor comprising steps of preparing a base member having a major surface, forming a first insulator layer which is to be a portion of the sealing body on the major surface of the base member, selectively embedding a conductor in the first insulator layer so as to be routed in a normal direction of the mounting surface of the sealing body to form a first spiral portion of spiral form which is to be a portion of the coil conductor and includes a first coil end to be externally connected and a first coil sub end to be internally connected, forming a second insulator layer which is to be a portion of the sealing body on the first insulator layer, selectively embedding a conductor in the second insulator layer so as to be electrically connected to the first coil sub end of the first spiral portion to form a connecting portion which is to be a portion of the coil conductor, forming a third insulator layer which is to be a portion of the sealing body on the second insulator layer, and selectively embedding a conductor in the third insulator layer so as to be routed in the normal direction of the mounting surface of the sealing body to form a second spiral portion of spiral form which is to be a portion of the coil conductor and includes a second coil end to be externally connected and a second coil sub end to be electrically connected to the connecting portion.

The present method for manufacturing the chip inductor enables manufacture of a chip inductor that includes the spiral portions of spiral forms that are routed along the normal direction of the mounting surface of the sealing body. Therefore, if the number of turns or the cross-sectional area of the coil conductor is to be increased, the coil conductor can be enlarged three-dimensionally along the normal direction of the mounting surface of the sealing body. The coil conductor can thereby be suppressed from being enlarged two-dimensionally along the mounting surface of the sealing body.

Consequently, the area occupied by the sealing body with respect to a surface of a connected object, such as a mounting substrate, etc., can be suppressed from increasing two-dimensionally. A chip inductor can thus be manufactured and provided by which an increase in the area occupied with respect to a connected object, such as a mounting substrate, etc., can be suppressed and the Q value can be improved.

Preferred embodiments of the present invention shall now be described in detail with reference to the attached drawings.

Figure 2:
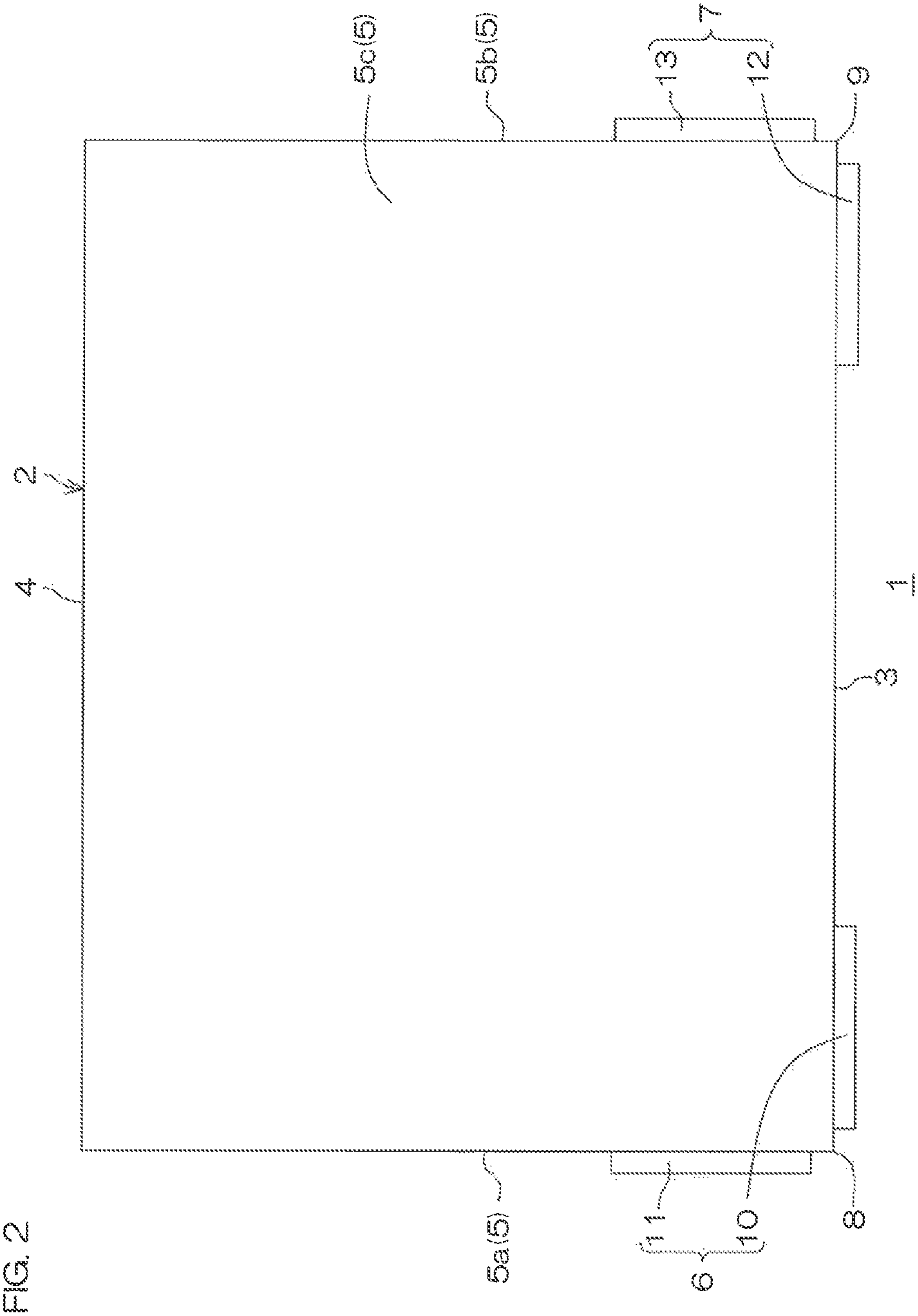
FIG. 2 is a front view of the chip inductor shown in FIG. 1.
Figure 3:
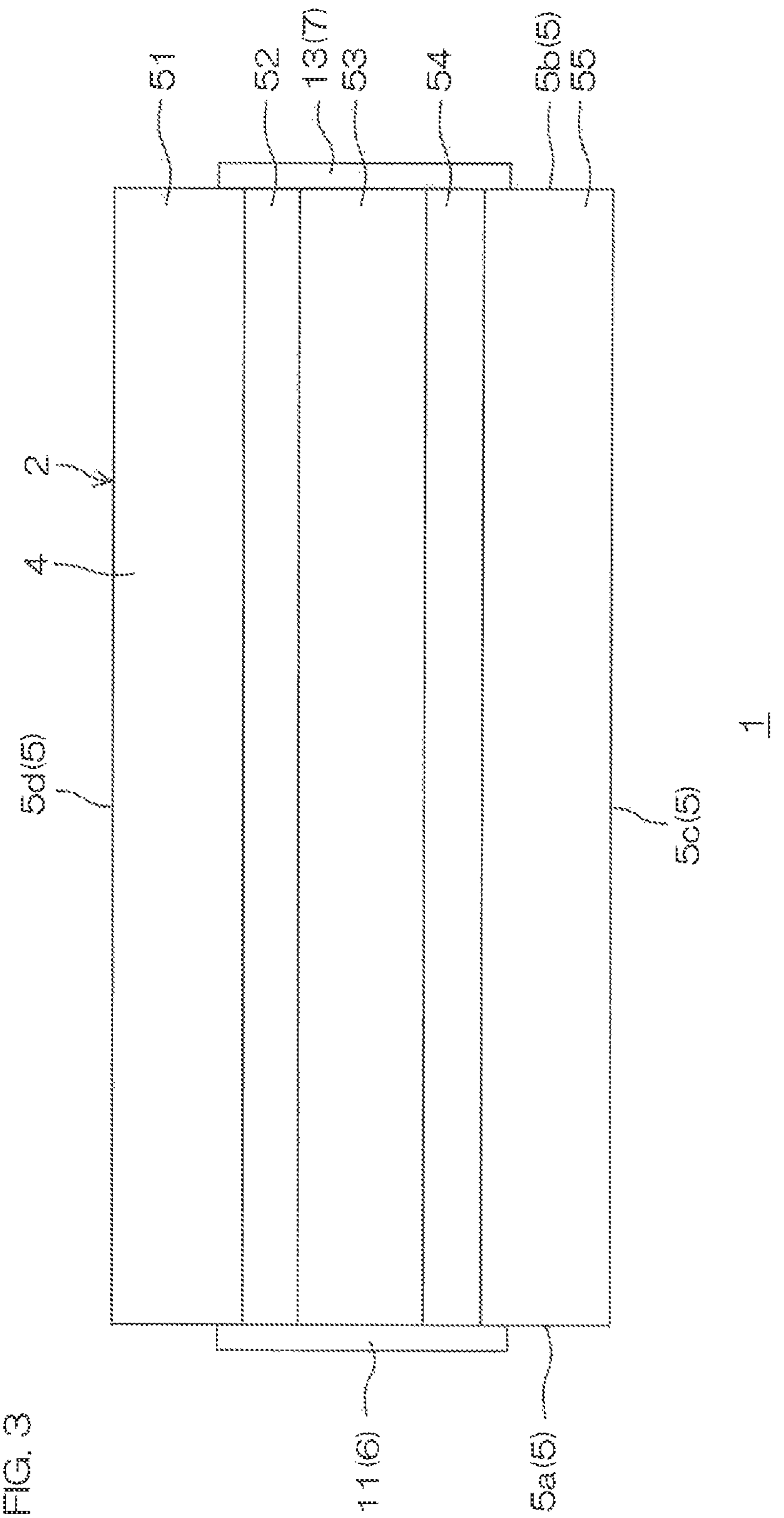
FIG. 3 is a top view of the chip inductor shown in FIG. 1.
Figure 4:
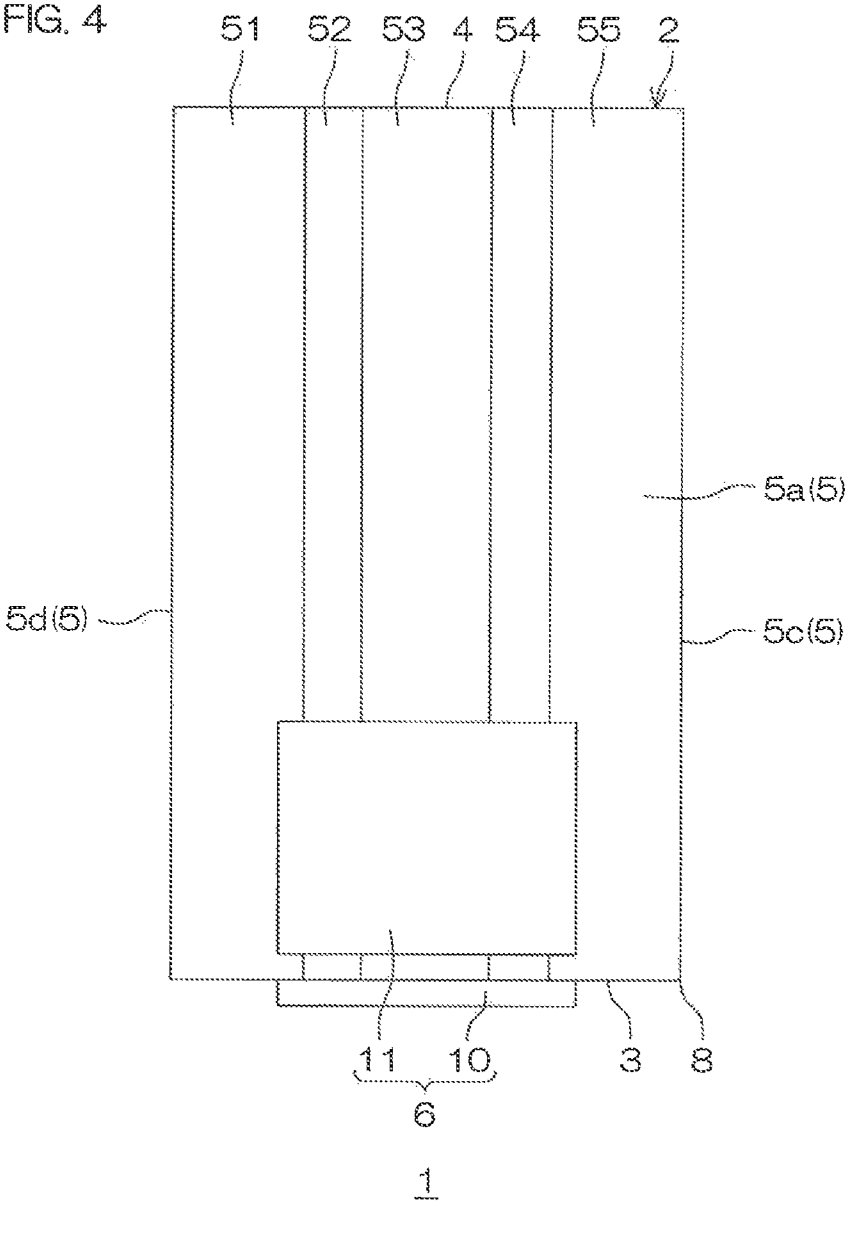
FIG. 4 is a first side view of the chip inductor shown in FIG. 1.
Figure 5:
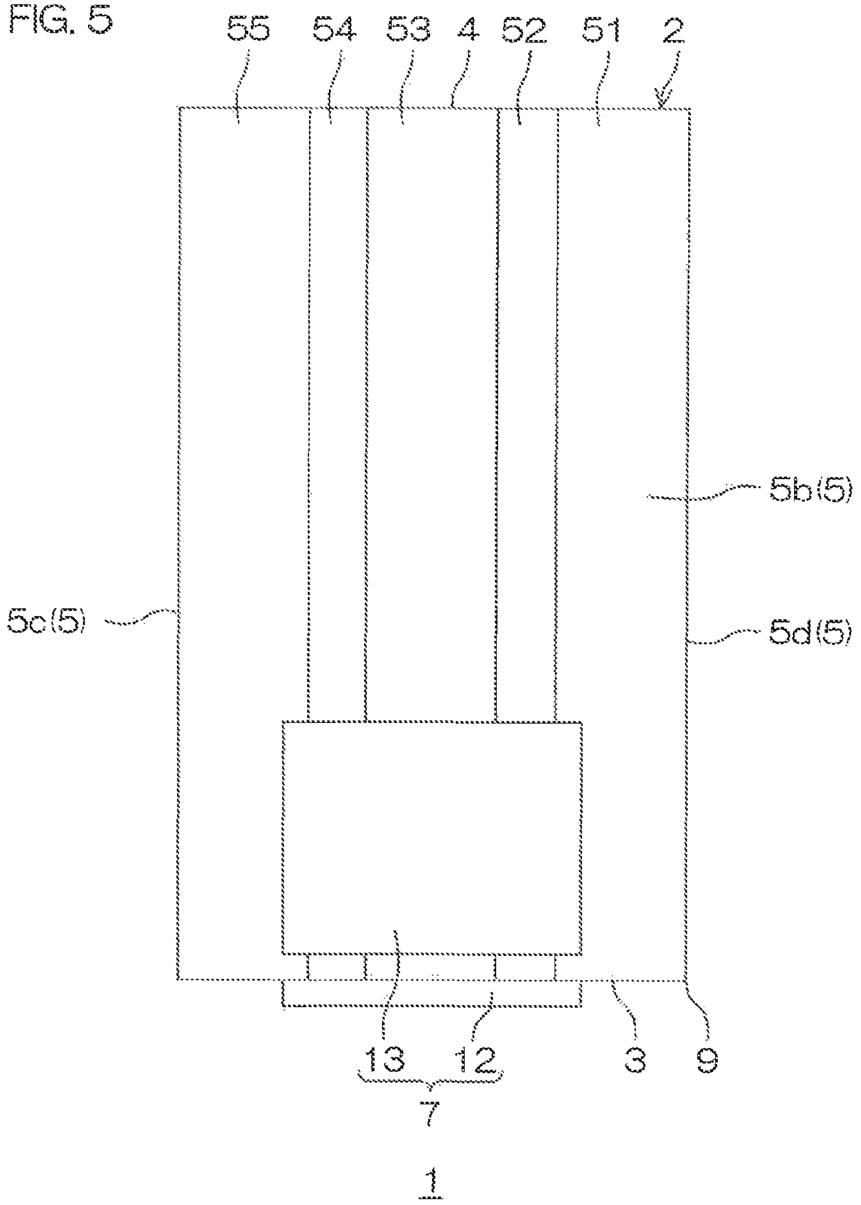
FIG. 5 is a second side view of the chip inductor shown in FIG. 1.
Figure 6:
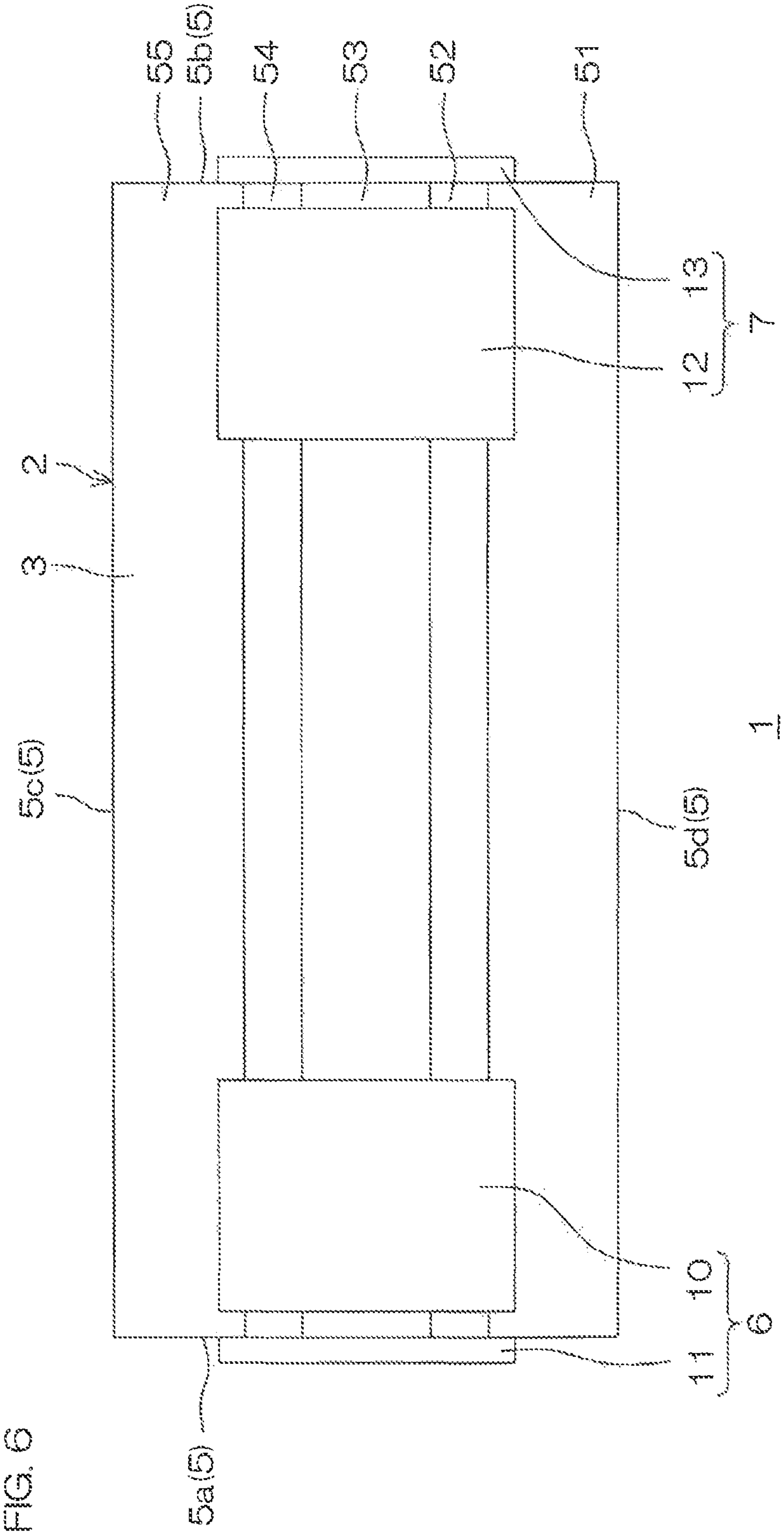
FIG. 6 is a bottom view of the chip inductor shown in FIG. 1.

FIG. 1 is a perspective view of a chip inductor 1 according to a first preferred embodiment of the present invention. FIG. 2 is a front view of the chip inductor 1 shown in FIG. 1. FIG. 3 is a top view of the chip inductor 1 shown in FIG. 1. FIG. 4 is a first side view of the chip inductor 1 shown in FIG. 1. FIG. 5 is a second side view of the chip inductor 1 shown in FIG. 1. FIG. 6 is a bottom view of the chip inductor 1 shown in FIG. 1.

Referring to FIG. 1 to FIG. 6, the chip inductor 1 is a fine electronic component referred to as a chip part. The chip inductor 1 includes a sealing body 2 of rectangular parallelepiped shape. The sealing body 2 is also a package that seals a functional element (an inductor in the present embodiment).

The sealing body 2 is made of an insulator. The insulator may include an inorganic based insulator that includes silicon oxide, silicon nitride, or a ceramic. The insulator may include an organic based insulator that includes a sealing resin, such as a polyimide resin or an epoxy resin, etc. With the present embodiment, an example where the sealing body 2 includes an epoxy resin as an organic based insulator shall be described. The epoxy resin is also a negative type photoresist.

Referring to FIG. 1 to FIG. 6, the sealing body 2 includes a mounting surface 3, a non-mounting surface 4, positioned at an opposite side to the mounting surface 3, and connecting surfaces 5, connecting the mounting surface 3 and the non-mounting surface 4. The mounting surface 3 is a facing surface that faces a connected object, such as a mounting substrate, etc., when the chip inductor 1 is mounted on the connected object.

In the present embodiment, the mounting surface 3 and the non-mounting surface 4 are formed in oblong shapes in a plan view as viewed from a normal direction thereof (hereinafter referred to simply as the "plan view"). A first connecting surface 5*a* and a second connecting surface 5*b*, connected to short sides of the mounting surface 3, and a third connecting surface 5*c* and a fourth connecting surface 5*d*, connected to long sides of the mounting surface 3, are included in the connecting surfaces 5 of the sealing body 2.

In the present embodiment, the first connecting surface 5*a* and the second connecting surface 5*b*, in a side view as viewed from a normal direction thereof (hereinafter referred to simply as the "side view"), are formed in oblong shapes extending along the normal direction to the mounting surface 3. Respective surface areas of the third connecting surface 5*c* and the fourth connecting surface 5*d* are larger than respective surface areas of the first connecting surface 5*a* and the second connecting surface 5*b*.

The mounting surface 3 of the sealing body 2 forms a bottom surface of the chip inductor 1. The non-mounting surface 4 of the sealing body 2 forms an upper surface of the chip inductor 1. The first connecting surface 5*a* of the sealing body 2 forms a first side surface of the chip inductor 1.

The second connecting surface 5*b* of the sealing body 2 forms a second side surface of the chip inductor 1. The third connecting surface 5*c* of the sealing body 2 forms a front surface of the chip inductor 1. The fourth connecting surface 5*d* of the sealing body 2 forms a back surface of the chip inductor 1.

A width W1 along the long sides of the mounting surface 3 of the sealing body 2 may be not less than 0.1 mm and not more than 1.0 mm (for example, approximately 0.4 mm). A width W2 along the short sides of the mounting surface 3 of the sealing body 2 may be not less than 0.05 mm and not more than 0.4 mm (for example, approximately 0.175 mm). A width W3 along long sides of the first connecting surface 5*a* of the sealing body 2 may be not less than 0.1 mm and not more than 1 mm (for example, approximately 0.3 mm).

A first external terminal 6 and a second external terminal 7 are formed on outer surfaces of the sealing body 2. The first external terminal 6 is formed in vicinities of a first angle portion 8, connecting the mounting surface 3 and the first connecting surface 5*a*, in the sealing body 2. The second external terminal 7 is formed in vicinities of a second angle portion 9, connecting the mounting surface 3 and the second connecting surface 5*b*, in the sealing body 2. The first external terminal 6 and the second external terminal 7 face each other along a long direction of the mounting surface 3 of the sealing body 2.

In the present embodiment, the first external terminal 6 includes a first bottom surface terminal 10 and a first side surface terminal 11. The first bottom surface terminal 10 is formed at a first angle portion 8 side end portion of the mounting surface 3 of the sealing body 2. The first side surface terminal 11 is formed at a first angle portion 8 side end portion of the first connecting surface 5*a* of the sealing body 2.

The first bottom surface terminal 10 and the first side surface terminal 11 are formed across the first corner portion 8 and across an interval from each other. In the present embodiment, the first bottom surface terminal 10 is formed in a quadrilateral shape in the plan view. In the present embodiment, the first side surface terminal 11 is formed in a quadrilateral shape in the side view.

The first bottom surface terminal 10 may have a laminated structure that includes a nickel film, a palladium film, and a gold film laminated in that order from the outer surface side of the sealing body 2. The first side surface terminal 11 may have a laminated structure that includes a nickel film, a palladium film, and a gold film laminated in that order from the outer surface side of the sealing body 2.

In the present embodiment, the second external terminal 7 includes a second bottom surface terminal 12 and a second side surface terminal 13. The second bottom surface terminal 12 is formed at a second angle portion 9 side end portion of the mounting surface 3 of the sealing body 2. The second side surface terminal 13 is formed at a second angle portion 9 side end portion of the second connecting surface 5*b* of the sealing body 2.

The second bottom surface terminal 12 and the second side surface terminal 13 are formed across the second corner portion 9 and across an interval from each other. In the present embodiment, the second bottom surface terminal 12 is formed in a quadrilateral shape in the plan view. In the present embodiment, the second side surface terminal 13 is formed in a quadrilateral shape in the side view.

The second bottom surface terminal 12 may have a laminated structure that includes a nickel film, a palladium film, and a gold film laminated in that order from the outer surface side of the sealing body 2. The second side surface terminal 13 may have a laminated structure that includes a nickel film, a palladium film, and a gold film laminated in that order from the outer surface side of the sealing body 2.

Figure 7:
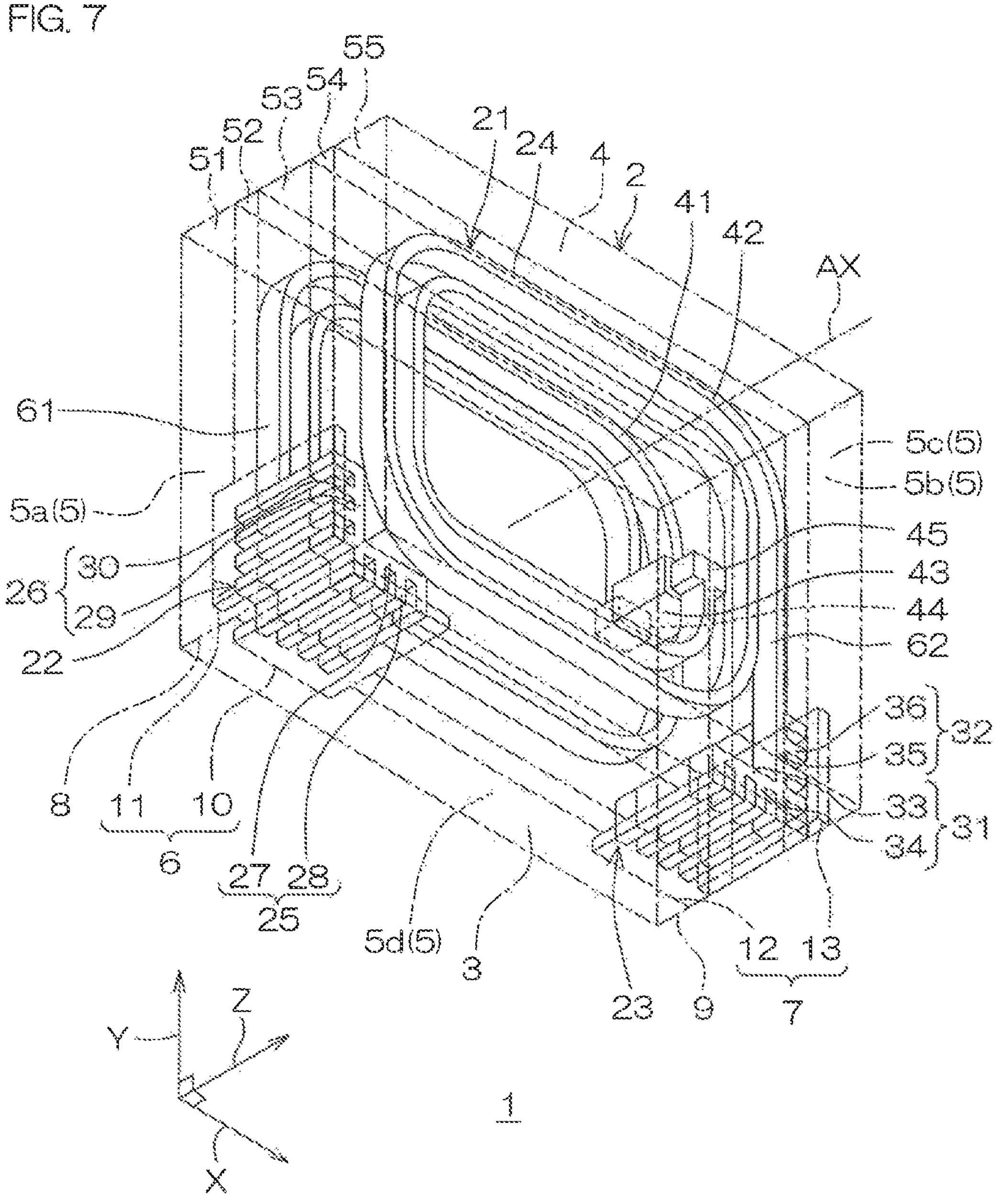
FIG. 7 is a perspective view of an internal structure of the chip inductor shown in FIG. 1.

FIG. 7 is a perspective view of an internal structure of the chip inductor 1 shown in FIG. 1.

Referring to FIG. 7, the chip inductor 1 includes a coil conductor 21, sealed in an interior of the sealing body 2. The coil conductor 21 forms an inductor. An inductance component L of the coil conductor 21 is, for example, not less than 0.1 nH and not more than 100 nH.

In the present embodiment, only the coil conductor 21 is sealed in the interior of the sealing body 2. That is, a conductor or other member besides the coil conductor 21 is not sealed in the interior of the sealing body 2.

The coil conductor 21 includes a first coil end 22, a second coil end 23, and a spiral portion 24 of spiral form. The first coil end 22 is exposed from the sealing body 2 and connected to the first external terminal 6. The second coil end 23 is exposed from the sealing body 2 and connected to the second external terminal 7. The first coil end 22 and the second coil end 23 face each other along the long direction of the mounting surface 3 of the sealing body 2.

The spiral portion 24 is connected to the first coil end 22 and the second coil end 23. The spiral portion 24 is routed spirally along the normal direction of the mounting surface 3 of the sealing body 2 from the first coil end 22 and the second coil end 23.

The spiral portion 24 has a structure where a linear conductor is wound spirally a plurality of times around a predetermined winding axis AX. The winding axis AX is aligned with the normal direction of the third connecting surface 5*c* and the fourth connecting surface 5*d* and passes through a spiral center of the spiral portion 24. The number of turns of the spiral portion 24 is arbitrary.

In the following description, a direction in which the first coil end 22 and the second coil end 23 face each other shall be referred to as the "facing direction X of the first coil end 22 and the second coil end 23." Also, in the following description, the normal direction of the mounting surface 3 shall be referred to as the "normal direction Y of the mounting surface 3." Also, in the following description, a direction aligned with the winding axis AX of the spiral portion 24 shall be referred to as the "winding axis direction Z of the spiral portion 24."

The facing direction X of the first coil end 22 and the second coil end 23 is also a direction in which the first external terminal 6 and the second external terminal 7 face each other. The normal direction Y of the mounting surface 3 is also a direction orthogonal to the facing direction X of the first coil end 22 and the second coil end 23. The winding axis direction Z of the spiral portion 24 is also a direction that is orthogonal to the facing direction X of the first coil end 22 and the second coil end 23 and orthogonal to the normal direction Y of the mounting surface 3.

Further, the facing direction X of the first coil end 22 and the second coil end 23 is also the normal direction of the first connecting surface 5*a* and the second connecting surface 5*b*. Also, the normal direction Y of the mounting surface 3 is also the normal direction of the mounting surface 3 and the non-mounting surface 4. Also, the winding axis direction Z of the spiral portion 24 is also the normal direction of the third connecting surface 5*c* and the fourth connecting surface 5*d*.

The spiral portion 24 has a spiral surface facing an X-Y plane, extending in the facing direction X of the first coil end 22 and the second coil end 23 and in the normal direction Y of the mounting surface 3 and is wound along a normal direction of the X-Y plane (that is, the winding axis direction Z of the spiral portion 24).

The spiral surface of the spiral portion 24 faces the third connecting surface 5*c* and the fourth connecting surface 5*d*. The spiral surface of the spiral portion 24 is a virtual surface defined in a region connecting any two points set at an inner peripheral edge of the spiral portion 24 and the winding axis AX.

In the present embodiment, the first coil end 22 includes a first bottom surface portion 25 and a first side surface portion 26. The first bottom surface portion 25 of the first coil end 22 is exposed from the mounting surface 3 of the sealing body 2 and is connected to the first bottom surface terminal 10. The first side surface portion 26 of the first coil end 22 is exposed from the first connecting surface 5*a* of the sealing body 2 and is connected to the first side surface terminal 11.

The first bottom surface portion 25 of the first coil end 22 includes a first bottom surface extension portion 27 and a plurality of first bottom surface projections 28. The first bottom surface extension portion 27 is formed in a region further to an inner side of the sealing body 2 than the mounting surface 3 of the sealing body 2. The first bottom surface extension portion 27 extends along the mounting surface 3 of the sealing body 2 from the first external terminal 6 side toward the second external terminal 7 side.

The plurality of first bottom surface projections 28 project from the first bottom surface extension portion 27 toward the mounting surface 3 of the sealing body 2. The plurality of first bottom surface projections 28 respectively have tip portions exposed from the mounting surface 3 of the sealing body 2. The plurality of first bottom surface projections 28 are covered collectively by the first bottom surface terminal 10 of the first external terminal 6.

The tip portions of the first bottom surface projections 28 may be formed to be flush with the mounting surface 3. The tip portions of the first bottom surface projections 28 may project further to an outer side than the mounting surface 3. The tip portions of the first bottom surface projections 28 may be recessed further inward than the mounting surface 3.

The first side surface portion 26 of the first coil end 22 includes a first side surface extension portion 29 and a plurality of first side surface projections 30. The first side surface extension portion 29 is formed in a region further to the inner side of the sealing body 2 than the mounting surface 3 of the sealing body 2. The first side surface extension portion 29 extends along the first connecting surface 5*a* of the sealing body 2.

The plurality of first side surface projections 30 project from the first side surface extension portion 29 toward the first connecting surface 5*a* of the sealing body 2. The plurality of first side surface projections 30 respectively have tip portions exposed from the first connecting surface 5*a* of the sealing body 2. The plurality of first side surface projections 30 are covered collectively by the first side surface terminal 11 of the first external terminal 6.

The tip portions of the first side surface projections 30 may be formed to be flush with the first connecting surface 5*a*. The tip portions of the first side surface projections 30 may project further to the outer side than the first connecting surface 5*a*. The tip portions of the first side surface projections 30 may be recessed further inward than the first connecting surface 5*a*.

In the present embodiment, the second coil end 23 includes a second bottom surface portion 31 and a second side surface portion 32. The second bottom surface portion 31 of the second coil end 23 is exposed from the mounting surface 3 of the sealing body 2 and is connected to the second bottom surface terminal 12. The second side surface portion 32 of the second coil end 23 is exposed from the second connecting surface 5*b* of the sealing body 2 and is connected to the second side surface terminal 13.

The second bottom surface portion 31 of the second coil end 23 includes a second bottom surface extension portion 33 and a plurality of second bottom surface projections 34. The second bottom surface extension portion 33 is formed in a region further to the inner side of the sealing body 2 than the mounting surface 3 of the sealing body 2. The second bottom surface extension portion 33 extends along the mounting surface 3 of the sealing body 2 from the second external terminal 7 side toward the first external terminal 6 side.

The plurality of second bottom surface projections 34 project from the second bottom surface extension portion 33 toward the mounting surface 3 of the sealing body 2. The plurality of second bottom surface projections 34 respectively have tip portions exposed from the mounting surface 3 of the sealing body 2. The plurality of second bottom surface projections 34 are covered collectively by the second bottom surface terminal 12 of the second external terminal 7.

The tip portions of the second bottom surface projections 34 may be formed to be flush with the mounting surface 3. The tip portions of the second bottom surface projections 34 may project further to the outer side than the mounting surface 3. The tip portions of the second bottom surface projections 34 may be recessed further inward than the mounting surface 3.

The second side surface portion 32 of the second coil end 23 includes a second side surface extension portion 35 and a plurality of second side surface projections 36. The second side surface extension portion 35 is formed in a region further to the inner side of the sealing body 2 than the mounting surface 3 of the sealing body 2. The second side surface extension portion 35 extends along the second connecting surface 5*b* of the sealing body 2.

The plurality of second side surface projections 36 project from the second side surface extension portion 35 toward the second connecting surface 5*b* of the sealing body 2. The plurality of second side surface projections 36 respectively have tip portions exposed from the second connecting surface 5*b* of the sealing body 2. The plurality of second side surface projections 36 are covered collectively by the second side surface terminal 13 of the second external terminal 7.

The tip portions of the second side surface projections 36 may be formed to be flush with the second connecting surface 5*b*. The tip portions of the second side surface projections 36 may project further to the outer side than the second connecting surface 5*b*. The tip portions of the second side surface projections 36 may be recessed further inward than the second connecting surface 5*b*.

Figure 8:
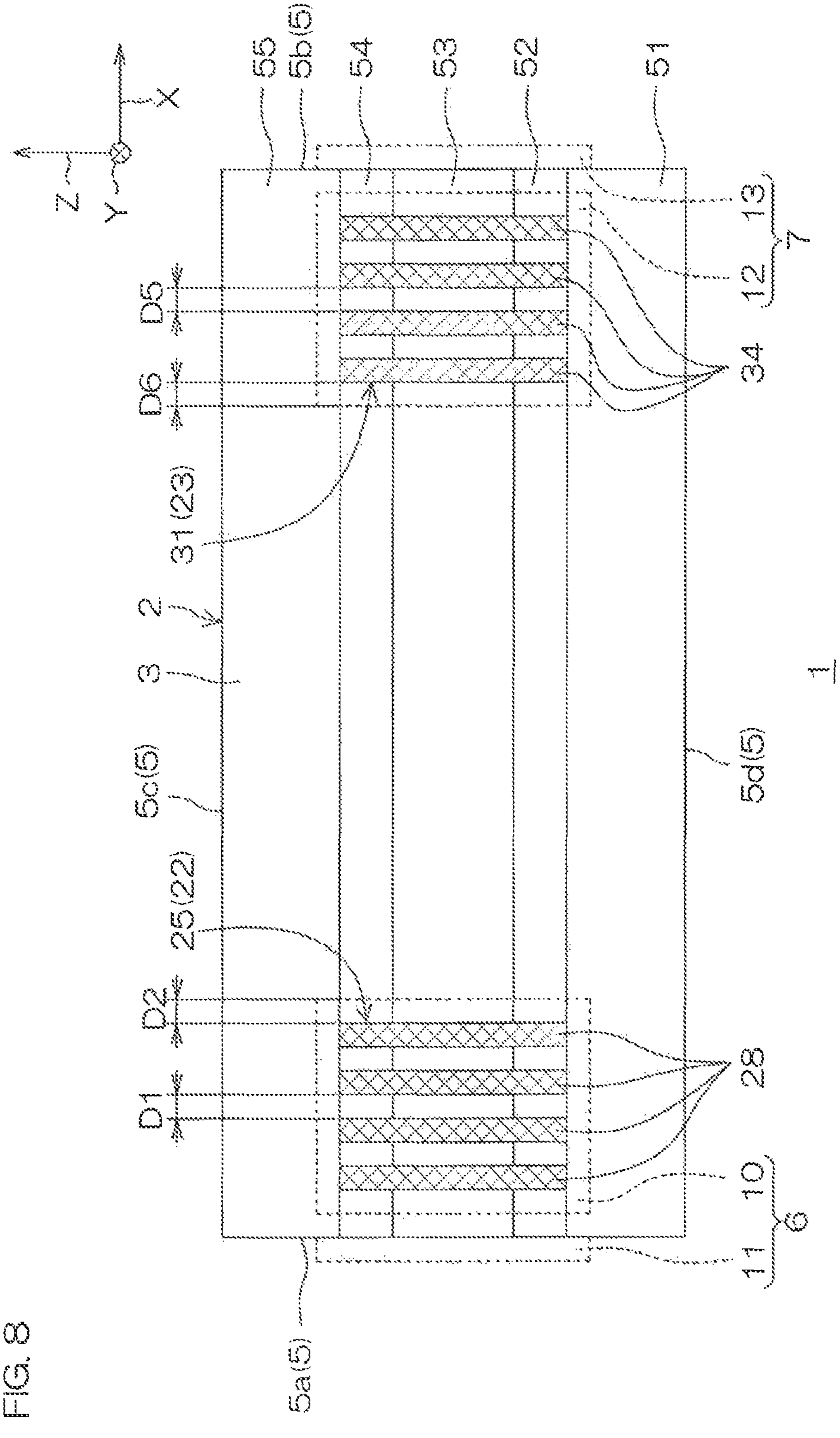
FIG. 8 is a bottom view of the chip inductor shown in FIG. 1 and is a diagram for describing plan view shapes of a first coil end and a second coil end.
Figure 9:
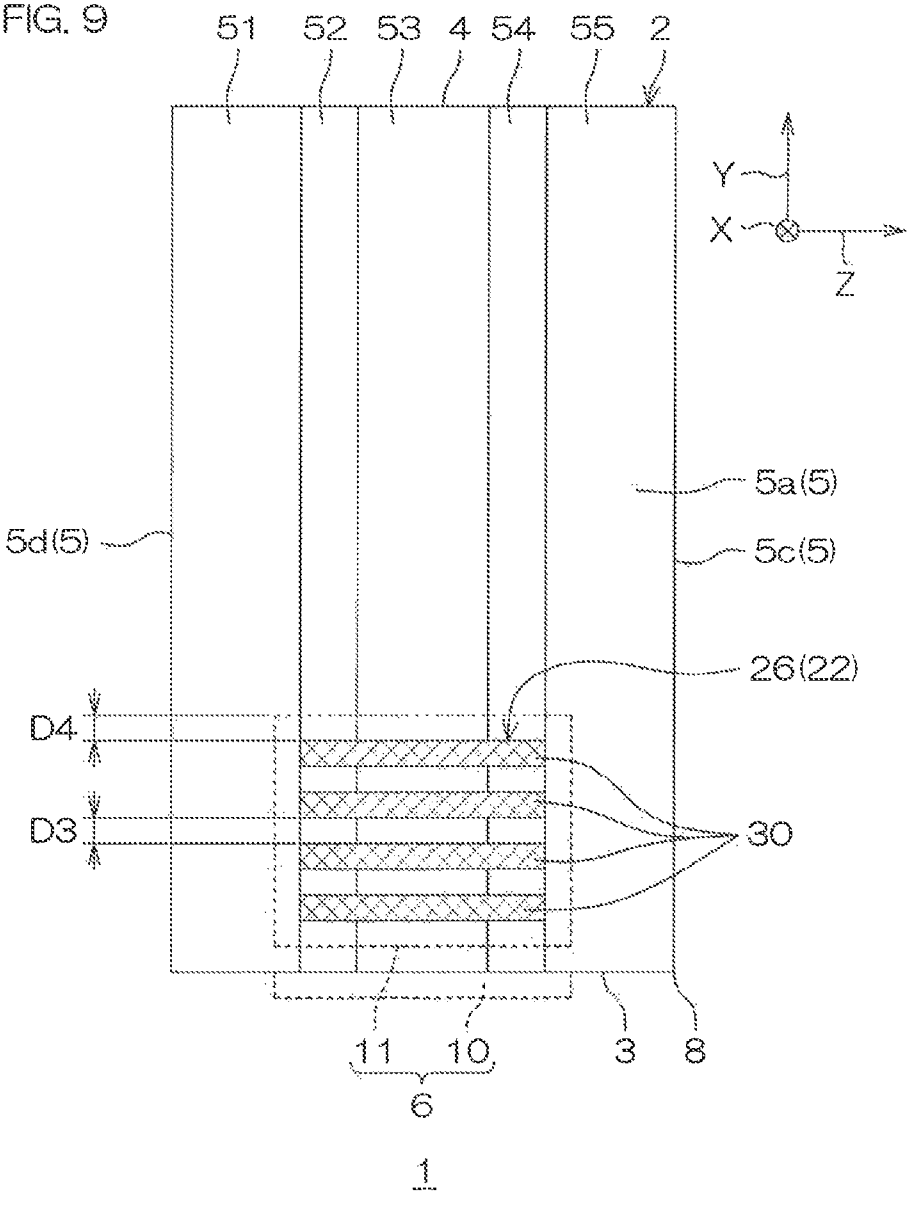
FIG. 9 is a first side view of the chip inductor shown in FIG. 1 and is a diagram for describing a side view shape of the first coil end.
Figure 10:
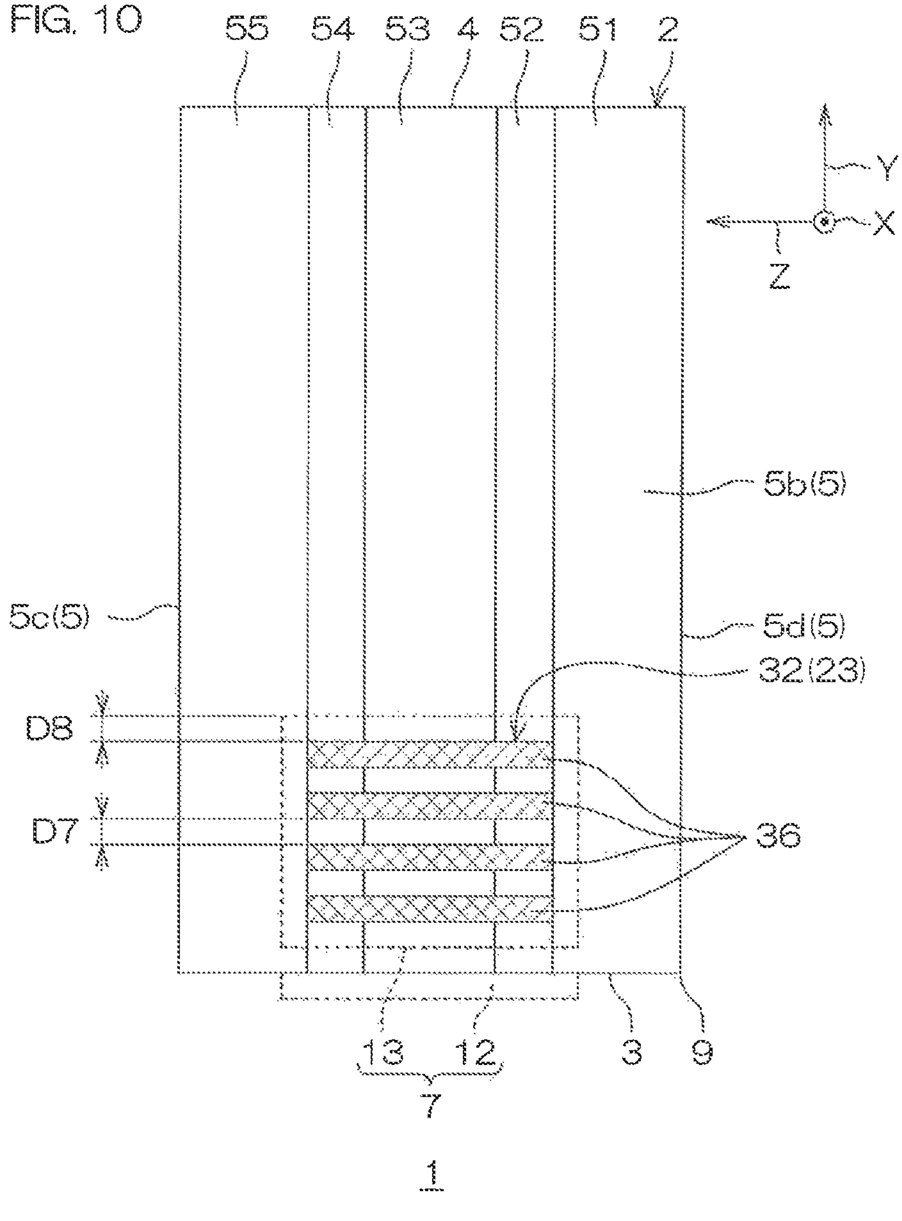
FIG. 10 is a second side view of the chip inductor shown in FIG. 1 and is a diagram for describing a side view shape of the second coil end.

FIG. 8 is a bottom view of the chip inductor 1 shown in FIG. 1 and is a diagram for describing plan view shapes of the first coil end 22 and the second coil end 23. FIG. 9 is a first side view of the chip inductor 1 shown in FIG. 1 and is a diagram for describing a side view shape of the first coil end 22. FIG. 10 is a second side view of the chip inductor 1 shown in FIG. 1 and is a diagram for describing a side view shape of the second coil end 23.

In FIG. 8 to FIG. 10, the first external terminal 6 and the second external terminal 7 are indicated by broken lines for the sake of clarity.

Referring to FIG. 8, the plurality of first bottom surface projections 28 of the first coil end 22 are formed across intervals from each other along the facing direction X of the first coil end 22 and the second coil end 23. The plurality of first bottom surface projections 28 are formed in stripes extending along the winding axis direction Z of the spiral portion 24 in the plan view.

A distance between two mutually adjacent first bottom surface projections 28 is defined as "D1". A distance between a peripheral edge of the first bottom surface projection 28 positioned at an outermost side and a peripheral edge of the first external terminal 6 (first bottom surface terminal 10) is defined as "D2". The formula "D1≤2×D2" holds between "D1" and "D2."

During forming of the first external terminal 6, a conductive material of the first external terminal 6 grows with the respective first bottom surface projections 28 as starting points. If the formula "D1≤2×D2" holds, the conductive material of the first external terminal 6 growing with one first bottom surface projection 28 as the starting point and the conductive material of the first external terminal 6 growing with another first bottom surface projection 28 as the starting point may be mutually overlapped between the two. A usage amount of the conductive material necessary for forming the first external terminal 6 can thereby be reduced.

Referring to FIG. 9, the plurality of first side surface projections 30 of the first coil end 22 are formed across intervals from each other along the normal direction Y of the mounting surface 3. The plurality of first side surface projections 30 are formed in stripes extending along the winding axis direction Z of the spiral portion 24 in the plan view.

A distance between two mutually adjacent first side surface projections 30 is defined as "D3". A distance between a peripheral edge of the first side surface projection 30 positioned at an outermost side and a peripheral edge of the first external terminal 6 (first side surface terminal 11) is defined as "D4". The formula "D3≤2×D4" holds between "D3" and "D4."

During forming of the first external terminal 6, the conductive material of the first external terminal 6 grows with the respective first side surface projections 30 as starting points. If the formula "D3≤2×D4" holds, the conductive material of the first external terminal 6 growing with one first side surface projection 30 as the starting point and the conductive material of the first external terminal 6 growing with another first side surface projection 30 as the starting point may be mutually overlapped between the two. The usage amount of the conductive material necessary for forming the first external terminal 6 can thereby be reduced.

Referring again to FIG. 8, the plurality of second bottom surface projections 34 of the second coil end 23 are formed across intervals from each other along the facing direction X of the first coil end 22 and the second coil end 23. The plurality of second bottom surface projections 34 are formed in stripes extending along the winding axis direction Z of the spiral portion 24 in the plan view.

A distance between two mutually adjacent second bottom surface projections 34 is defined as "D5". A distance between a peripheral edge of the second bottom surface projection 34 positioned at an outermost side and a peripheral edge of the second external terminal 7 (second bottom surface terminal 12) is defined as "D6". The formula "D5≤2×D6" holds between "D5" and "D6."

During forming of the second external terminal 7, a conductive material of the second external terminal 7 grows with the respective second bottom surface projections 34 as starting points. If the formula "D5≤2×D6" holds, the conductive material of the second external terminal 7 growing with one second bottom surface projection 34 as the starting point and the conductive material of the second external terminal 7 growing with another second bottom surface projection 34 as the starting point may be mutually overlapped between the two. A usage amount of the conductive material necessary for forming the second external terminal 7 can thereby be reduced.

Referring to FIG. 10, the plurality of second side surface projections 36 of the second coil end 23 are formed across intervals from each other along the normal direction Y of the mounting surface 3. The plurality of second side surface projections 36 are formed in stripes extending along the winding axis direction Z of the spiral portion 24 in the plan view.

A distance between two mutually adjacent second side surface projections 36 is defined as "D7". A distance between a peripheral edge of the second side surface projection 36 positioned at an outermost side and a peripheral edge of the second external terminal 7 (second side surface terminal 13) is defined as "D8". The formula "D7≤2×D8" holds between "D7" and "D8."

During forming of the second external terminal 7, the conductive material of the second external terminal 7 grows with the respective second side surface projections 36 as starting points. If the formula "D7≤2×D8" holds, the conductive material of the second external terminal 7 growing with one second side surface projection 36 as the starting point and the conductive material of the second external terminal 7 growing with another second side surface projection 36 as the starting point may be mutually overlapped between the two. The usage amount of the conductive material necessary for forming the second external terminal 7 can thereby be reduced.

The distance D1, the distance D3, the distance D5, and the distance D7 may be of mutually equal value or may be of mutually different values.

Referring again to FIG. 7, the spiral portion 24 of the coil conductor 21 has a first spiral portion 41, a second spiral portion 42, and a connecting portion 43, connecting the first spiral portion 41 and the second spiral portion 42.

In regard to the winding axis direction Z of the spiral portion 24, the first spiral portion 41 is formed at the fourth connecting surface **5*d* side of the sealing body 2. The first spiral portion 41 is routed spirally along the normal direction Y of the mounting surface 3 from the first coil end 22. The first spiral portion 41 has a first coil sub end 44 positioned in the interior of the sealing body 2**.

In regard to the winding axis direction Z of the spiral portion 24, the second spiral portion 42 is formed at the third connecting surface **5*c* side of the sealing body 2. The second spiral portion 42 is routed spirally along the normal direction Y of the mounting surface 3 from the second coil end 23. The second spiral portion 42 faces the first spiral portion 41 in the winding axis direction Z of the spiral portion 24. The second spiral portion 42 of the spiral portion 24 has a second coil sub end 45 positioned in the interior of the sealing body 2**.

In regard to the winding axis direction Z of the spiral portion 24, the connecting portion 43 is formed in a region between the first spiral portion 41 and the second spiral portion 42. In the interior of the sealing body 2, the connecting portion 43 connects the first coil sub end 44 of the first spiral portion 41 and the second coil sub end 45 of the second spiral portion 42.

A spiral direction of the first spiral portion 41 and a spiral direction of the second spiral portion 42 are made opposite via the connecting portion 43. The connecting portion 43 is formed as a spiral direction switching portion switching the spiral direction of the first spiral portion 41 and the spiral direction of the second spiral portion 42.

The number of turns of the first spiral portion 41 and the number of turns of the second spiral portion 42 are arbitrary and, as long as a contribution is made to increasing or decreasing the inductance component L, do not have to be not less than 1 necessarily. The number of turns of the first spiral portion 41 may be equal to or different from the number of turns of the second spiral portion 42.

Figure 11:
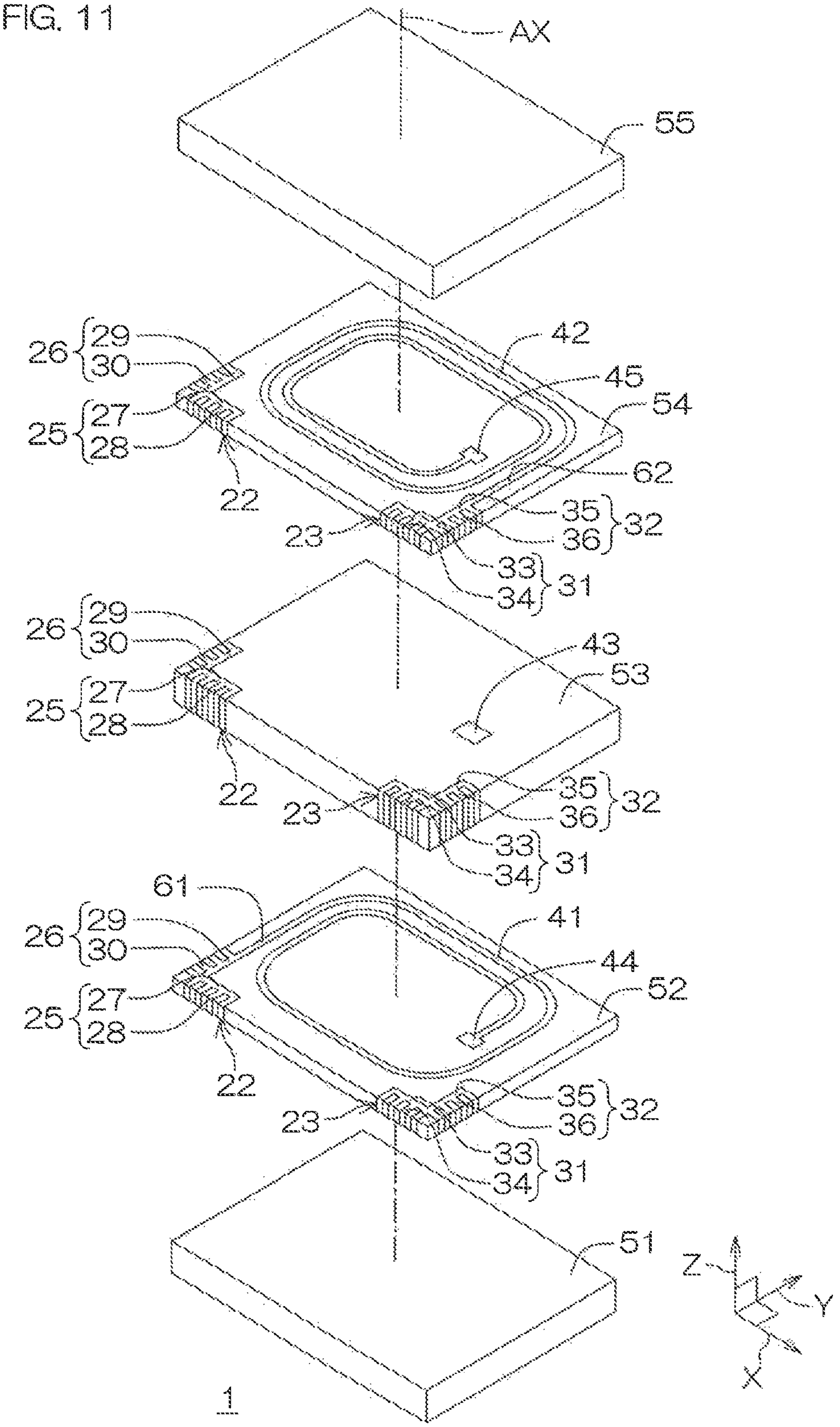
FIG. 11 is an exploded perspective view of the chip inductor shown in FIG. 1.

FIG. 11 is an exploded perspective view of the chip inductor 1 shown in FIG. 1. In FIG. 11, illustration of the first external terminal 6 and the second external terminal 7 is omitted.

Referring to FIG. 11, the sealing body 2 has a laminated structure, in which a plurality (five in the present embodiment) of resin layers, made of an epoxy resin, are laminated along the winding axis direction Z of the spiral portion 24. The resin layers are, more specifically, photoresist layers. That is, the sealing body 2 is a photoresist laminated body, in which a plurality of photoresist layers are laminated. The coil conductor 21 is sealed by the plurality of resin layers.

In the present embodiment, the plurality of resin layers include a first base resin layer 51, a first spiral portion resin layer 52, a connecting portion resin layer 53, a second spiral portion resin layer 54, and a second base resin layer 55.

The first spiral portion resin layer 52 is laminated on the first base resin layer 51. The first spiral portion resin layer 52 seals the first spiral portion 41, a portion of the first coil end 22, and a portion of the second coil end 23.

The connecting portion resin layer 53 is laminated on the first spiral portion resin layer 52. The connecting portion resin layer 53 seals the connecting portion 43, a portion of the first coil end 22, and a portion of the second coil end 23.

The second spiral portion resin layer 54 is laminated on the connecting portion resin layer 53. The second spiral portion resin layer 54 seals the second spiral portion 42, a portion of the first coil end 22, and a portion of the second coil end 23. The second base resin layer 55 is laminated on the second spiral portion resin layer 54.

The first base resin layer 51 and the second base resin layer 55 are layers that do not seal the coil conductor 21. The first base resin layer 51 and the second base resin layer 55 are formed as protective layers arranged to protect the coil conductor 21.

A thickness of the first base resin layer 51 and a thickness of the second base resin layer 55 are preferably greater than a thickness of the first spiral portion resin layer 52, a thickness of the second spiral portion resin layer 54, and a thickness of the connecting portion resin layer 53.

The thickness of the first base resin layer 51 may be equal to the thickness of the second base resin layer 55. The thickness of the first spiral portion resin layer 52 may be equal to the thickness of the second spiral portion resin layer 54. The thickness of the first spiral portion resin layer 52 may be less than the thickness of the connecting portion resin layer 53. The thickness of the connecting portion resin layer 53 may be equal to the thickness of the first base resin layer 51.

The thickness of the first base resin layer 51 and the thickness of the second base resin layer 55 may be not less than 10 μm and not more than 100 μm (for example, 45 μm). The thickness of the first spiral portion resin layer 52 and the thickness of the second spiral portion resin layer 54 may be not less than 10 μm and not more than 50 μm (approximately 20 μm in the present embodiment). The thickness of the connecting portion resin layer 53 may be not less than 10 μm and not more than 100 μm (for example, 45 μm).

The respective thicknesses of the first base resin layer 51, the first spiral portion resin layer 52, the connecting portion resin layer 53, the second spiral portion resin layer 54, and the second base resin layer 55 are arbitrary and are not restricted to the numerical values and conditions given above.

Figure 12:
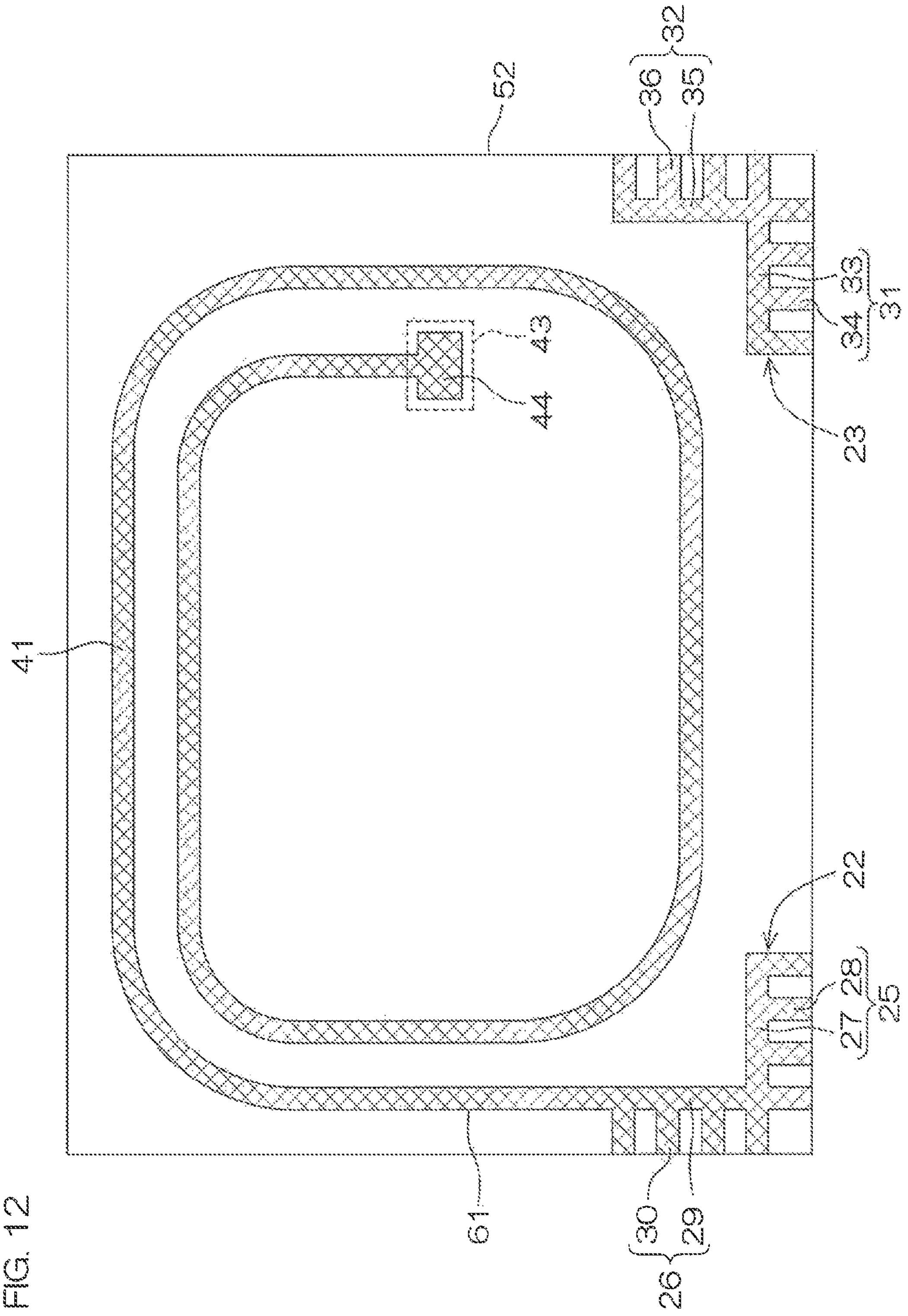
FIG. 12 is a plan view of a first spiral portion resin layer shown in FIG. 7.
Figure 13:
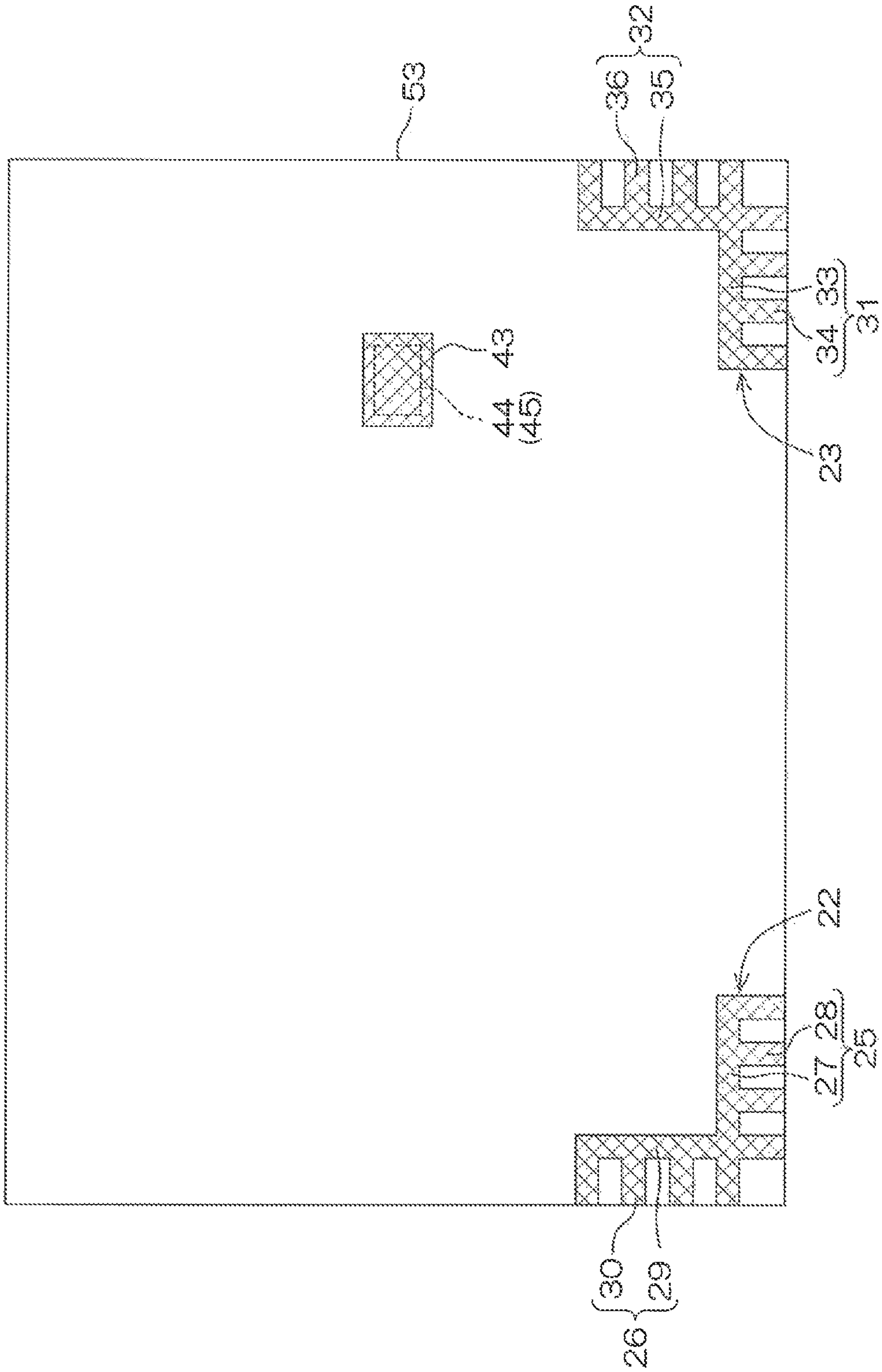
FIG. 13 is a plan view of a connecting portion resin layer shown in FIG. 7.
Figure 14:
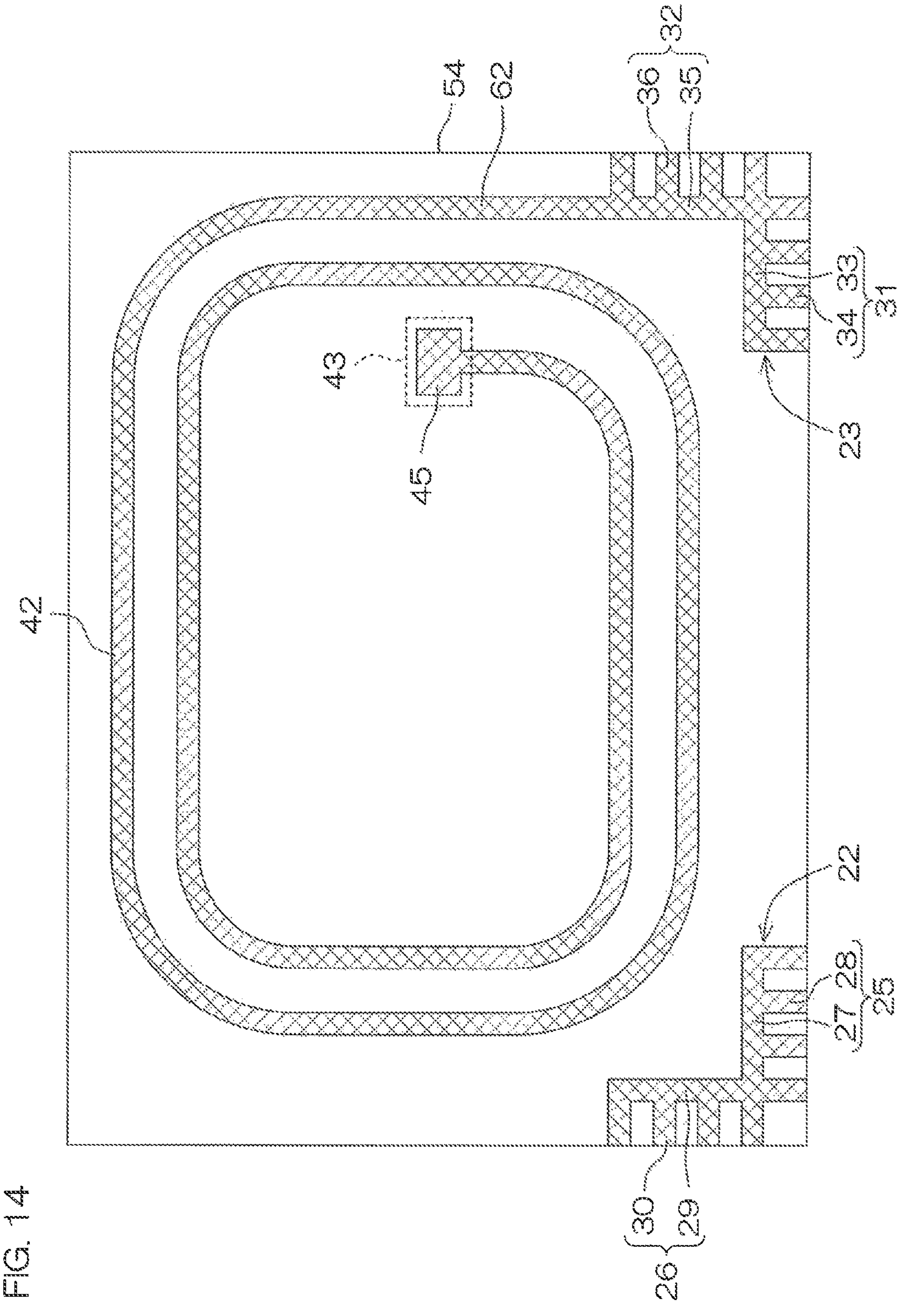
FIG. 14 is a plan view of a second spiral portion resin layer shown in FIG. 7.

FIG. 12 is a plan view of the first spiral portion resin layer 52 shown in FIG. 7. FIG. 13 is a plan view of the connecting portion resin layer 53 shown in FIG. 7. FIG. 14 is a plan view of the second spiral portion resin layer 54 shown in FIG. 7. In FIG. 12 to FIG. 14, illustration of the first external terminal 6 and the second external terminal 7 is omitted.

Referring to FIG. 11 and FIG. 12, the first spiral portion 41, a portion of the first coil end 22, and a portion of the second coil end 23 are embedded in the first spiral portion resin layer 52. The first spiral portion 41, the portion of the first coil end 22, and the portion of the second coil end 23 are formed to penetrate through the first spiral portion resin layer 52 in the winding axis direction Z of the spiral portion 24.

The first spiral portion 41 is wound inwardly from the first coil end 22 toward the first coil sub end 44. The first coil sub end 44 is formed in an arbitrary region in an inner region of the first spiral portion resin layer 52. The first spiral portion 41 has a first lead-out portion 61 lead out in the normal direction Y of the mounting surface 3 from the first coil end 22.

Although not illustrated, the first spiral portion 41, the portion of the first coil end 22, and the portion of the second coil end 23 may each have a laminated structure that includes a titanium seed layer and a copper plating layer laminated in that order from a surface side of the first spiral portion resin layer 52.

Referring to FIG. 11 and FIG. 13, the connecting portion 43, a portion of the first coil end 22, and a portion of the second coil end 23 are embedded in the connecting portion resin layer 53. The connecting portion 43, the portion of the first coil end 22, and the portion of the second coil end 23 are formed to penetrate through the connecting portion resin layer 53 in the winding axis direction Z of the spiral portion 24.

The connecting portion 43 is formed in a region facing the first coil sub end 44 of the first spiral portion 41 in the winding axis direction Z of the spiral portion 24. The connecting portion 43 is thereby electrically connected to the first coil sub end 44 of the first spiral portion 41.

Although not illustrated, the connecting portion 43, the portion of the first coil end 22, and the portion of the second coil end 23 may each have a laminated structure that includes a titanium seed layer and a copper plating layer laminated in that order from a surface side of the connecting portion resin layer 53. The titanium seed layer of the connecting portion 43 may be connected to the titanium seed layer and the copper plating layer of the first coil sub end 44.

Referring to FIG. 11 and FIG. 14, the second spiral portion 42, a portion of the first coil end 22, and a portion of the second coil end 23 are embedded in the second spiral portion resin layer 54. The second spiral portion 42, the portion of the first coil end 22, and the portion of the second coil end 23 are formed to penetrate through the second spiral portion resin layer 54 in the winding axis direction Z of the spiral portion 24.

The second spiral portion 42 has a second lead-out portion 62 lead out in the normal direction Y of the mounting surface 3 from the second coil end 23. The second spiral portion 42 is wound inwardly from the second coil end 23 toward the second coil sub end 45.

When the second coil sub end 45 is taken as a starting point, the second spiral portion 42 is wound outwardly from the second coil sub end 45 toward the second coil end 23. The second spiral portion 42 is thus routed spirally continuously around the winding axis direction Z of the spiral portion 24 in a region between the second coil sub end 45 and the second coil end 23.

The second coil sub end 45 is formed in a region facing the connecting portion 43 in the winding axis direction Z of the spiral portion 24. That is, the connecting portion 43 is interposed in a region between the first coil sub end 44 and the second coil sub end 45.

The second coil sub end 45 is electrically connected to the first coil sub end 44 via the connecting portion 43. The second spiral portion 42 is thereby electrically connected to the first spiral portion 41 via the connecting portion 43.

Although not illustrated, the second spiral portion 42, the portion of the first coil end 22, and the portion of the second coil end 23 may each have a laminated structure that includes a titanium seed layer and a copper plating layer laminated in that order from a surface side of the second spiral portion resin layer 54. The titanium seed layer of the second spiral portion 42 may be connected to the titanium seed layer and the copper plating layer of the connecting portion 43.

With the present embodiment, an example is illustrated where the first bottom surface extension portion 27 and the first side surface extension portion 29 of the first coil end 22 are formed across the first spiral portion resin layer 52, the connecting portion resin layer 53, and the second spiral portion resin layer 54.

However, the first bottom surface extension portion 27 of the first coil end 22 may be formed in at least one layer among the first spiral portion resin layer 52, the connecting portion resin layer 53, and the second spiral portion resin layer 54. Similarly, the first side surface extension portion 29 of the first coil end 22 may be formed in at least one layer among the first spiral portion resin layer 52, the connecting portion resin layer 53, and the second spiral portion resin layer 54.

Further, with the present embodiment, an example is illustrated where the second bottom surface extension portion 33 and the second side surface extension portion 35 of the second coil end 23 are formed across the first spiral portion resin layer 52, the connecting portion resin layer 53, and the second spiral portion resin layer 54.

However, the second bottom surface extension portion 33 of the second coil end 23 may be formed in at least one layer among the first spiral portion resin layer 52, the connecting portion resin layer 53, and the second spiral portion resin layer 54. Similarly, the second side surface extension portion 35 of the second coil end 23 may be formed in at least one layer among the first spiral portion resin layer 52, the connecting portion resin layer 53, and the second spiral portion resin layer 54.

Figure 15:
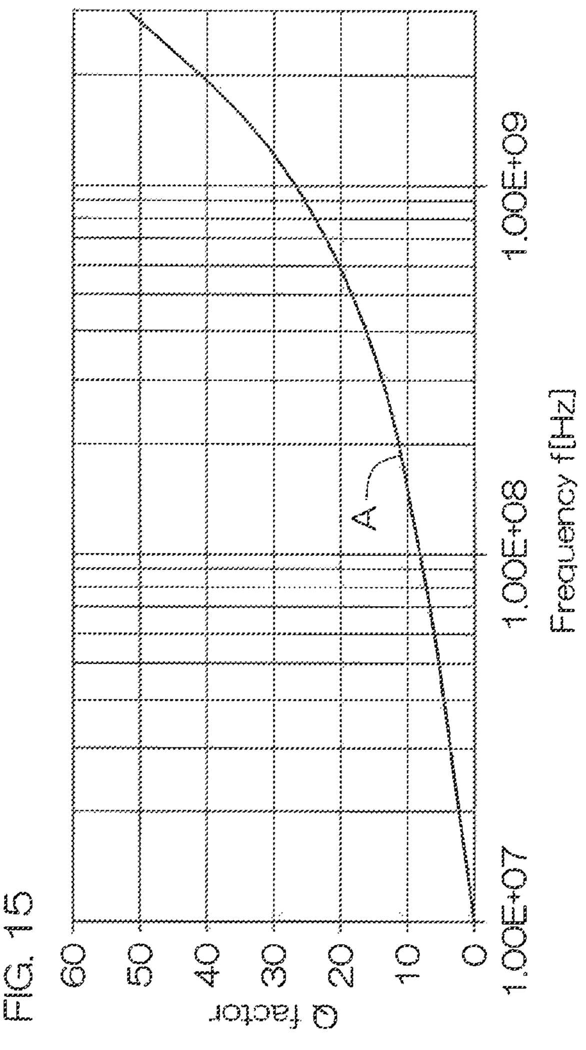
FIG. 15 is a graph of a Q value (quality factor), determined by simulation, of the chip inductor shown in FIG. 1.

FIG. 15 is a graph of a Q value (quality factor), determined by simulation, of the chip inductor 1 shown in FIG. 1. In FIG. 15, the ordinate is the Q value and the abscissa is a frequency f [Hz].

Here, the width W1 of the sealing body 2 is approximately 0.4 mm. Also, the width W2 of the sealing body 2 is approximately 0.175 mm. Also, the width W3 of the sealing body 2 is approximately 0.3 mm. Also, the inductance component L of the coil conductor 21 is approximately 3.0 nH.

A curve A is shown in FIG. 15. The curve A expresses the Q value of the chip inductor 1 when the frequency f of current flowing through the coil conductor 21 is increased from 0 Hz to 10 GHz.

Referring to the curve A, it may be understood that the Q value of the chip inductor 1 increases monotonously from a low frequency region toward a high frequency region. More specifically, the Q value when the frequency f is not less than 1 GHz is not less than 25. Also, the Q value when the frequency f is not less than 2 GHz is not less than 40. Also, the Q value when the frequency f is not less than 3 GHz is not less than 60.

It was found that the chip inductor 1 according to the present embodiment is small in attenuation of the Q value in the high frequency region and thus has an excellent characteristic as a high frequency inductance.

As described above, with the chip inductor 1 according to the present embodiment, the coil conductor 21 includes the spiral portion 24 that is routed spirally along the normal direction Y of the mounting surface 3 from the first coil end 22 and the second coil end 23. If the number of turns or a cross-sectional area of the coil conductor 21 is to be increased, the coil conductor 21 can be enlarged three-dimensionally along the normal direction Y of the mounting surface 3 of the sealing body 2.

The coil conductor 21 can thereby be suppressed from being enlarged two-dimensionally along the mounting surface 3 of the sealing body 2. An area occupied by the sealing body 2 with respect to a surface of a connected object, such as a mounting substrate, etc., can thus be suppressed from increasing two-dimensionally. Consequently, the chip inductor 1 can be provided by which an increase in the area occupied with respect to a connected object, such as a mounting substrate, etc., can be suppressed and the Q value can be improved.

Also, with the chip inductor 1 according to the present embodiment, the first external terminal 6 includes the first bottom surface terminal 10 and the first side surface terminal 11 and the second external terminal 7 includes the second bottom surface terminal 12 and the second side surface terminal 13.

When mounted on a connected object, such as a mounting substrate, etc., the chip inductor 1 can be fixed from the mounting surface 3 side, the first connecting surface 5*a* side, and the second connecting surface 5*b* side of the sealing body 2. Connection strength of the chip inductor 1 with respect to a connected object, such as a mounting substrate, etc., can thereby be improved.

FIG. 16A to FIG. 16K are diagrams for describing a method for manufacturing the chip inductor 1 shown in FIG. 1. Although in the method for manufacturing the chip inductor 1, a plurality of the chip inductors 1 are manufactured at the same time, only a region in which four chip inductors 1 are formed is shown for convenience of explanation in FIG. 16A to FIG. 16K.

Figure 16A:
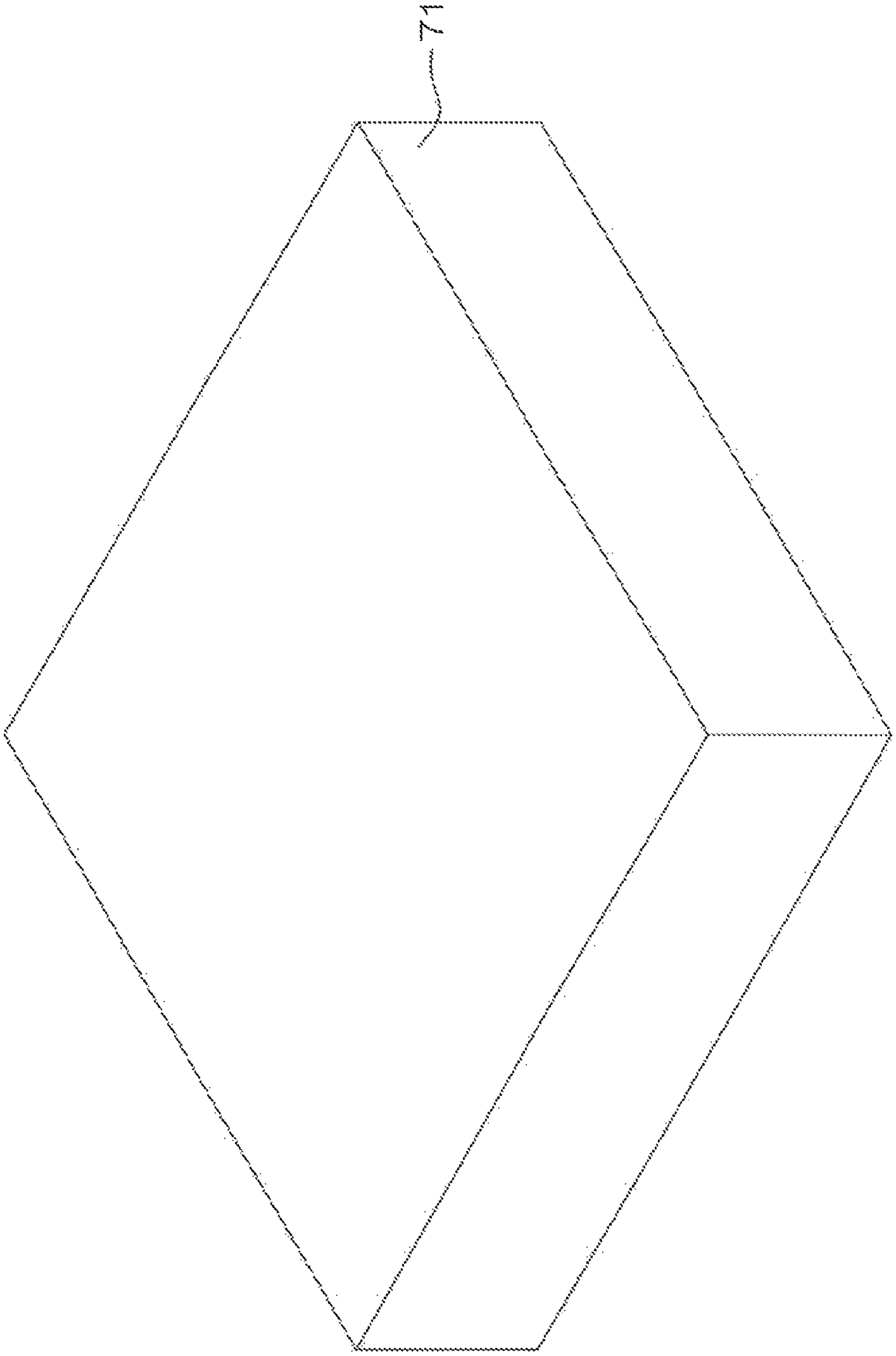
FIG. 16A to FIG. 16K are diagrams for describing a method for manufacturing the chip inductor shown in FIG. 1.

First, referring to FIG. 16A, a base member 71 is prepared. The base member 71 is used as a base for manufacturing the chip inductors 1 and is removed in the middle of manufacture. Any of various materials may be used as the material of the base member 71 as long as it is a material that is capable of being removed in the middle of manufacture of the chip inductor 1.

The base member 71 may be a semiconductor wafer, a metal substrate, a tape made of resin, etc. A silicon substrate or a nitride semiconductor substrate, etc., may be cited as examples of a semiconductor wafer. A copper substrate or a stainless steel substrate, etc., may be cited as examples of a metal substrate. Here, an example where the base member 71 is made of a silicon substrate (semiconductor wafer) shall be described.

Figure 16B:
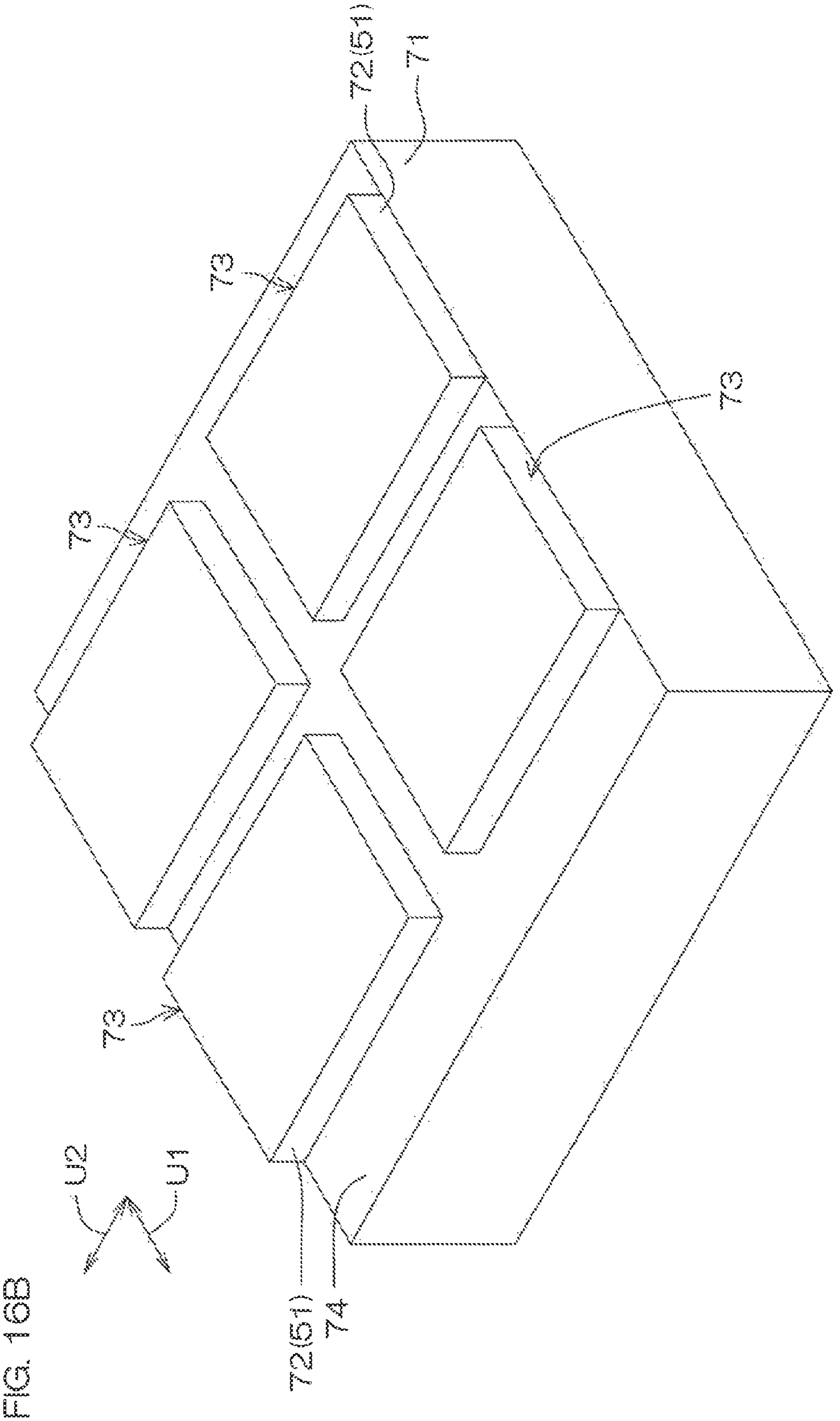

Next, referring to FIG. 16B, a first photoresist layer 72 of film form that is to be the first base resin layer 51 is attached to the base member 71. In the present embodiment, the first photoresist layer 72 is a negative type photoresist layer that includes an epoxy resin. A thickness of the first photoresist layer 72 is, for example, 45 μm.

Next, a plurality of chip formation regions 73, for forming the chip inductors 1, are set with respect to the first photoresist layer 72. Also, a boundary region 74 that demarcates regions between the plurality of chip formation regions 73 is set with respect to the first photoresist layer 72.

The plurality of chip formation regions 73 may be set at intervals along an arbitrary first direction U1 and a second direction U2 that intersects (is orthogonal to) the first direction U1. Here, an example where, in the plan view, the plurality of chip formation regions 73 are set in a matrix in the first photoresist layer 72 and the boundary region 74 is set as a lattice in the photoresist layer 72 shall be described.

Next, regions of the first photoresist layer 72 in which the plurality of chip formation regions 73 are set are selectively exposed. Next, the first photoresist layer 72 is developed through immersion in a developing solution. A plurality of the first base resin layers 51, demarcating the chip formation regions 73, are thereby formed on the base member 71.

Figure 16C:
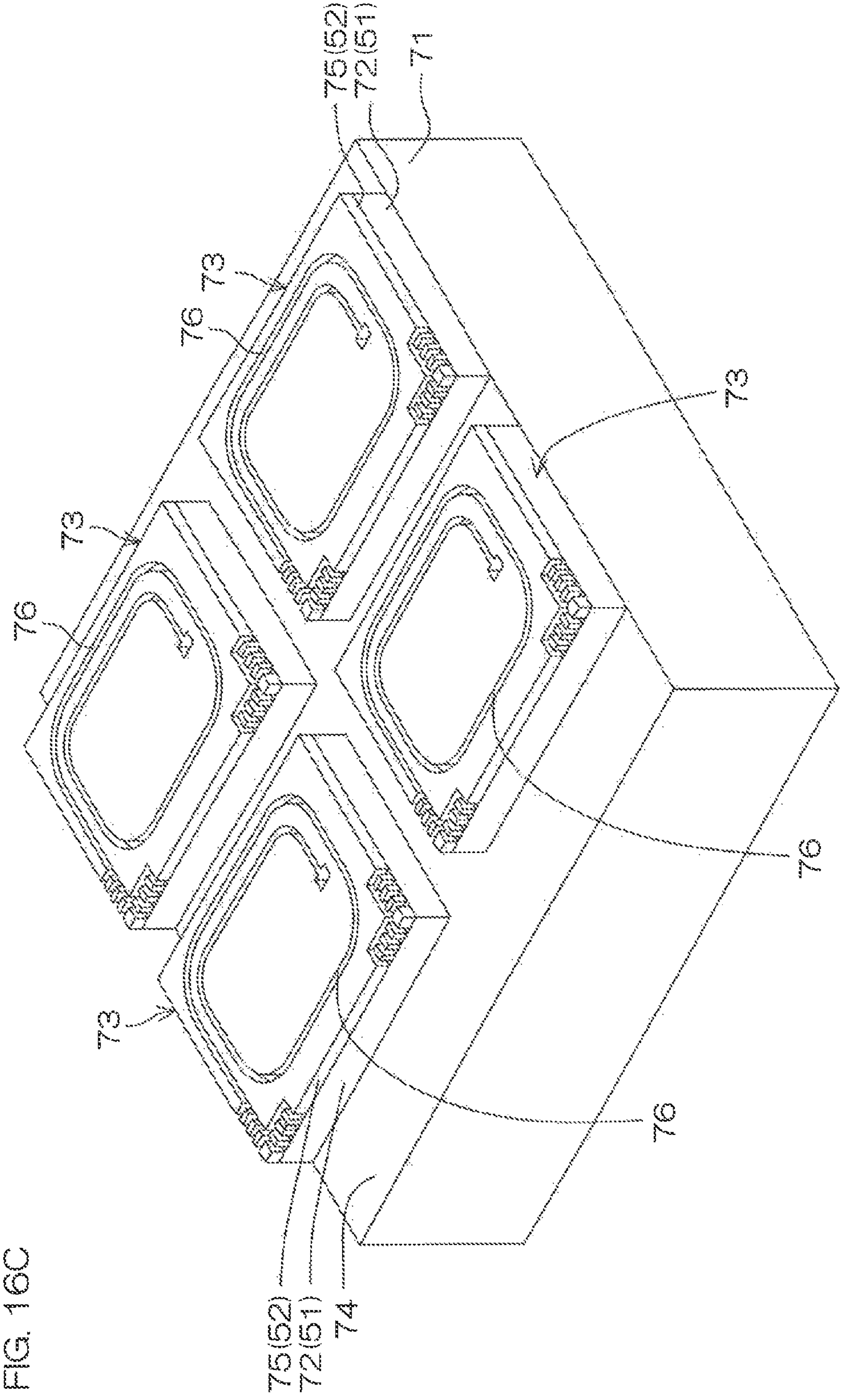

Next, referring to FIG. 16C, a second photoresist layer 75 (first insulator layer) of film form that is to be the first spiral portion resin layer 52 is attached to the base member 71. The second photoresist layer 75 covers the plurality of first base resin layers 51. In the present embodiment, the second photoresist layer 75 is a negative type photoresist layer that includes an epoxy resin. A thickness of the second photoresist layer 75 is, for example, 20 μm.

Next, regions of the second photoresist layer 75 positioned on the first base resin layers 51 are selectively exposed. In this process, the second photoresist layer 75 is exposed in a pattern corresponding to the first spiral portion 41, a portion of the first coil end 22, and a portion of the second coil end 23.

Next, the second photoresist layer 75 is developed through immersion in a developing solution. The first spiral portion resin layers 52 are thereby respectively formed on the plurality of first base resin layers 51. Also, openings 76 of a pattern corresponding to the first spiral portion 41, the portion of the first coil end 22, and the portion of the second coil end 23 are thereby formed in each first spiral portion resin layer 52.

Figure 16D:
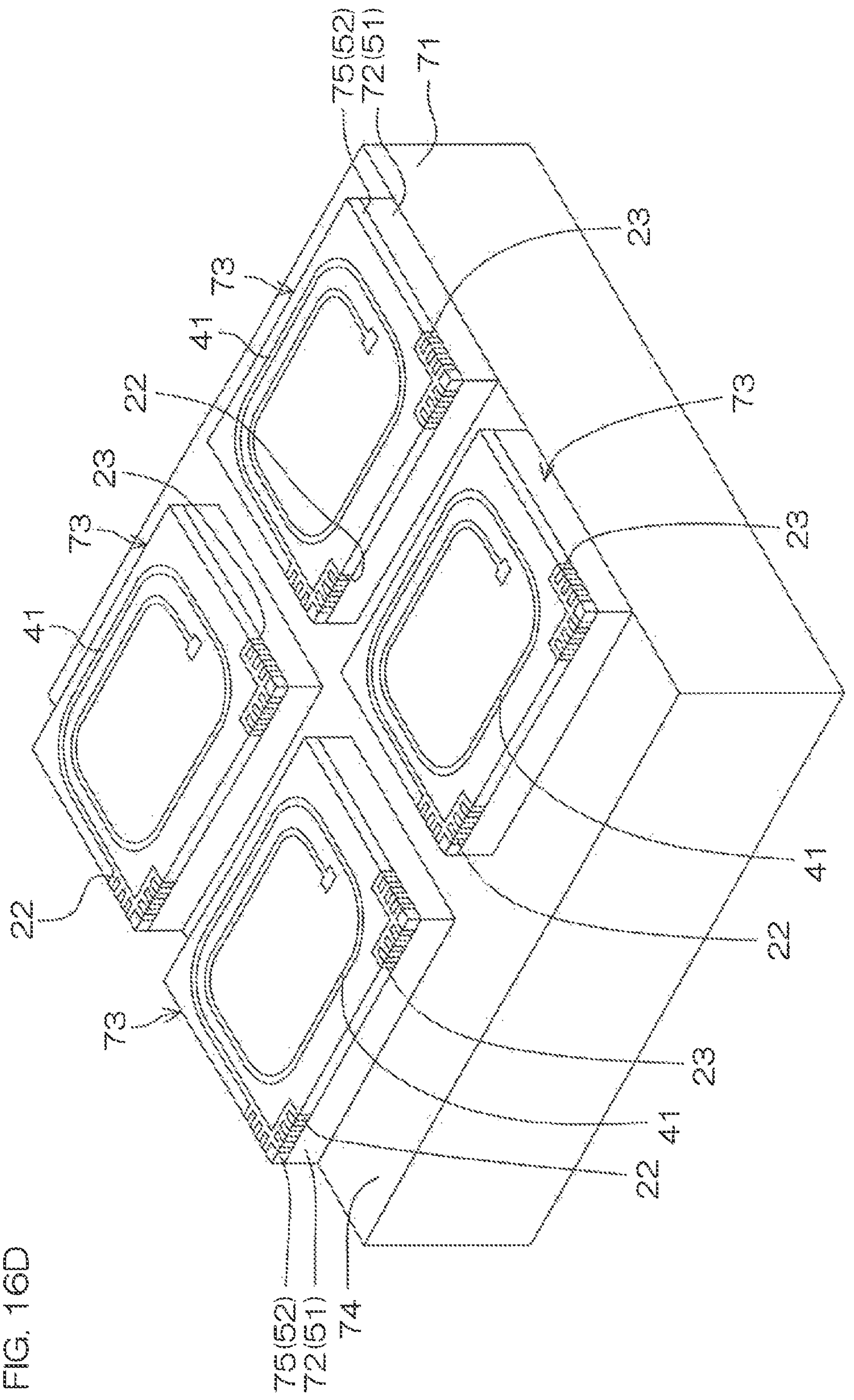

Next, referring to FIG. 16D, a titanium seed layer (not shown) and a copper seed layer (not shown), covering surfaces of the first spiral portion resin layers 52, are formed in that order. The titanium seed layer and the copper seed layer may be formed respectively by a sputtering method. The titanium seed layer and the copper seed layer are formed such that a surface at one side and a surface at another side conform to the surfaces of the first spiral portion resin layers 52 and inner walls of the openings 76.

Next, a copper plating layer is formed on the copper seed layer, for example, by an electroplating method. The copper plating layer is formed to fill the openings 76 and cover the surfaces of the first spiral portion resin layers 52.

Next, unnecessary portions of the titanium seed layer, the copper seed layer, and the copper plating layer formed on the surfaces of the first spiral portion resin layers 52 are removed. The first spiral portions 41, the portions of the first coil ends 22, and the portions of the second coil ends 23 are thereby embedded in the openings 76 of the first spiral portion resin layers 52.

Figure 16E:
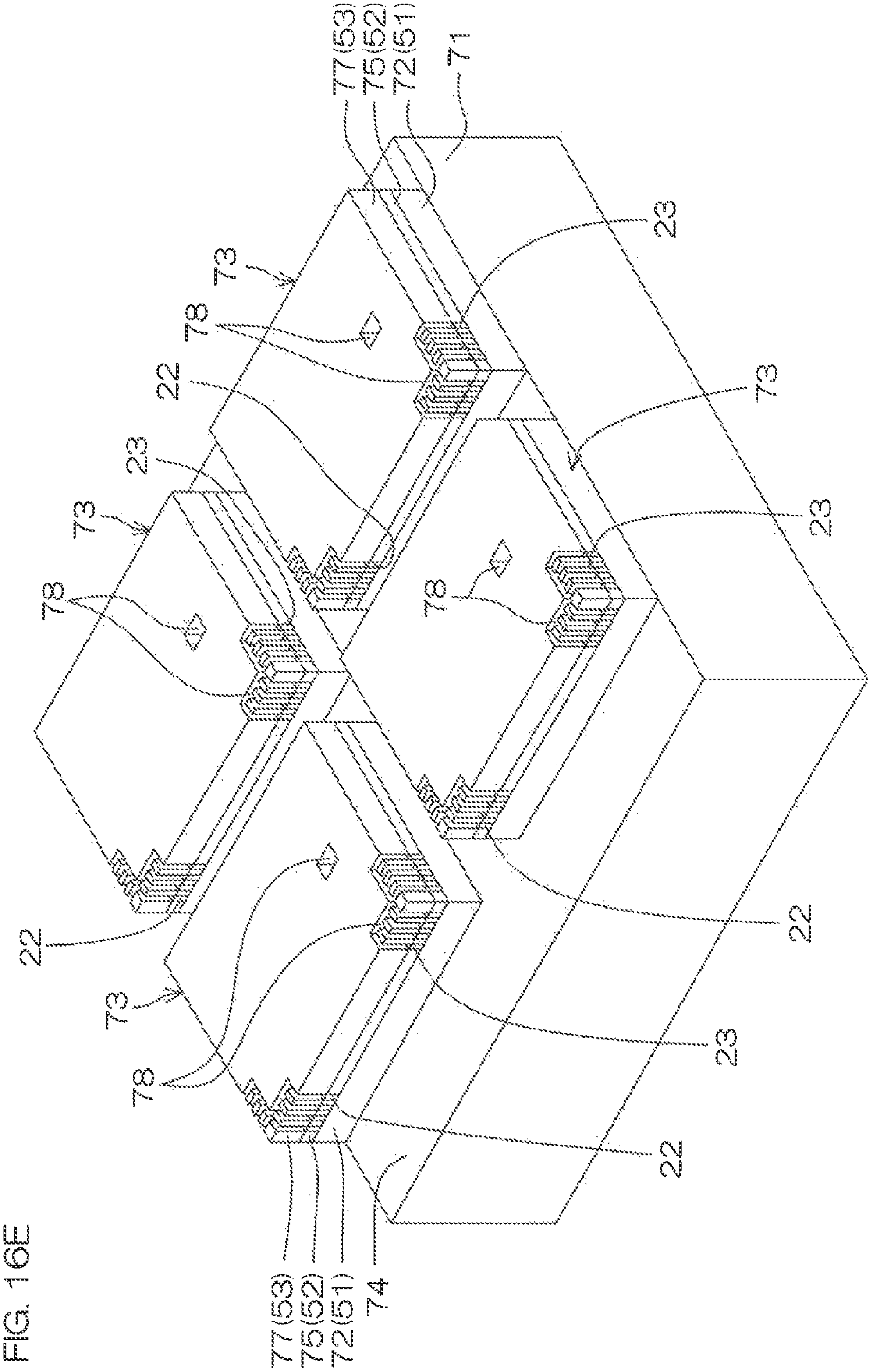

Next, referring to FIG. 16E, a third photoresist layer 77 (second insulator layer) of film form that is to be the connecting portion resin layer 53 is attached to the base member 71. The third photoresist layer 77 covers the plurality of first spiral portion resin layers 52. In the present embodiment, the third photoresist layer 77 is a negative type photoresist layer that includes an epoxy resin. A thickness of the third photoresist layer 77 is, for example, 40 μm.

Next, regions of the third photoresist layer 77 positioned on the first spiral portion resin layers 52 are selectively exposed. In this process, the third photoresist layer 77 is exposed in a pattern corresponding to the connecting portion 43, a portion of the first coil end 22, and a portion of the second coil end 23.

Next, the third photoresist layer 77 is developed through immersion in a developing solution. The connecting portion resin layers 53 are thereby respectively formed on the plurality of first spiral portion resin layers 52. Also, openings 78 of a pattern corresponding to the connecting portion 43, the portion of the first coil end 22, and the portion of the second coil end 23 are thereby formed in each connecting portion resin layer 53.

Figure 16F:
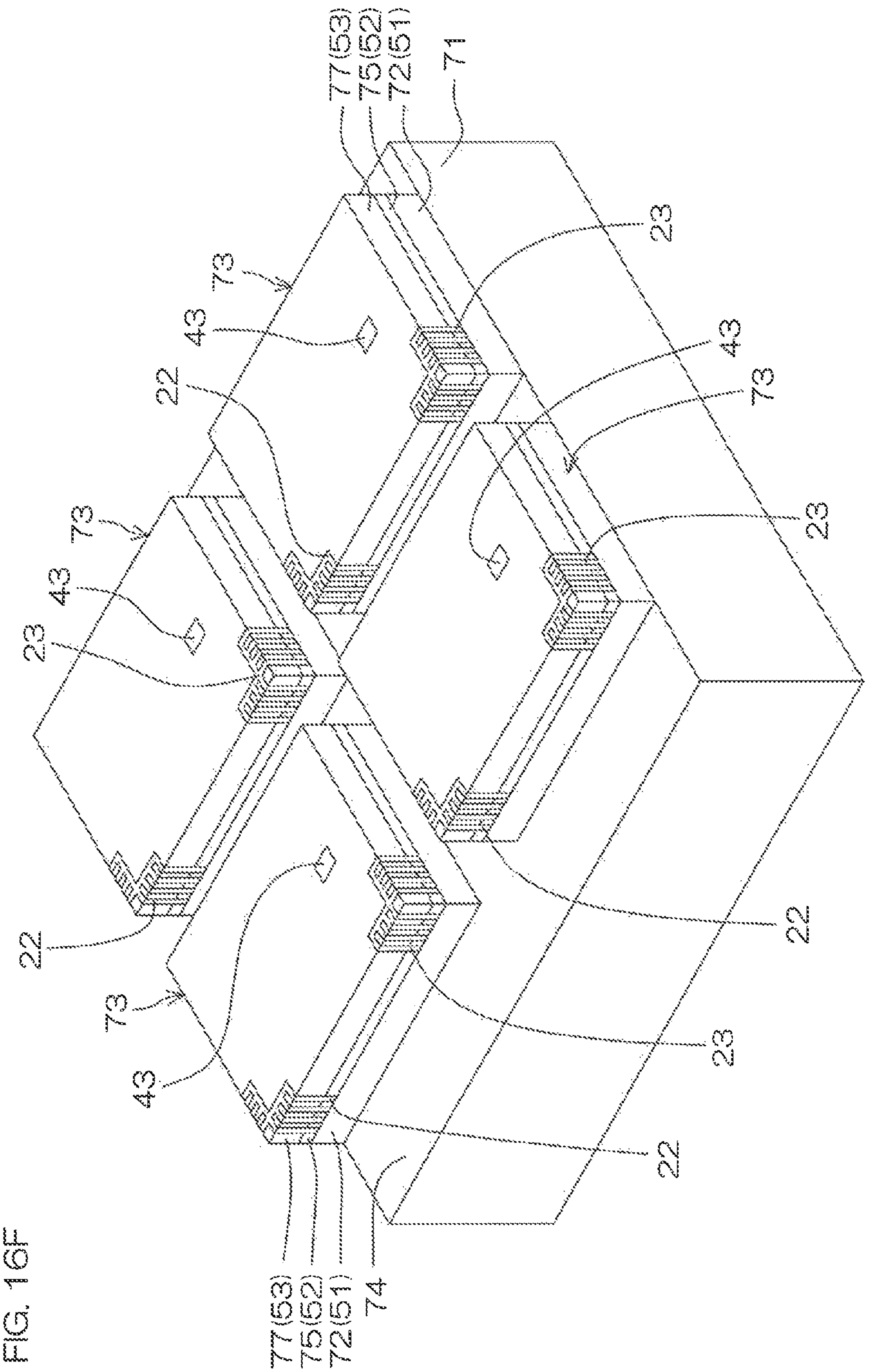

Next, referring to FIG. 16F, a titanium seed layer (not shown) and a copper seed layer (not shown), covering surfaces of the connecting portion resin layers 53, are formed in that order. The titanium seed layer and the copper seed layer may be formed respectively by the sputtering method. The titanium seed layer and the copper seed layer are formed such that a surface at one side and a surface at another side conform to the surfaces of the connecting portion resin layers 53 and inner walls of the openings 78.

Next, a copper plating layer is formed on the copper seed layer, for example, by the electroplating method. The copper plating layer is formed to fill the openings 78 and cover the surfaces of the connecting portion resin layers 53.

Next, unnecessary portions of the titanium seed layer, the copper seed layer, and the copper plating layer formed on the surfaces of the connecting portion resin layers 53 are removed. The connecting portions 43, the portions of the first coil ends 22, and the portions of the second coil ends 23 are thereby embedded in the openings 78 of the connecting portion resin layers 53.

Figure 16G:
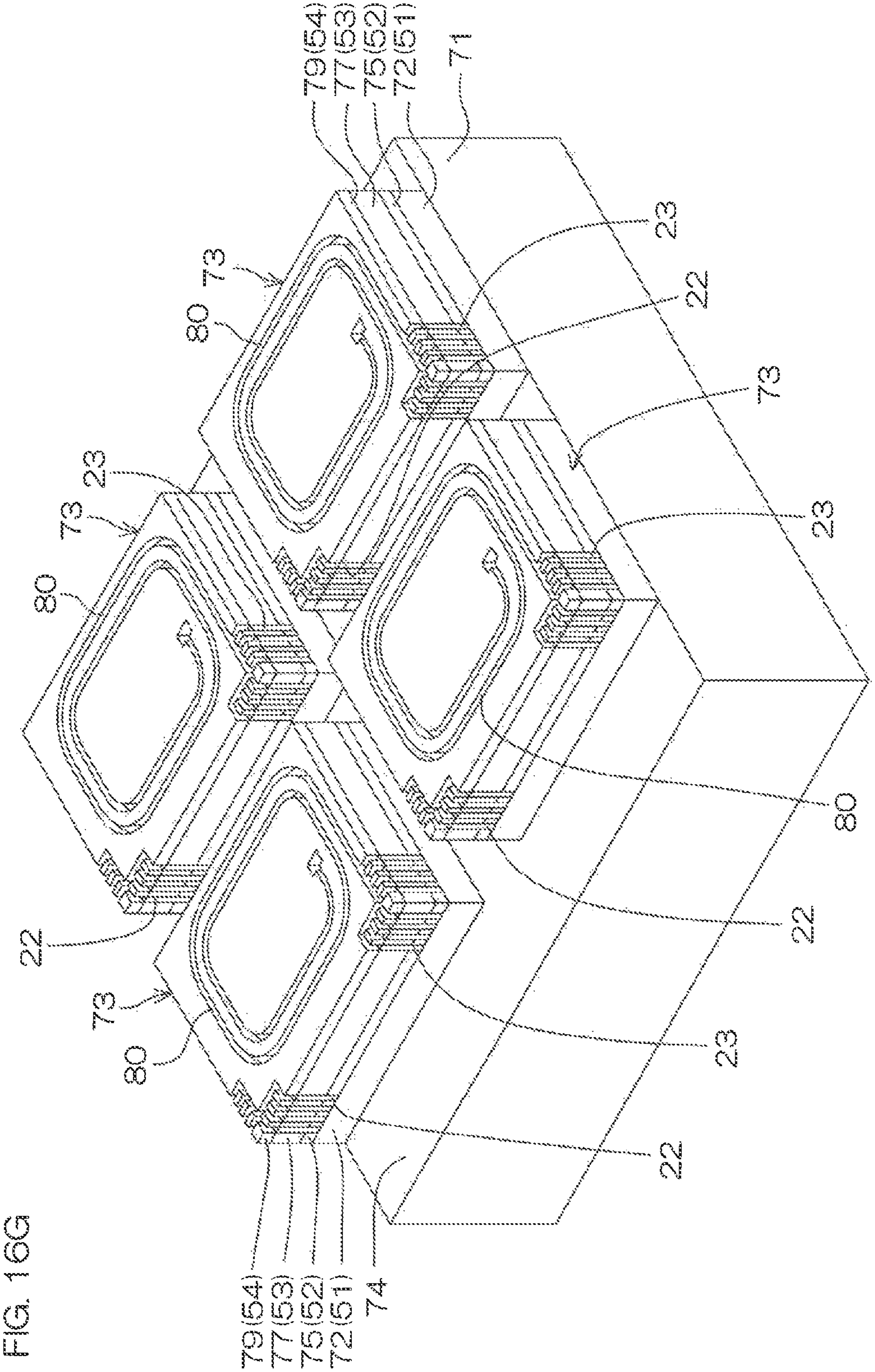

Next, referring to FIG. 16G, a fourth photoresist layer 79 (third insulator layer) of film form that is to be the second spiral portion resin layer 54 is attached to the base member 71. The fourth photoresist layer 79 covers the plurality of the connecting portion resin layers 53. In the present embodiment, the fourth photoresist layer 79 is a negative type photoresist layer that includes an epoxy resin. A thickness of the fourth photoresist layer 79 is, for example, 20 μm.

Next, regions of the fourth photoresist layer 79 positioned on the connecting portion resin layers 53 are selectively exposed. In this process, the fourth photoresist layer 79 is exposed in a pattern corresponding to the second spiral portion 42, a portion of the first coil end 22, and a portion of the second coil end 23.

Next, the fourth photoresist layer 79 is developed through immersion in a developing solution. The second spiral portion resin layers 54 are thereby respectively formed on the plurality of connecting portion resin layers 53. Also, openings 80 of a pattern corresponding to the second spiral portion 42, the portion of the first coil end 22, and the portion of the second coil end 23 are thereby formed in each second spiral portion resin layer 54.

Figure 16H:
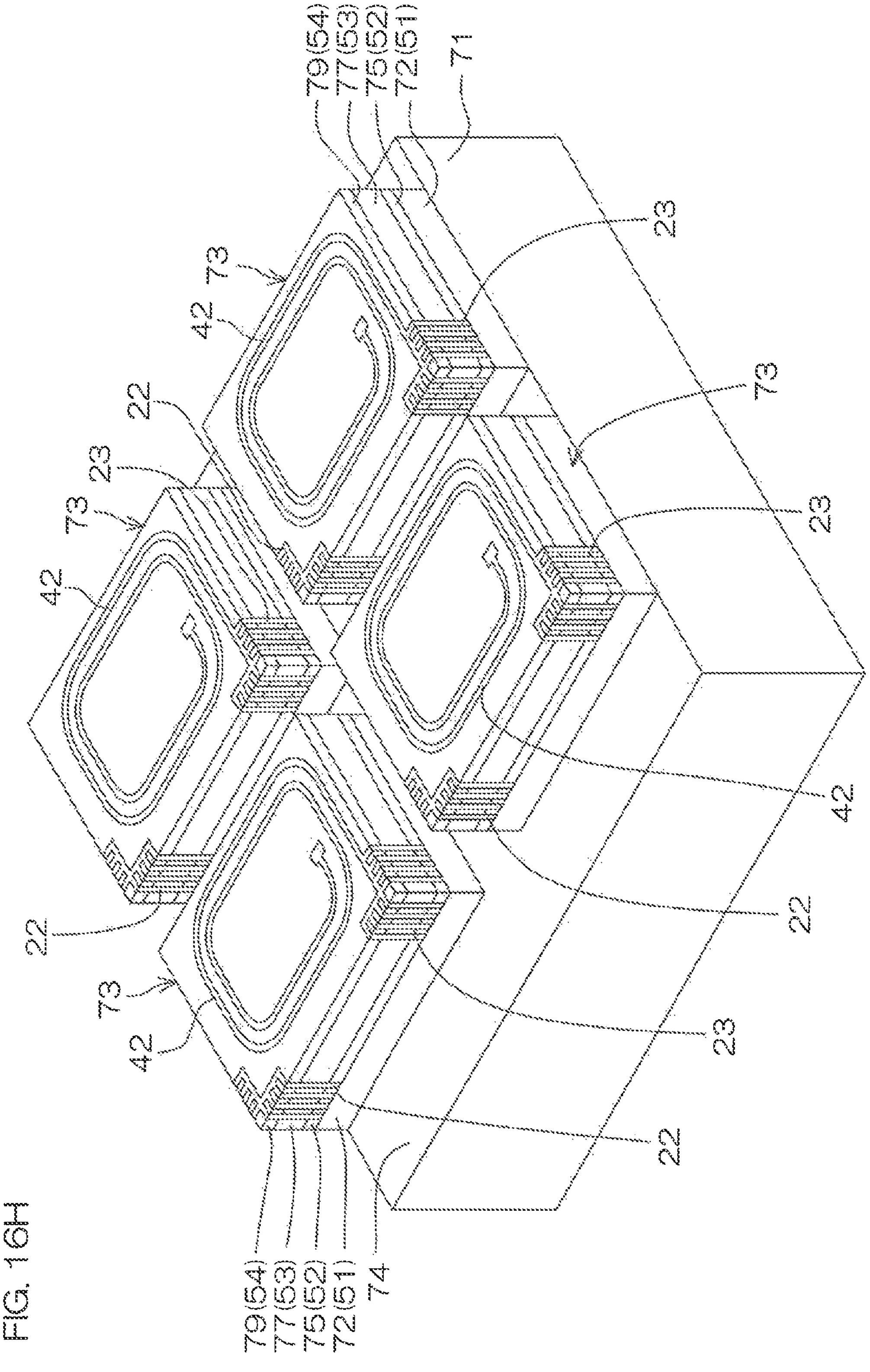

Next, referring to FIG. 16H, a titanium seed layer (not shown) and a copper seed layer (not shown), covering surfaces of the second spiral portion resin layers 54, are formed in that order. The titanium seed layer and the copper seed layer may be formed respectively by the sputtering method. The titanium seed layer and the copper seed layer are formed such that a surface at one side and a surface at another side conform to the surfaces of the second spiral portion resin layers 54 and inner walls of the openings 80 of the second spiral portion resin layers 54.

Next, a copper plating layer is formed on the copper seed layer, for example, by the electroplating method. The copper plating layer is formed to fill the openings 80 and cover the surfaces of the second spiral portion resin layers 54.

Next, unnecessary portions of the titanium seed layer, the copper seed layer, and the copper plating layer formed on the surfaces of the second spiral portion resin layers 54 are removed. The second spiral portions 42, the portions of the first coil ends 22, and the portions of the second coil ends 23 are thereby embedded in the openings 80 of the second spiral portion resin layers 54.

Figure 16I:
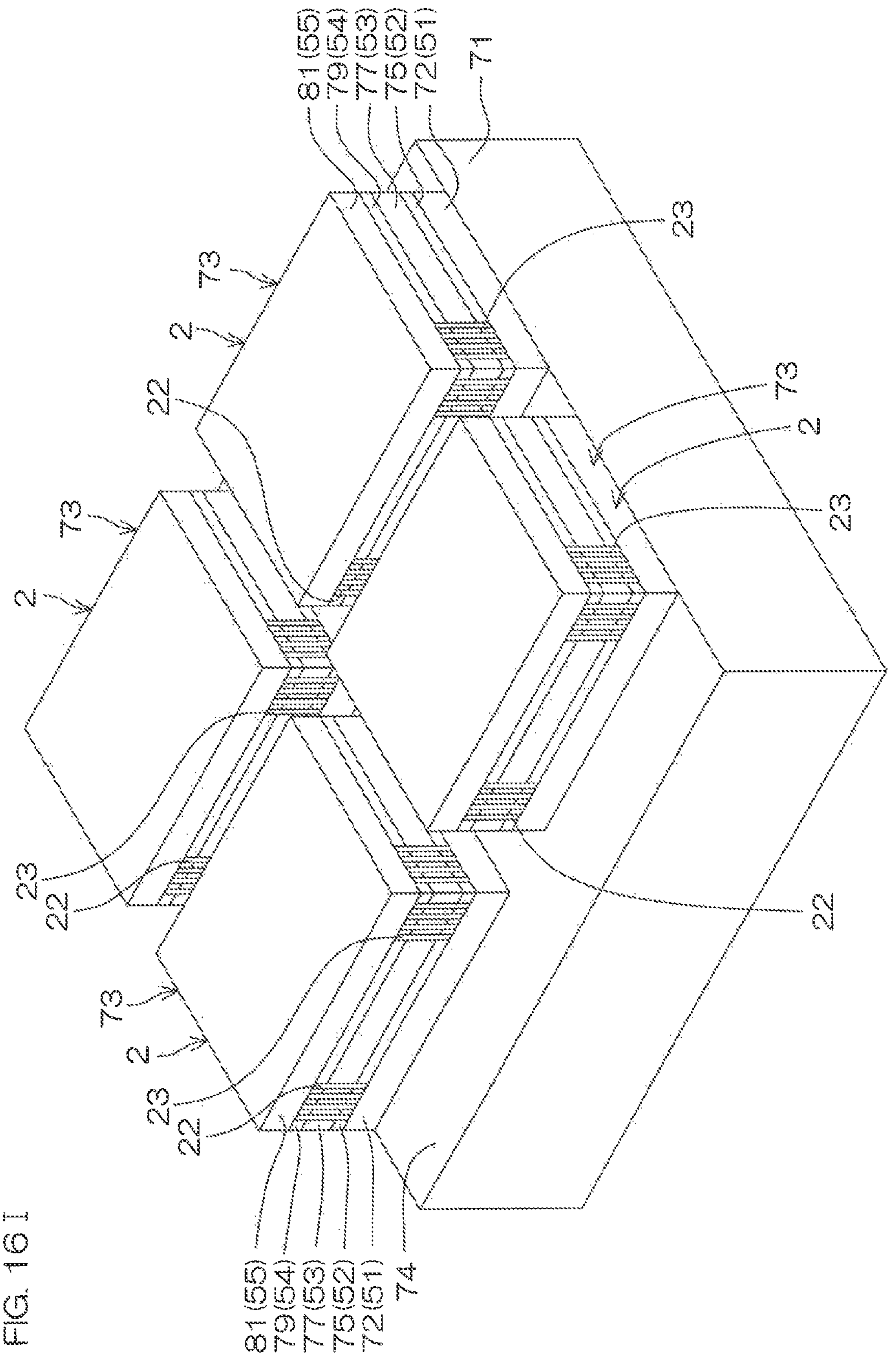

Next, referring to FIG. 16I, a fifth photoresist layer 81 of film form that is to be the second base resin layer 55 is attached to the base member 71. The fifth photoresist layer 81 covers the plurality of second spiral portion resin layers 54. In the present embodiment, the fifth photoresist layer 81 is a negative type photoresist layer that includes an epoxy resin. A thickness of the fifth photoresist layer 81 is, for example, 40 μm.

Next, regions of the fifth photoresist layer 81 positioned on the second spiral portion resin layers 54 are selectively exposed. Next, the fifth photoresist layer 81 is developed through immersion in a developing solution. The second base resin layers 55 are thereby respectively formed on the plurality of second spiral portion resin layers 54.

The plurality of sealing bodies 2, each made of the photoresist laminated body in which the first photoresist layer 72, the second photoresist layer 75, the third photoresist layer 77, the fourth photoresist layer 79, and the fifth photoresist layer 81 are laminated, is thus formed. The first coil end 22 and the second coil end 23 of the coil conductor 21 are exposed at outer surfaces of the sealing body 2.

Figure 16J:
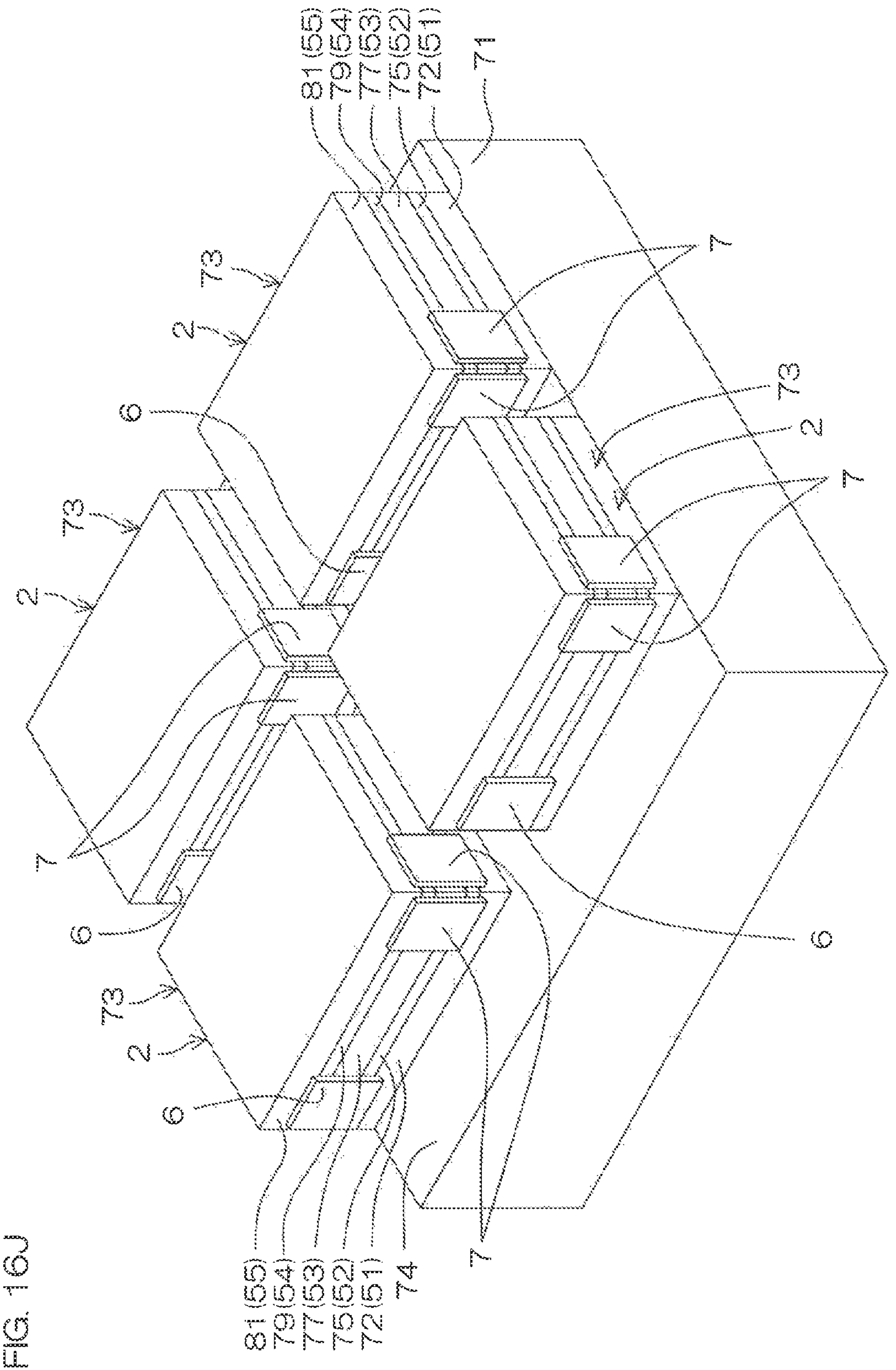

Next, referring to FIG. 16J, a nickel layer, a palladium layer, and a gold layer are formed successively with the first coil end 22 and the second coil end 23 of each sealing body 2 as starting points, for example, by the electroplating method. The first external terminals 6 and the second external terminals 7 are thereby respectively formed on the outer surfaces of the plurality of sealing bodies 2.

Figure 16K:
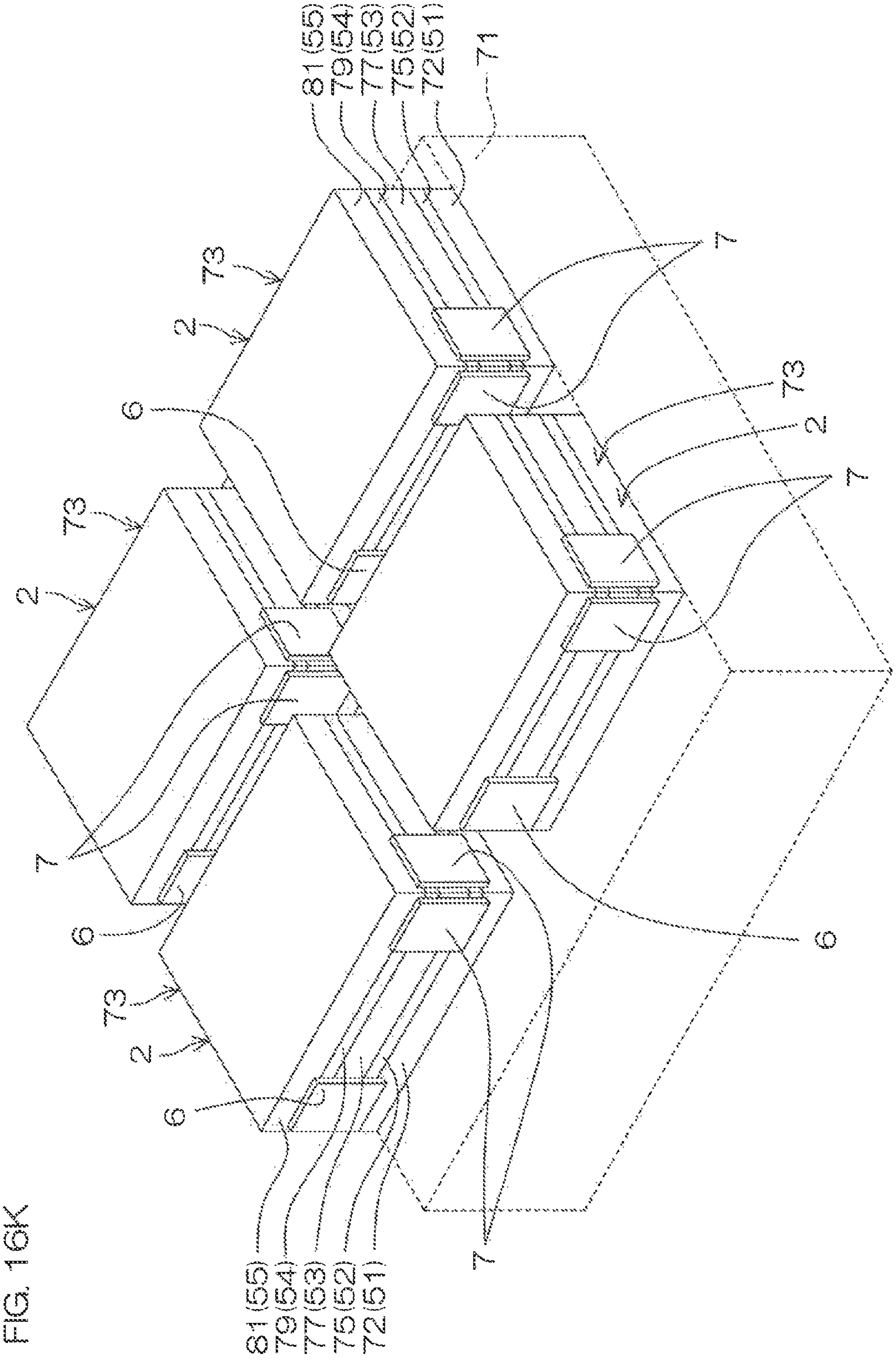

Next, referring to FIG. 16K, the plurality of sealing bodies 2 are separated from the base member 71. The step of separating the chip inductors 1 from the base member 71 may include a step of peeling the plurality of sealing bodies 2 from the base member 71. Also, the step of separating the plurality of sealing bodies 2 from the base member 71 may include a step of removing the base member 71.

The step of removing the base member 71 may, for example, be a step of removing the base member 71 by grinding. The step of removing the base member 71 may be a step of removing the base member 71 by an etching method. The step of removing the base member 71 may, for example, be a step of removing the base member 71 by peeling. The plurality of chip inductors 1 are manufactured through the above processes.

Figure 17:
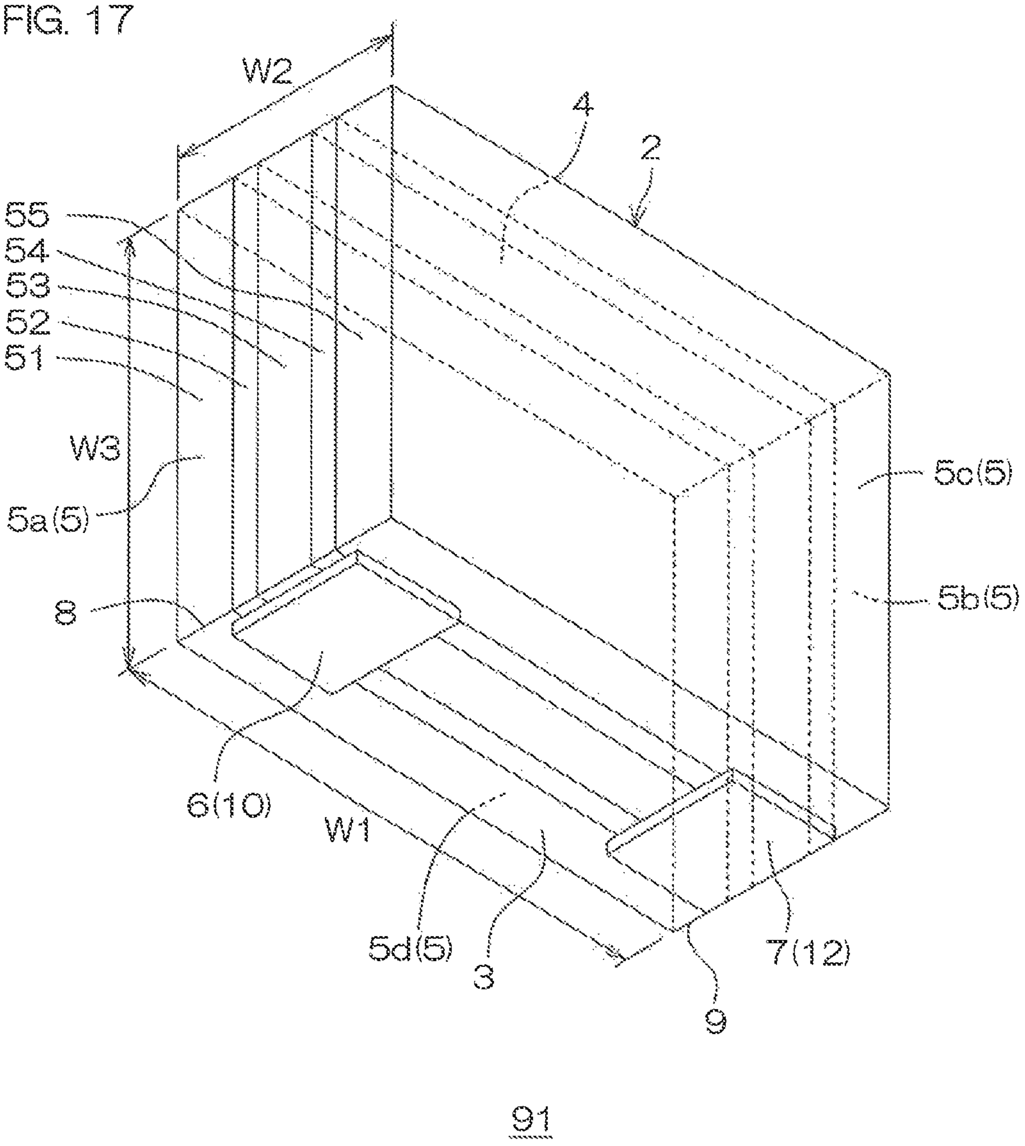
FIG. 17 is a perspective view of a chip inductor according to a second preferred embodiment of the present invention.

FIG. 17 is a perspective view of a chip inductor 91 according to a second preferred embodiment of the present invention. With the chip inductor 91, arrangements corresponding to arrangements of the chip inductor 1 shall be provided with the same reference symbols and description thereof shall be omitted.

In the present embodiment, the first external terminal 6 does not include the first side surface terminal 11 and has only the first bottom surface terminal 10. Similarly, the second external terminal 7 does not include the second side surface terminal 13 and has only the second bottom surface terminal 12.

Although not shown, the first coil end 22 does not include the first side surface portion 26 and has only the first bottom surface portion 25. Similarly, the second coil end 23 does not include the second side surface portion 32 and has only the second bottom surface portion 31.

The chip inductor 91 can be manufactured by changing the respective exposure patterns of the second photoresist layer 75, the third photoresist layer 77, and the fourth photoresist layer 79 in the processes of FIG. 16A to FIG. 16K described above.

The same effects as the effects described for the chip inductor 1 can also be exhibited by the chip inductor 91 described above.

With the chip inductor 91, the first side surface terminal 11 and the second side surface terminal 13 are not formed at the first connecting surface 5*a* side and the second connecting surface 5*b* side of the sealing body 2. Therefore, when mounted on a connected object, such as a mounting substrate, etc., wet-spreading of a bonding member, such as solder, etc., to a side of the chip inductor 91 can be suppressed.

Another electronic component can thus be disposed in proximity to the chip inductor 91 by an amount by which enlargement of a region in which solder, etc., wet-spreads can be suppressed. Consequently, the chip inductor 91, capable of contributing to high-density mounting of a connected object, such as a mounting substrate, etc., can be provided.

Figure 18:
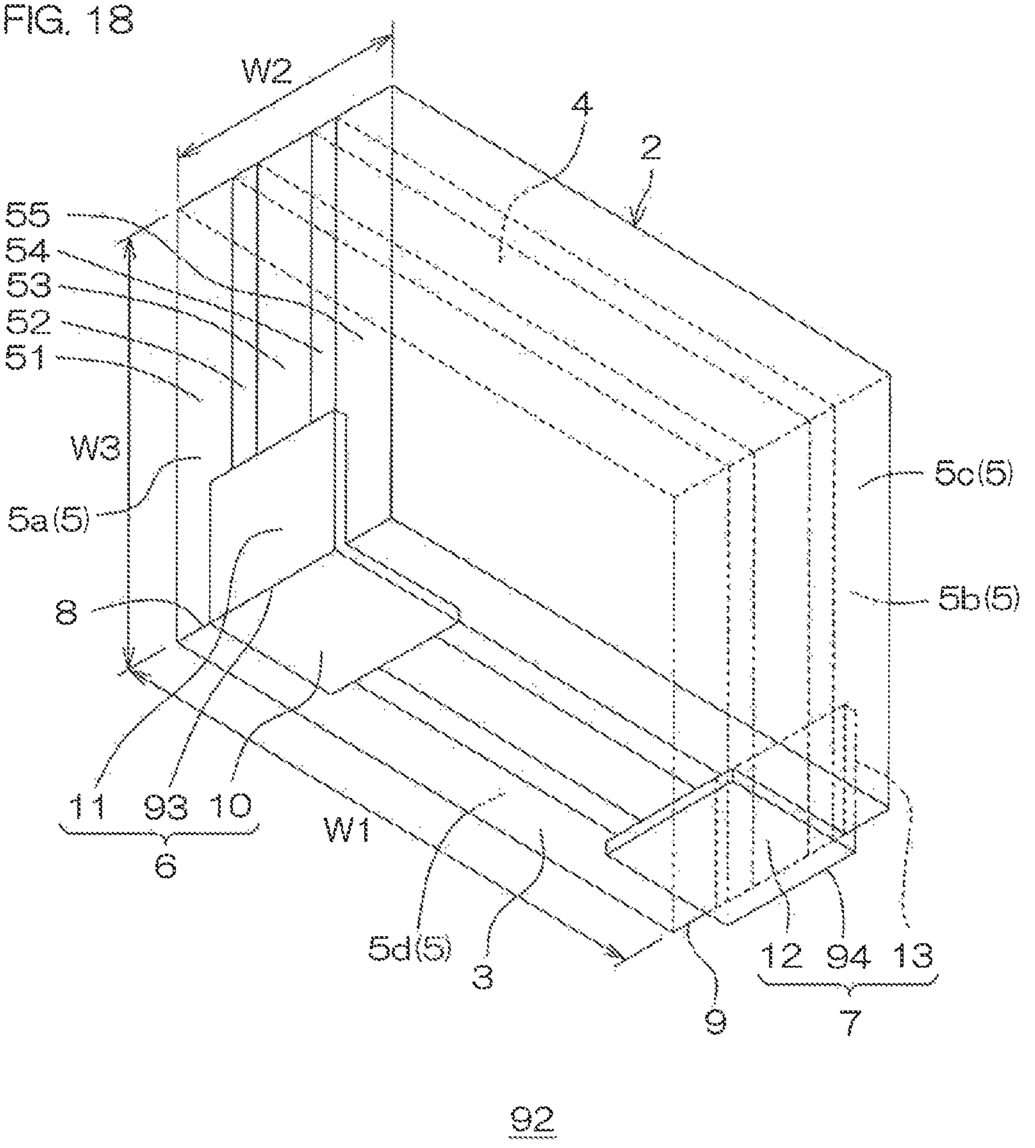
FIG. 18 is a perspective view of a chip inductor according to a third preferred embodiment of the present invention.

FIG. 18 is a perspective view of a chip inductor 92 according to a third preferred embodiment of the present invention. With the chip inductor 92, arrangements corresponding to arrangements of the chip inductor 1 shall be provided with the same reference symbols and description thereof shall be omitted.

In the present embodiment, the first external terminal 6 includes, in addition to the first bottom surface terminal 10 and the first side surface terminal 11, a first angle portion terminal 93 covering the first angle portion 8. The first angle portion terminal 93 is formed integral to the first bottom surface terminal 10 and the first side surface terminal 11.

Similarly, the second external terminal 7 includes, in addition to the second bottom surface terminal 12 and the second side surface terminal 13, a second angle portion terminal 94 covering the second angle portion 9. The second angle portion terminal 94 is formed integral to the second bottom surface terminal 12 and the second side surface terminal 13.

The chip inductor 92 can be manufactured by changing the respective exposure patterns of the second photoresist layer 75, the third photoresist layer 77, and the fourth photoresist layer 79 in the processes of FIG. 16A to FIG. 16K described above.

The same effects as the effects described for the chip inductor 91 can also be exhibited by the chip inductor 92 according to the present embodiment described above.

Figure 19:
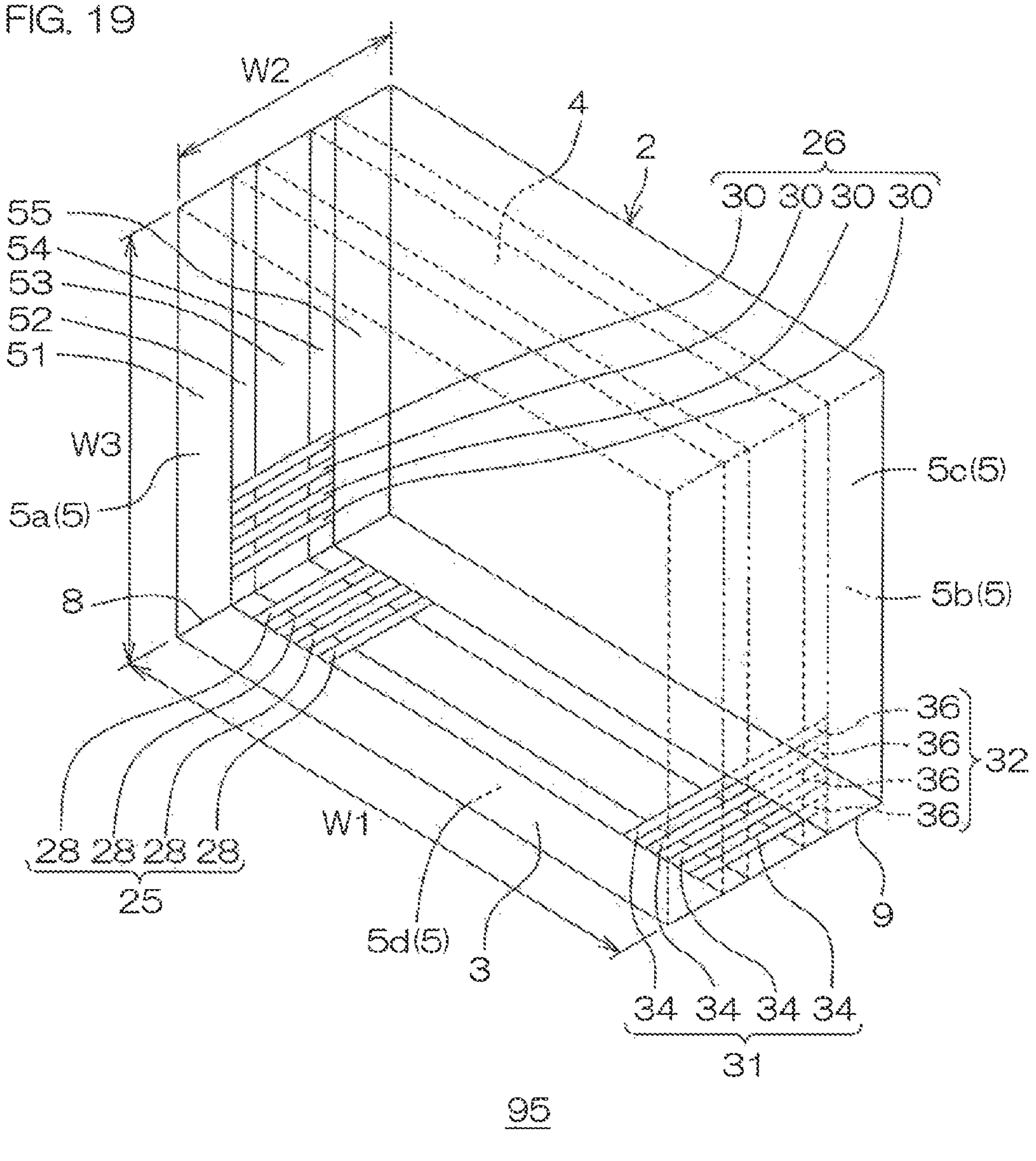
FIG. 19 is a perspective view of a chip inductor according to a fourth preferred embodiment of the present invention.

FIG. 19 is a perspective view of a chip inductor 95 according to a fourth preferred embodiment of the present invention. With the chip inductor 95, arrangements corresponding to arrangements of the chip inductor 1 shall be provided with the same reference symbols and description thereof shall be omitted.

With the chip inductor 95, in place of the first external terminal 6 and the second external terminal 7, the first coil end 22 is formed as the first external terminal 6 and the second coil end 23 is formed as the second external terminal 7.

More specifically, with the first coil end 22, the first bottom surface portion 25 and the first side surface portion 26 are formed as the first external terminal 6. Similarly, with the second coil end 23, the second bottom surface portion 31 and the second side surface portion 32 are formed as the second external terminal 7.

The chip inductor 95 can be manufactured by omitting the step of forming the first external terminal 6 and the second external terminal 7 in the step of FIG. 16J described above.

The same effects as the effects described for the chip inductor 1 can also be exhibited by the chip inductor 95 described above.

With the chip inductor 95, the first coil end 22 not having the first side surface portion 26 and having only the first bottom surface portion 25 may be adopted. Similarly, the second coil end 23 not having the second side surface portion 32 and having only the second bottom surface portion 31 may be adopted.

Figure 20:
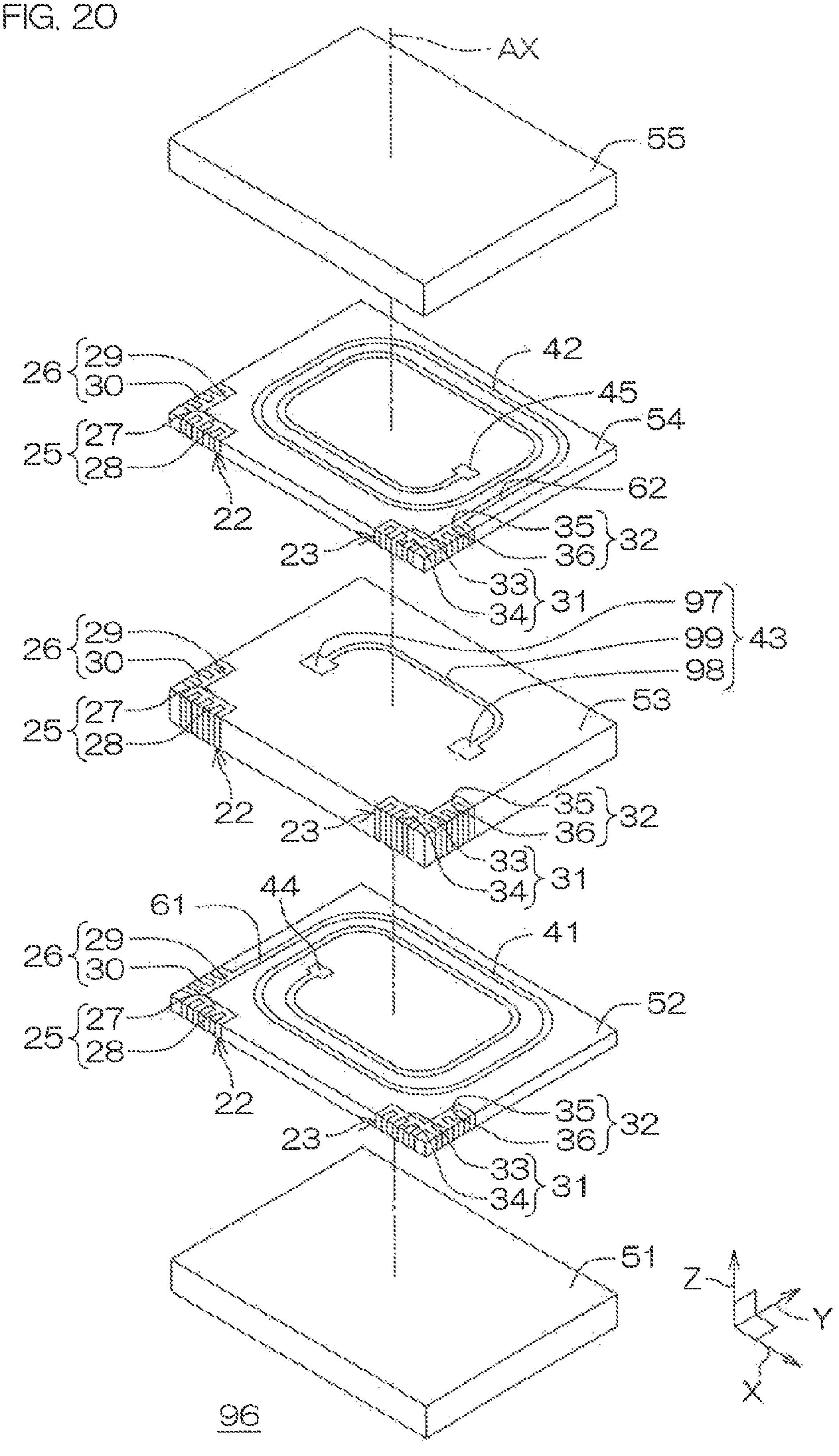
FIG. 20 is an exploded perspective view of a chip inductor according to a fifth preferred embodiment of the present invention.

FIG. 20 is an exploded perspective view of a chip inductor 96 according to a fifth preferred embodiment of the present invention. In FIG. 20, illustration of the first external terminal 6 and the second external terminal 7 is omitted. With the chip inductor 96, arrangements corresponding to arrangements of the chip inductor 1 shall be provided with the same reference symbols and description thereof shall be omitted.

With the chip inductor 96, the first coil sub end 44 of the first spiral portion 41 and the second coil sub end 45 of the second spiral portion 42 are formed in regions that do not face each other in the winding axis direction Z of the spiral portion 24. In the present embodiment, the connecting portion 43 includes a first connecting portion 97, a second connecting portion 98, and an extension portion 99, extending in a region between the first connecting portion 97 and the second connecting portion 98.

The first connecting portion 97 of the connecting portion 43 faces the first coil sub end 44 of the first spiral portion 41 in the winding axis direction Z of the spiral portion 24. The first connecting portion 97 of the connecting portion 43 is electrically connected to the first coil sub end 44 of the first spiral portion 41.

The second connecting portion 98 of the connecting portion 43 faces the second coil sub end 45 of the second spiral portion 42 in the winding axis direction Z of the spiral portion 24. The second connecting portion 98 of the connecting portion 43 is electrically connected to the second coil sub end 45 of the second spiral portion 42.

The extension portion 99 of the connecting portion 43 is routed linearly from the first connecting portion 97 toward the second connecting portion 98. In the present embodiment, the extension portion 99 of the connecting portion 43 extends along a winding direction of the spiral portion 24 in the region between the first connecting portion 97 and the second connecting portion 98. The first spiral portion 41 and the second spiral portion 42 are thereby wound continuously in the winding direction.

The chip inductor 96 can be manufactured by changing the exposure pattern of the third photoresist layer 77 in the step of FIG. 16E described above.

The same effects as the effects described for the chip inductor 1 can also be exhibited by the chip inductor 96 described above. A structure such as that of the chip inductor 96 is also applicable to the second to fourth preferred embodiments described above.

Figure 21:
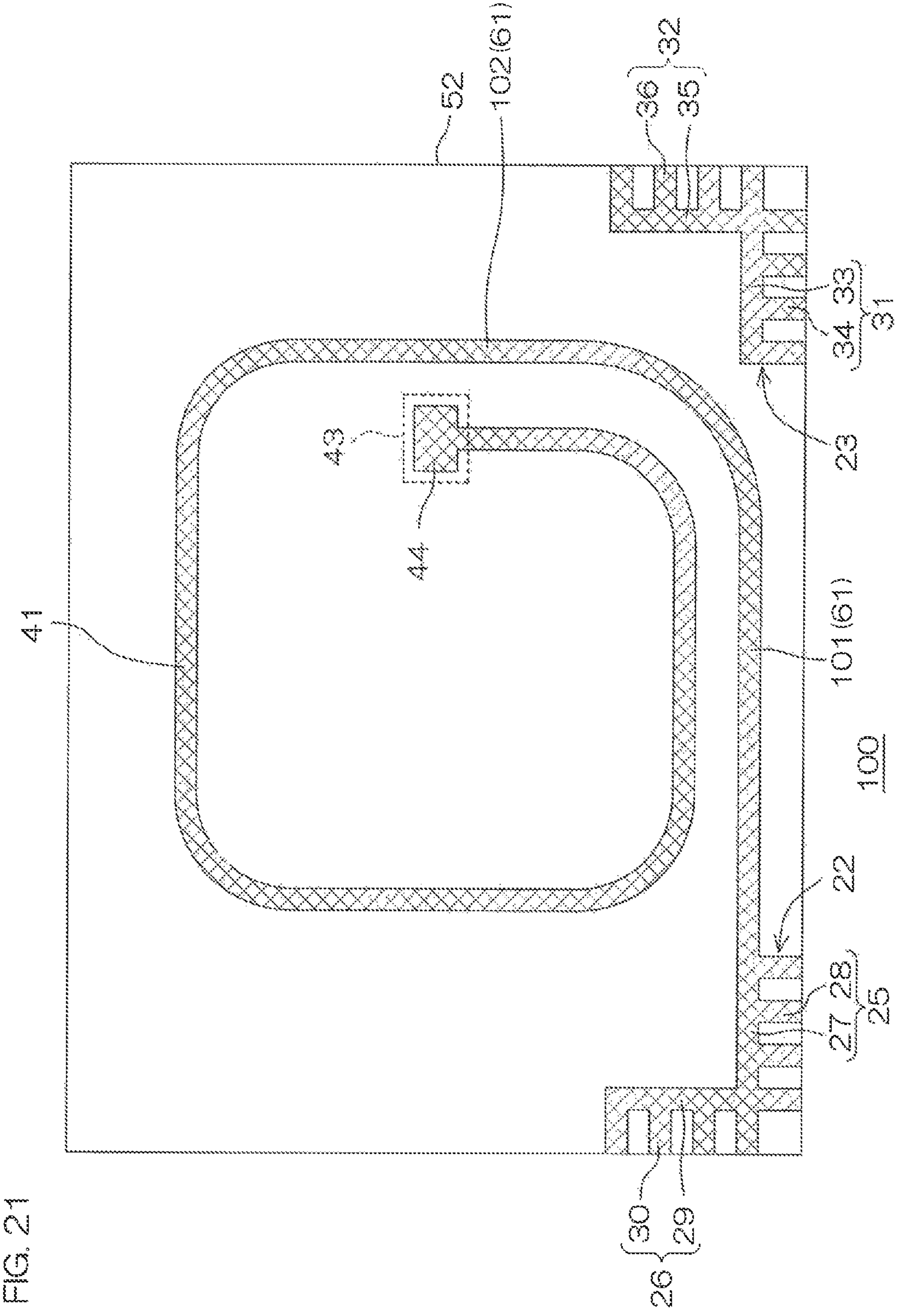
FIG. 21 is a plan view of a first spiral portion resin layer of a chip inductor according to a sixth preferred embodiment of the present invention.
Figure 22:
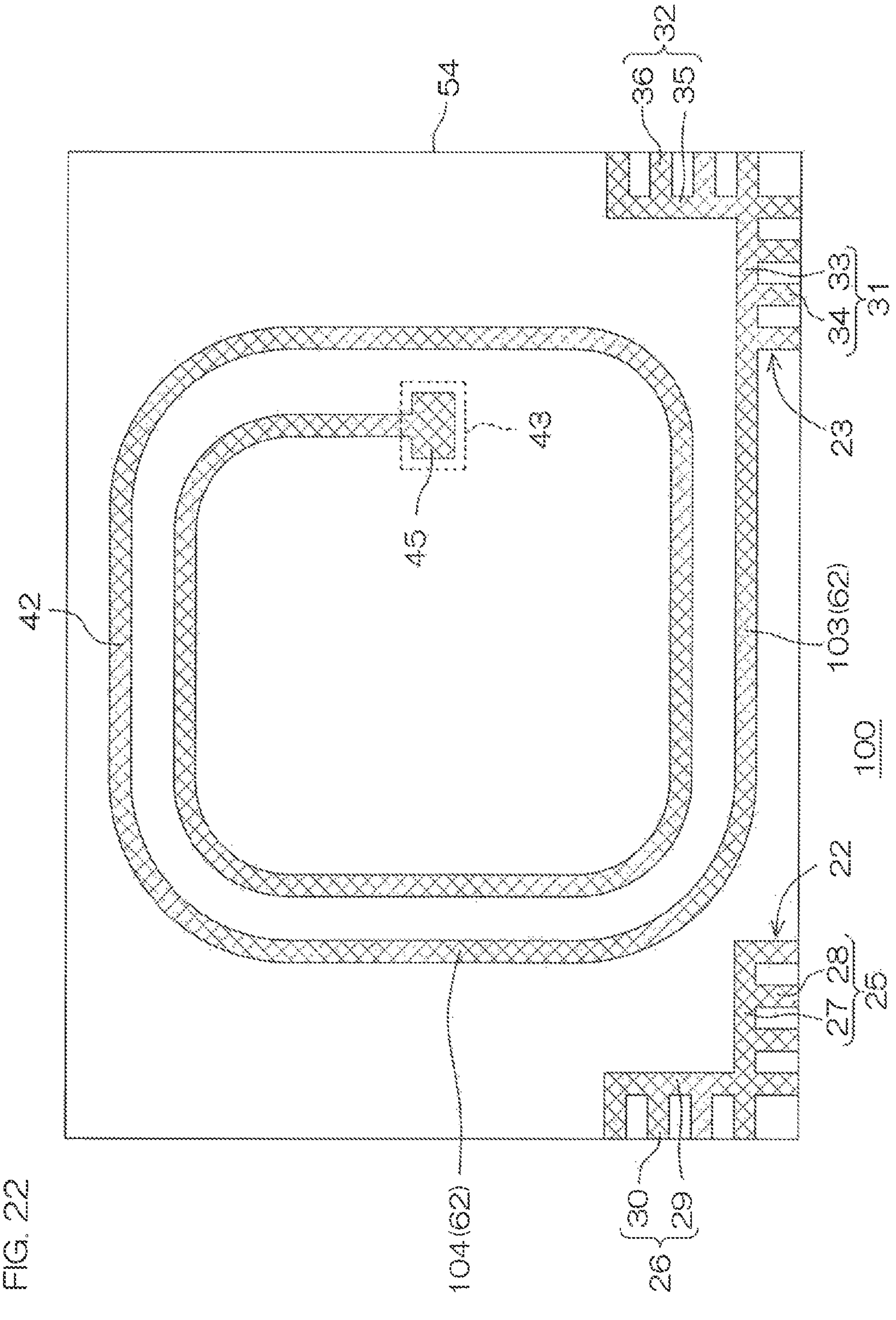
FIG. 22 is a plan view of a second spiral portion resin layer of the chip inductor shown in FIG. 21.

FIG. 21 is a plan view of the first spiral portion resin layer 52 of a chip inductor 100 according to a sixth preferred embodiment of the present invention. FIG. 22 is a plan view of the second spiral portion resin layer 54 of the chip inductor 100 shown in FIG. 21. With the chip inductor 100, arrangements corresponding to arrangements of the chip inductor 1 shall be provided with the same reference symbols and description thereof shall be omitted.

Referring to FIG. 21, the first lead-out portion 61 of the first spiral portion 41 has, in the present embodiment, a first extension portion 101 and a second extension portion 102. The first extension portion 101 of the first lead-out portion 61 extends along the mounting surface 3 from the first coil end 22 toward the second coil end 23 side.

The first extension portion 101 of the first lead-out portion 61 has one end portion connected to the first coil end 22 and another end portion positioned at the second coil end 23 side. The second extension portion 102 of the first extension portion 61 extends along the normal direction Y of the mounting surface 3 from the other end portion of the first extension portion 101.

Referring to FIG. 22, the second lead-out portion 62 of the second spiral portion 42 has, in the present embodiment, a third extension portion 103 and a fourth extension portion 104. The third extension portion 103 of the second lead-out portion 62 extends along the mounting surface 3 from the second coil end 23 toward the first coil end 22 side.

The third extension portion 103 of the second lead-out portion 62 has one end portion connected to the second coil end 23 and another end portion positioned at the first coil end 22 side. The fourth extension portion 104 of the second extension portion 62 extends along the normal direction Y of the mounting surface 3 from the other end portion of the third extension portion 103.

The chip inductor 100 can be manufactured by changing the exposure pattern of the second photoresist layer 75 in the step of FIG. 16C described above and changing the exposure pattern of the fourth photoresist layer 79 in the step of FIG. 16G.

The same effects as the effects described for the chip inductor 1 can also be exhibited by the chip inductor 100 described above. A structure such as that of the chip inductor 100 is also applicable to the second to fifth preferred embodiments described above.

Although the first preferred embodiment to the sixth preferred embodiment of the present invention were described above, the present invention may be implemented in modes besides the first preferred embodiment to the sixth preferred embodiment.

With each of preferred embodiments described above, an example where the first photoresist layer 72, the second photoresist layer 75, the third photoresist layer 77, the fourth photoresist layer 79, and the fifth photoresist layer 81 (referred to simply as the "plurality of resin layers" here) are negative type photoresist layers was described.

However, the plurality of resin layers may also be positive type photoresist layers. Obviously, at least one of the plurality of resin layers may be a positive type photoresist layer and the rest may be negative type photoresist layers.

With each of preferred embodiments described above, an example where the plurality of resin layers are patterned to the shapes of the chip formation regions 73 was described. However, the plurality of resin layers may be laminated as they are without being patterned to the shapes of the chip formation regions 73.

In this case, after forming the coil conductors 21 respectively in the regions, corresponding to the plurality of chip formation regions 73, in an interior of the laminated body of the plurality of resin layers, individual pieces of the plurality of chip inductors 1 may be cut out from the laminated body by a dicing blade.

With each of preferred embodiments described above, an example where the plurality of resin layers are photoresist layers of film form was described. However, the plurality of resin layers may include, for example, photoresist layers, with which a resin of liquid form is cured. In this case, for example, a flattening treatment by a CMP (chemical mechanical polishing) method may be applied to respective surfaces of the plurality of resin layers.

Also, With each of preferred embodiments described above, a plurality of insulator layers, formed, for example, by a CVD (chemical vapor deposition) method, may be included in place of the plurality of resin layers. In this case, respective patterning of the plurality of insulator layers may be performed by an etching method performed via a mask. Also, in this case, for example, the flattening treatment by the CMP method may be applied to respective surfaces of the plurality of insulator layers.

With each of preferred embodiments described above, the spiral portion 24 of the coil conductor 21 may have a plurality of spiral portions made of n (where n is a natural number not less than 2) layers. That is, the plurality of spiral portions may include the first spiral portion 41, the second spiral portion 42, a third spiral portion, . . . , and an n-th spiral portion. Also, the spiral portion 24 of the coil conductor 21 may have, between an (n−1)-th spiral portion and the n-th spiral portion, an (n−1)-th connecting portion, connecting the (n−1)-th spiral portion and the n-th spiral portion.

In this case, the sealing body 2 may have an n-th spiral portion resin layer for the n-th spiral portion in accordance with a lamination number of the n-th spiral portion. Further, the sealing body 2 may have, between an (n−1)-th spiral portion resin layer and the n-th spiral portion resin layer, an (n−1)-th connecting portion resin layer for the (n−1)-th connecting portion.

With each of preferred embodiments described above, a structure may be adopted where the first external terminal 6 does not include the first bottom surface terminal 10 and has only the first side surface terminal 11. In this case, the first coil end 22 does not include the first bottom surface portion 25 and has only the first side surface portion 26.

The first external terminal 6 of such structure can be manufactured by changing the respective exposure patterns of the second photoresist layer 75, the third photoresist layer 77, and the fourth photoresist layer 79 in the processes of FIG. 16A to FIG. 16K described above.

With each of preferred embodiments described above, a structure may be adopted where the second external terminal 7 does not include the second bottom surface terminal 12 and has only the second side surface terminal 13. In this case, the second coil end 23 does not include the second bottom surface portion 31 and has only the second side surface portion 32.

The second external terminal 7 of such structure can be manufactured by changing the respective exposure patterns of the second photoresist layer 75, the third photoresist layer 77, and the fourth photoresist layer 79 in the processes of FIG. 16A to FIG. 16K described above.

Figure 23:
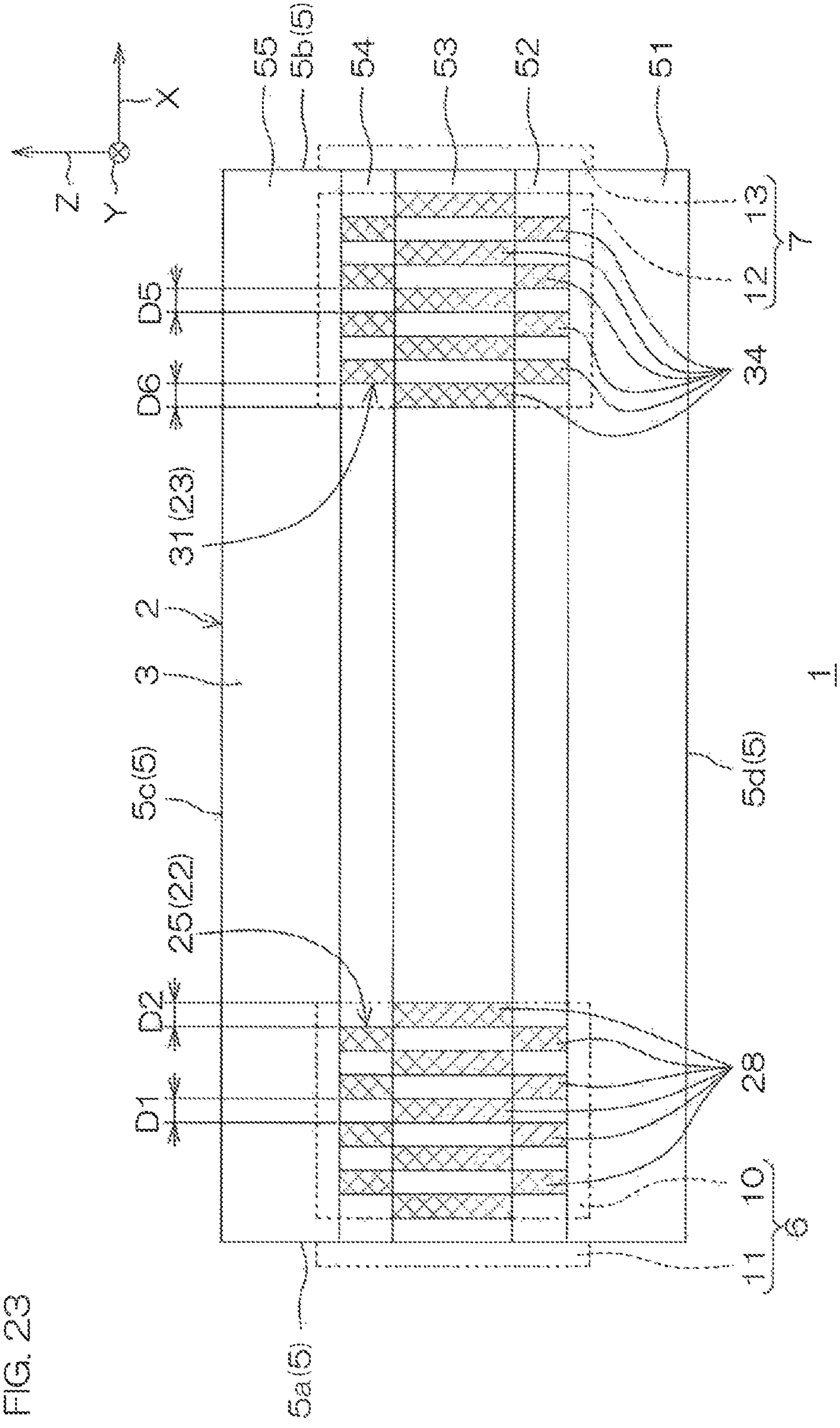
FIG. 23 is a bottom view of the chip inductor shown in FIG. 1 and is a diagram for describing a first modification example of the first coil end and the second coil end.

FIG. 23 is a bottom view of the chip inductor 1 shown in FIG. 1 and is a diagram for describing a first modification example of the first coil end 22 and the second coil end 23. In FIG. 23, arrangements that are the same as arrangements described with the first preferred embodiment described above shall be provided with the same reference symbols and description thereof shall be omitted.

As in the present modification example, the plurality of first bottom surface projections 28 exposed from the mounting surface 3 may be formed to be of staggered form in the plan view. That is, the plurality of first bottom surface projections 28 formed in the connecting portion resin layer 53 may be shifted in the facing direction X of the first coil end 22 and the second coil end 23 with respect to the plurality of first bottom surface projections 28 formed in the first spiral portion resin layer 52.

Similarly, the plurality of second bottom surface projections 34 exposed from the mounting surface 3 may be formed to be of staggered form in the plan view. That is, the plurality of second bottom surface projections 34 formed in the connecting portion resin layer 53 may be shifted in the facing direction X of the first coil end 22 and the second coil end 23 with respect to the plurality of second bottom surface projections 34 formed in the first spiral portion resin layer 52.

As with the plurality of first bottom surface projections 28, the plurality of first side surface projections 30 may also be formed to be of staggered form in the side view. As with the plurality of second bottom surface projections 34, the plurality of second side surface projections 36 may also be formed to be of staggered form in the side view.

The first coil end 22 and the second coil end 23 of such structure can be manufactured by changing the respective exposure patterns of the second photoresist layer 75, the third photoresist layer 77, and the fourth photoresist layer 79 in the processes of FIG. 16A to FIG. 16K described above.

The first coil end 22 and the second coil end 23 of such structure may be formed. The first coil end 22 and the second coil end 23 according to the present modification example are also applicable to the second preferred embodiment to the sixth preferred embodiment.

Figure 24:
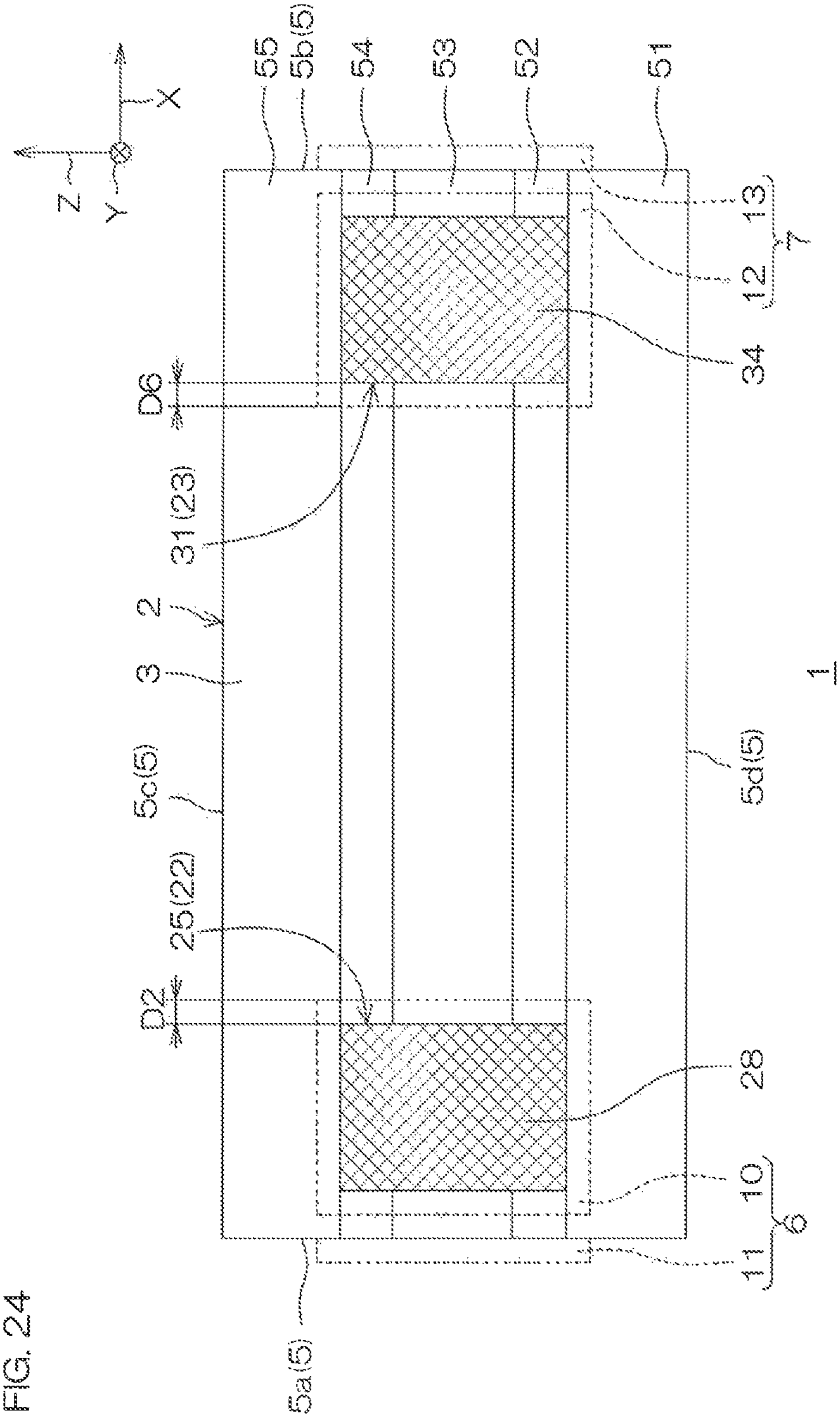
FIG. 24 is a bottom view of the chip inductor shown in FIG. 1 and is a diagram for describing a second modification example of the first coil end and the second coil end.

FIG. 24 is a bottom view of the chip inductor 1 shown in FIG. 1 and is a diagram for describing a second modification example of the first coil end 22 and the second coil end 23. In FIG. 24, arrangements that are the same as arrangements described with the first preferred embodiment described above shall be provided with the same reference symbols and description thereof shall be omitted.

As in the present modification example, the first bottom surface portion 25 of the first coil end 22 may include a single wide first bottom surface projection 28 in place of the plurality of first bottom surface projections 28. Similarly, the second bottom surface portion 31 of the second coil end 23 may include a single wide second bottom surface projection 34 in place of the plurality of second bottom surface projections 34.

As with the first bottom surface portion 25, the first side surface portion 26 of the first coil end 22 may include a single wide first side surface projection 30 in place of the plurality of first side surface projections 30. Also, as with the second bottom surface portion 31, the second side surface portion 32 of the second coil end 23 may include a single wide second side surface projection 36 in place of the plurality of second side surface projections 36.

The first coil end 22 and the second coil end 23 of such structure can be manufactured by changing the respective exposure patterns of the second photoresist layer 75, the third photoresist layer 77, and the fourth photoresist layer 79 in the processes of FIG. 16A to FIG. 16K described above.

The first coil end 22 and the second coil end 23 of such structure may be formed. The first coil end 22 and the second coil end 23 according to the present modification example are also applicable to the second preferred embodiment to the sixth preferred embodiment.

Figure 25:
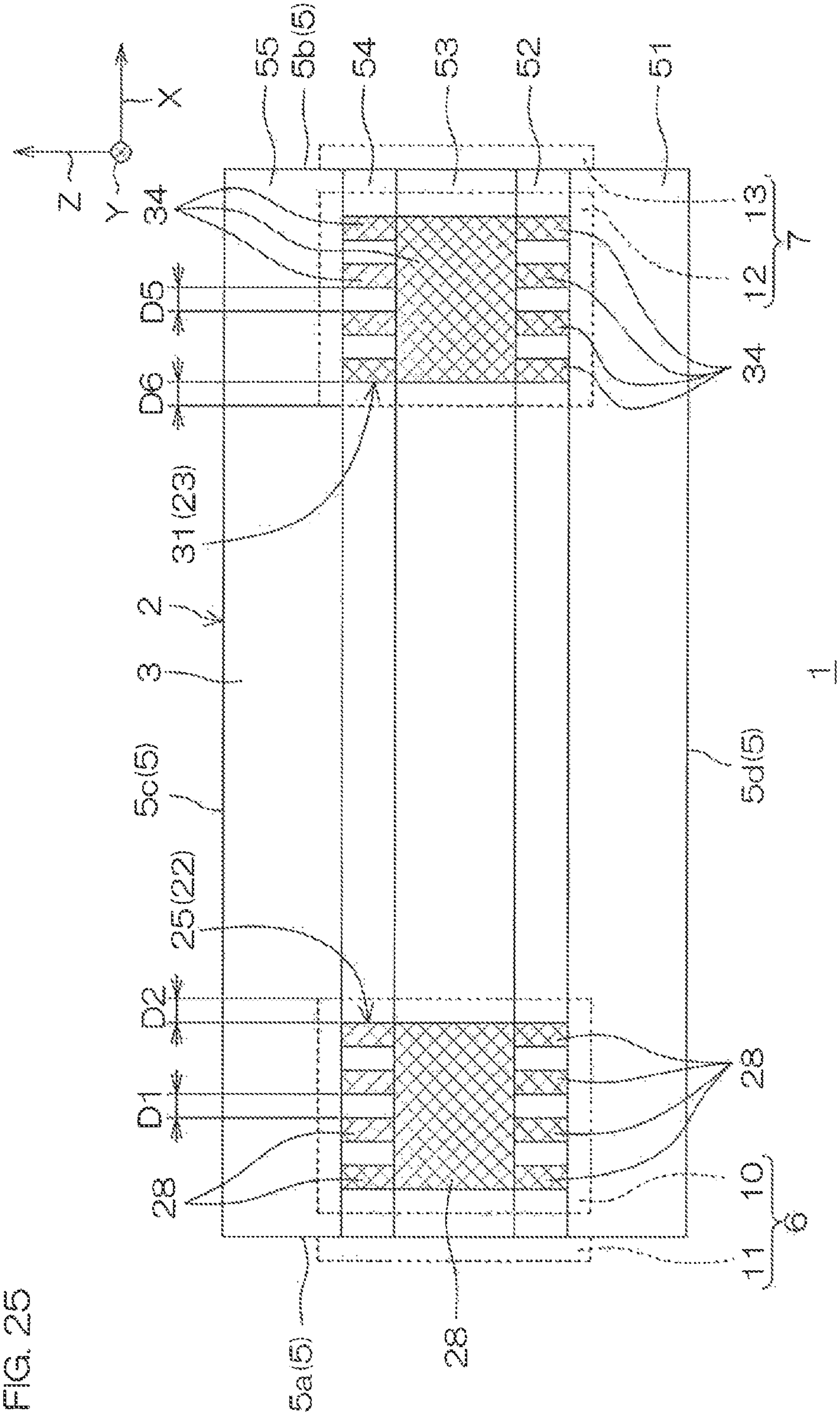
FIG. 25 is a bottom view of the chip inductor shown in FIG. 1 and is a diagram for describing a third modification example of the first coil end and the second coil end.

FIG. 25 is a bottom view of the chip inductor 1 shown in FIG. 1 and is a diagram for describing a third modification example of the first coil end and the second coil end. In FIG. 25, arrangements that are the same as arrangements described with the first preferred embodiment described above shall be provided with the same reference symbols and description thereof shall be omitted.

As in the present modification example, in the first coil end 22, a wide first bottom surface projection 28 may be formed only in the connecting portion resin layer 53. Similarly, in the second coil end 23, a wide second bottom surface projection 34 may be formed only in the connecting portion resin layer 53.

Obviously, in the first coil end 22, the wide first bottom surface projection 28 may be formed in the first spiral portion resin layer 52 in place of or in addition to the connecting portion resin layer 53. Also, in the first coil end 22, the wide first bottom surface projection 28 may be formed in the second spiral portion resin layer 54 in place of or in addition to the connecting portion resin layer 53.

Also, in the first coil end 22, the wide first bottom surface projections 28 may be formed in the first spiral portion resin layer 52 and the second spiral portion resin layer 54 while the plurality of first bottom surface projections 28 are formed in the connecting portion resin layer 53.

Similarly, in the second coil end 23, the wide second bottom surface projection 34 may be formed in the first spiral portion resin layer 52 in place of or in addition to the connecting portion resin layer 53. Also, in the second coil end 23, the wide second bottom surface projection 34 may be formed in the second spiral portion resin layer 54 in place of or in addition to the connecting portion resin layer 53.

Also, in the second coil end 23, the wide second bottom surface projections 34 may be formed in the first spiral portion resin layer 52 and the second spiral portion resin layer 54 while the plurality of second bottom surface projections 34 are formed in the connecting portion resin layer 53.

The first coil end 22 and the second coil end 23 of such structure can be manufactured by changing the respective exposure patterns of the second photoresist layer 75, the third photoresist layer 77, and the fourth photoresist layer 79 in the processes of FIG. 16A to FIG. 16K described above.

The first coil end 22 and the second coil end 23 of such structure may be formed. The first coil end 22 and the second coil end 23 according to the present modification example are also applicable to the second preferred embodiment to the sixth preferred embodiment.

Figure 26:
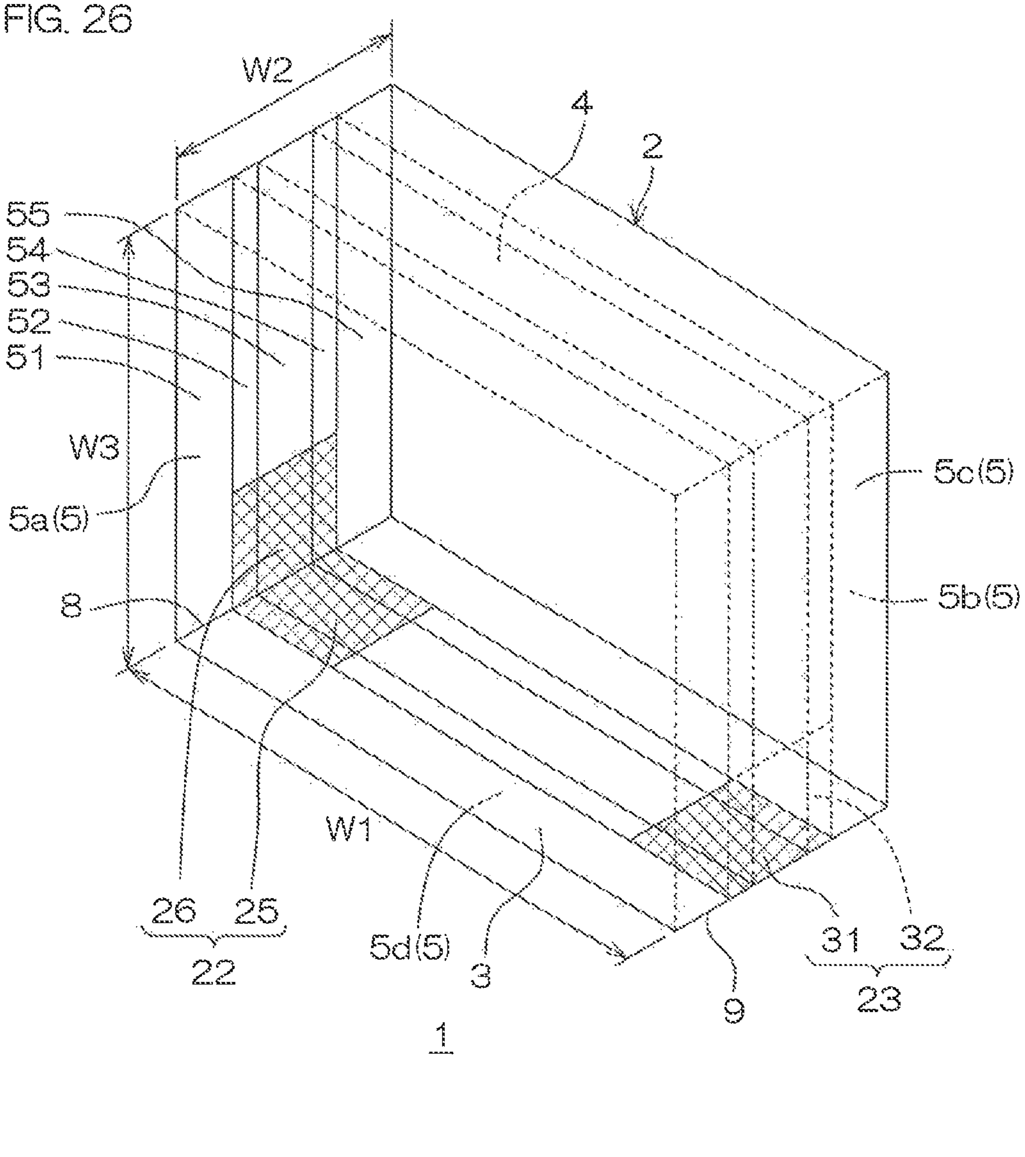
FIG. 26 is a perspective view of the chip inductor shown in FIG. 1 and is a diagram for describing a fourth modification example of the first coil end and the second coil end.

FIG. 26 is a perspective view of the chip inductor 1 shown in FIG. 1 and is a diagram for describing a fourth modification example of the first coil end 22 and the second coil end 23. In FIG. 26, illustration of the first external terminal 6 and the second external terminal 7 is omitted. In FIG. 26, arrangements that are the same as arrangements described with the first preferred embodiment described above shall be provided with the same reference symbols and description thereof shall be omitted.

In the present modification example, the first bottom surface portion 25 of the first coil end 22 includes a single wide first bottom surface projection 28 in place of the plurality of first bottom surface projections 28. Similarly, the second bottom surface portion 31 of the second coil end 23 includes a single wide second bottom surface projection 34 in place of the plurality of second bottom surface projections 34. As in the present modification example, the first bottom surface projection 28 and the first side surface projection 30 may be formed integrally in the first coil end 22.

In the present modification example, the first side surface portion 26 of the first coil end 22 includes a single wide first side surface projection 30 in place of the plurality of first side surface projections 30. Similarly, the second side surface portion 32 of the second coil end 23 includes a single wide second side surface projection 36 in place of the plurality of second side surface projections 36. As in the present modification example, the second bottom surface projection 34 and the second side surface projection 36 may be formed integrally in the second coil end 23.

The first coil end 22 and the second coil end 23 of such structure may be formed. The first coil end 22 and the second coil end 23 according to the present modification example are also applicable to the second preferred embodiment to the sixth preferred embodiment.

Figure 27:
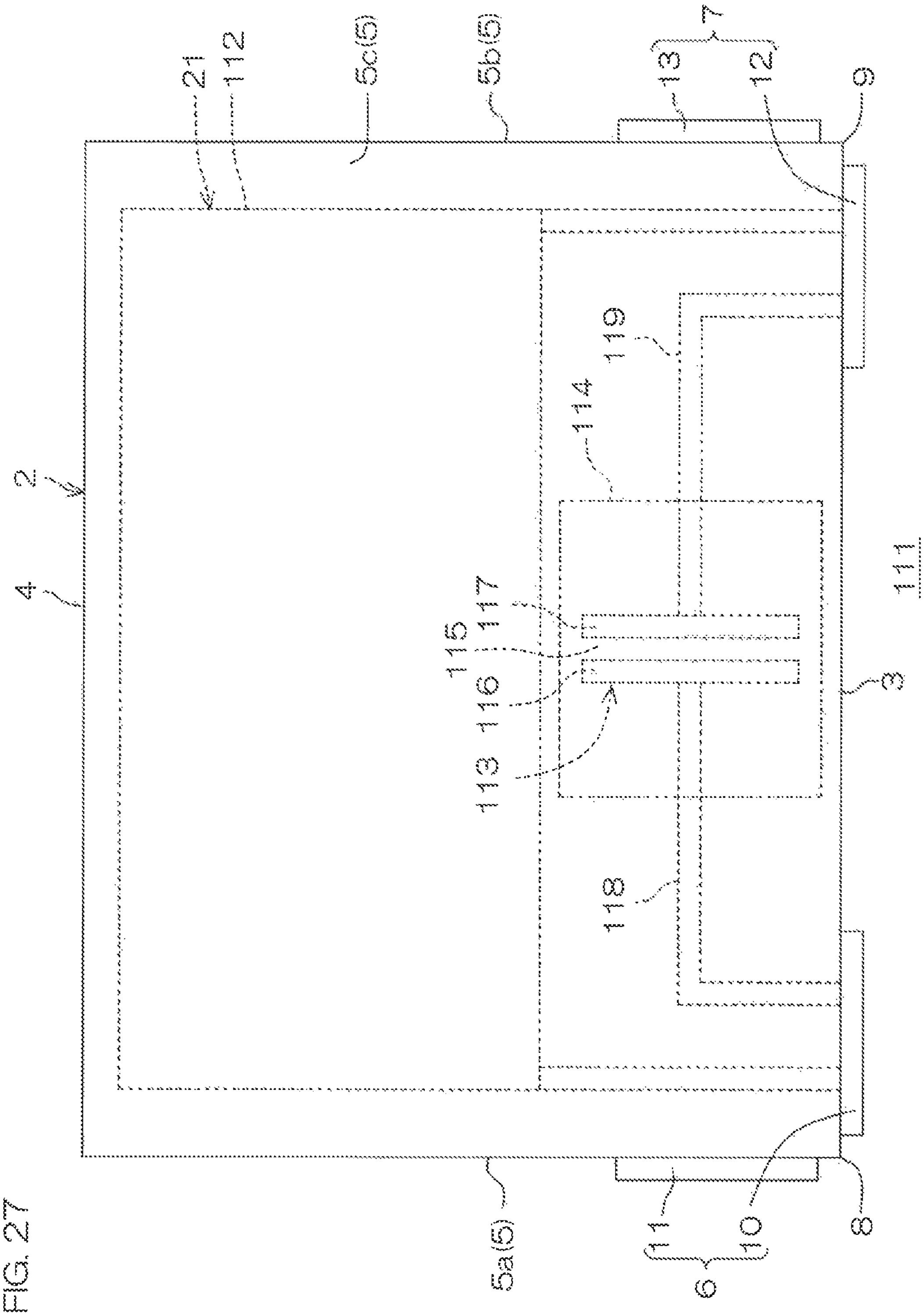
FIG. 27 is a diagram for describing a chip inductor according to a first modification example.

FIG. 27 is a diagram for describing a chip inductor 111 according to a first modification example. In FIG. 27, arrangements that are the same as arrangements described with the first preferred embodiment described above shall be provided with the same reference symbols and description thereof shall be omitted.

The chip inductor 111 according to the present modification example includes, in addition to an inductor formation region 112, in which the spiral portion 24 is formed, a capacitor formation region 114, in which a capacitor portion 113 is formed. With the chip inductor 111 according to the present modification example, the capacitor formation region 114 and the inductor formation region 112 are mutually stacked in the normal direction Y of the mounting surface 3.

In the present modification example, the capacitor formation region 114 is formed in a region between the mounting surface 3 and the inductor formation region 112. The capacitor formation region 114 may also be formed in a region between the non-mounting surface 4 and the inductor formation region 112.

The capacitor portion 113 includes a first conductor 116 and a second conductor 117 that face each other across a dielectric body 115. The dielectric body 115 may be formed using a portion (plurality of resin layers) of the sealing body 2. The dielectric body 115 may be formed of an insulator differing from the sealing body 2.

The first conductor 116 may be formed in a plate shape extending along the winding axis direction Z of the first spiral portion 41. The first conductor 116 may be formed of the same material as the coil conductor 21 (spiral portion 24). The first conductor 116 may be formed of a conductor differing from that of the coil conductor 21 (spiral portion 24).

The second conductor 117 may be formed in a plate shape extending along the winding axis direction Z of the first spiral portion 41. The second conductor 117 may be formed of the same material as the coil conductor 21 (spiral portion 24). The second conductor 117 may be formed of a conductor differing from that of the coil conductor 21 (spiral portion 24).

The capacitor portion 113 may be connected in parallel to the coil conductor 21. That is, the first conductor 116 may be electrically connected via a first wiring 118 to the first coil end 22. Also, the second conductor 117 may be electrically connected via a second wiring 119 to the second coil end 23.

The capacitor portion 113 may be connected in series to the coil conductor 21. That is, the capacitor portion 113 may be interposed between the first external terminal 6 and the coil conductor 21 and/or between the second external terminal 7 and the coil conductor 21.

The chip inductor 111 can be manufactured by changing the respective exposure patterns of the second photoresist layer 75, the third photoresist layer 77, and the fourth photoresist layer 79 in the processes of FIG. 16A to FIG. 16K described above.

The same effects as the effects described for the first preferred embodiment described above can also be exhibited by the chip inductor 111 according to the present modification example described above. The structure in which the capacitor portion 113 is formed is also applicable to the second preferred embodiment to the sixth preferred embodiment.

Figure 28:
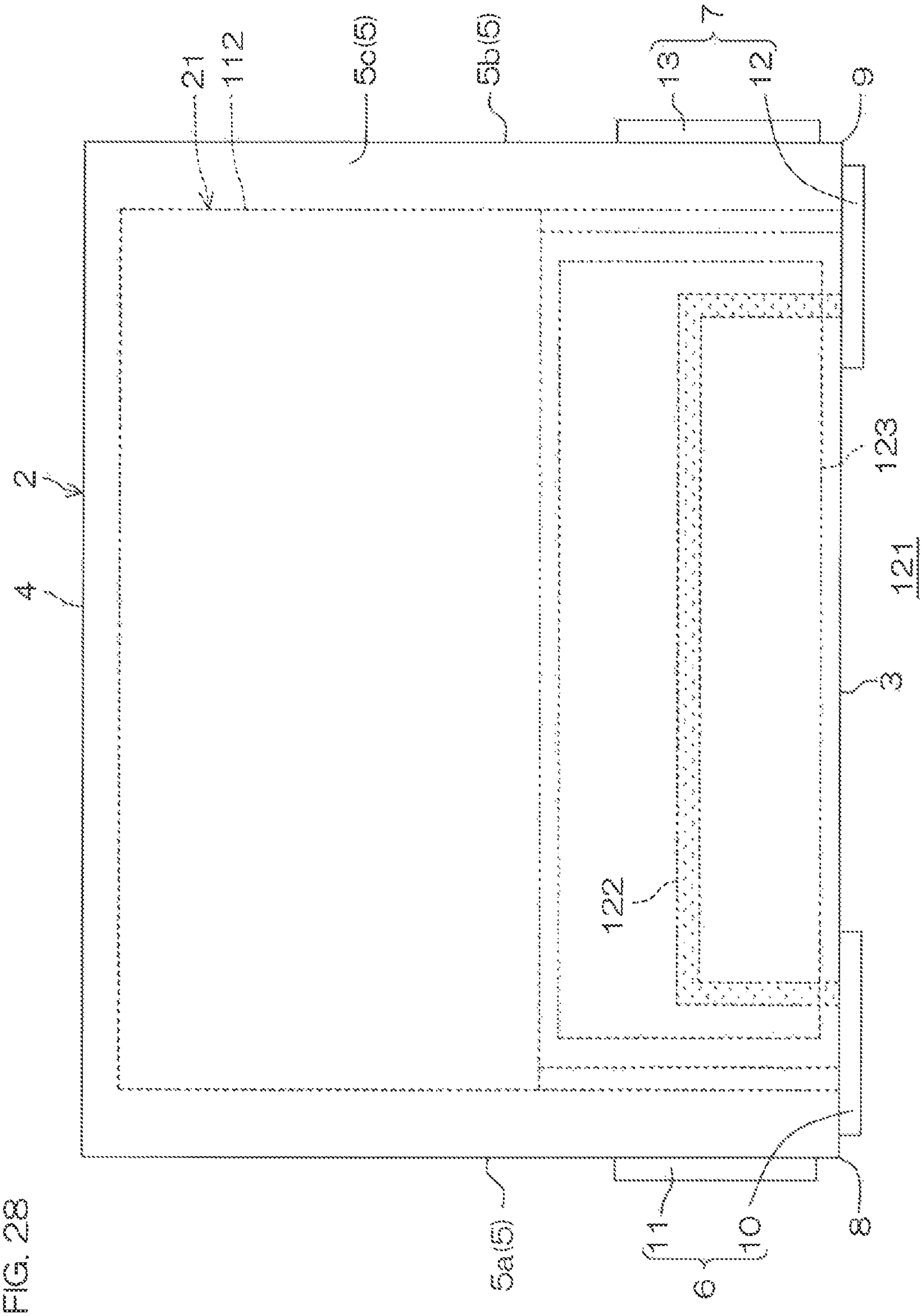
FIG. 28 is a diagram for describing a chip inductor according to a second modification example.

FIG. 28 is a diagram for describing a chip inductor 121 according to a second modification example. In FIG. 28, arrangements that are the same as arrangements described with the first preferred embodiment described above shall be provided with the same reference symbols and description thereof shall be omitted.

The chip inductor 121 according to the present modification example includes, in addition to the inductor formation region 112, in which the spiral portion 24 is formed, a resistor formation region 123, in which a resistor portion 122 is formed. With the chip inductor 121 according to the present modification example, the inductor formation region 112 and the resistor formation region 123 are mutually stacked in the normal direction Y of the mounting surface 3.

In the present modification example, the resistor formation region 123 is formed in a region between the mounting surface 3 and the inductor formation region 112. The resistor formation region 123 may also be formed in a region between the non-mounting surface 4 and the inductor formation region 112.

The resistor portion 122 includes a conductor (for example, titanium or titanium nitride, etc.) having a higher resistivity than a resistivity of the coil conductor 21. The resistor portion 122 may be connected in parallel to the coil conductor 21. That is, the resistor portion 122 may be electrically connected to the first coil end 22 and the second coil end 23.

The resistor portion 122 may be connected in series to the coil conductor 21. That is, the resistor portion 122 may be interposed between the first external terminal 6 and the coil conductor 21 and/or between the second external terminal 7 and the coil conductor 21.

The chip inductor 121 can be manufactured by changing the respective exposure patterns of the second photoresist layer 75, the third photoresist layer 77, and the fourth photoresist layer 79 and selectively embedding a resistivity higher than the resistivity of the coil conductor 21 in the processes of FIG. 16A to FIG. 16K described above.

The same effects as the effects described for the first preferred embodiment described above can also be exhibited by the chip inductor 121 according to the present modification example described above. The structure in which the resistor portion 122 is formed is also applicable to the second preferred embodiment to the sixth preferred embodiment.

A structure combining the structures of FIG. 27 and FIG. 28 and includes both the capacitor portion 113 and the resistor portion 122 may be applied to the second preferred embodiment to the sixth preferred embodiment. Obviously, a chip part (chip capacitor) including only the capacitor portion 113 that is routed along the normal direction Y of the mounting surface 3 can be manufactured as well.

Also, a chip part (chip resistor) including only the resistor portion 122 that is routed along the normal direction Y of the mounting surface 3 can be manufactured as well. Also, a chip part including only the capacitor portion 113 and the resistor portion 122 that are routed along the normal direction Y of the mounting surface 3 can be manufactured as well.

Figure 29:
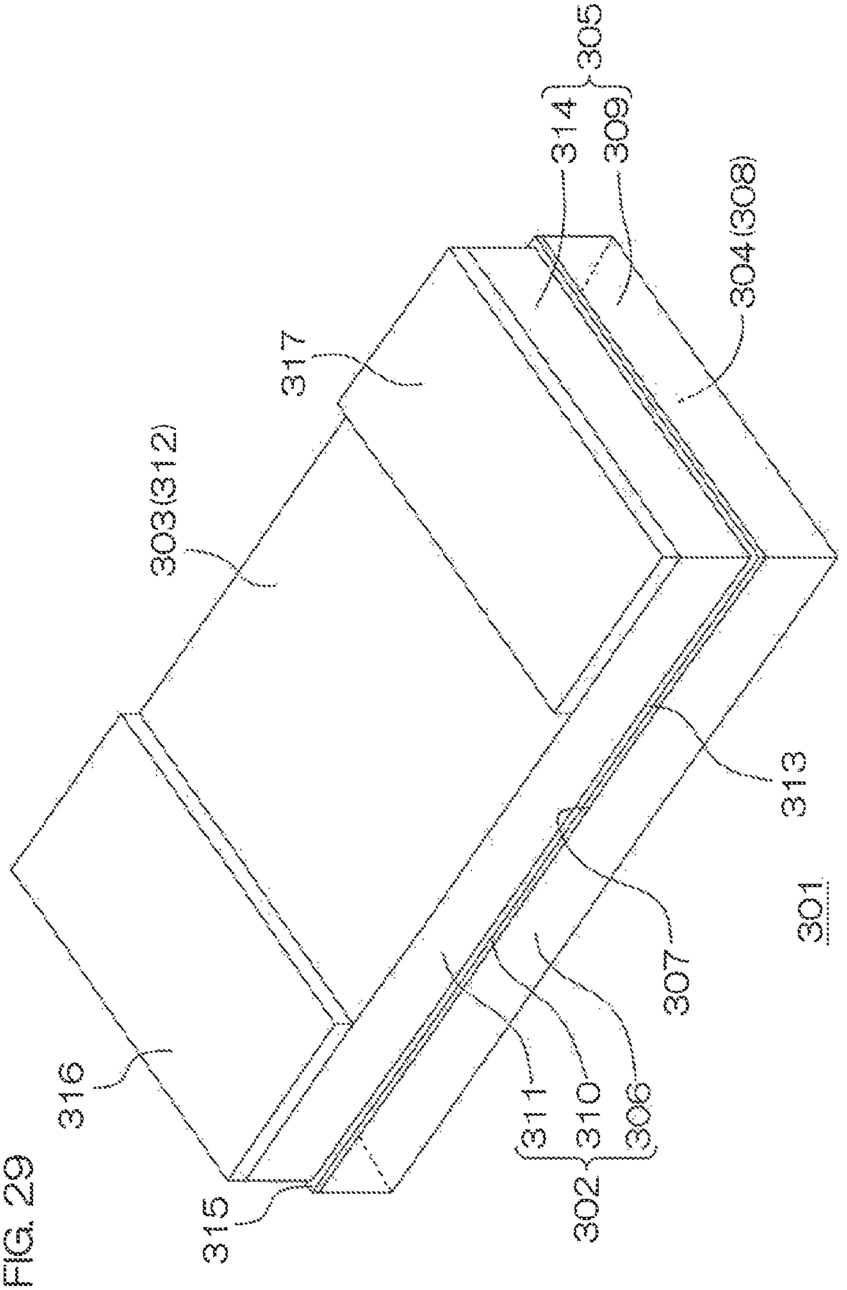
FIG. 29 is a perspective view of a chip capacitor according to a seventh preferred embodiment of the present invention.

FIG. 29 is a perspective view of a chip capacitor 301 according to a seventh preferred embodiment of the present invention.

The chip capacitor 301 is a chip part that is called a 0603 (0.6 mm×0.3 mm) chip, a 0402 (0.4 mm×0.2 mm) chip, or a 03015 (0.3 mm×0.15 mm) chip, etc.

Referring to FIG. 29, the chip capacitor 301 includes a chip main body 302 of rectangular parallelepiped shape. The chip main body 302 includes a first major surface 303, a second major surface 304 positioned at an opposite side to the first major surface 303, and side surfaces 305 connecting the first major surface 303 and the second major surface 304. The first major surface 303 and the second major surface 304 are formed in oblong shapes, having long sides and short sides, in a plan view as viewed from a normal direction thereof (hereinafter referred to simply as the “plan view”).

The abovementioned “0603,” “0402,” “03015,” etc., are defined by a length of a long side of the chip main body 302 and a length of a short side of the chip main body 302. A thickness of the chip main body 302 may, for example, be not less than 100 μm and not more than 300 μm (for example, approximately 150 μm).

The chip main body 302 includes a substrate 306. The substrate 306 is formed in a rectangular parallelepiped shape. The substrate 306 includes a first major surface 307, a second major surface 308 positioned at an opposite side to the first major surface 307, and side surfaces 309 connecting the first major surface 307 and the second major surface 308.

The first major surface 307 and the second major surface 308 are formed in oblong shapes, having long sides and short sides, in the plan view. The second major surface 308 of the substrate 306 forms the second major surface 304 of the chip main body 302. The side surfaces 309 of the substrate 306 form portions of the side surfaces 305 of the chip main body 302.

The substrate 306 may be a high resistance substrate having a resistivity of not less than 0.5 MΩ·cm and not more than 1.5 MΩ·cm (for example, approximately 1.0 MΩ·cm). A thickness of the substrate 306 may, for example, be not less than 50 μm and not more than 250 μm (for example, approximately 100 μm).

The chip main body 302 includes a surface insulating film 310 formed on the first major surface 307 of the substrate 306. The surface insulating film 310 covers an entirety of the first major surface 307 of the substrate 306. The surface insulating film 310 forms portions of the side surfaces 305 of the chip main body 302. The surface insulating film 310 may include silicon oxide. A thickness of the surface insulating film 310 is, for example, not less than 0.1 μm and not more than 5 μm.

The chip main body 302 includes an insulating layer 311 formed on the surface insulating film 310. The insulating layer 311 is formed in a rectangular parallelepiped shape. The insulating layer 311 includes a first major surface 312 at one side, a second major surface 313 at another side, and side surfaces 314 connecting the first major surface 312 and the second major surface 313. The first major surface 312 and the second major surface 313 are formed in oblong shapes, having long sides and short sides, in the plan view.

The first major surface 312 of the insulating layer 311 forms the first major surface 303 of the chip main body 302. The second major surface 313 of the insulating layer 311 is connected to the surface insulating film 310. The side surfaces 314 of the insulating layer 311 form portions of the side surfaces 305 of the chip main body 302.

The side surfaces 314 of the insulating layer 311 are formed across intervals in an inner region from the side surfaces 309 of the substrate 306. Step portions 315 are formed at regions between the side surfaces 314 of the insulating layer 311 and the side surfaces 309 of the substrate 306. Peripheral edge portions of the surface insulating film 310 are exposed from the step portions 315.

The side surfaces 314 of the insulating layer 311 and the side surfaces 309 of the substrate 306 may be formed to be substantially flush. That is, a chip main body 302, having a structure where the step portions 315 are not formed in the regions between the side surfaces 314 of the insulating layer 311 and the side surfaces 309 of the substrate 306, may be adopted.

The insulating layer 311 is made of an insulator. The insulator may include an inorganic based insulator that includes silicon oxide, silicon nitride, or a ceramic. The insulator may include an organic based insulator that includes a sealing resin, such as a polyimide resin or an epoxy resin, etc.

In the present embodiment, the insulating layer 311 is made of a single layer structure of a resin layer. The resin layer includes an epoxy resin as an organic based insulator. The epoxy resin is also a negative type photoresist. In the present embodiment, the insulating layer 311 is made of a photoresist layer.

A thickness of the insulating layer 311 is greater than the thickness of the surface insulating film 310. In the present embodiment, the thickness of the insulating layer 311 is not less than 10 μm and not more than 200 μm (for example, approximately 50 μm). With the insulating layer 311 of this thickness, a parasitic capacitance that is formed in a region between the first major surface 312 of the insulating layer 311 and the first major surface 307 of the substrate 306 can be decreased.

On the first major surface 303 of the chip main body 302, a first external terminal 316 and a second external terminal 317 are formed across an interval along a long direction of the chip main body 302 from each other.

The first external terminal 316 is formed at one end portion side of the chip main body 302. The first external terminal 316 is formed in an oblong shape extending along a short direction of the chip main body 302 in the plan view.

The second external terminal 317 is formed at another end portion side of the chip main body 302. The second external terminal 317 is formed in an oblong shape extending along the short direction of the chip main body 302 in the plan view.

Figure 30:
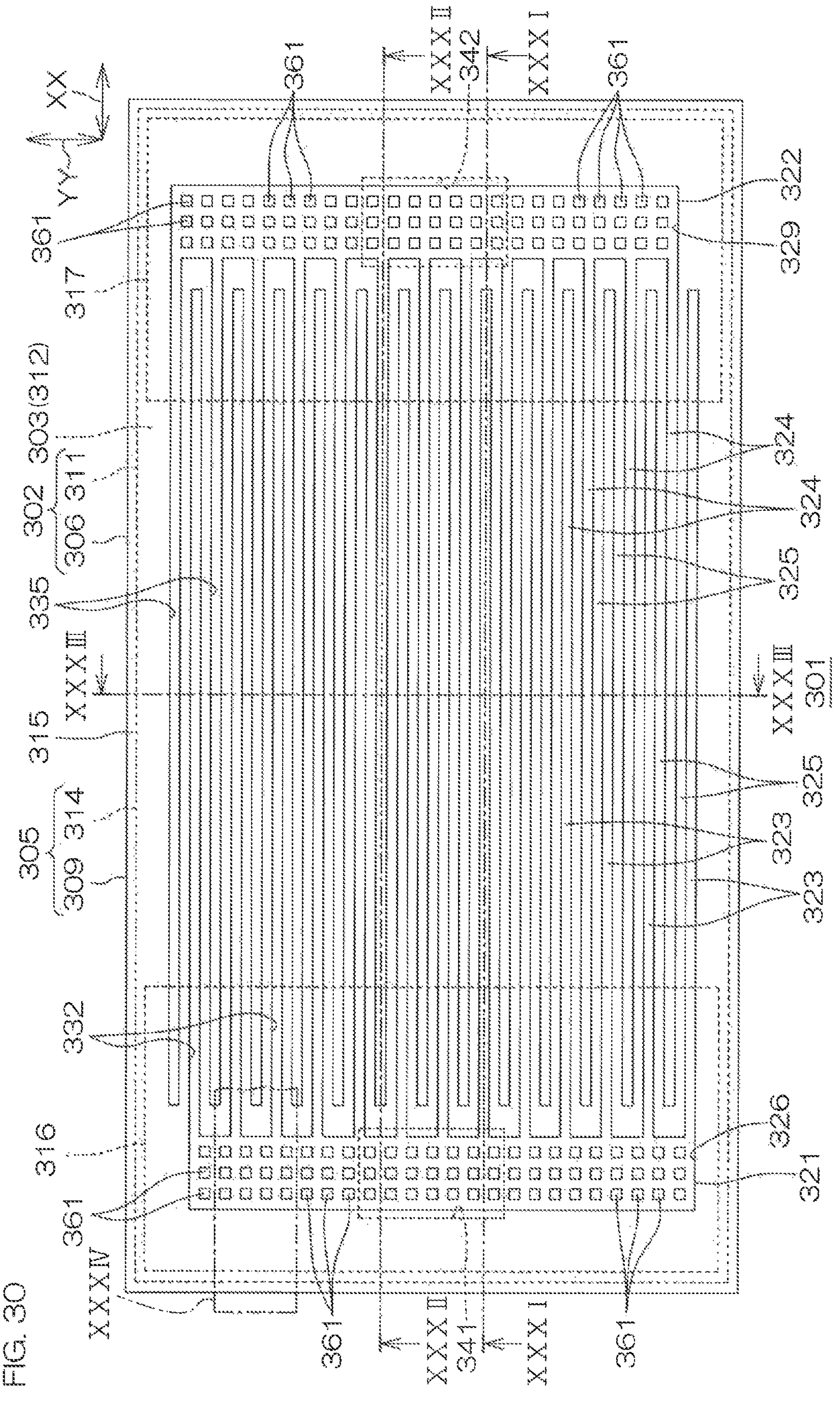
FIG. 30 is a plan view of an internal structure of the chip capacitor of FIG. 29.
Figure 31:
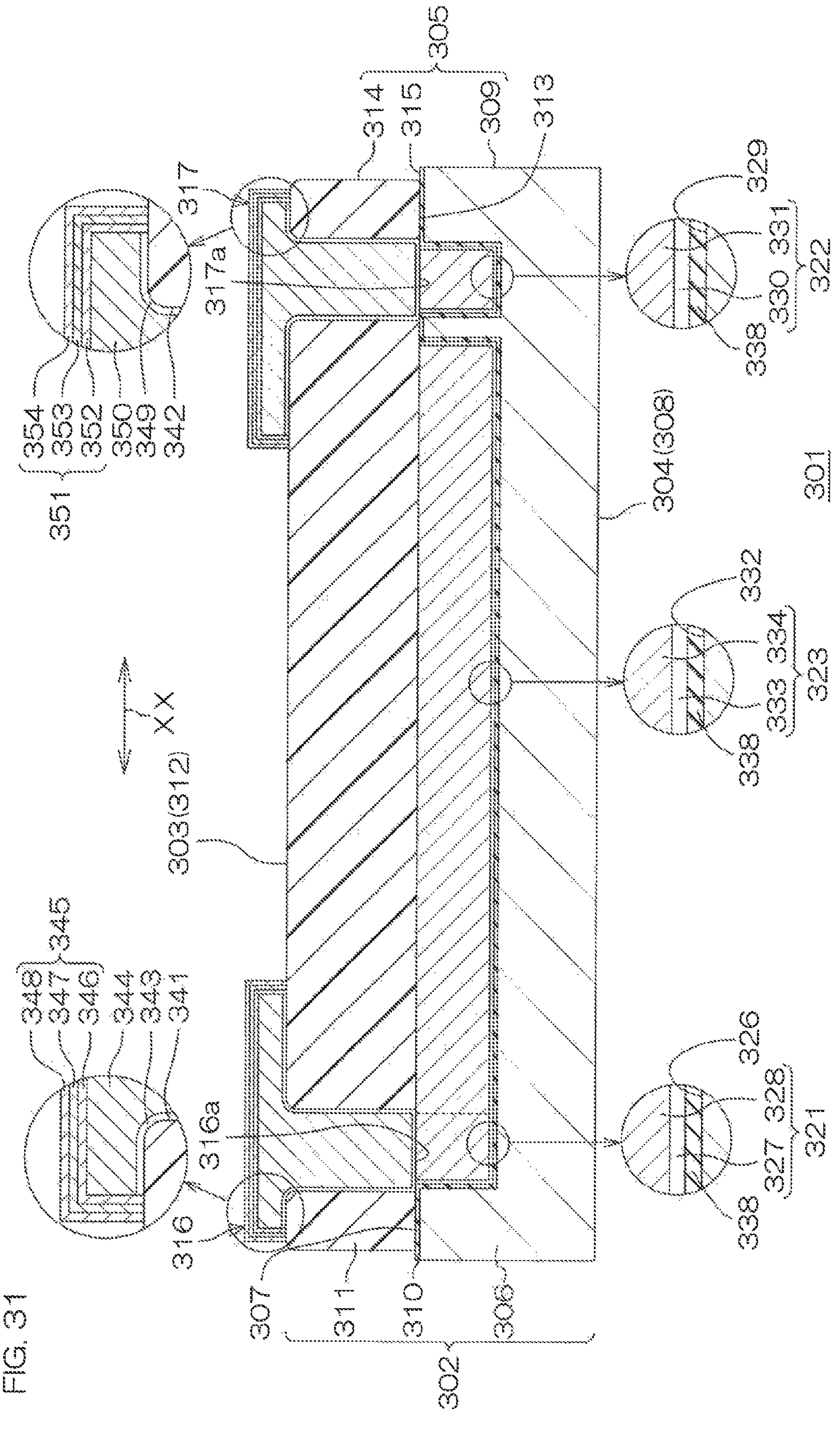
FIG. 31 is a sectional view taken along line XXXI-XXXI of FIG. 30.
Figure 32:
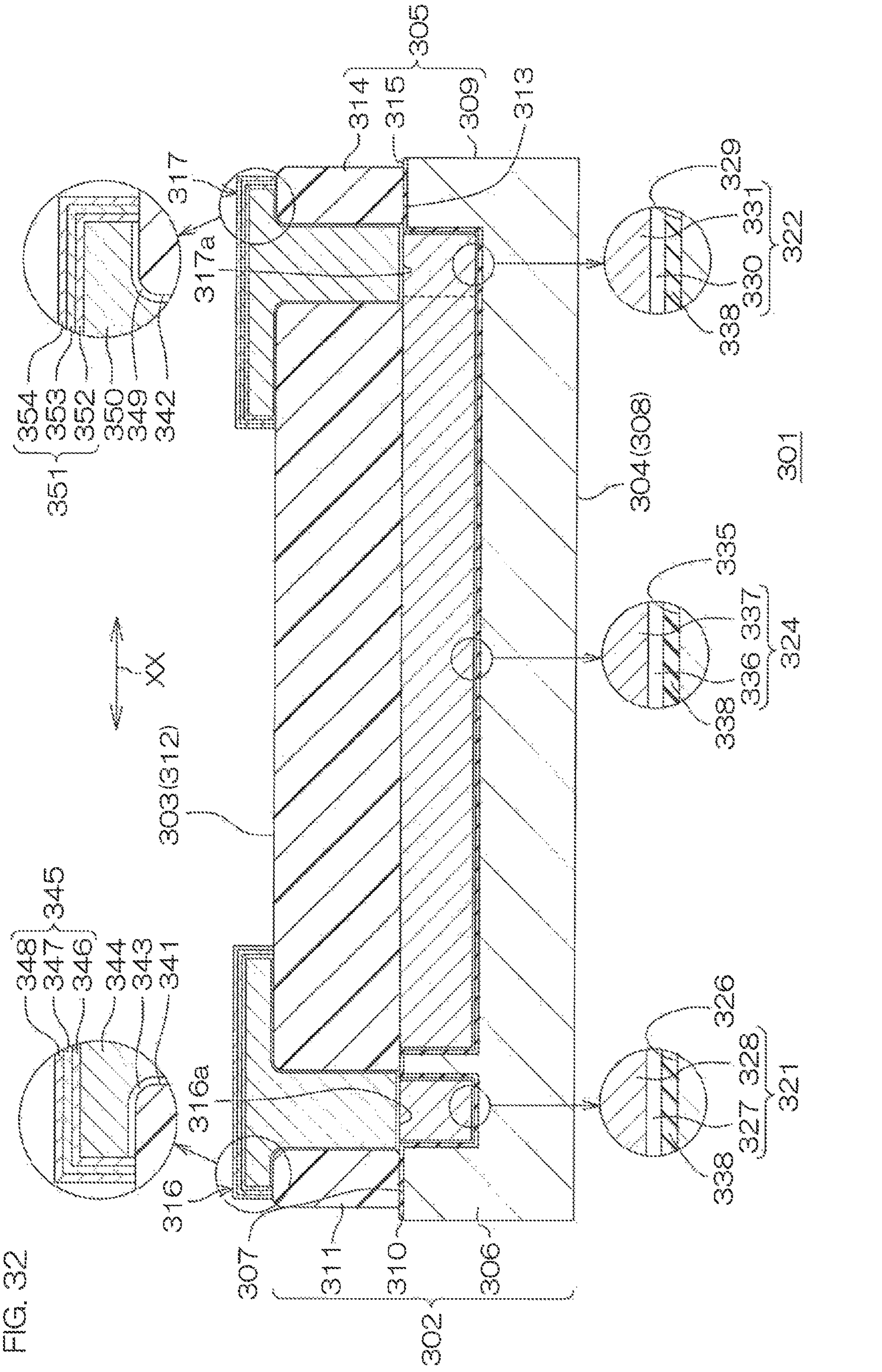
FIG. 32 is a sectional view taken along line XXXII-XXXII of FIG. 30.
Figure 33:
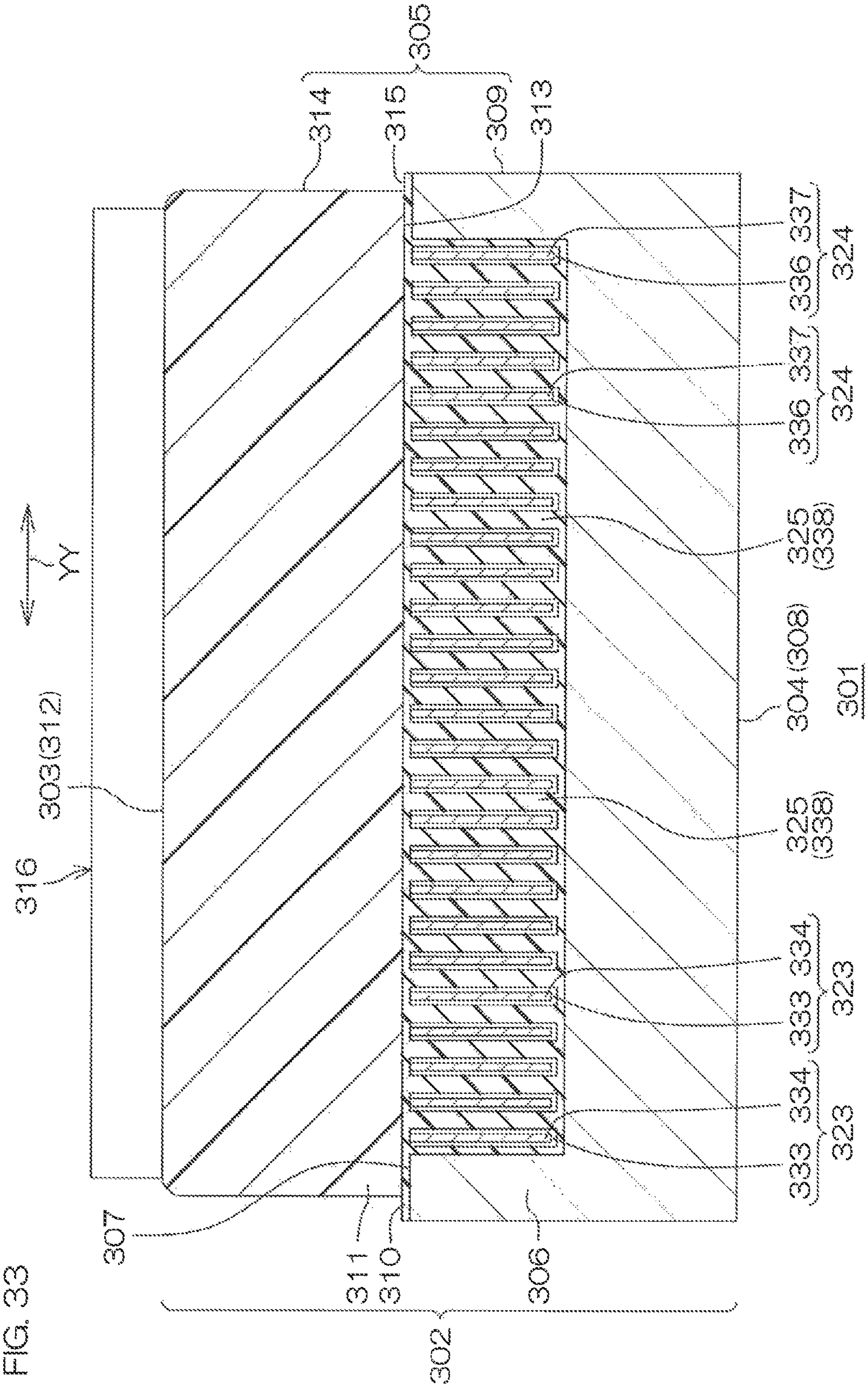
FIG. 33 is a sectional view taken along line XXXIII-XXXIII of FIG. 30.

FIG. 30 is a plan view of an internal structure of the chip capacitor 301 of FIG. 29. FIG. 31 is a sectional view taken along line XXXI-XXXI of FIG. 30. FIG. 32 is a sectional view taken along line XXXII-XXXII of FIG. 30. FIG. 33 is a sectional view taken along line XXXIII-XXXIII of FIG. 30. FIG. 30 is also a plan view with which structures above the first major surface 307 of the substrate 306 are removed.

Referring to FIG. 30 to FIG. 33, a first pad electrode 321, a second pad electrode 322, first capacitor electrodes 323, second capacitor electrodes 324, and a dielectric body 325 are embedded in the first major surface 307 of the substrate 306.

Referring to FIG. 30 to FIG. 32, the first pad electrode 321 is embedded at the one end portion side of the first major surface 307 of the substrate 306. More specifically, in the first major surface 307 of the substrate 306, the first pad electrode 321 is embedded in a first pad trench 326 formed in a pattern corresponding to the first pad electrode 321.

The first pad electrode 321 is formed in a region directly below the first external terminal 316. The first pad electrode 321 faces the first external terminal 316 in a normal direction of the first major surface 307 of the substrate 306. The first pad electrode 321 is formed in an oblong shape extending along a short direction of the substrate 306 in the plan view.

The first pad electrode 321 has a laminated structure including a first pad electrode layer 327 and a second pad electrode layer 328 laminated in that order from the substrate 306 side. The first pad electrode layer 327 of the first pad electrode 321 is formed in a film conforming to inner wall surfaces of the first pad trench 326.

The first pad electrode layer 327 of the first pad electrode 321 defines a recessed space in an interior of the first pad trench 326. The second pad electrode layer 328 of the first pad electrode 321 is embedded in the recessed space defined in the interior of the first pad trench 326.

The first pad electrode layer 327 of the first pad electrode 321 may include a titanium seed layer and a copper seed layer. The second pad electrode layer 328 of the first pad electrode 321 may include a plating layer having copper as the main component. The second pad electrode layer 328 of the first pad electrode 321 may include a tungsten layer that is excellent in embedding property in place of the plating layer having copper as the main component.

The plating layer having copper as the main component refers to a metal with which a mass ratio (% by mass) of copper constituting the second pad electrode layer 328 of the first pad electrode 321 is highest with respect to other components. The plating layer having copper as the main component may include at least one type among pure copper, an aluminum-copper alloy, or an aluminum-silicon-copper alloy.

Referring to FIG. 30 to FIG. 32, the second pad electrode 322 is embedded at the other end portion side of the first major surface 307 of the substrate 306 across an interval from the first pad electrode 321. More specifically, in the first major surface 307 of the substrate 306, the second pad electrode 322 is embedded in a second pad trench 329 formed in a pattern corresponding to the second pad electrode 322.

The second pad electrode 322 is formed in a region directly below the second external terminal 317. The second pad electrode 322 faces the second external terminal 317 in the normal direction of the first major surface 307 of the substrate 306. The second pad electrode 322 is formed in an oblong shape extending along the short direction of the substrate 306 in the plan view.

The second pad electrode 322 faces the first pad electrode 321 along a long direction of the substrate 306. In the following, a direction in which the first pad electrode 321 and the second pad electrode 322 face each other shall be referred to simply as the "facing direction XX." Also, a direction orthogonal to the facing direction XX and orthogonal to the normal direction of the first major surface 307 of the substrate 306 shall be referred to simply as the "orthogonal direction YY."

The second pad electrode 322 has a laminated structure including a first pad electrode layer 330 and a second pad electrode layer 331 laminated in that order from the substrate 306 side. The first pad electrode layer 330 of the second pad electrode 322 is formed in a film conforming to inner wall surfaces of the second pad trench 329.

The first pad electrode layer 330 of the second pad electrode 322 defines a recessed space in an interior of the second pad trench 329. The second pad electrode layer 331 of the second pad electrode 322 is embedded in the recessed space defined in the interior of the second pad trench 329.

The first pad electrode layer 330 of the second pad electrode 322 may be formed of the same material type as the first pad electrode layer 327 of the first pad electrode 321. A thickness of the first pad electrode layer 330 of the second pad electrode 322 may be substantially equal to the thickness of the first pad electrode layer 327 of the first pad electrode 321.

The second pad electrode layer 331 of the second pad electrode 322 may be formed of the same material type as the second pad electrode layer 328 of the first pad electrode 321. A thickness of the second pad electrode layer 331 of the second pad electrode 322 may be substantially equal to the thickness of the second pad electrode layer 328 of the first pad electrode 321.

Referring to FIG. 30 and FIG. 31, the first capacitor electrodes 323 are embedded in a region between the first pad electrode 321 and the second pad electrode 322 in the plan view. More specifically, in the first major surface 307 of the substrate 306, the first capacitor electrodes 323 are embedded in first capacitor trenches 332 formed in a pattern corresponding to the first capacitor electrodes 323.

Each first capacitor electrode 323 is formed in a band shape extending in the facing direction XX. In the present embodiment, the first capacitor electrode 323 is formed in a rectangular shape extending in a thickness direction of the substrate 306. The first capacitor electrode 323 is embedded as a wall extending along the facing direction XX.

The first capacitor electrode 323 has one end portion positioned at the first pad electrode 321 side and another end portion positioned at the second pad electrode 322 side. The one end portion of the first capacitor electrode 323 is connected to the first pad electrode 321. The other end portion of the first capacitor electrode 323 is formed at a position across an interval to the first pad electrode 321 side from the second pad electrode 322.

The first capacitor electrodes 323 are thereby lead out from the first pad electrode 321. Also, the first capacitor electrodes 323 are insulated from the second pad electrode 322.

In the present embodiment, the plurality of first capacitor electrodes 323 are formed across intervals along the orthogonal direction YY. The plurality of first capacitor electrodes 323 are thereby formed in stripes extending along the facing direction XX.

Each first capacitor electrode 323 has a laminated structure including a first capacitor electrode layer 333 and a second capacitor electrode layer 334 laminated in that order from the substrate 306 side.

The first capacitor electrode layer 333 of the first capacitor electrode 323 is formed in a film conforming to inner wall surfaces of a first capacitor trench 332. The first capacitor electrode layer 333 of the first capacitor electrode 323 defines a recessed space in an interior of the first capacitor trench 332. The first capacitor electrode layer 333 is formed integral to the first pad electrode layer 327 of the first pad electrode 321.

A thickness of the first capacitor electrode layer 333 may be substantially equal to the thickness of the first pad electrode layer 327 of the first pad electrode 321. The first capacitor electrode layer 333 may be formed of the same material type as the first pad electrode layer 327 of the first pad electrode 321.

The second capacitor electrode layer 334 of the first capacitor electrode 323 is embedded in the recessed space defined in the interior of the first capacitor trench 332. The second capacitor electrode layer 334 is formed integral to the second pad electrode layer 328 of the first pad electrode 321.

A thickness of the second capacitor electrode layer 334 may be substantially equal to the thickness of the second pad electrode layer 328 of the first pad electrode 321. The second capacitor electrode layer 334 may be formed of the same material type as the second pad electrode layer 328 of the first pad electrode 321.

Referring to FIG. 30 and FIG. 32, the second capacitor electrodes 324 are embedded in a region between the first pad electrode 321 and the second pad electrode 322 in the plan view. More specifically, in the first major surface 307 of the substrate 306, the second capacitor electrodes 324 are embedded in second capacitor trenches 335 formed in a pattern corresponding to the second capacitor electrodes 324.

Each second capacitor electrode 324 is formed in a band shape extending in the facing direction XX. In the present embodiment, the second capacitor electrode 324 is formed in a rectangular shape extending in the thickness direction of the substrate 306. The second capacitor electrode 324 is embedded as a wall extending along the facing direction XX.

The second capacitor electrodes 324 are formed across intervals in the orthogonal direction YY from the first capacitor electrodes 323. The second capacitor electrodes 324 face the first capacitor electrodes 323 along the orthogonal direction YY.

Each second capacitor electrode 324 has one end portion positioned at the second pad electrode 322 side and another end portion positioned at the first pad electrode 321 side. The one end portion of the second capacitor electrode 324 is connected to the second pad electrode 322. The other end portion of the second capacitor electrode 324 is formed at a position across an interval to the second pad electrode 322 side from the first pad electrode 321.

The second capacitor electrodes 324 are thereby lead out from the second pad electrode 322. Also, the second capacitor electrodes 324 are insulated from the first pad electrode 321.

In the present embodiment, the plurality of second capacitor electrodes 324 are formed across intervals along a direction orthogonal to the facing direction XX. The plurality of second capacitor electrodes 324 are thereby formed in stripes extending along the facing direction XX.

The plurality of first capacitor electrodes 323 and the plurality of second capacitor electrode 324 are formed alternately in the orthogonal direction YY. The plurality of first capacitor electrodes 323 and the plurality of second capacitor electrode 324 are formed as mutually engaging comb teeth in the plan view.

Each second capacitor electrode 324 has a laminated structure including a first electrode layer 336 and a second electrode layer 337 laminated in that order from the substrate 306 side. The first electrode layer 336 of the second capacitor electrode 324 is formed in a film conforming to inner wall surfaces of a second capacitor trench 335.

The first electrode layer 336 of the second capacitor electrode 324 defines a recessed space in an interior of the second capacitor trench 335. The first electrode layer 336 is formed integral to the first pad electrode layer 330 of the second pad electrode 322.

A thickness of the first electrode layer 336 may be substantially equal to the thickness of the first pad electrode layer 330 of the second pad electrode 322. The first electrode layer 336 may be formed of the same material type as the first pad electrode layer 330 of the second pad electrode 322.

The second electrode layer 337 of the second capacitor electrode 324 is embedded in the recessed space defined in the interior of the second capacitor trench 335. The second electrode layer 337 is formed integral to the second pad electrode layer 331 of the second pad electrode 322.

A thickness of the second electrode layer 337 may be substantially equal to the thickness of the second pad electrode layer 331 of the second pad electrode 322. The second electrode layer 337 may be formed of the same material type as the second pad electrode layer 331 of the second pad electrode 322.

Referring to FIG. 31 to FIG. 33, inner wall insulating films 338 of film form are formed on the inner wall surfaces of the first pad trench 326, the inner wall surfaces of the second pad trench 329, the inner wall surfaces of the first capacitor trenches 332, and the inner wall surfaces of the second capacitor trenches 335. The inner wall insulating films 338 are formed integral to the surface insulating film 310 covering the first major surface 307 of the substrate 306.

The first pad electrode 321 is embedded in the first pad trench 326 via the inner wall insulating films 338. The second pad electrode 322 is embedded in the second pad trench 329 via the inner wall insulating films 338.

The first capacitor electrodes 323 are embedded in the first capacitor trenches 332 via the inner wall insulating films 338. The second capacitor electrodes 324 are embedded in the second capacitor trenches 335 via the inner wall insulating films 338.

In the present embodiment, the inner wall insulating films 338 include oxide films formed by applying an oxidation treatment (for example, a thermal oxidation treatment) to the substrate 306. Referring to FIG. 33, in the present embodiment, regions of the substrate 306 between the first capacitor electrodes 323 and the second capacitor electrodes 324 are completely insulated (oxidized).

That is, the inner wall insulating films 338 at the first capacitor trench 332 sides and the inner wall insulating films 338 at the second capacitor trench 335 sides overlap mutually in regions of the substrate 306 between the first capacitor trenches 332 and the second capacitor trenches 335.

The dielectric body 325 is thereby formed by the inner wall insulating films 338 formed in the regions between the first capacitor electrodes 323 and the second capacitor electrodes 324. Also, the first capacitor electrodes 323 and the second capacitor electrodes 324 face each other across only the dielectric body 325.

A single capacitor element is formed by a first capacitor electrode 323 and a second capacitor electrode 324 facing each other across the dielectric body 325. A capacitance value of the chip capacitor 301 can be set to any value by adjusting a facing area of a first capacitor electrode 323 and a second capacitor electrode 324 and/or adjusting the number of capacitor elements.

Referring to FIG. 31 and FIG. 32, a first pad opening 341 and a second pad opening 342 are formed in the insulating layer 311.

The first pad opening 341 in the present embodiment exposes a portion of the first pad electrode 321. The first pad opening 341 may expose substantially an entirety of the first pad electrode 321 instead.

An opening end of the first pad opening 341 in the present embodiment is formed in a convexly curved shape directed into the first pad opening 341. The opening end of the first pad opening 341 is a portion connecting the first major surface 312 of the insulating layer 311 and inner walls of the first pad opening 341.

The second pad opening 342 in the present embodiment exposes a portion of the second pad electrode 322. The second pad opening 342 may expose substantially an entirety of the second pad electrode 322 instead.

An opening end of the second pad opening 342 in the present embodiment is formed in a convexly curved shape directed into the second pad opening 342. The opening end of the second pad opening 342 is a portion connecting the first major surface 312 of the insulating layer 311 and inner walls of the second pad opening 342.

The first external terminal 316 is formed inside the first pad opening 341. The first external terminal 316 enters into the first pad opening 341 from the first major surface 312 of the insulating layer 311. The first external terminal 316 includes a connecting portion **316*a* that is directly connected to the first pad electrode 321 inside the first pad opening 341**.

The first external terminal 316 has a laminated structure including a first electrode layer 343, a second electrode layer 344, and a third electrode layer 345 that are laminated in that order from the first major surface 307 side of the substrate 306.

The first electrode layer 343 of the first external terminal 316 may include a titanium seed layer and a copper seed layer that are laminated in that order from the first major surface 307 side of the substrate 306. The second electrode layer 344 of the first external terminal 316 may include a copper plating layer. A main body of the first external terminal 316 is formed by the second electrode layer 344.

The third electrode layer 345 of the first external terminal 316 may have a laminated structure including a nickel layer 346, a palladium layer 347, and a gold layer 348 that are laminated in that order from the second electrode layer 344 side of the first external terminal 316. The first external terminal 316 not having the third electrode layer 345 may be adopted instead.

The second external terminal 317 is formed inside the second pad opening 342. The second external terminal 317 enters into the second pad opening 342 from the first major surface 312 of the insulating layer 311. The second external terminal 317 includes a connecting portion **317*a* that is directly connected to the second pad electrode 322 inside the second pad opening 342**.

The second external terminal 317 has a laminated structure including a first electrode layer 349, a second electrode layer 350, and a third electrode layer 351 that are laminated in that order from the first major surface 307 side of the substrate 306.

The first electrode layer 349 of the second external terminal 317 may include a titanium seed layer and a copper seed layer that are laminated in that order from the first major surface 307 side of the substrate 306. The second electrode layer 350 of the second external terminal 317 may include a copper plating layer. A main body of the second external terminal 317 is formed by the second electrode layer 350.

The third electrode layer 351 of the second external terminal 317 may have a laminated structure including a nickel layer 352, a palladium layer 353, and a gold layer 354 that are laminated in that order from the second electrode layer 350 side of the second external terminal 317. The second external terminal 317 not having the third electrode layer 351 may be adopted instead.

Figure 34:
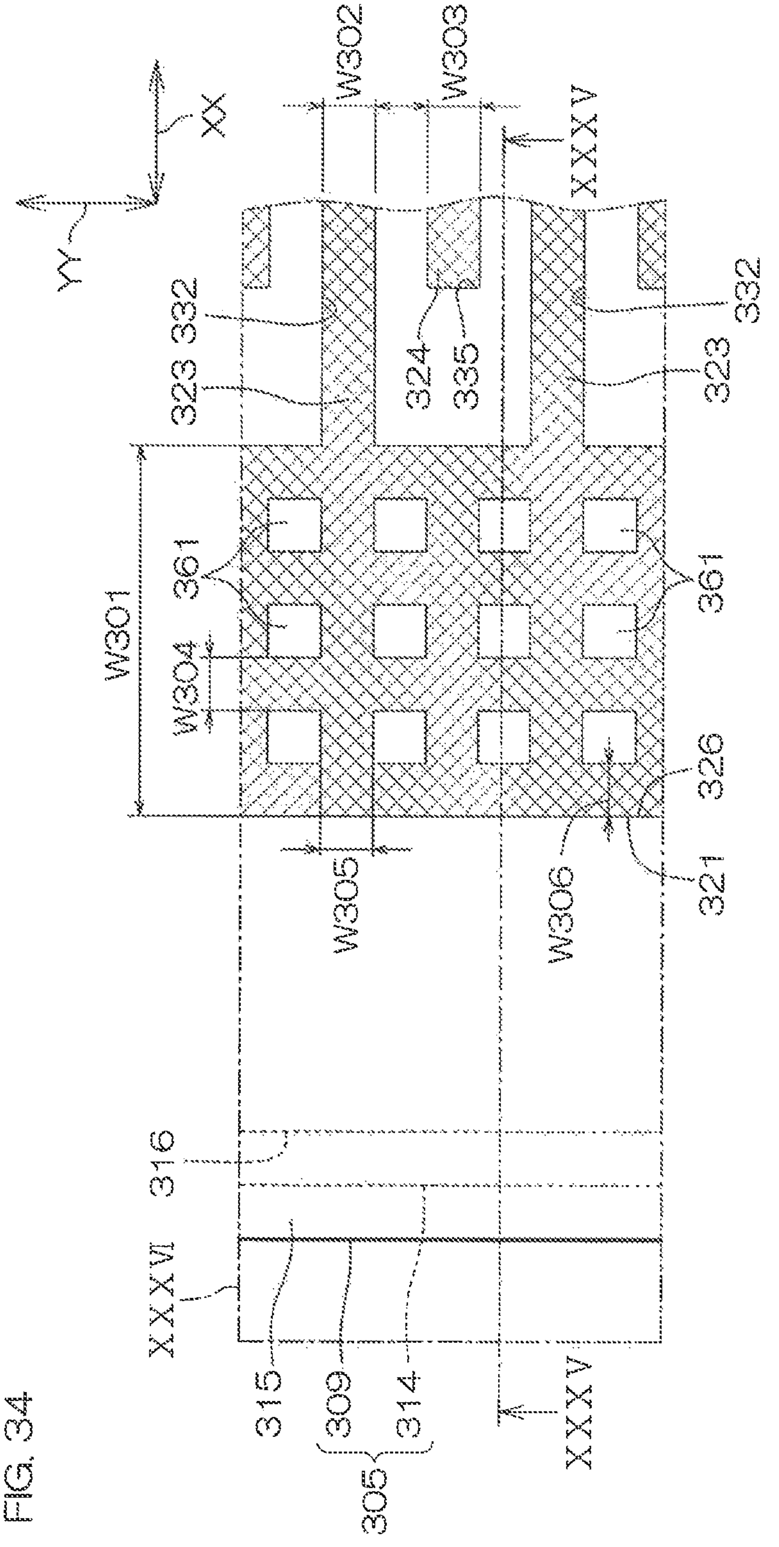
FIG. 34 is an enlarged view of region XXXIV in FIG. 30.
Figure 35:
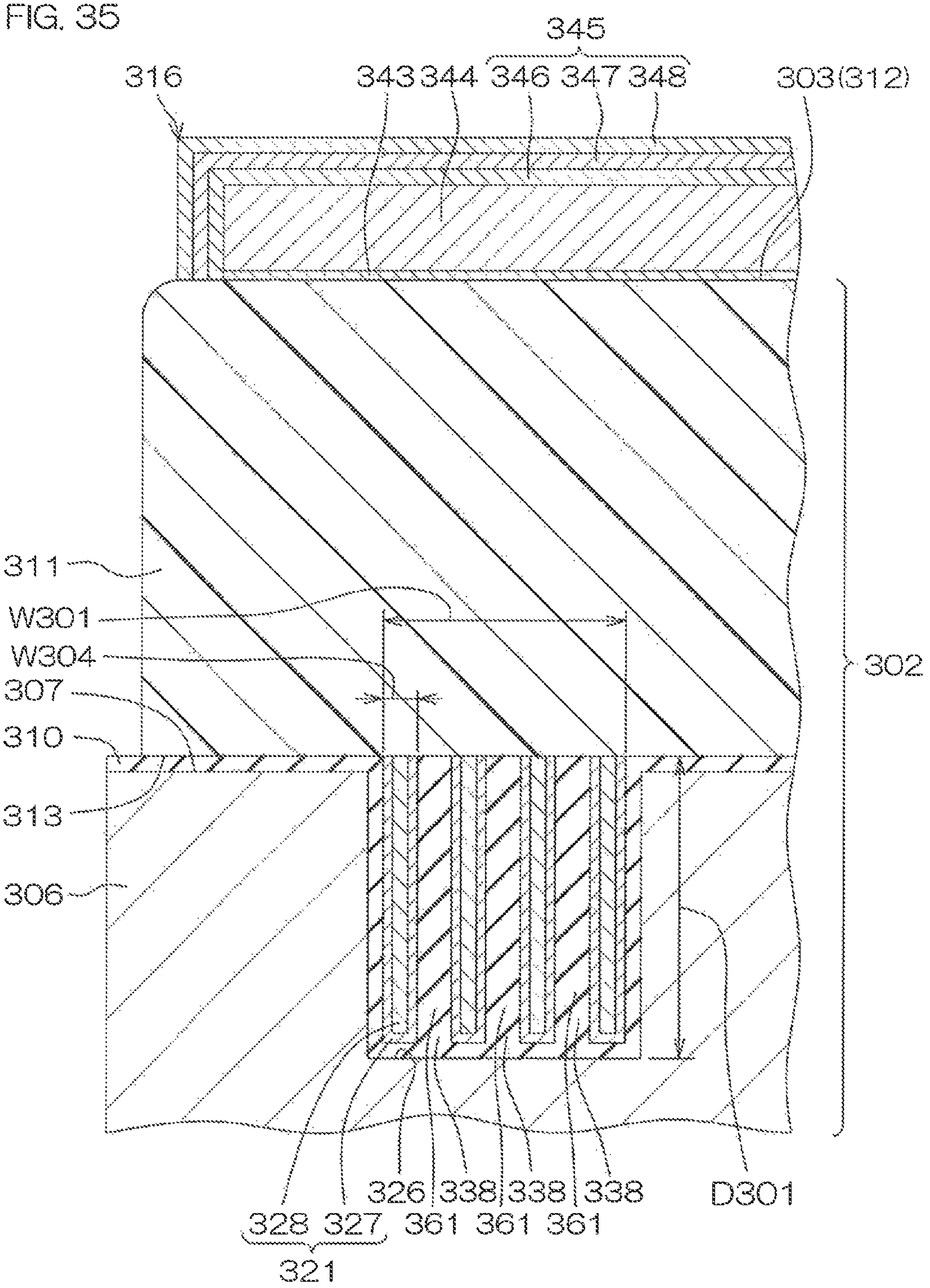
FIG. 35 is a sectional view taken along line XXXV-XXXV of FIG. 34.

Next, structures of the first pad trench 326 and the second pad trench 329 shall be described specifically with reference to FIG. 34 and FIG. 35 in addition to FIG. 30. FIG. 34 is an enlarged view of region XXXIV in FIG. 30. FIG. 35 is a sectional view taken along line XXXV-XXXV of FIG. 34. In FIG. 34, cross hatching is applied to the first pad electrode 321, the first capacitor electrodes 323, and the second capacitor electrodes 324 for the sake of clarity.

The second pad trench 329 has the same structure as the first pad trench 326. Here, only the structure at the first pad trench 326 side shall be described. In regard to the structure at the second pad trench 329 side, portions corresponding to the structure at the first pad trench 326 side shall be provided with the same reference symbols in FIG. 30 and description thereof shall be omitted.

Referring to FIG. 34, columnar portions 361 are formed in the first pad trench 326. In the present embodiment, the plurality of columnar portions 361 are formed in the first pad trench 326. The plurality of columnar portions 361 are formed in a matrix across intervals in the facing direction XX and the orthogonal direction YY in the plan view.

The plurality of columnar portions 361 may be formed across intervals in a region inward from side walls of the first pad trench 326. At least one of the plurality of columnar portions 361 may be formed integral to a side wall of the first pad trench 326. Also, at least two of the plurality of columnar portions 361 may be formed integral to each other.

In the present embodiment, each columnar portion 361 is formed in a quadratic prism shape. Each columnar portion 361 may be formed instead to a triangular prism shape, a hexagonal prism shape, or other polygonal prism shape besides a quadratic prism shape. Also, each columnar portion 361 may be formed instead to a circular columnar shape or an elliptical columnar shape.

Referring to FIG. 35, each columnar portion 361 is made of a portion of the substrate 306. Each columnar portion 361 is erected from a bottom wall of the first pad trench 326 toward a trench opening. Wall surfaces of each columnar portion 361 are covered by the inner wall insulating film 338 described above. An entirety of each columnar portion 361 may be insulated (oxidized) by the inner wall insulating film 338.

In the present embodiment, the first pad trench 326, the first capacitor trenches 332, and the second capacitor trenches 335 have a substantially equal depth D301. The first pad trench 326 has a width W301 along the facing direction XX. The first capacitor trenches 332 have a width W302 along the orthogonal direction YY. The second capacitor trenches 335 have a width W303 along the orthogonal direction YY.

A pair of columnar portions 361 that are mutually adjacent along the facing direction XX are formed across an interval of only a width W304 along the facing direction XX. A pair of columnar portions 361 that are mutually adjacent along the orthogonal direction YY are formed across an interval of only a width W305 along the orthogonal direction YY. Also, each columnar portion 361 is formed across an interval of only a width W306 from an inner wall of the first pad trench 326.

An aspect ratio D301/W301 of the first pad trench 326 is smaller than an aspect ratio D301/W302 of each first capacitor trench 332 (ratio D301/W301<ratio D301/W302).

The aspect ratio D301/W301 of the first pad trench 326 is smaller than an aspect ratio D301/W303 of each second capacitor trench 335 (ratio D301/W301<ratio D301/W303).

The aspect ratio D301/W301 of the first pad trench 326 is smaller than an aspect ratio D301/W304 of each portion between a pair of columnar portions 361 that are mutually adjacent along the facing direction XX (ratio D301/W301<ratio D301/W304).

The aspect ratio D301/W301 of the first pad trench 326 is smaller than an aspect ratio D301/W305 of each portion between a pair of columnar portions 361 that are mutually adjacent along the orthogonal direction YY (ratio D301/W301<ratio D301/W305).

The aspect ratio D301/W301 of the first pad trench 326 is smaller than an aspect ratio D301/W306 of each portion between an inner wall of the first pad trench 326 and each columnar portion 361 (ratio D301/W301<ratio D301/W306).

The aspect ratio D301/W304 of each portion between a pair of columnar portions 361 that are mutually adjacent along the facing direction XX is preferably substantially equal to the aspect ratio D301/W302 of each first capacitor trench 332 (ratio D301/W304≈ratio D301/W302 or ratio D301/W304=ratio D301/W302).

The aspect ratio D301/W304 of each portion between a pair of columnar portions 361 that are mutually adjacent along the facing direction XX is preferably substantially equal to the aspect ratio D301/W303 of each second capacitor trench 335 (ratio D301/W304≈ratio D301/W303 or ratio D301/W304=ratio D301/W303).

The aspect ratio D301/W305 of each portion between a pair of columnar portions 361 that are mutually adjacent along the orthogonal direction YY is preferably substantially equal to the aspect ratio D301/W302 of each first capacitor trench 332 (ratio D301/W305≈ratio D301/W302 or ratio D301/W305=ratio D301/W302).

The aspect ratio D301/W305 of each portion between a pair of columnar portions 361 that are mutually adjacent along the orthogonal direction YY is preferably substantially equal to the aspect ratio D301/W303 of each second capacitor trench 335 (ratio D301/W305≈ratio D301/W303 or ratio D301/W305=ratio D301/W303).

The aspect ratio D301/W306 of each portion between an inner wall of the first pad trench 326 and each columnar portion 361 is preferably substantially equal to the aspect ratio D301/W302 of each first capacitor trench 332 (ratio D301/W306≈ratio D301/W302 or ratio D301/W306=ratio D301/W302).

The aspect ratio D301/W306 of each portion between an inner wall of the first pad trench 326 and each columnar portion 361 is preferably substantially equal to the aspect ratio D301/W303 of each second capacitor trench 335 (ratio D301/W306≈ratio D301/W303 or ratio D301/W306=ratio D301/W303).

The aspect ratio D301/W302 of each first capacitor trench 332 is preferably substantially equal to the aspect ratio D301/W303 of each second capacitor trench 335 (ratio D301/W302=ratio D301/W303 or ratio D301/W302=ratio D301/W303).

A case where the columnar portions 361 are not formed in the first pad trench 326 shall now be considered. In this case, the first pad electrode 321 must be embedded in the first pad trench 326 that is wider than each first capacitor trench 332.

If the first pad electrode 321 and the first capacitor electrodes 323 are embedded at the same time, while the first capacitor electrodes 323 fill the first capacitor trenches 332, a deficiency arises in the first pad electrode 321 at the first pad trench 326 side.

On the other hand, although the first pad trench 326 according to the present embodiment has the aspect ratio D301/W301, it is formed to be practically of the aspect ratio D301/W304 and the aspect ratio D301/W305 due to the plurality of columnar portions 361. The aspect ratio D301/W304 and the aspect ratio D301/W305 are both larger than the aspect ratio D301/W301.

Occurrence of deficiency or excess of a conductive material between the first pad electrode 321 and the first capacitor electrodes 323 can thereby be suppressed when the first pad electrode 321 and the first capacitor electrodes 323 are embedded at the same time.

Preferably, the aspect ratio D301/W302, the aspect ratio D301/W303, the aspect ratio D301/W304, and the aspect ratio D301/W305 are set to substantially equal values.

In this case, the first pad electrode 321 and the first capacitor electrodes 323 can be embedded in the first pad trench 326 and the first capacitor trenches 332 at substantially equal rates and proportions. The occurrence of deficiency or excess of the conductive material between the first pad electrode 321 and the first capacitor electrodes 323 can thus be suppressed reliably.

The plurality of columnar portions 361 are formed to adjust the aspect ratio D301/W301 of the first pad trench 326 to thereby improve the embedding property of the first pad electrode 321. Positions, sizes, and/or proportions occupied in the first pad trench 326 of the plurality of columnar portions 361 are changeable as appropriate.

Also, the aspect ratio D301/W301, the aspect ratio D301/W302, the aspect ratio D301/W303, the aspect ratio D301/W304, the aspect ratio D301/W305, and the aspect ratio D301/W306 are not constrained to the above relationships and conditions and may be set to arbitrary values.

As described above, with the chip capacitor 301 according to the present embodiment, the first capacitor electrodes 323, the second capacitor electrodes 324, and the dielectric body 325 are embedded in the first major surface 307 of the substrate 306. It is thereby made unnecessary to laminate the first capacitor electrodes 323, the second capacitor electrodes 324, and the dielectric body 325 along the normal direction of the first major surface 307 of the substrate 306.

Especially with the chip capacitor 301 according to the present embodiment, the first pad electrode 321 and the second pad electrode 322 are also embedded in the first major surface 307 of the substrate 306. Electrode layers to be formed on the first major surface 307 of the substrate 306 can thus be reduced.

The chip capacitor 301 can thereby be suppressed reliably from enlarging along the normal direction of the first major surface 307 of the substrate 306. The chip capacitor 301 that can be miniaturized can thus be provided.

FIG. 36A to FIG. 36M are sectional views for describing an example of a method for manufacturing the chip capacitor 301 of FIG. 29. Although in a process for manufacturing the chip capacitor 301, a plurality of the chip capacitors 301 are manufactured at the same time, only a region in which one chip capacitor 301 is formed and a region peripheral thereto are shown for convenience of explanation in FIG. 36A to FIG. 36M.

Figure 36A:
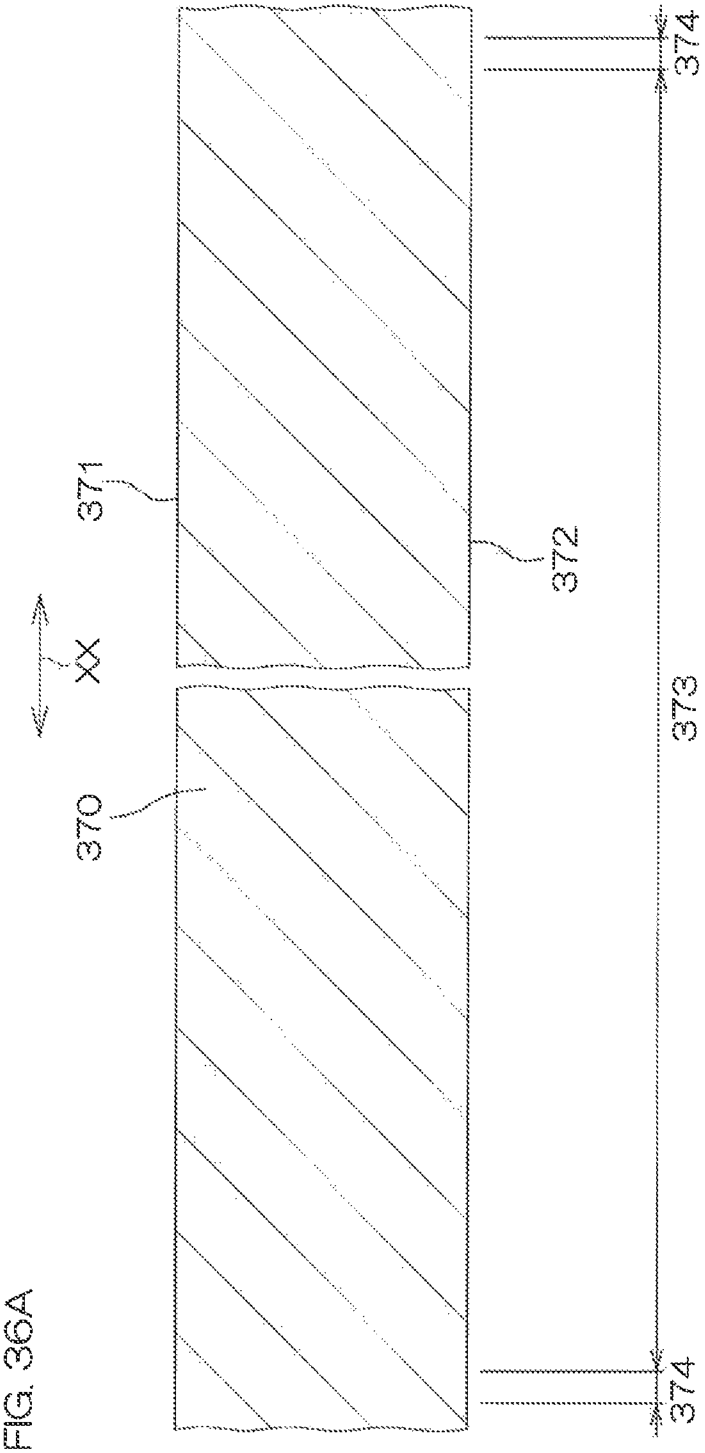
FIG. 36A to FIG. 36M are sectional views for describing an example of a method for manufacturing the chip capacitor of FIG. 29.

First, referring to FIG. 36A, a base substrate 370 is prepared. The base substrate 370 has a first major surface 371 and a second major surface 372. The first major surface 371 of the base substrate 370 corresponds to the first major surface 307 of the substrate 306. The second major surface 372 of the base substrate 370 corresponds to the second major surface 308 of the substrate 306.

A thickness of the base substrate 370 may be not less than 500 μm and not more than 1000 μm (for example, approximately 700 μm). In the base substrate 370, a plurality of chip formation regions 373, corresponding to the chip capacitors 301, and boundary regions 374, demarcating the plurality of chip formation regions 373, are set.

Figure 36B:
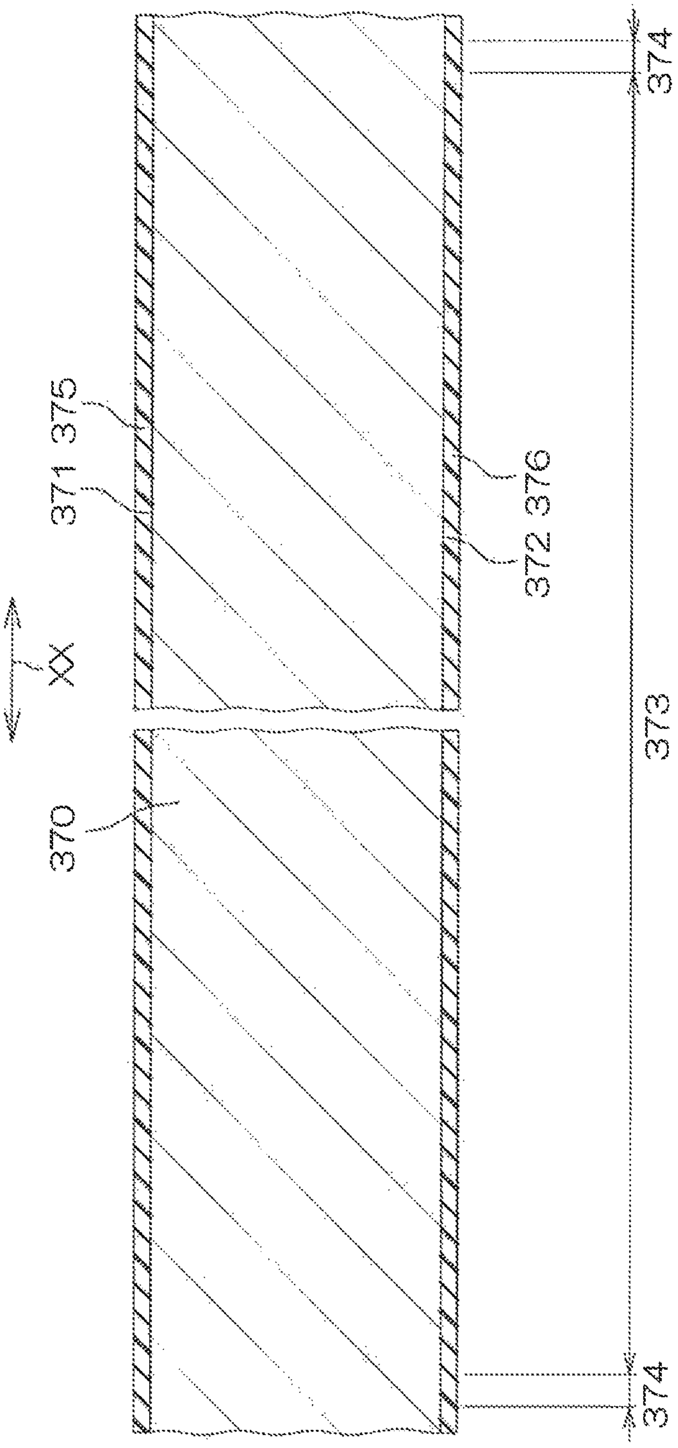

Next, referring to FIG. 36B, a first insulating film 375 covering the first major surface 371 of the base substrate 370 is formed. Also, a second insulating film 376 covering the second major surface 372 of the base substrate 370 is formed.

The first insulating film 375 and the second insulating film 376 may be silicon oxide films formed by applying an oxidation treatment (for example, the thermal oxidation treatment) to the base substrate 370. The first insulating film 375 and the second insulating film 376 may be silicon oxide films formed by a CVD (chemical vapor deposition) method.

The first insulating film 375 and the second insulating film 376 are formed to be of mutually equal thickness. Stress arising at the first major surface 371 side of the base substrate 370 and stress arising at the second major surface 372 side of the base substrate 370 in the step of forming the first insulating film 375 and the second insulating film 376 are thereby made substantially equal. Warping of the base substrate 370 can thus be suppressed.

Figure 36C:
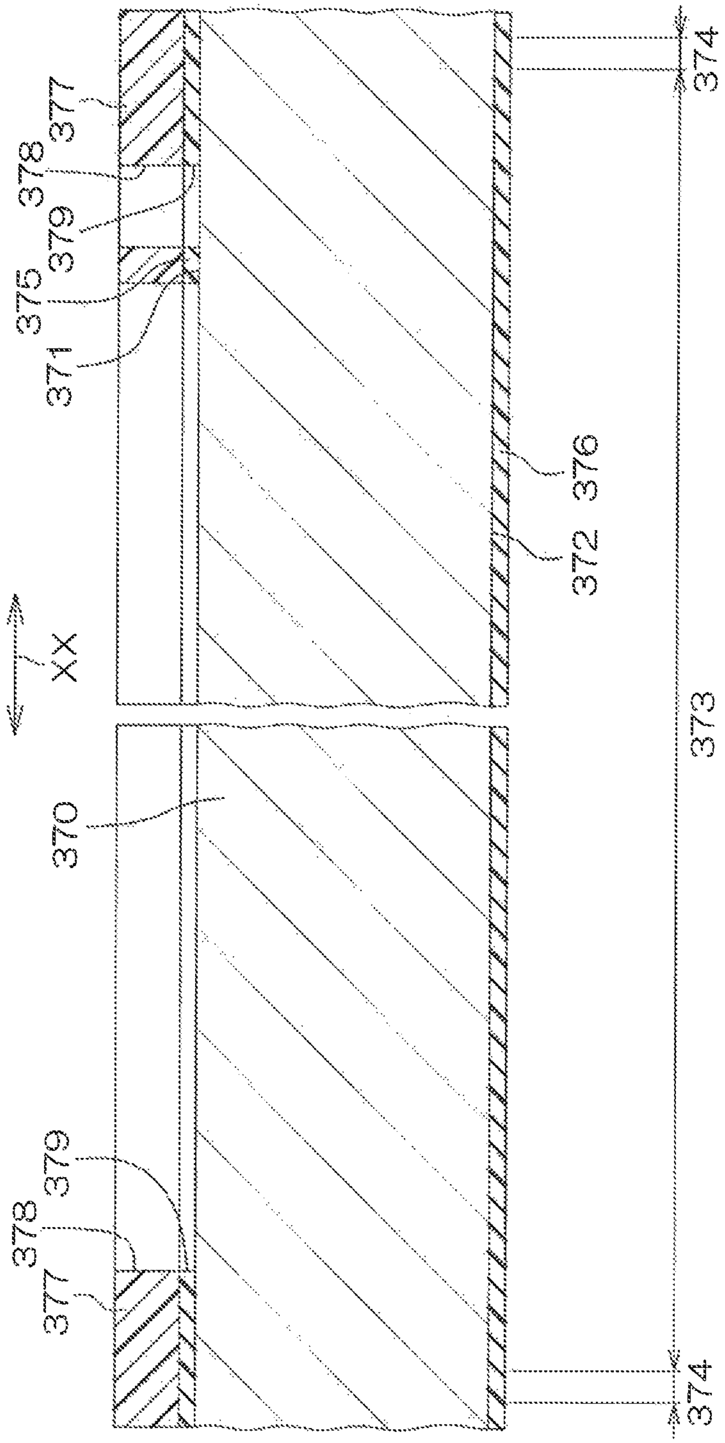

Next, referring to FIG. 36C, a mask 377 having a predetermined pattern is formed on the first insulating film 375. The mask 377 has openings 378 that expose regions in which the first pad trench 326, the second pad trench 329, the first capacitor trenches 332, and the second capacitor trenches 335 are to be formed.

Next, by an etching method via the mask 377, unnecessary portions of the first insulating film 375 are removed. The etching method may be an anisotropic etching (for example, a reactive ion etching) method. Openings 379 matching the openings 378 of the mask 377 are thereby formed in the first insulating film 375. Thereafter, the mask 377 is removed.

Figure 36D:
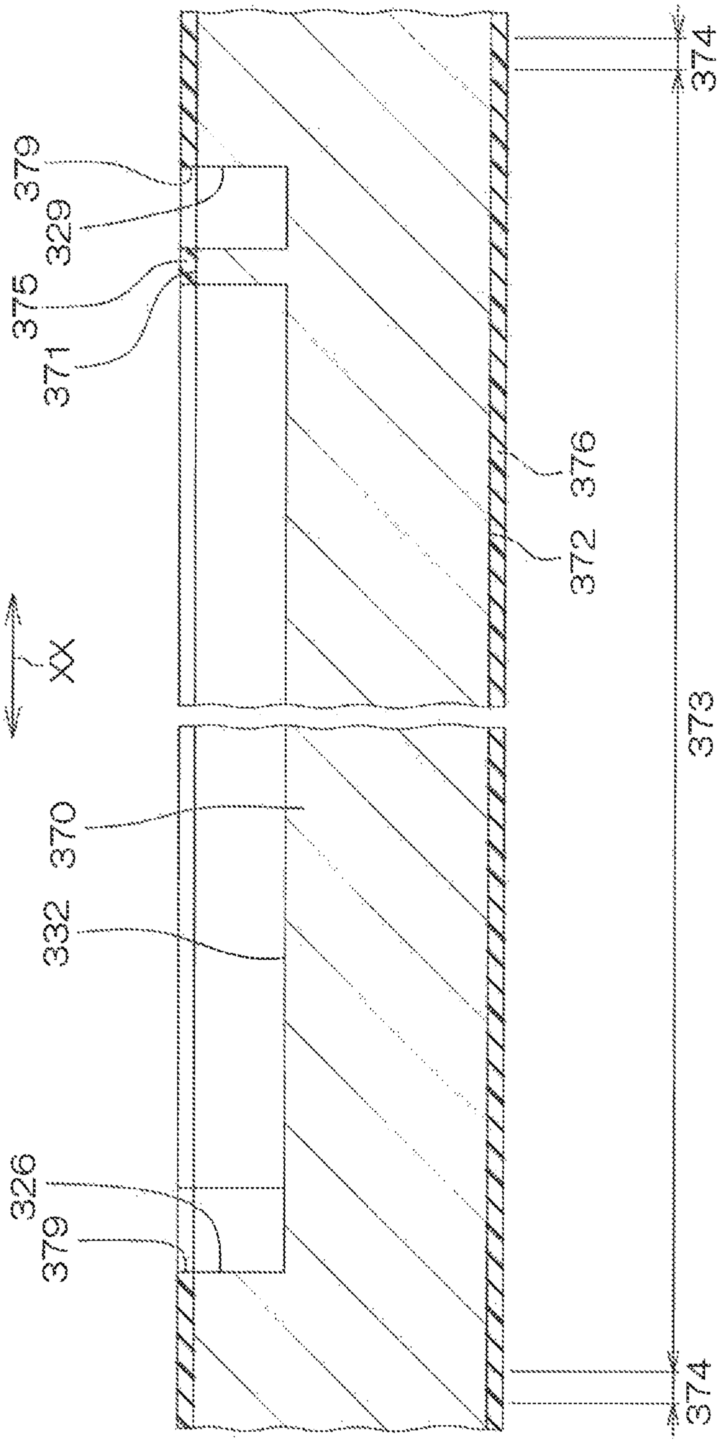

Next, referring to FIG. 36D, unnecessary portions of the base substrate 370 are removed by an etching method using the first insulating film 375 as a mask. The etching method may be an anisotropic etching (for example, the reactive ion etching) method.

The first pad trench 326, the second pad trench 329, the first capacitor trenches 332, and the second capacitor trenches 335 are thereby formed at the same time in the first major surface 371 of the base substrate 370.

The first pad trench 326, the second pad trench 329, the first capacitor trenches 332, and the second capacitor trenches 335 may instead be formed respectively through different processes. For example, the second pad trench 329 and the second capacitor trenches 335 may be formed at the same time after or before forming the first pad trench 326 and the first capacitor trenches 332 at the same time.

Figure 36E:
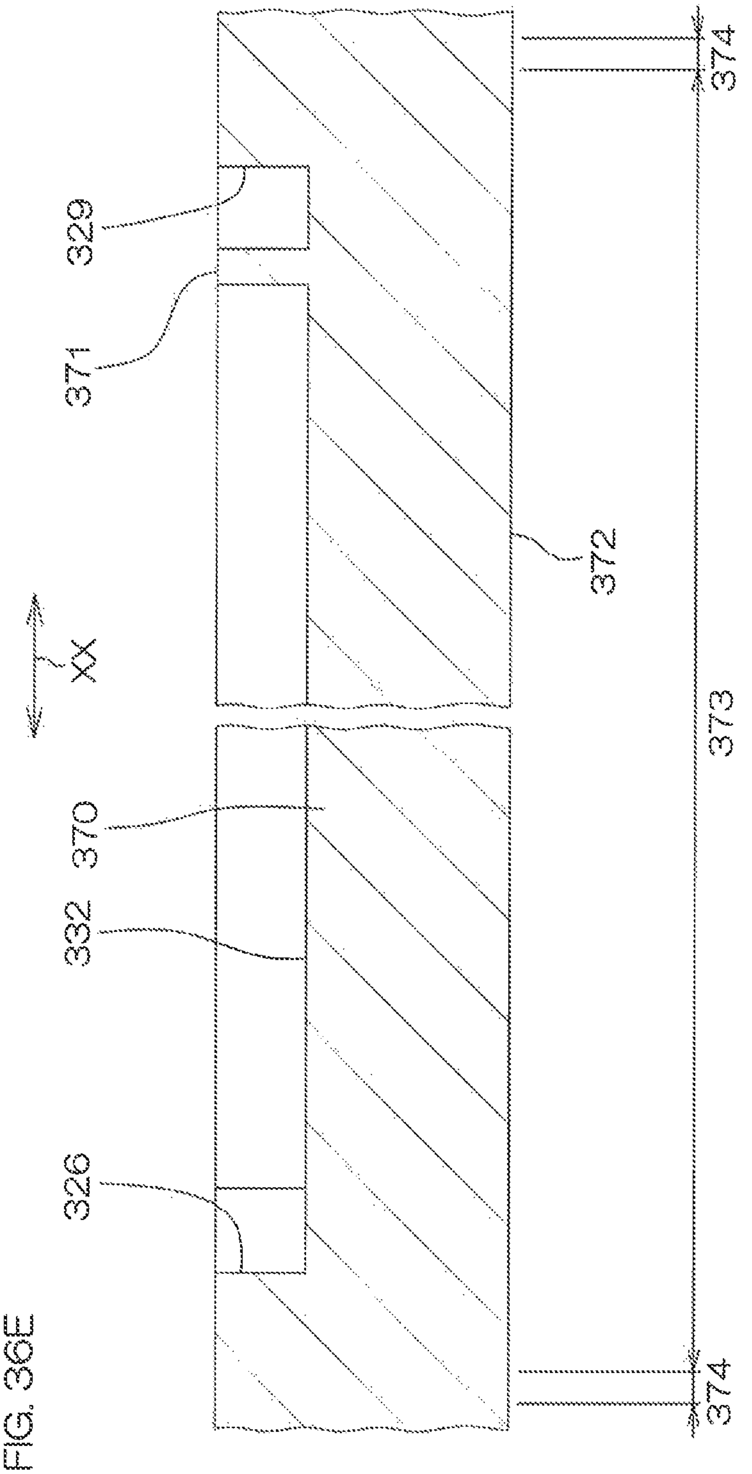

Next, referring to FIG. 36E, the first insulating film 375 and the second insulating film 376 are removed, for example, by an etching method. The etching method may be an isotropic etching (for example, a wet etching) method.

Figure 36F:
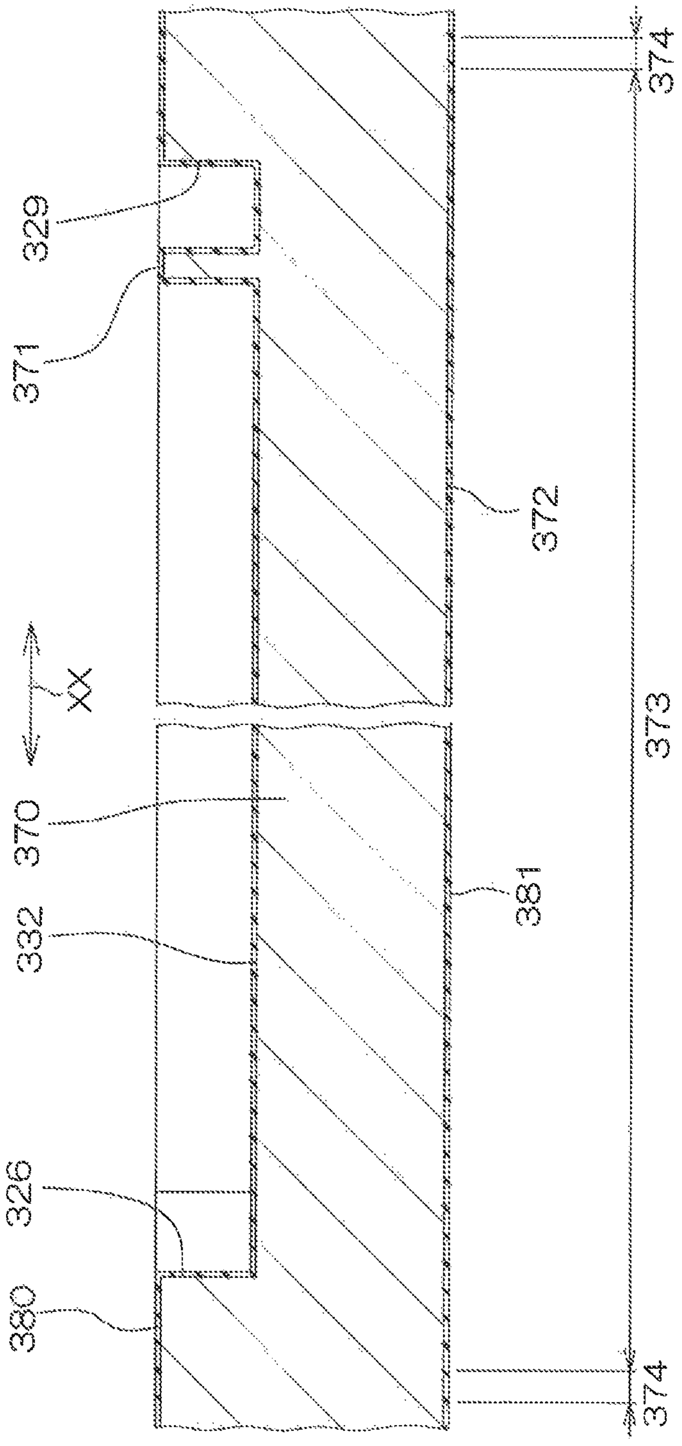

Next, referring to FIG. 36F, a first insulating film 380 is formed so as to cover the first major surface 371 of the base substrate 370. Also, a second insulating film 381 is formed on the second major surface 372 covering the base substrate 370.

The first insulating film 380 and the second insulating film 381 may be silicon oxide films formed by applying an oxidation treatment (for example, the thermal oxidation treatment) to the base substrate 370.

The first insulating film 380 and the second insulating film 381 are formed to be of mutually equal thickness. Stress arising at the first major surface 371 side of the base substrate 370 and stress arising at the second major surface 372 side of the base substrate 370 in the step of forming the first insulating film 380 and the second insulating film 381 are thereby made substantially equal. Warping of the base substrate 370 can thus be suppressed.

A portion of the first insulating film 380 covering the first major surface 371 of the base substrate 370 becomes the surface insulating film 310. Also, portions of the first insulating film 380 positioned at the interior of the first pad trench 326, the interior of the second pad trench 329, the interiors of the first capacitor trenches 332, and the interiors of the second capacitor trenches 335 become the inner wall insulating films 338.

In the present process, regions of the first major surface 371 of the base substrate 370 between the first capacitor trenches 332 and the second capacitor trenches 335 become completely insulated (oxidized). That is, the inner wall insulating films 338 at the first capacitor trench 332 sides and the inner wall insulating films 338 at the second capacitor trench 335 sides are made integral in the regions of the base substrate 370 between the first capacitor trenches 332 and the second capacitor trenches 335.

The dielectric body 325 is thereby formed in the regions between the first capacitor trenches 332 and the second capacitor trenches 335.

Figure 36G:
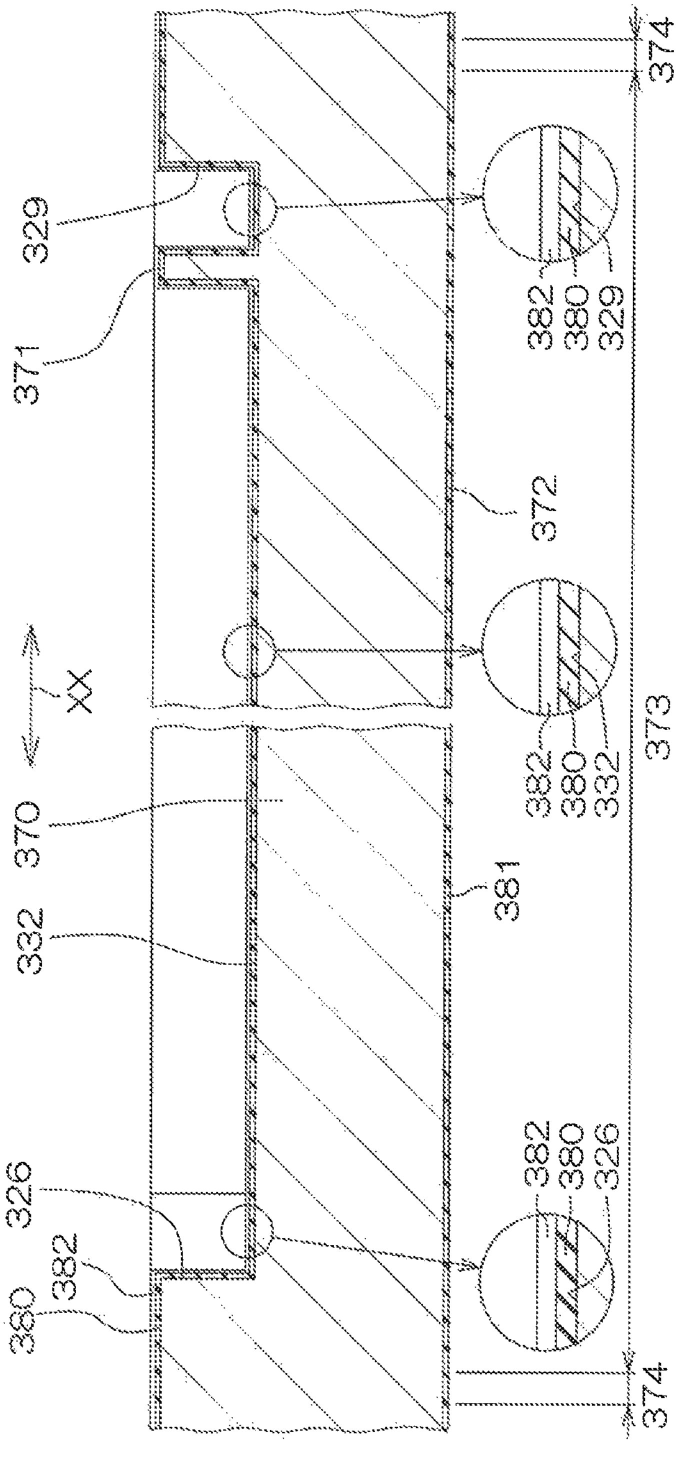

Next, referring to FIG. 36G, a first electrode layer 382 is formed on the first major surface 371 of the base substrate 370. The first electrode layer 382 is a layer that becomes a base of the first pad electrode layer 327 of the first pad electrode 321, the first pad electrode layer 330 of the second pad electrode 322, the first capacitor electrode layers 333 of the first capacitor electrodes 323, and the first electrode layers 336 of the second capacitor electrodes 324. A thickness of the first electrode layer 382 may, for example, be not less than 1000 Å and not more than 2000 Å.

The first electrode layer 382 is formed in a film conforming to the first major surface 371 of the base substrate 370, the inner walls of the first pad trench 326, the inner walls of the second pad trench 329, the inner walls of the first capacitor trenches 332, and the inner walls of the second capacitor trenches 335.

The first electrode layer 382 includes a titanium seed layer and a copper seed layer formed in that order from the first major surface 371 side of the base substrate 370. The titanium seed layer is formed, for example, by a sputtering method. The copper seed layer is formed, for example, by the sputtering method.

Figure 36H:
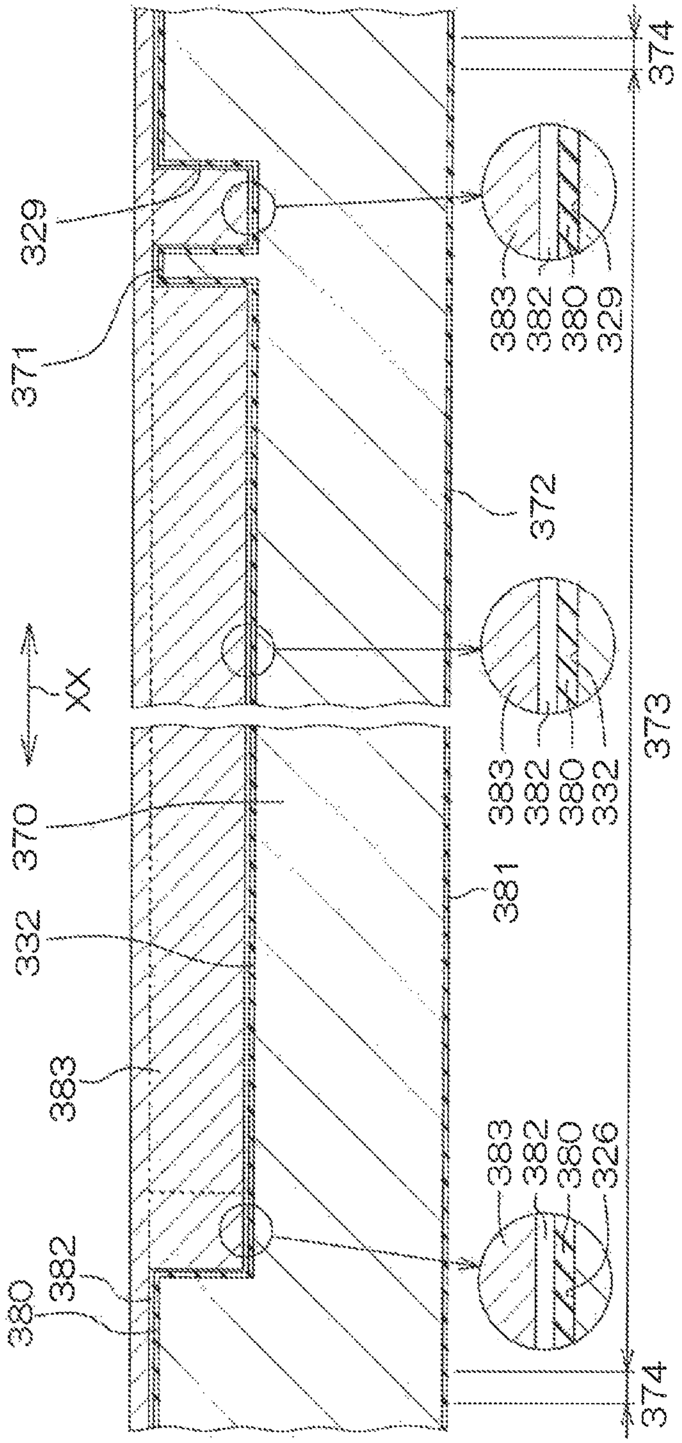

Next, referring to FIG. 36H, a second electrode layer 383 is formed. The second electrode layer 383 is a layer that becomes a base of the second pad electrode layer 328 of the first pad electrode 321, the second pad electrode layer 331 of the second pad electrode 322, the second capacitor electrode layers 334 of the first capacitor electrodes 323, and the second electrode layers 337 of the second capacitor electrodes 324. A thickness of the second electrode layer 383 may, for example, be not less than 10000 Å and not more than 20000 Å.

The second electrode layer 383 includes a copper plating layer. The copper plating layer is formed, for example, by an electroplating method. The second electrode layer 383 fills the first pad trench 326, the second pad trench 329, the first capacitor trenches 332, and the second capacitor trenches 335 and covers the first major surface 371 of the base substrate 370.

Figure 36I:
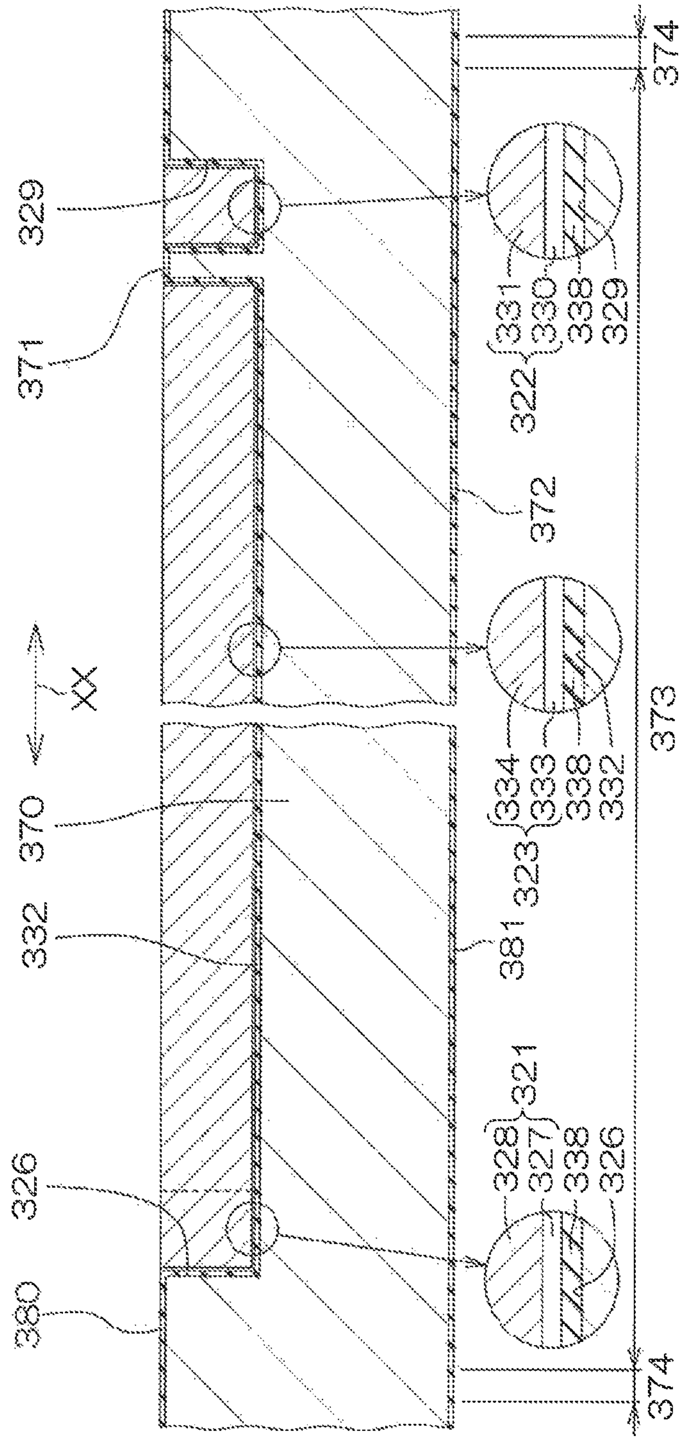

Next, referring to FIG. 36I, unnecessary portions of the first electrode layer 382 and unnecessary portions of the second electrode layer 383 are removed. The unnecessary portions of the first electrode layer 382 and the unnecessary portions of the second electrode layer 383 may be removed by an etching method.

The etching method may be an isotropic etching (for example, the wet etching) method. The first pad electrode 321, the second pad electrode 322, the first capacitor electrodes 323, and the second capacitor electrodes 324 are thereby formed at the same time.

The first pad electrode 321, the second pad electrode 322, the first capacitor electrodes 323, and the second capacitor electrodes 324 may instead be formed respectively through different processes. For example, the first capacitor electrodes 323 and the second capacitor electrodes 324 may be formed at the same time after or before forming the first pad electrode 321 and the second pad electrode 322 at the same time.

Figure 36J:
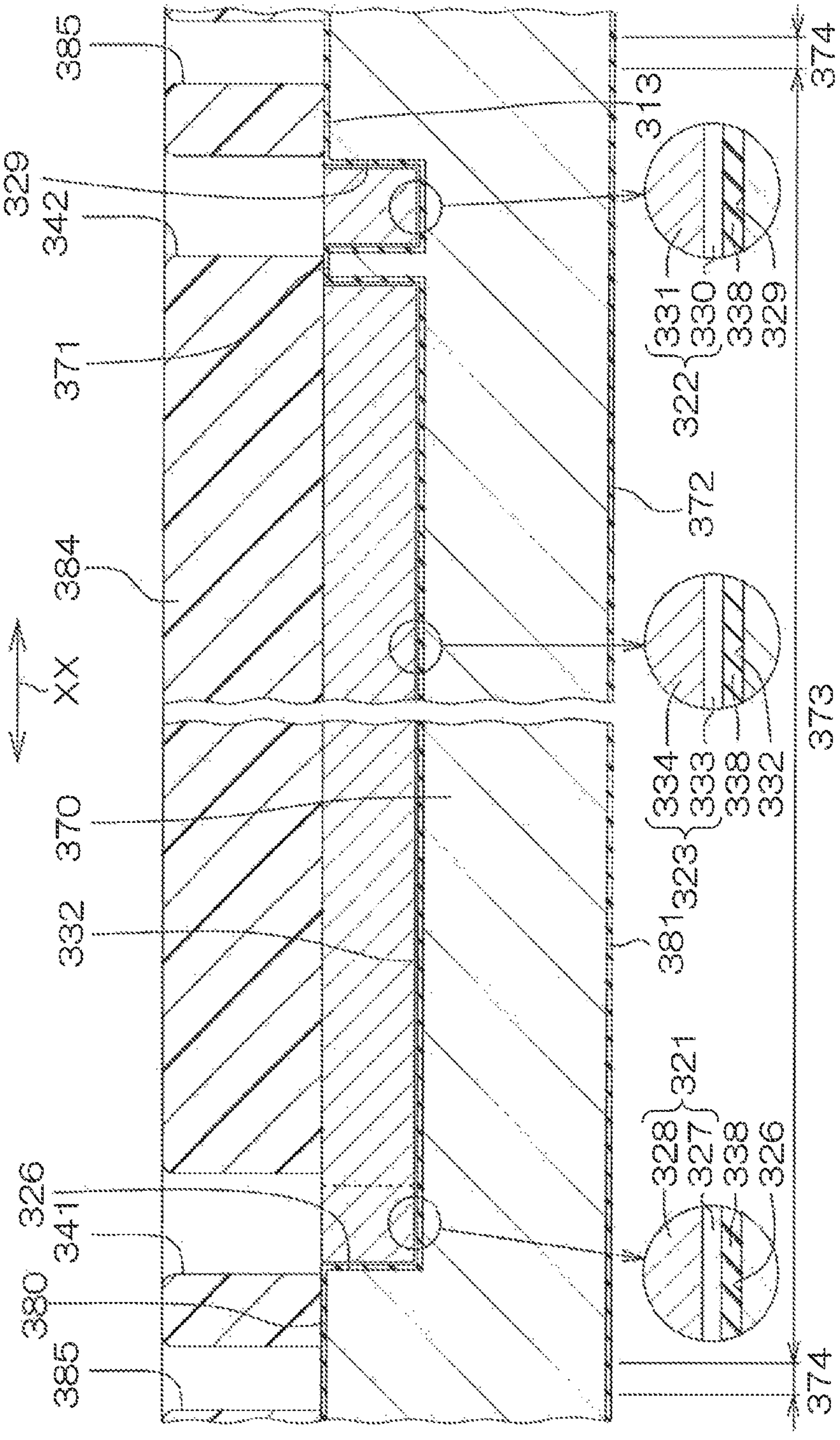

Next, referring to FIG. 36J, a photoresist layer 384 of film form that is to be the insulating layer 311 is adhered on the first major surface 371 of the base substrate 370. In the present embodiment, the photoresist layer 384 includes negative type epoxy resin. A thickness of the photoresist layer 384 is not less than 10 μm and not more than 200 μm (for example, 40 μm).

Next, regions of the photoresist layer 384 corresponding to the plurality of chip formation regions 373 are selectively exposed. More specifically, of the photoresist layer 384, regions outside the regions in which the first pad opening 341 and the second pad opening 342 are to be formed and regions outside the boundary regions 374 are selectively exposed.

Next, the photoresist layer 384 is developed through immersion in a developing solution. After development, a heat treatment for curing the photoresist layer 384 may be performed as necessary. The first pad opening 341, the second pad opening 342, and openings 385, exposing the boundary regions 374, are thereby formed in the photoresist layer 384. The insulating layer 311, made of the photoresist layer 384, is thereby formed.

Figure 36K:
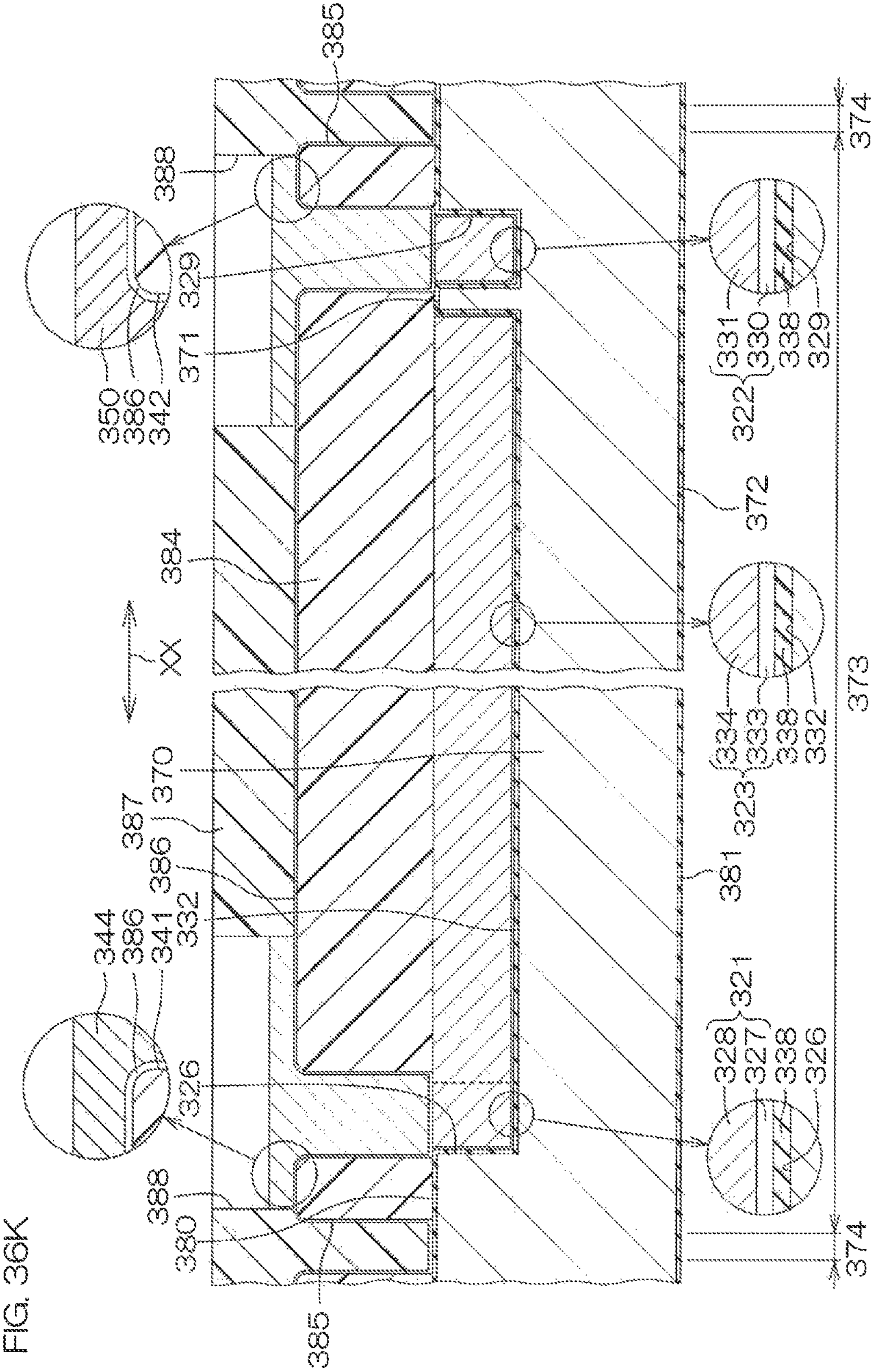

Next, referring to FIG. 36K, the first external terminal 316 and the second external terminal 317 are formed.

In the present process, first, a first electrode layer 386 is formed on the first major surface 312 of the insulating layer 311. The first electrode layer 386 becomes a base of the first electrode layer 343 of the first external terminal 316 and the first electrode layer 349 of the second external terminal 317.

The first electrode layer 386 includes a titanium seed layer and a copper seed layer formed in that order from the first major surface 312 side of the insulating layer 311. The titanium seed layer is formed, for example, by the sputtering method. The copper seed layer is formed, for example, by the sputtering method.

Next, a resist mask 387 having a predetermined pattern is formed on the first electrode layer 386. The resist mask 387 has openings 388 that selectively expose regions in which the first external terminal 316 and the second external terminal 317 are to be formed.

Next, the second electrode layer 344 of the first external terminal 316 and the second electrode layer 350 of the second external terminal 317 are formed on the first electrode layer 386 exposed from the openings 388 in the resist mask 387.

Each of the second electrode layer 344 of the first external terminal 316 and the second electrode layer 350 of the second external terminal 317 includes a copper plating layer. The copper plating layer is formed, for example, by the electroplating method. Thereafter, the resist mask 387 is removed.

Next, unnecessary portions of the first electrode layer 386 are removed by an etching method using the second electrode layer 344 of the first external terminal 316 and the second electrode layer 350 of the second external terminal 317 as masks. The first electrode layer 386 is thereby divided into the first electrode layer 343 of the first external terminal 316 and the first electrode layer 349 of the second external terminal 317.

Next, the third electrode layer 345 of the first external terminal 316 and the third electrode layer 351 of the second external terminal 317 are formed.

The third electrode layer 345 of the first external terminal 316 includes the nickel layer 346, the palladium layer 347, and the gold layer 348 that are laminated in that order from the second electrode layer 344 side of the first external terminal 316. The nickel layer 346, the palladium layer 347, and the gold layer 348 are respectively formed, for example, by the electroplating method.

The third electrode layer 351 of the second external terminal 317 includes the nickel layer 352, the palladium layer 353, and the gold layer 354 that are laminated in that order from the second electrode layer 350 side of the second external terminal 317. The nickel layer 352, the palladium layer 353, and the gold layer 354 are respectively formed, for example, by the electroplating method.

The first external terminal 316 and the second external terminal 317 are thus formed. The first external terminal 316 and the second external terminal 317 are formed at the same time through processes in common.

The first external terminal 316 and the second external terminal 317 may be formed through different processes. For example, the second external terminal 317 may be formed after or before forming the first external terminal 316.

Figure 36L:
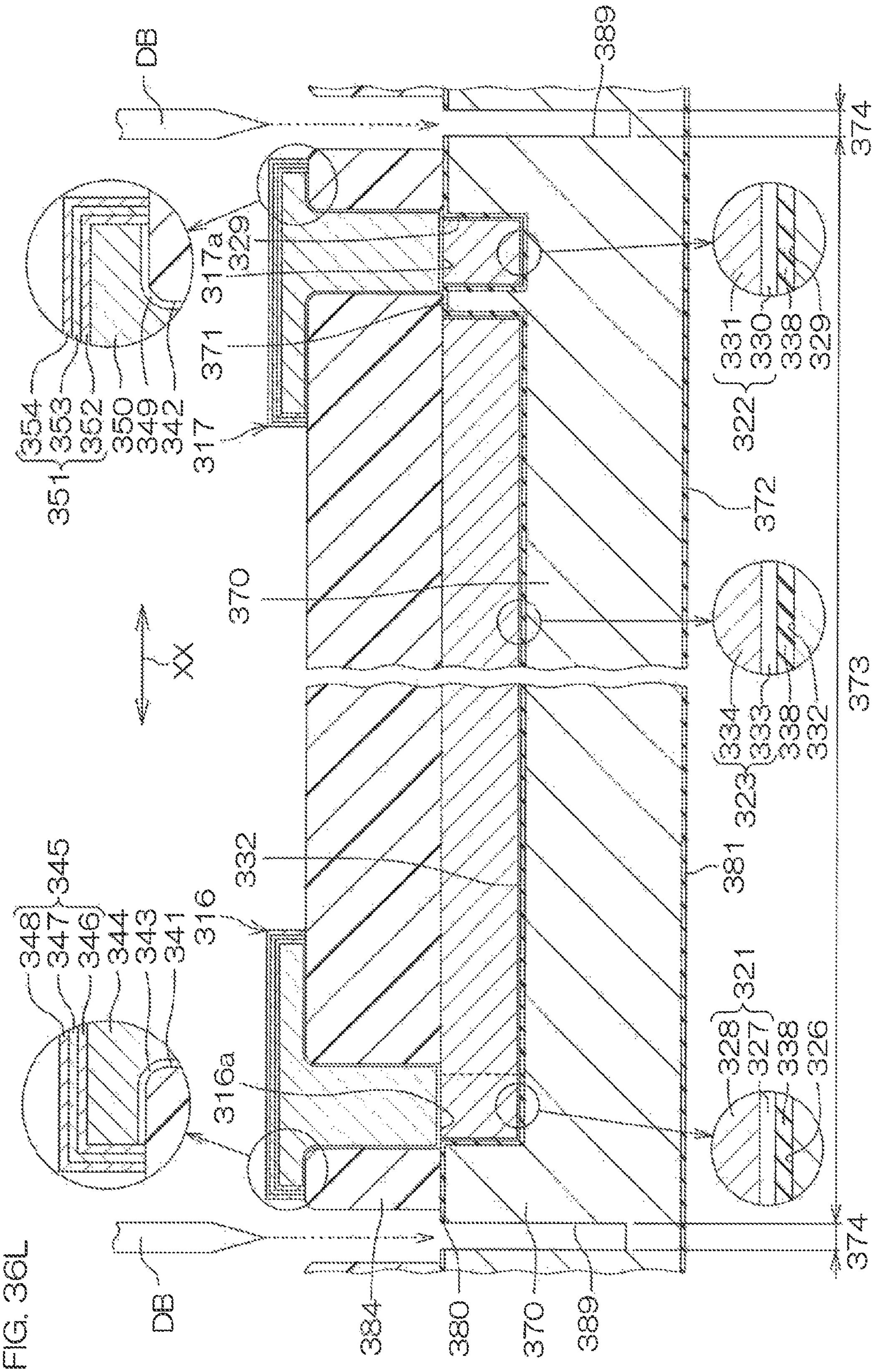

Next, referring to FIG. 36L, grooves 389 conforming to the boundary regions 374 are formed in the first major surface 371 of the base substrate 370. In the present embodiment, the grooves 389 are formed by half-dicing by dicing blades DB.

The dicing blades DB are made to proceed along the boundary regions 374 from the first major surface 371 side of the base substrate 370. The base substrate 370 is ground to an intermediate portion in the thickness direction by the dicing blades DB.

In the openings 385 that expose the boundary regions 374, the dicing blades DB are made to proceed to regions further inward than the side surfaces 314 of the insulating layer 311. The step portions 315 are thereby formed between the side surfaces 314 of the insulating layer 311 and inner wall surfaces of the grooves 389.

The grooves 389 may be formed by an etching method using the insulating layer 311 as a mask instead of by the dicing blades DB. In this case, the etching method may be an anisotropic etching (for example, the reactive ion etching) method. When the grooves 389 are formed by an etching method, the side surfaces 314 of the insulating layer 311 and the inner wall surfaces of the grooves 389 can be formed to be substantially flush.

Figure 36M:
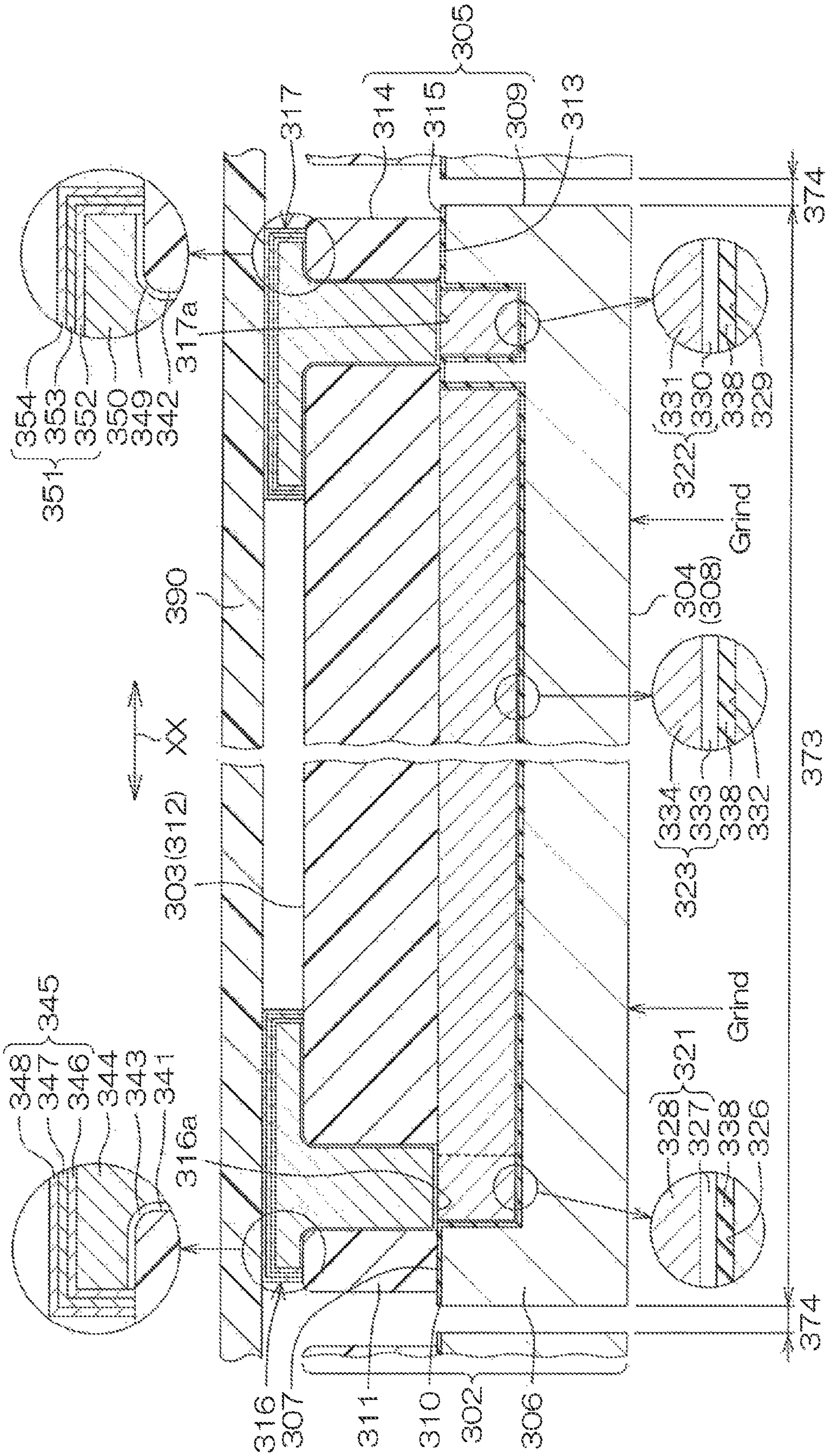

Next, referring to FIG. 36M, a supporting tape 390, arranged to support the base substrate 370, is attached to the first major surface 371 side of the base substrate 370. Next, the second major surface 372 of the base substrate 370 is ground, for example, by a CMP (chemical mechanical polishing) method.

The present grinding process is performed until the second major surface 372 of the base substrate 370 is put in communication with the grooves 389. A thickness of the base substrate 370 after the grinding process may be not less than 50 μm and not more than 150 μm (for example, approximately 100 μm). Thereafter, the supporting tape 390 is removed. The plurality of chip capacitors 301 are thereby cut out from the base substrate 370.

The chip capacitors 301 are manufactured through the above processes.

Figure 37:
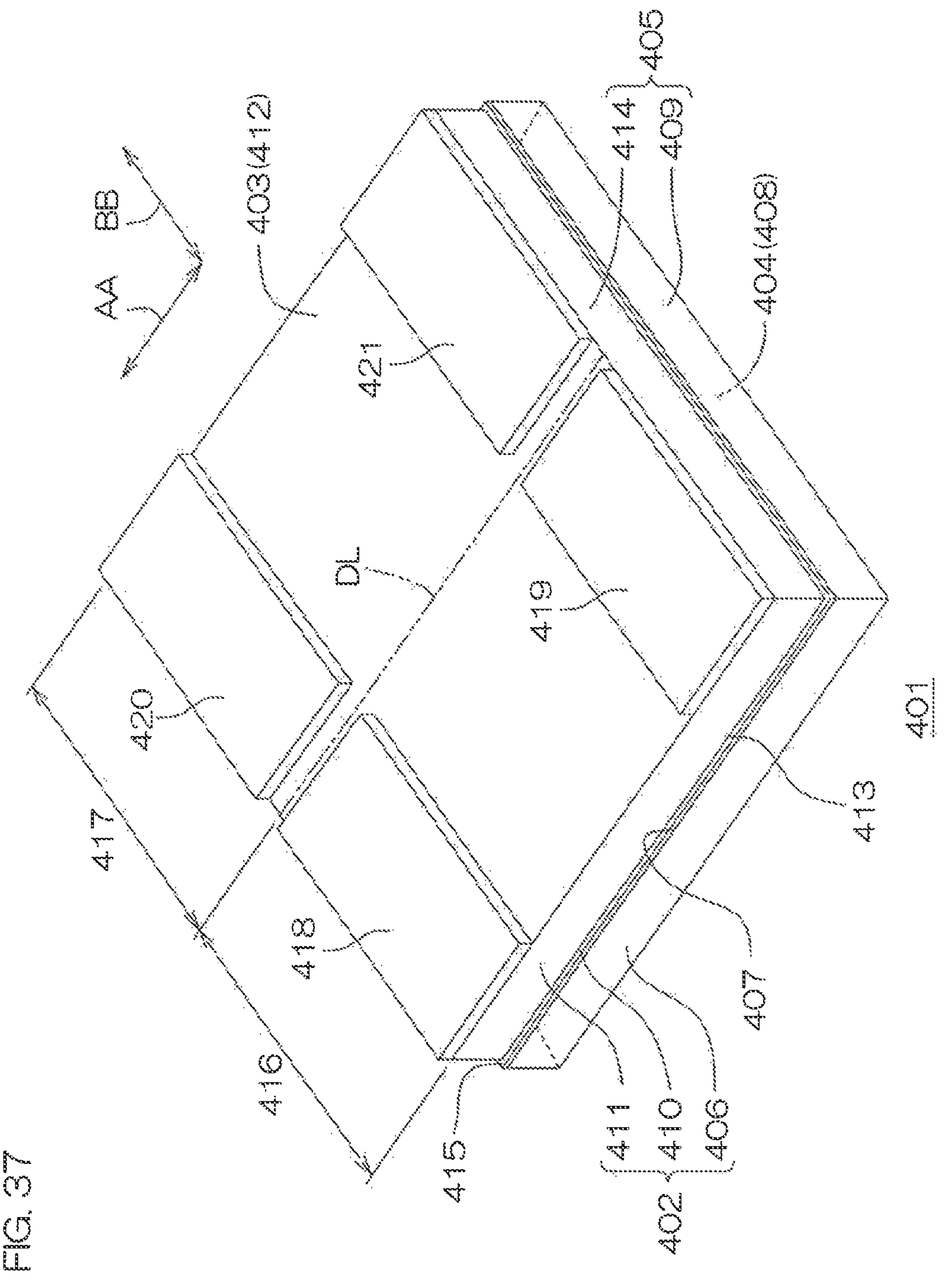
FIG. 37 is a perspective view of a chip capacitor according to an eighth preferred embodiment of the present invention.

FIG. 37 is a perspective view of a chip capacitor 401 according to an eighth preferred embodiment of the present invention. With the chip capacitor 401, arrangements corresponding to arrangements of the chip capacitor 301 shall be provided with the same reference symbols and description thereof shall be omitted.

The chip capacitor 401 is a composite type chip part having a structure in which a plurality (two in the present embodiment) of chip parts, each called a 0603 (0.6 mm×0.3 mm) chip, a 0402 (0.4 mm×0.2 mm) chip, or a 03015 (0.3 mm×0.15 mm) chip, etc., are formed integrally.

Referring to FIG. 37, the chip capacitor 401 includes a chip main body 402 of rectangular parallelepiped shape. The chip main body 402 includes a first major surface 403, a second major surface 404 positioned at an opposite side to the first major surface 403, and side surfaces 405 connecting the first major surface 403 and the second major surface 404. The first major surface 403 and the second major surface 404 are formed in quadrilateral shapes in a plan view as viewed from a normal direction thereof (hereinafter referred to simply as the "plan view").

With the chip main body 402, a length of a side along a predetermined first direction AA is, for example, not less than 0.6 mm and not more than 1.2 mm. With the chip main body 402, a length of a side along a second direction BB orthogonal to the normal direction of the first major surface 403 of the chip main body 402 and orthogonal to the first direction AA is, for example, not less than 0.6 mm and not more than 1.2 mm. A thickness of the chip main body 402 may, for example, be not less than 100 μm and not more than 300 μm (for example, approximately 150 μm).

The chip main body 402 includes a substrate 406. The substrate 406 is formed in a rectangular parallelepiped shape. The substrate 406 includes a first major surface 407 at one side, a second major surface 408 at another side, and side surfaces 409 connecting the first major surface 407 and the second major surface 408.

The first major surface 407 and the second major surface 408 are formed in quadrilateral shapes in the plan view. The second major surface 408 of the substrate 406 forms the second major surface 404 of the chip main body 402. The side surfaces 409 of the substrate 406 form portions of the side surfaces 405 of the chip main body 402.

The substrate 406 may be a high resistance substrate having a resistivity of not less than 0.5 MΩ·cm and not more than 1.5 MΩ·cm (for example, approximately 1.0 MΩ·cm). A thickness of the substrate 406 may, for example, be not less than 50 μm and not more than 250 μm (for example, approximately 100 μm).

The chip main body 402 includes a surface insulating film 410 formed on the first major surface 407 of the substrate 406. The surface insulating film 410 covers an entirety of the first major surface 407 of the substrate 406. The surface insulating film 410 forms portions of the side surfaces 405 of the chip main body 402. A thickness of the surface insulating film 410 is, for example, not less than 0.1 μm and not more than 10 μm.

The chip main body 402 includes an insulating layer 411 formed on the surface insulating film 410. The insulating layer 411 is formed in a rectangular parallelepiped shape. The insulating layer 411 includes a first major surface 412 at one side, a second major surface 413 at another side, and side surfaces 414 connecting the first major surface 412 and the second major surface 413. The first major surface 412 and the second major surface 413 are formed in quadrilateral shapes in the plan view.

The first major surface 412 of the insulating layer 411 forms the first major surface 403 of the chip main body 402. The second major surface 413 of the insulating layer 411 is connected to the surface insulating film 410. The side surfaces 414 of the insulating layer 411 form portions of the side surfaces 405 of the chip main body 402.

The side surfaces 414 of the insulating layer 411 are formed across intervals from and further to inner region sides of the substrate 406 than the side surfaces 409 of the substrate 406. Step portions 415 are thereby formed at regions between the side surfaces 414 of the insulating layer 411 and the side surfaces 409 of the substrate 406. Peripheral edge portions of the surface insulating film 410 are exposed from the step portions 415.

The side surfaces 414 of the insulating layer 411 and the side surfaces 409 of the substrate 406 may be formed to be substantially flush. That is, a chip main body 402, with a structure where the step portions 415 are not formed in the regions between the side surfaces 414 of the insulating layer 411 and the side surfaces 409 of the substrate 406, may be adopted.

The insulating layer 411 is made of an insulator. The insulator may include an inorganic based insulator that includes silicon oxide, silicon nitride, or a ceramic. The insulator may include an organic based insulator that includes a sealing resin, such as a polyimide resin or an epoxy resin, etc.

In the present embodiment, the insulating layer 411 is made of a single layer structure of a resin layer. The resin layer includes an epoxy resin as an organic based insulator. The epoxy resin is also a negative type photoresist. In the present embodiment, the insulating layer 411 is made of a photoresist layer.

A thickness of the insulating layer 411 is greater than the thickness of the surface insulating film 410. The thickness of the insulating layer 411 may be not less than 10 μm and not more than 200 μm (for example, approximately 50 μm). With the insulating layer 411 of this thickness, a parasitic capacitance that is formed in a region between the first major surface 412 of the insulating layer 411 and the first major surface 407 of the substrate 406 can be decreased.

A capacitor formation region 416, in which a capacitor CC is formed, and an inductor formation region 417, in which an inductor LL is formed, are defined in the chip main body 402.

In the present embodiment, the capacitor formation region 416 and the inductor formation region 417 are defined respectively in two regions divided by a dividing line DL that divides the chip main body 402 equally in two portions. The dividing line DL extends in the first direction AA and divides the chip main body 402 equally in two portions along the second direction BB. The dividing line DL is indicated by an alternate long and two short dashed line in FIG. 37.

The capacitor formation region 416 is defined at one end portion side in the second direction BB of the chip main body 402. The inductor formation region 417 is defined at another end portion side in the second direction BB of the chip main body 402. The capacitor formation region 416 and the inductor formation region 417 are thereby made to face each other along the second direction BB.

In the capacitor formation region 416, a first external terminal 418 and a second external terminal 419 are formed on the first major surface 403 of the chip main body 402. The first external terminal 418 and the second external terminal 419 are formed across an interval along the first direction AA from each other.

The first external terminal 418 is formed at one end portion side in the first direction AA of the first major surface 403. The first external terminal 418 is formed in an oblong shape extending along the second direction BB in the plan view.

The second external terminal 419 is formed at another end portion side in the first direction AA of the first major surface 403. The second external terminal 419 is formed in an oblong shape extending in the second direction BB in the plan view.

In the inductor formation region 417, a third external terminal 420 and a fourth external terminal 421 are formed on the first major surface 403 of the chip main body 402. The third external terminal 420 and the fourth external terminal 421 are formed across an interval from each other along the first direction AA.

The third external terminal 420 is formed at the one end portion side in the first direction AA of the first major surface 403. The third external terminal 420 is formed across an interval along the second direction BB from the first external terminal 418.

The third external terminal 420 faces the first external terminal 418 along the second direction BB. The third external terminal 420 is formed in an oblong shape extending along the second direction BB in the plan view.

The fourth external terminal 421 is formed at the other end portion side in the first direction AA of the first major surface 403. The fourth external terminal 421 is formed across an interval along the second direction BB from the second external terminal 419.

The fourth external terminal 421 faces the second external terminal 419 along the second direction BB. The fourth external terminal 421 is formed in an oblong shape extending in the second direction BB in the plan view.

The first direction AA may be defined by a direction in which the first external terminal 418 and the second external terminal 419 face each other and/or a direction in which the third external terminal 420 and the fourth external terminal 421 face each other.

The second direction BB may be defined by a direction orthogonal to the normal direction of the first major surface 403 of the chip main body 402 and orthogonal to a facing direction of the first external terminal 418 and the second external direction 419 and/or a direction orthogonal to the normal direction of the first major surface 403 of the chip main body 402 and orthogonal to a facing direction of the third external terminal 420 and the fourth external direction 421.

Figure 38:
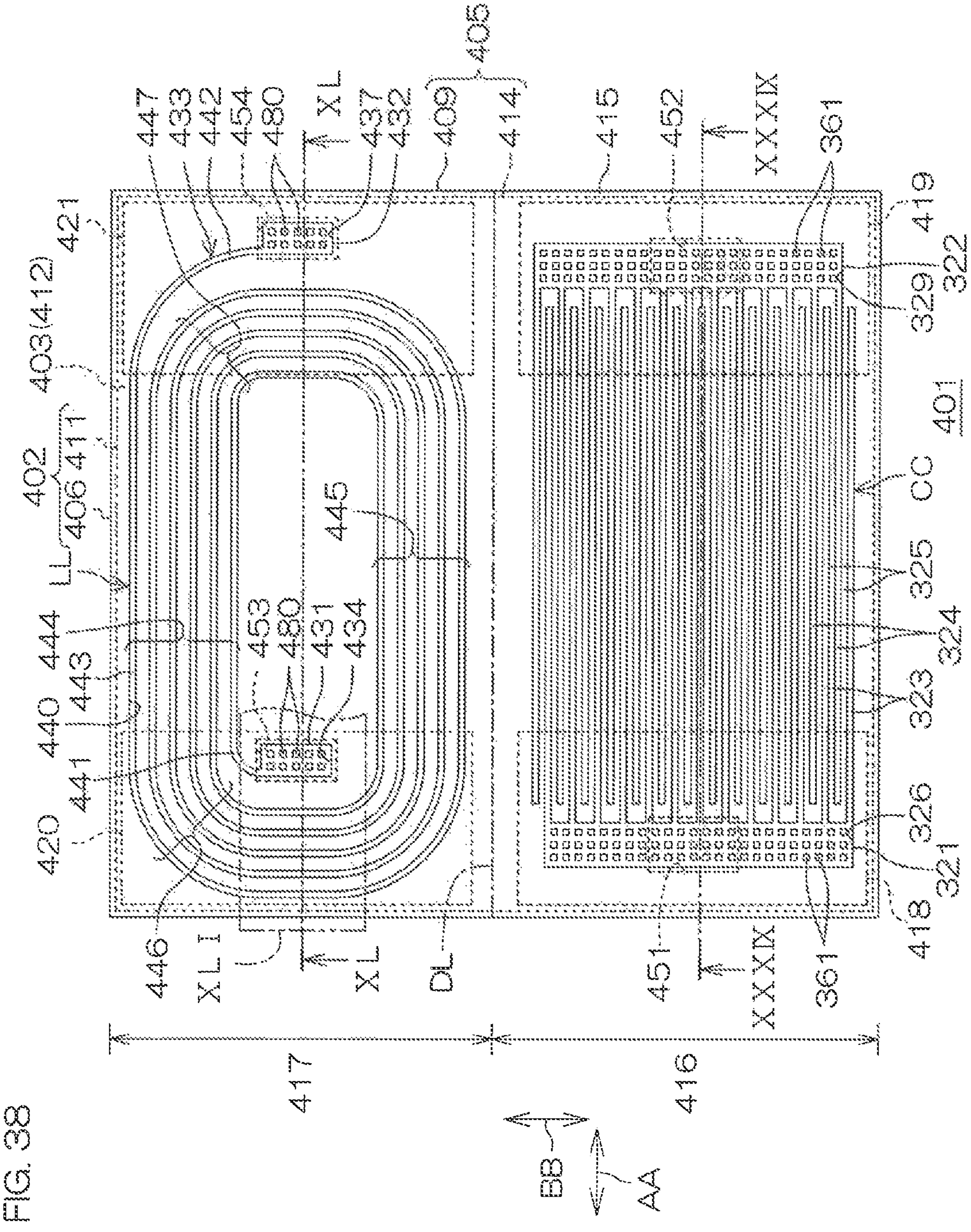
FIG. 38 is a plan view of an internal structure of the chip capacitor of FIG. 37.
Figure 39:
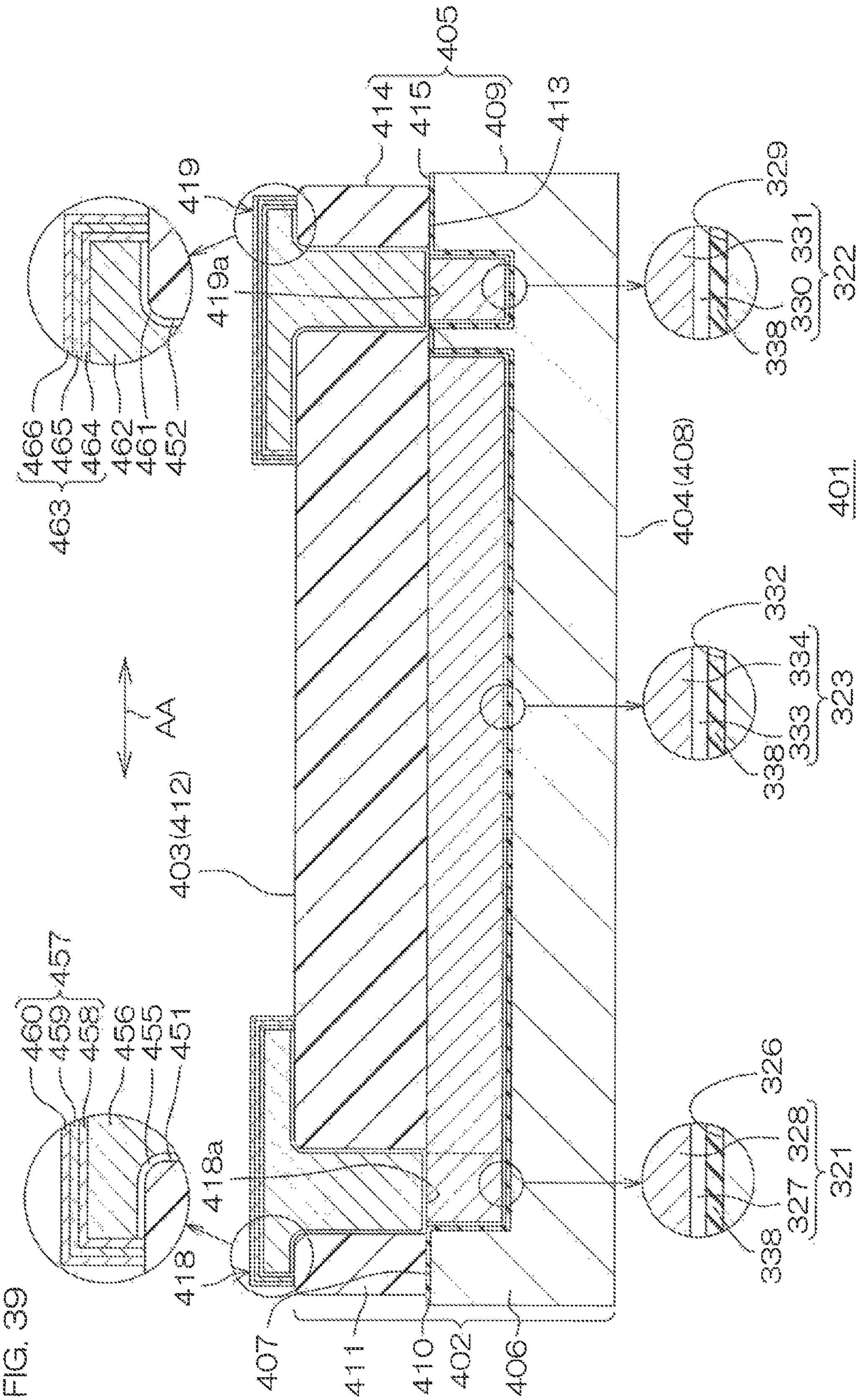
FIG. 39 is a sectional view taken along line XXXIX-XXXIX of FIG. 38.
Figure 40:
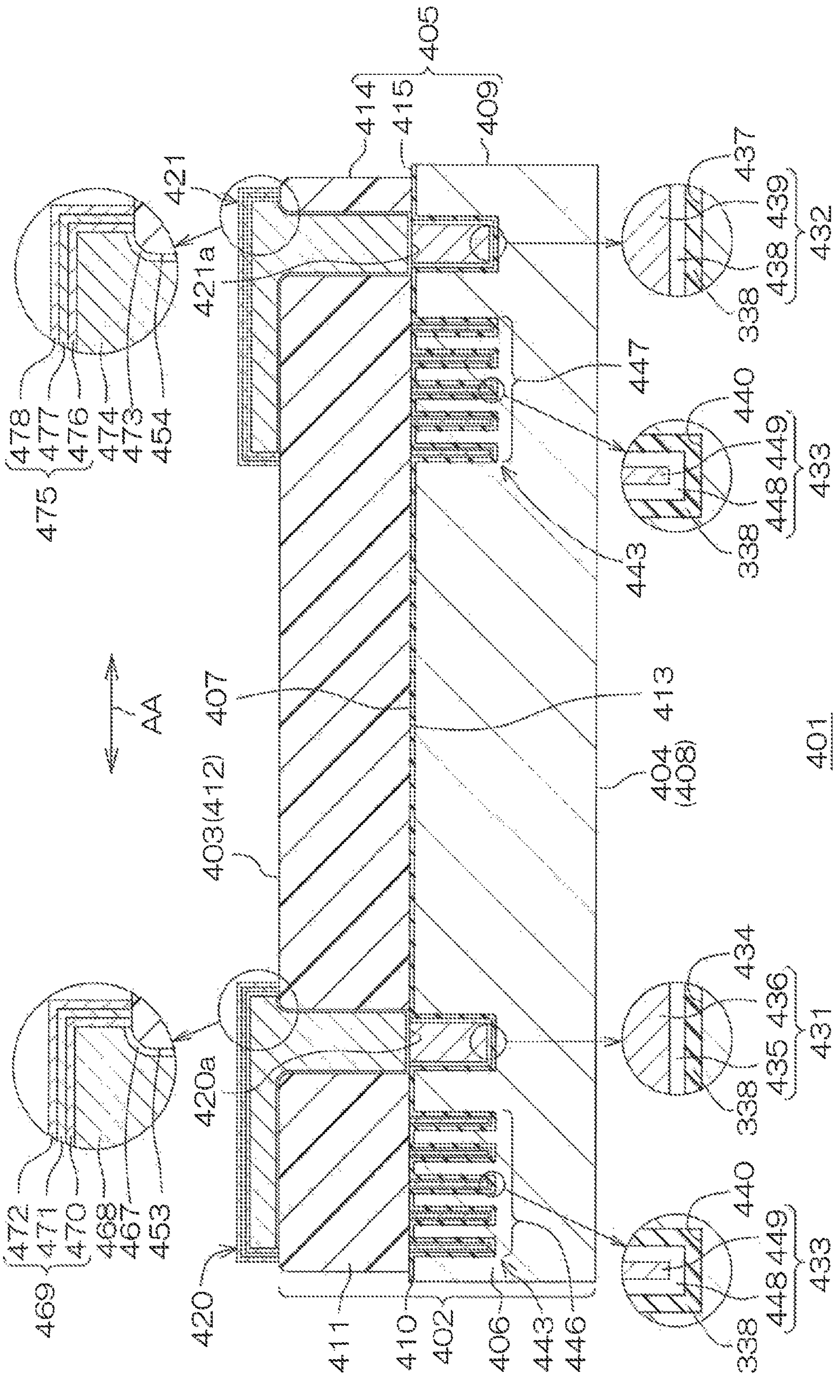
FIG. 40 is a sectional view taken along line XL-XL of FIG. 38.

FIG. 38 is a plan view of an internal structure of the chip capacitor 401 of FIG. 37. FIG. 39 is a sectional view taken along line XXXIX-XXXIX of FIG. 38. FIG. 40 is a sectional view taken along line XL-XL of FIG. 38.

Referring to FIG. 38 and FIG. 39, in the capacitor formation region 416, a first pad electrode 321, a second pad electrode 322, first capacitor electrodes 323, second capacitor electrodes 324, and a dielectric body 325 (inner wall insulating films 338) are embedded in the first major surface 407 of the substrate 406.

The respective structures of the first pad electrode 321, the second pad electrode 322, the first capacitor electrodes 323, the second capacitor electrodes 324, and the dielectric body 325 are the same as in the seventh preferred embodiment described above and description thereof shall thus be omitted.

Referring to FIG. 38 and FIG. 40, in the inductor formation region 417, a third pad electrode 431, a fourth pad electrode 432, and a coil electrode 433 are embedded in the first major surface 407 of the substrate 406.

The third pad electrode 431 is embedded at the one end portion side in the first direction AA of the first major surface 407 of the substrate 406. More specifically, in the first major surface 407 of the substrate 406, the third pad electrode 431 is embedded in a third pad trench 434 formed in a pattern corresponding to the third pad electrode 431.

The third pad electrode 431 is formed in a region directly below the third external terminal 420. The third pad electrode 431 faces the third external terminal 420 in a normal direction of the first major surface 407 of the substrate 406. The third pad electrode 431 is formed in an oblong shape extending along the second direction BB in the plan view.

The third pad electrode 431 has a laminated structure including a first pad electrode layer 435 and a second pad electrode layer 436 laminated in that order from the substrate 406 side. The first pad electrode layer 435 of the third pad electrode 431 is formed in a film conforming to inner wall surfaces of the third pad trench 434.

The first pad electrode layer 435 of the third pad electrode 431 defines a recessed space in an interior of the third pad trench 434. The second pad electrode layer 436 of the third pad electrode 431 is embedded in the recessed space defined in the interior of the third pad trench 434.

The first pad electrode layer 435 of the third pad electrode 431 may be formed of the same material type as the first pad electrode layer 327 of the first pad electrode 321. A thickness of the first pad electrode layer 435 of the third pad electrode 431 may be substantially equal to the thickness of the first pad electrode layer 327 of the first pad electrode 321.

The second pad electrode layer 436 of the third pad electrode 431 may be formed of the same material type as the second pad electrode layer 328 of the first pad electrode 321. A thickness of the second pad electrode layer 436 of the third pad electrode 431 may be substantially equal to the thickness of the second pad electrode layer 328 of the first pad electrode 321.

The fourth pad electrode 432 is embedded at the other end portion side in the first direction AA of the first major surface 407 of the substrate 406 across an interval from the third pad electrode 431. More specifically, in the first major surface 407 of the substrate 406, the fourth pad electrode 432 is embedded in a fourth pad trench 437 formed in a pattern corresponding to the fourth pad electrode 432.

The fourth pad electrode 432 is formed in a region directly below the fourth external terminal 421. The fourth pad electrode 432 faces the fourth external terminal 421 in the normal direction of the first major surface 407 of the substrate 406. The fourth pad electrode 432 is formed in an oblong shape extending along the second direction BB in the plan view.

The fourth pad electrode 432 has a laminated structure including a first pad electrode layer 438 and a second pad electrode layer 439 laminated in that order from the substrate 406 side. The first pad electrode layer 438 of the fourth pad electrode 432 is formed in a film conforming to inner wall surfaces of the fourth pad trench 437.

The first pad electrode layer 438 of the fourth pad electrode 432 defines a recessed space in an interior of the fourth pad trench 437. The second pad electrode layer 439 of the fourth pad electrode 432 is embedded in the recessed space defined in the interior of the fourth pad trench 437.

The first pad electrode layer 438 of the fourth pad electrode 432 may be formed of the same material type as the first pad electrode layer 327 of the first pad electrode 321. A thickness of the first pad electrode layer 438 of the fourth pad electrode 432 may be substantially equal to the thickness of the first pad electrode layer 327 of the first pad electrode 321.

The second pad electrode layer 439 of the fourth pad electrode 432 may be formed of the same material type as the second pad electrode layer 328 of the first pad electrode 321. A thickness of the second pad electrode layer 439 of the fourth pad electrode 432 may be substantially equal to the thickness of the second pad electrode layer 328 of the first pad electrode 321.

The coil electrode 433 is embedded in spiral form in the plan view in the first major surface 407 of the substrate 406. More specifically, in the first major surface 407 of the substrate 406, the coil electrode 433 is embedded in a coil trench 440 formed in a pattern of spiral form in the plan view that corresponds to the coil electrode 433. In the present embodiment, the coil electrode 433 is formed in a rectangular shape extending in a thickness direction of the substrate 406.

The coil electrode 433 is routed in a region directly below the third external terminal 420, a region directly below the fourth external terminal 421, and a region between the third external terminal 420 and the fourth external terminal 421.

The coil electrode 433 includes an inner end 441, connected to the third pad electrode 431, an outer end 442, connected to the fourth pad electrode 432, and a spiral portion 443 of spiral form in the plan view that connects the inner end 441 and the outer end 432.

The spiral portion 443 of the coil electrode 433 is wound outwardly from the inner end 441 toward the outer end 442 in the plan view. That is, the spiral portion 443 of the coil electrode 433 is wound so as to surround the inner end 441. The number of turns of the coil conductor 443 is arbitrary.

The spiral portion 443 of the coil electrode 433 includes a first region 444 extending along a winding direction from the third pad electrode 431 side toward the fourth pad electrode 432 side and positioned in a region between the third external terminal 420 and the fourth external terminal 421.

The spiral portion 443 of the coil electrode 433 includes a second region 445 extending along the winding direction from the fourth pad electrode 432 side toward the third pad electrode 431 side and positioned in the region between the third external terminal 420 and the fourth external terminal 421.

The spiral portion 443 of the coil electrode 433 includes a third region 446 extending along the winding direction from the second region 445 toward the first region 444 and positioned in a region directly below the third external terminal 420.

The spiral portion 443 of the coil electrode 433 includes a fourth region 447 extending along the winding direction from the first region 444 toward the second region 445 and positioned in a region directly below the fourth external terminal 421.

Thus, in the present embodiment, in the first major surface 407 of the substrate 406, the coil electrode 433 is routed in the region directly below the third external terminal 420 and the region directly below the fourth external terminal 421 in addition to the region between the third external terminal 420 and the fourth external terminal 421.

An increase in the number of turns of the coil electrode 433 and an increase in an area of the coil electrode 433 can thus be achieved. A decrease in a resistance component of the coil electrode 433 and an increase in an inductance component of the coil electrode 433 can thereby be achieved. That is, improvement of a Q value (quality factor) of the coil electrode 433 can be achieved while achieving refinement in a restricted area of the first major surface 407 of the substrate 406.

The coil electrode 433 has a laminated structure including a first coil electrode layer 448 and a second coil electrode layer 449 laminated in that order from the substrate 406 side.

The first coil electrode layer 448 of the coil electrode 433 is formed in a film conforming to inner wall surfaces of the coil trench 440. The first coil electrode layer 448 defines a recessed space in an interior of the coil trench 440.

The first coil electrode layer 448 is formed integral to the first pad electrode layer 435 of the third pad electrode 431 and the first pad electrode layer 438 of the fourth pad electrode 432. A thickness of the first coil electrode layer 448 may be substantially equal to the thickness of the first pad electrode layer 435 of the third pad electrode 431 and the thickness of the first pad electrode layer 438 of the fourth pad electrode 432.

The first coil electrode layer 448 of the coil electrode 433 may be formed of the same material type as the first pad electrode layer 327 of the first pad electrode 321. The thickness of the first coil electrode layer 448 may be substantially equal to the thickness of the first pad electrode layer 327 of the first pad electrode 321.

The second coil electrode layer 449 of the coil electrode 433 is embedded in the recessed space defined in the interior of the coil trench 440. The second coil electrode layer 449 is formed integral to the second pad electrode layer 436 of the third pad electrode 431 and the second pad electrode layer 439 of the fourth pad electrode 432.

A thickness of the second coil electrode layer 449 may be substantially equal to the thickness of the second pad electrode layer 436 of the third pad electrode 431 and the thickness of the second pad electrode layer 439 of the fourth pad electrode 432. The second coil electrode layer 449 may be formed of the same material type as the second pad electrode layer 328 of the first pad electrode 321. The thickness of the second coil electrode layer 449 may be substantially equal to the thickness of the second pad electrode layer 328 of the first pad electrode 321.

Referring to FIG. 40, in the inductor formation region 417, the inner wall insulating film 338 described above is also formed on the inner wall surfaces of the coil trench 440. In the inductor formation region 417, the inner wall insulating film 338 is formed integral to the surface insulating film 410 covering the first major surface 407 of the substrate 406. The coil electrode 433 is embedded in the coil trench 440 via the inner wall insulating film 338.

In FIG. 40, an example where regions of the substrate 406 between portions of the coil trench 440 that are mutually adjacent in sectional view are not completely insulated (oxidized) is illustrated. A structure where the regions of the substrate 406 between the portions of the coil trench 440 that are mutually adjacent in sectional view are completely insulated (oxidized) may be adopted instead.

Referring to FIG. 38 to FIG. 40, a first pad opening 451, a second pad opening 452, a third pad opening 453, and a fourth pad opening 454 are formed in the insulating layer 411.

Referring to FIG. 39, the first pad opening 451 in the present embodiment exposes a portion of the first pad electrode 321. The first pad opening 451 may expose substantially an entirety of the first pad electrode 321 instead.

An opening end of the first pad opening 451 in the present embodiment is formed in a convexly curved shape directed into the first pad opening 451. The opening end of the first pad opening 451 is a portion connecting the first major surface 412 of the insulating layer 411 and inner walls of the first pad opening 451.

The second pad opening 452 in the present embodiment exposes a portion of the second pad electrode 322. The second pad opening 452 may expose substantially an entirety of the second pad electrode 322 instead.

An opening end of the second pad opening 452 in the present embodiment is formed in a convexly curved shape directed into the second pad opening 452. The opening end of the second pad opening 452 is a portion connecting the first major surface 412 of the insulating layer 411 and inner walls of the second pad opening 452.

Referring to FIG. 40, the third pad opening 453 in the present embodiment exposes substantially an entirety of the third pad electrode 431. The third pad opening 453 may expose a portion of the third pad electrode 431 instead.

An opening end of the third pad opening 453 in the present embodiment is formed in a convexly curved shape directed into the third pad opening 453. The opening end of the third pad opening 453 is a portion connecting the first major surface 412 of the insulating layer 411 and inner walls of the third pad opening 453.

The fourth pad opening 454 in the present embodiment exposes substantially an entirety of the fourth pad electrode 432. The fourth pad opening 454 may expose a portion of the fourth pad electrode 432 instead.

An opening end of the fourth pad opening 454 in the present embodiment is formed in a convexly curved shape directed into the fourth pad opening 454. The opening end of the fourth pad opening 454 is a portion connecting the first major surface 412 of the insulating layer 411 and inner walls of the fourth pad opening 454.

Referring to FIG. 39, the first external terminal 418 is formed inside the first pad opening 451. The first external terminal 418 enters into the first pad opening 451 from the first major surface 412 of the insulating layer 411. The first external terminal 418 includes a connecting portion 418*a* that is directly connected to the first pad electrode 321 inside the first pad opening 451.

The first external terminal 418 has a laminated structure including a first electrode layer 455, a second electrode layer 456, and a third electrode layer 457 that are laminated in that order from the first major surface 407 side of the substrate 406.

The first electrode layer 455 of the first external terminal 418 may include a titanium seed layer and a copper seed layer that are laminated in that order from the first major surface 407 side of the substrate 406. The second electrode layer 456 of the first external terminal 418 may include a copper plating layer. A main body of the first external terminal 418 is formed by the second electrode layer 456.

The third electrode layer 457 of the first external terminal 418 may have a laminated structure including a nickel layer 458, a palladium layer 459, and a gold layer 460 that are laminated in that order from the second electrode layer 456 side of the first external terminal 418. The first external terminal 418 not having the third electrode layer 457 may be adopted instead.

The second external terminal 419 is formed inside the second pad opening 452. The second external terminal 419 enters into the second pad opening 452 from the first major surface 412 of the insulating layer 411. The second external terminal 419 includes a connecting portion 419*a* that is directly connected to the second pad electrode 322 inside the second pad opening 452.

The second external terminal 419 has a laminated structure including a first electrode layer 461, a second electrode layer 462, and a third electrode layer 463 that are laminated in that order from the first major surface 407 side of the substrate 406.

The first electrode layer 461 of the second external terminal 419 may include a titanium seed layer and a copper seed layer that are laminated in that order from the first major surface 407 side of the substrate 406. The second electrode layer 462 of the second external terminal 419 may include a copper plating layer. A main body of the second external terminal 419 is formed by the second electrode layer 462.

The third electrode layer 463 of the second external terminal 419 may have a laminated structure including a nickel layer 464, a palladium layer 465, and a gold layer 466 that are laminated in that order from the second electrode layer 462 side of the second external terminal 419. The second external terminal 419 not having the third electrode layer 463 may be adopted instead.

Referring to FIG. 40, the third external terminal 420 is formed inside the third pad opening 453. The third external terminal 420 enters into the third pad opening 453 from the first major surface 412 of the insulating layer 411. The third external terminal 420 includes a connecting portion 420*a* that is directly connected to the third pad electrode 431 inside the third pad opening 453.

The third external terminal 420 has a laminated structure including a first electrode layer 467, a second electrode layer 468, and a third electrode layer 469 that are laminated in that order from the first major surface 407 side of the substrate 406.

The first electrode layer 467 of the third external terminal 420 may include a titanium seed layer and a copper seed layer that are laminated in that order from the first major surface 407 side of the substrate 406. The second electrode layer 468 of the third external terminal 420 may include a copper plating layer. A main body of the third external terminal 420 is formed by the second electrode layer 468.

The third electrode layer 469 of the third external terminal 420 may have a laminated structure including a nickel layer 470, a palladium layer 471, and a gold layer 472 that are laminated in that order from the second electrode layer 468 side of the third external terminal 420. The third external terminal 420 not having the third electrode layer 469 may be adopted instead.

The fourth external terminal 421 is formed inside the fourth pad opening 454. The fourth external terminal 421 enters into the fourth pad opening 454 from the first major surface 412 of the insulating layer 411. The fourth external terminal 421 includes a connecting portion 421*a* that is directly connected to the fourth pad electrode 432 inside the fourth pad opening 454.

The fourth external terminal 421 has a laminated structure including a first electrode layer 473, a second electrode layer 474, and a third electrode layer 475 that are laminated in that order from the first major surface 407 side of the substrate 406.

The first electrode layer 473 of the fourth external terminal 421 may include a titanium seed layer and a copper seed layer that are laminated in that order from the first major surface 407 side of the substrate 406. The second electrode layer 474 of the fourth external terminal 421 may include a copper plating layer. A main body of the fourth external terminal 421 is formed by the second electrode layer 474.

The third electrode layer 475 of the fourth external terminal 421 may have a laminated structure including a nickel layer 476, a palladium layer 477, and a gold layer 478 that are laminated in that order from the second electrode layer 474 side of the fourth external terminal 421. The fourth external terminal 421 not having the third electrode layer 475 may be adopted instead.

Figure 41:
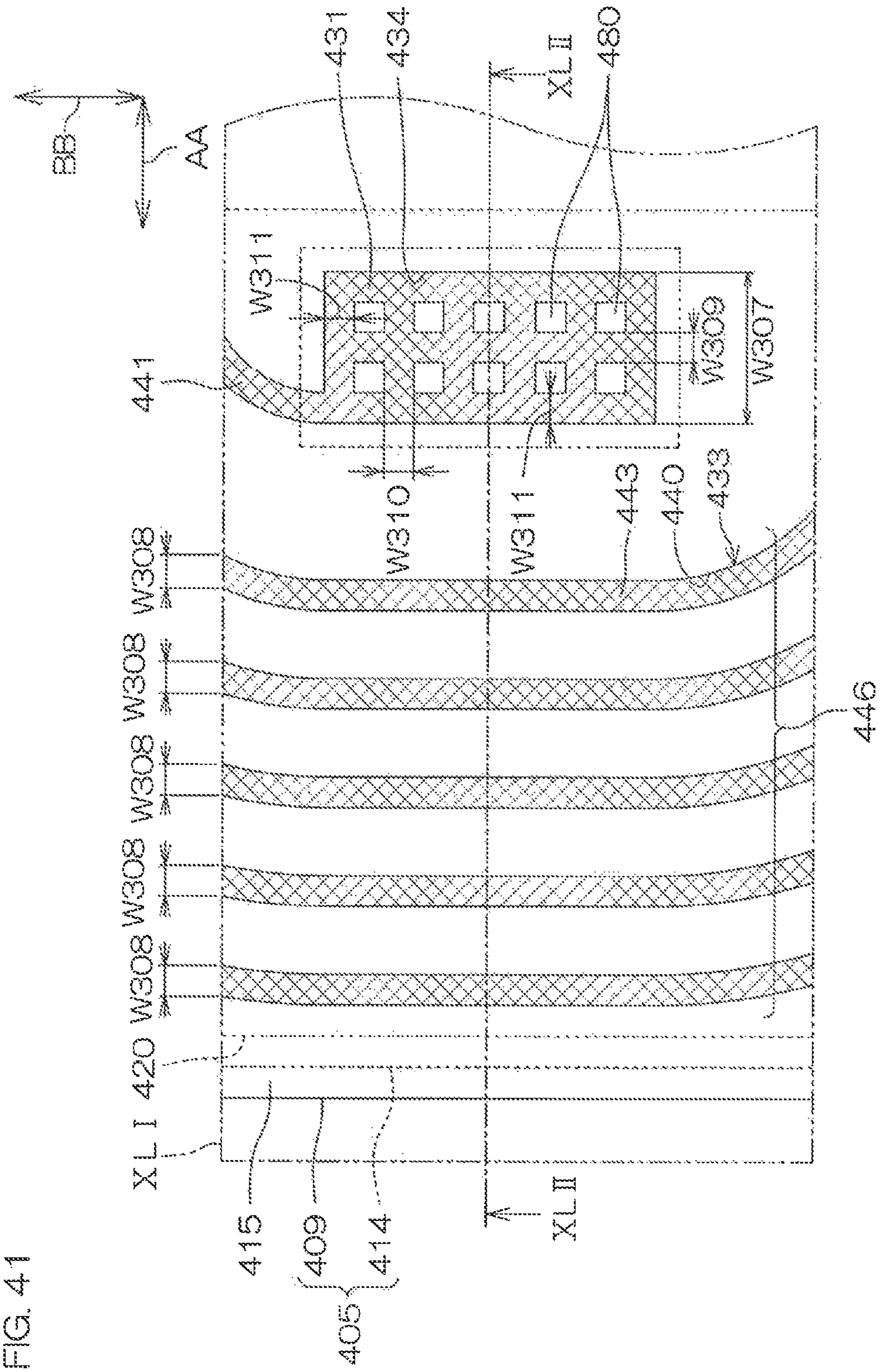
FIG. 41 is an enlarged view of region XLI of FIG. 38.
Figure 42:
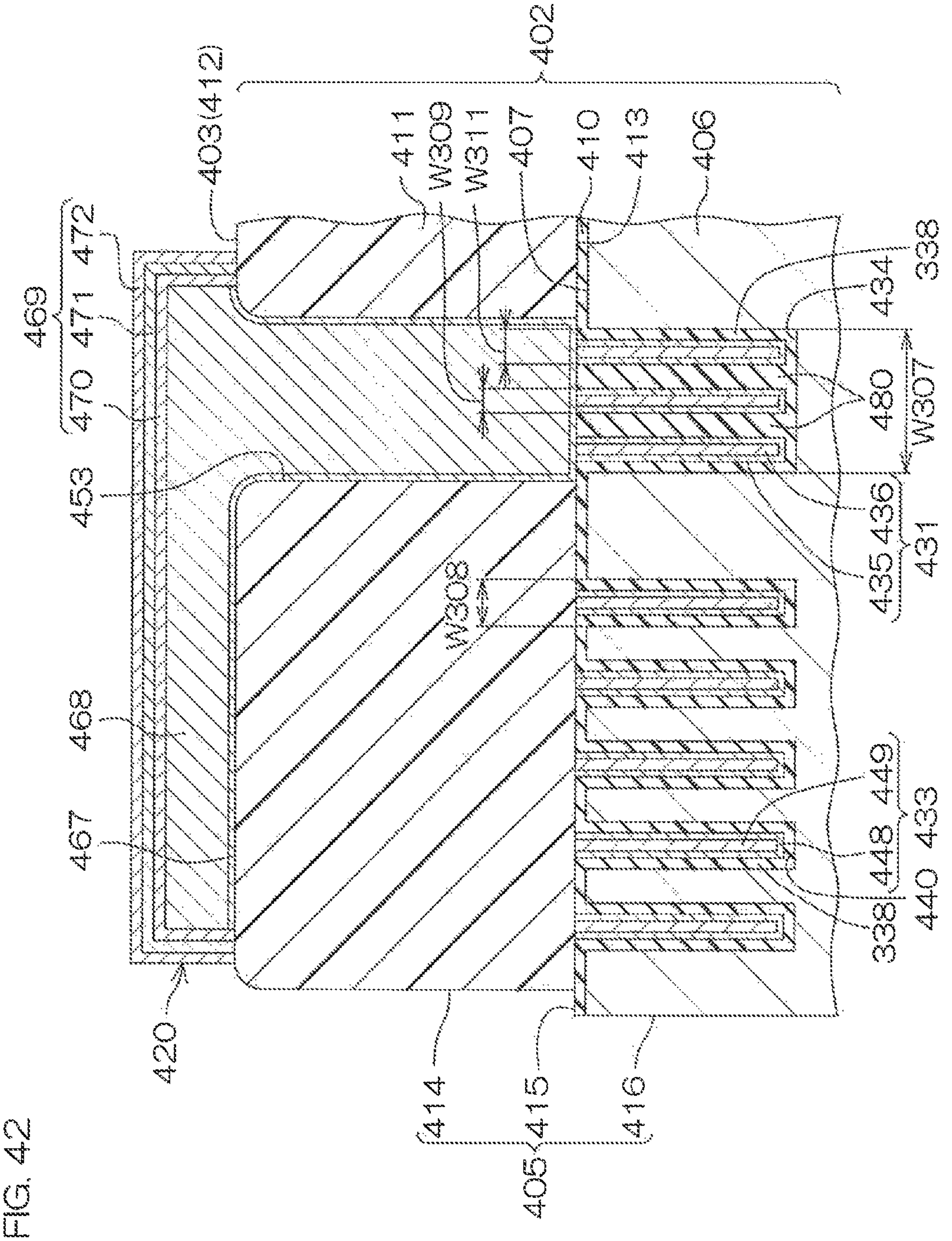
FIG. 42 is a sectional view taken along line XLII-XLII of FIG. 41.

Next, structures of the third pad trench 434 and the fourth pad trench 437 shall be described specifically with reference to FIG. 41 and FIG. 42 in addition to FIG. 38. FIG. 41 is an enlarged view of region XLI in FIG. 38. FIG. 42 is a sectional view taken along line XLII-XLII of FIG. 41. In FIG. 41, cross hatching is applied to the third pad electrode 431 and the coil electrode 433 for the sake of clarity.

The fourth pad trench 437 has the same structure as the third pad trench 434. Here, only the structure at the third pad trench 434 side shall be described. In regard to the structure at the fourth pad trench 437 side, portions corresponding to the structure at the third pad trench 434 side shall be provided with the same reference symbols in FIG. 38 and description thereof shall be omitted.

Referring to FIG. 41, columnar portions 480 are formed in the third pad trench 434. In the present embodiment, the plurality of columnar portions 480 are formed in the third pad trench 434. The plurality of columnar portions 480 are formed in a matrix across intervals in the first direction AA and the second direction BB.

The plurality of columnar portions 480 may be formed across intervals in a region inward from the inner walls of the third pad trench 434. At least one of the plurality of columnar portions 480 may be formed integral to a side wall of the third pad trench 434. Also, at least two of the plurality of columnar portions 480 may be formed integral to each other.

In the present embodiment, each columnar portion 480 is formed in a quadratic prism shape. Each columnar portion 480 may be formed instead to a triangular prism shape, a hexagonal prism shape, or other polygonal prism shape besides a quadratic prism shape. Also, each columnar portion 480 may be formed instead to a circular columnar shape or an elliptical columnar shape.

Referring to FIG. 42, each columnar portion 480 is made of a portion of the substrate 406. Each columnar portion 480 is erected from a bottom wall of the third pad trench 434 toward a trench opening. Wall surfaces of each columnar portion 480 are covered by the inner wall insulating film 338 described above. An entirety of each columnar portion 480 may be insulated (oxidized).

In the present embodiment, the third pad trench 434 and the coil trench 440 have a substantially equal depth D302. The third pad trench 434 has a width W307 along the first direction AA. The coil trench 440 has a width W308 along a direction orthogonal to a direction in which the coil electrode 433 extends.

A pair of columnar portions 480 that are mutually adjacent along the first direction AA are formed across an interval of only a width W309 along the first direction AA. A pair of columnar portions 480 that are mutually adjacent along the second direction BB are formed across an interval of only a width W310 along the second direction BB. Also, each columnar portion 480 is formed across an interval of only a width W311 from an inner wall of the third pad trench 434.

An aspect ratio D302/W307 of the third pad trench 434 is smaller than an aspect ratio D302/W308 of the coil trench 440 (ratio D302/W307<ratio D302/W308).

The aspect ratio D302/W307 of the third pad trench 434 is smaller than an aspect ratio D302/W309 of each portion between a pair of columnar portions 480 that are mutually adjacent along the first direction AA (ratio D302/W307<ratio D302/W309).

The aspect ratio D302/W307 of the third pad trench 434 is smaller than an aspect ratio D302/W310 of each portion between a pair of columnar portions 480 that are mutually adjacent along the second direction BB (ratio D302/W307<ratio D302/W310).

The aspect ratio D302/W307 of the third pad trench 434 is smaller than an aspect ratio D302/W311 of each portion between an inner wall of the third pad trench 434 and each columnar portion 480 (ratio D302/W307<ratio D302/W311).

The aspect ratio D302/W309 of each portion between a pair of columnar portions 480 that are mutually adjacent along the first direction AA is preferably substantially equal to the aspect ratio D302/W308 of the coil trench 440 (ratio D302/W309≈ratio D302/W308 or ratio D302/W309=ratio D302/W308).

The aspect ratio D302/W310 of each portion between a pair of columnar portions 480 that are mutually adjacent along the second direction BB is preferably substantially equal to the aspect ratio D302/W308 of the coil trench 440 (ratio D302/W310≈ratio D302/W308 or ratio D302/W310=ratio D302/W308).

The aspect ratio D302/W311 of each portion between an inner wall of the third pad trench 434 and each columnar portion 480 is preferably substantially equal to the aspect ratio D302/W308 of the coil trench 440 (ratio D302/W311≈ratio D302/W308 or ratio D302/W311=ratio D302/W308).

A case where the columnar portions 480 are not formed in the third pad trench 434 shall now be considered. In this case, the third pad electrode 431 must be embedded in the third pad trench 434 that is wider than the coil trench 440.

If the third pad electrode 431 and the coil electrode 433 are embedded at the same time, while the coil electrode 433 fills the coil trench 440, a deficiency arises in the third pad electrode 431 at the third pad trench 434 side.

On the other hand, although the third pad trench 434 has the aspect ratio D302/W307, it is formed to be practically of the aspect ratio D302/W309 and the aspect ratio D302/W310 due to the plurality of columnar portions 480. The aspect ratio D302/W304 and the aspect ratio D302/W305 are both larger than the aspect ratio D302/W307.

Occurrence of deficiency or excess of a conductive material between the third pad electrode 431 embedded in the third pad trench 434 and the coil electrode 433 embedded in the coil trench 440 can thereby be suppressed when the third pad electrode 431 and the coil electrode 433 are embedded at the same time.

Preferably, the aspect ratio D302/W308, the aspect ratio D302/W309, and the aspect ratio D302/W310 are set to substantially equal values. In this case, the occurrence of deficiency or excess of the conductive material between the third pad electrode 431 and the coil electrode 433 can be suppressed reliably.

The plurality of columnar portions 480 are formed to adjust the aspect ratio D302/W307 of the third pad trench 434 to thereby improve the embedding property of the third pad electrode 431. Positions, sizes, and/or proportions occupied in the third pad trench 434 of the plurality of columnar portions 480 are changeable as appropriate.

Preferably, the aspect ratio D302/W307, the aspect ratio D302/W308, the aspect ratio D302/W309, the aspect ratio D302/W310, the aspect ratio D302/W311, the aspect ratio D301/W301, the aspect ratio D301/W302, the aspect ratio D301/W303, the aspect ratio D301/W304, the aspect ratio D301/W305, and the aspect ratio D301/W306 are set to substantially equal values.

Further, the depth D301 of each of the first pad trench 326, the first capacitor trenches 332, and the second capacitor trenches 335 and the depth D302 of each of the third pad trench 434 and the coil trench 440 are preferably set to substantially equal values.

The third pad electrode 431, the fourth pad electrode 432, and the coil electrode 433 of the inductor formation region 417 and the first pad electrode 321, the second pad electrode 322, the first capacitor electrodes 323, and the second capacitor electrodes 324 of the capacitor formation region 416 can thereby be formed at the same time through processes in common.

As described above, with the chip capacitor 401, the first capacitor electrodes 323, the second capacitor electrodes 324, and the dielectric body 325 are embedded in the first major surface 407 of the substrate 406 in the capacitor formation region 416. Also, the coil electrode 433 is embedded in the first major surface 407 of the substrate 406 in the inductor formation region 417.

It is thereby made unnecessary to laminate the first capacitor electrodes 323, the second capacitor electrodes 324, the dielectric body 325, and the coil electrode 433 along the normal direction of the first major surface 407 of the substrate 406.

Especially with the chip capacitor 401, the first pad electrode 321 and the second pad electrode 322 are embedded in the first major surface 407 of the substrate 406 in the capacitor formation region 416. Also, the third pad electrode 431 and the fourth pad electrode 432 are embedded in the first major surface 407 of the substrate 406 in the inductor formation region 417.

Electrode layers to be formed on the first major surface 407 of the substrate 406 can thus be reduced. The chip capacitor 401 can thereby be suppressed from enlarging along the normal direction of the first major surface 407 of the substrate 406. The chip capacitor 401 that can be miniaturized can thus be provided.

Such a chip capacitor 401 is manufactured through the same processes as the processes of FIG. 36A to FIG. 36M. In the following, a method for manufacturing the chip capacitor 401 shall be described with reference again to FIG. 36A to FIG. 36M. Specific description shall be omitted for processes in common to FIG. 36A to FIG. 36M.

First, referring to FIG. 36A, the base substrate 370 is prepared. The first major surface 371 of the base substrate 370 corresponds to the first major surface 407 of the substrate 406 and the second major surface 372 of the base substrate 370 corresponds to the second major surface 408 of the substrate 406.

In the base substrate 370, the plurality of chip formation regions 373, corresponding to the chip capacitors 401, and the boundary regions 374, demarcating the plurality of chip formation regions 373, are set. The capacitor formation regions 416, in which the capacitors CC are formed, and the inductor formation regions 417, in which the inductors LL are formed, are set respectively in the plurality of chip formation regions 373.

Next, referring to FIG. 36B, the first insulating film 375 covering the first major surface 371 of the base substrate 370 is formed. Also, the second insulating film 376 covering the second major surface 372 of the base substrate 370 is formed.

Next, referring to FIG. 36C, the mask 377 having the predetermined pattern is formed on the first insulating film 375. In each capacitor formation region 416, the mask 377 has the openings 378 that expose regions in which the first pad trench 326, the second pad trench 329, the first capacitor trenches 332, and the second capacitor trenches 335 are to be formed.

In each inductor formation region 417, the mask 377 has the openings 378 that expose regions in which the third pad trench 434, the fourth pad trench 437, and the coil trench 440 are to be formed.

Next, by an etching method via the mask 377, unnecessary portions of the first insulating film 375 are removed. The openings 379 matching the openings 378 of the mask 377 are thereby formed in the first insulating film 375. Thereafter, the mask 377 is removed.

Next, referring to FIG. 36D, unnecessary portions of the base substrate 370 are removed by an etching method using the first insulating film 375 as a mask.

Thereby, in the capacitor formation region 416, the first pad trench 326, the second pad trench 329, the first capacitor trenches 332, and the second capacitor trenches 335 are formed in the first major surface 371 of the base substrate 370.

Also, in the inductor formation region 417, the third pad trench 434, the fourth pad trench 437, and the coil trench 440 are formed in the first major surface 371 of the base substrate 370.

The third pad trench 434, the fourth pad trench 437, and the coil trench 440 may instead be formed through different processes. For example, the coil trench 440 may be formed after or before forming the third pad trench 434 and the fourth pad trench 437.

Further, the third pad trench 434, the fourth pad trench 437, and the coil trench 440 may be formed through different processes from the first pad trench 326, the second pad trench 329, the first capacitor trenches 332, and the second capacitor trenches 335.

For example, the third pad trench 434, the fourth pad trench 437, and the coil trench 440 may be formed after or before forming the first pad trench 326, the second pad trench 329, the first capacitor trenches 332, and the second capacitor trenches 335.

Next, referring to FIG. 36E, the first insulating film 375 and the second insulating film 376 are removed.

Next, referring to FIG. 36F, the first insulating film 380 covering the first major surface 371 of the base substrate 370 is formed. A portion of the first insulating film 380 covering the first major surface 371 of the base substrate 370 becomes the surface insulating film 410.

In the capacitor formation region 416, portions of the first insulating film 380 positioned at the interior of the first pad trench 326, the interior of the second pad trench 329, the interiors of the first capacitor trenches 332, and the interiors of the second capacitor trenches 335 become the inner wall insulating films 338.

In the inductor formation region 417, portions of the first insulating film 380 positioned at the interior of the third pad trench 434, the interior of the fourth pad trench 437, and the interior of the coil trench 440 become the inner wall insulating films 338.

Next, referring to FIG. 36G, the first electrode layer 382 is formed on the first major surface 371 of the base substrate 370.

In the capacitor formation region 416, the first electrode layer 382 is the layer that becomes the base of the first pad electrode layer 327, the first pad electrode layer 330, the first capacitor electrode layers 333, and the first electrode layers 336.

In the capacitor formation region 416, the first electrode layer 382 is formed in a film conforming to the first major surface 371 of the base substrate 370, the inner walls of the first pad trench 326, the inner walls of the second pad trench 329, the inner walls of the first capacitor trenches 332, and the inner walls of the second capacitor trenches 335.

In the inductor formation region 417, the first electrode layer 382 is a layer that becomes a base of the first pad electrode layer 435 of the third pad electrode 431, the first pad electrode layer 438 of the fourth pad electrode 432, and the first coil electrode layer 448 of the coil electrode 433.

In the inductor formation region 417, the first electrode layer 382 is formed in a film conforming to the first major surface 371 of the base substrate 370, the inner walls of the third pad trench 434, the inner walls of the fourth pad trench 437, and the inner walls of the coil trench 440.

Next, referring to FIG. 36H, the second electrode layer 383 is formed on the first electrode layer 382. In the capacitor formation region 416, the second electrode layer 383 is the layer that becomes the base of the second pad electrode layer 328, the second pad electrode layer 331, the second capacitor electrode layers 334, and the second electrode layers 337.

In the capacitor formation region 416, the second electrode layer 383 fills the first pad trench 326, the second pad trench 329, the first capacitor trenches 332, and the second capacitor trenches 335 and covers the first major surface 371 of the base substrate 370.

In the inductor formation region 417, the second electrode layer 383 is a layer that becomes a base of the second pad electrode layer 436 of the third pad electrode 431, the second pad electrode layer 439 of the fourth pad electrode 432, and the second coil electrode layer 449 of the coil electrode 433.

In the inductor formation region 417, the second electrode layer 383 fills the third pad trench 434, the fourth pad trench 437, and the coil trench 440 and covers the first major surface 371 of the base substrate 370.

Next, referring to FIG. 36I, unnecessary portions of the first electrode layer 382 and the second electrode layer 383 are removed. The first pad electrode 321, the second pad electrode 322, the first capacitor electrodes 323, and the second capacitor electrodes 324 are thereby formed in the capacitor formation region 416. Also, the third pad electrode 431, the fourth pad electrode 432, and the coil electrode 433, are formed in the inductor formation region 417.

The third pad electrode 431, the fourth pad electrode 432, and the coil electrode 433 may instead be formed through different processes from the first pad electrode 321, the second pad electrode 322, the first capacitor electrodes 323, and the second capacitor electrodes 324.

For example, the third pad electrode 431, the fourth pad electrode 432, and the coil electrode 433 may be formed after forming the first pad electrode 321, the second pad electrode 322, the first capacitor electrodes 323, and the second capacitor electrodes 324.

Also, the third pad electrode 431, the fourth pad electrode 432, and the coil electrode 433 may be formed before forming the first pad electrode 321, the second pad electrode 322, the first capacitor electrodes 323, and the second capacitor electrodes 324.

Next, referring to FIG. 36J, the photoresist layer 384 of film form that is to be the insulating layer 411 is adhered on the first major surface 371 of the base substrate 370.

Next, the regions of the photoresist layer 384 corresponding to the plurality of chip formation regions 373 are selectively exposed. More specifically, of the photoresist layer 384, regions outside the regions in which the first pad opening 451, the second pad opening 452, the third pad opening 453, and the fourth pad opening 454 are to be formed and regions outside the boundary regions 374 are selectively exposed.

Next, the photoresist layer 384 is developed through immersion in a developing solution. The first pad opening 451, the second pad opening 452, the third pad opening 453, the fourth pad opening 454 and the openings 385, exposing the boundary regions 374, are thereby formed in the photoresist layer 384. The insulating layer 411, made of the photoresist layer 384, is thereby formed.

Next, referring to FIG. 36K, the first external terminal 418, the second external terminal 419, the third external terminal 420, and the fourth external terminal 421 are formed in place of the first external terminal 316 and the second external terminal 317.

In the present process, first, the first electrode layer 386 is formed on the first major surface 412 of the insulating layer 411. The first electrode layer 386 becomes a base of the first electrode layer 455 of the first external terminal 418, the first electrode layer 461 of the second external terminal 419, the first electrode layer 467 of the third external terminal 420, and the first electrode layer 473 of the fourth external terminal 421.

The first electrode layer 386 includes the titanium seed layer and the copper seed layer formed in that order from the first major surface 412 side of the insulating layer 411. The titanium seed layer is formed, for example, by the sputtering method. The copper seed layer is formed, for example, by the sputtering method.

Next, the resist mask 387 having a predetermined pattern is formed on the first electrode layer 386. The resist mask 387 has the openings 388 that selectively expose regions in which the first external terminal 418, the second external terminal 419, the third external terminal 420, and the fourth external terminal 421 are to be formed.

Next, the second electrode layer 456 of the first external terminal 418, the second electrode layer 462 of the second external terminal 419, the second electrode layer 468 of the third external terminal 420, and the second electrode layer 474 of the fourth external terminal 421 are formed on the first electrode layer 386 exposed from the openings 388 in the resist mask 387.

Each of the second electrode layer 456 of the first external terminal 418, the second electrode layer 462 of the second external terminal 419, the second electrode layer 468 of the third external terminal 420, and the second electrode layer 474 of the fourth external terminal 421 includes a copper plating layer. The copper plating layer is formed, for example, by the electroplating method.

After the second electrode layer 456 of the first external terminal 418, the second electrode layer 462 of the second external terminal 419, the second electrode layer 468 of the third external terminal 420, and the second electrode layer 474 of the fourth external terminal 421 are formed, the resist mask 387 is removed.

Next, unnecessary portions of the first electrode layer 386 formed on the first major surface 412 of the insulating layer 411 are removed by an etching method using the second electrode layer 456 of the first external terminal 418, the second electrode layer 462 of the second external terminal 419, the second electrode layer 468 of the third external terminal 420, and the second electrode layer 474 of the fourth external terminal 421 as masks.

The first electrode layer 386 is thereby divided into the first electrode layer 455 of the first external terminal 418, the first electrode layer 461 of the second external terminal 419, the first electrode layer 467 of the third external terminal 420, and the first electrode layer 473 of the fourth external terminal 421.

Next, the third electrode layer 457 of the first external terminal 418, the third electrode layer 463 of the second external terminal 419, the third electrode layer 469 of the third external terminal 420, and the third electrode layer 475 of the fourth external terminal 421 are formed.

The third electrode layer 457 of the first external terminal 418 includes the nickel layer 458, the palladium layer 459, and the gold layer 460 that are laminated in that order from the second electrode layer 456 side of the first external terminal 418. The nickel layer 458, the palladium layer 459, and the gold layer 460 are respectively formed, for example, by the electroplating method.

The third electrode layer 463 of the second external terminal 419 includes the nickel layer 464, the palladium layer 465, and the gold layer 466 that are laminated in that order from the second electrode layer 462 side of the second external terminal 419. The nickel layer 464, the palladium layer 465, and the gold layer 466 are respectively formed, for example, by the electroplating method.

The third electrode layer 469 of the third external terminal 420 includes the nickel layer 470, the palladium layer 471, and the gold layer 472 that are laminated in that order from the second electrode layer 468 side of the third external terminal 420. The nickel layer 470, the palladium layer 471, and the gold layer 472 are respectively formed, for example, by the electroplating method.

The third electrode layer 475 of the fourth external terminal 421 includes the nickel layer 476, the palladium layer 477, and the gold layer 478 that are laminated in that order from the second electrode layer 474 side of the fourth external terminal 421. The nickel layer 476, the palladium layer 477, and the gold layer 478 are respectively formed, for example, by the electroplating method.

The first external terminal 418, the second external terminal 419, the third external terminal 420, and the fourth external terminal 421 are thus formed. The first external terminal 418, the second external terminal 419, the third external terminal 420, and the fourth external terminal 421 are formed at the same time.

The third external terminal 420 and the fourth external terminal 421 may be formed through different processes. For example, the fourth external terminal 421 may be formed after or before forming the third external terminal 420.

The third external terminal 420 and the fourth external terminal 421 may be formed after forming the first external terminal 418 and the second external terminal 419. The third external terminal 420 and the fourth external terminal 421 may be formed before forming the first external terminal 418 and the second external terminal 419.

Thereafter, the plurality of chip capacitors 401 are cut out from the base substrate 370 through the same processes as those of FIG. 36L to FIG. 36M.

Figure 43:
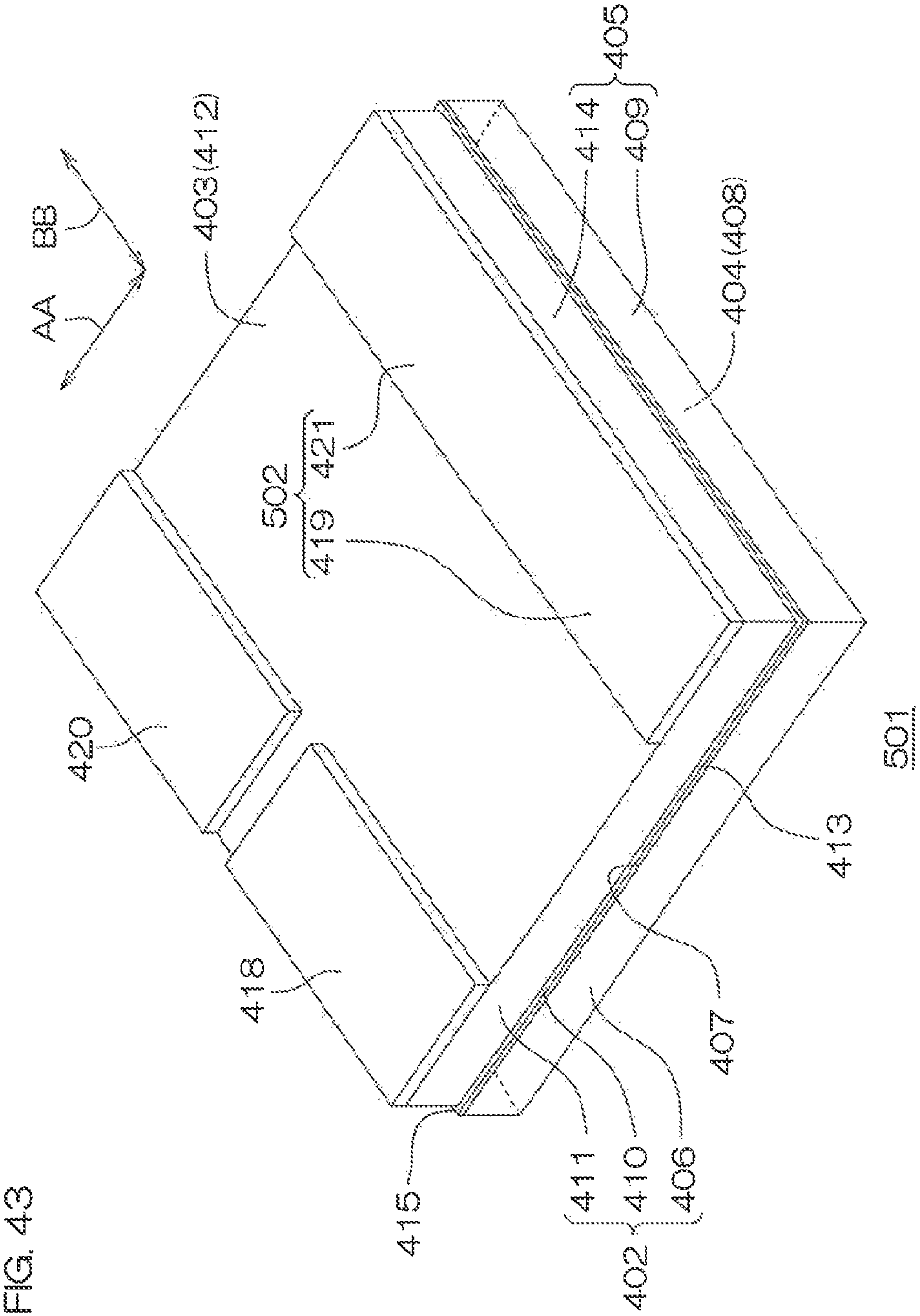
FIG. 43 is a perspective view of a chip capacitor according to a ninth preferred embodiment of the present invention.
Figure 44:
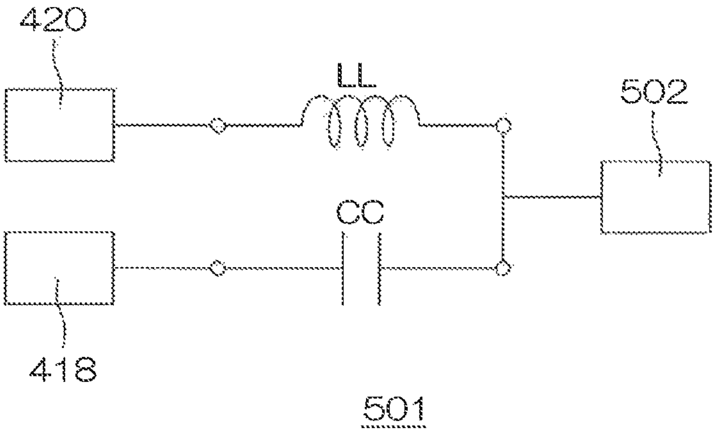
FIG. 44 is a circuit diagram of an electrical structure of the chip capacitor of FIG. 43.

FIG. 43 is a perspective view of a chip capacitor 501 according to a ninth preferred embodiment of the present invention. FIG. 44 is a circuit diagram of an electrical structure of the chip capacitor 501 of FIG. 43. With the chip capacitor 501, arrangements corresponding to arrangements of the chip capacitor 401 shall be provided with the same reference symbols and description thereof shall be omitted.

Referring to FIG. 43, with the chip capacitor 501, a common external terminal 502 is formed on the first major surface 403 of the chip main body 402. The common external terminal 502 integrally includes the first external terminal 418 and the third external terminal 420.

Referring to FIG. 44, one end of the capacitor CC and one end of the inductor LL are electrically connected to the common external terminal 502. Another end of the capacitor CC is electrically connected to the second external terminal 419. Another end of the inductor LL is electrically connected to the fourth external terminal 421.

The chip capacitor 501 can be manufactured by changing the pattern of the openings 388 in the resist mask 387 in the above-described processes of forming the first external terminal 418, the second external terminal 419, the third external terminal 420, and the fourth external terminal 421.

The same effects as the effects described for the chip capacitor 401 can also be exhibited by the chip capacitor 501 described above.

Figure 45:
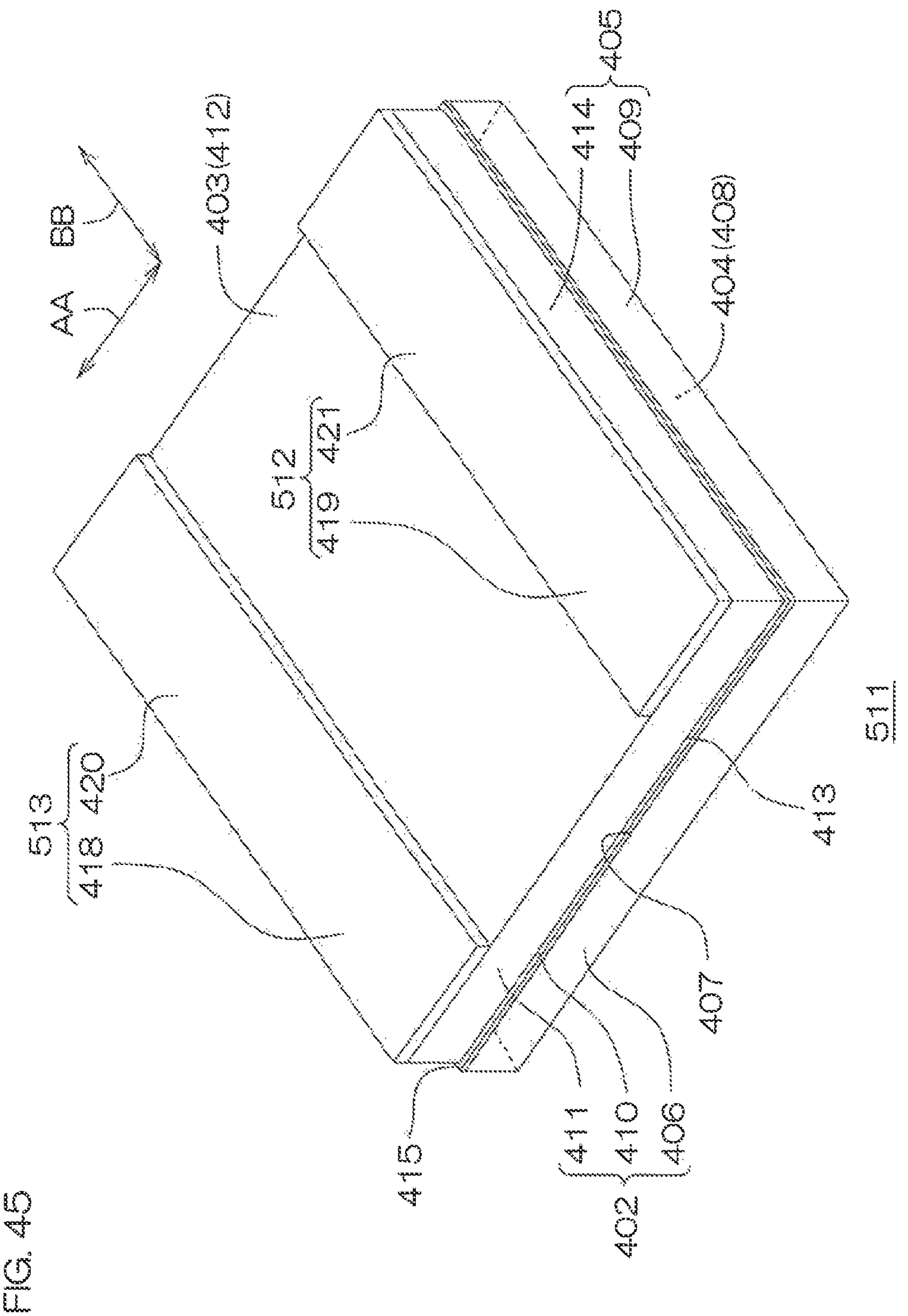
FIG. 45 is a perspective view of a chip capacitor according to a tenth preferred embodiment of the present invention.

FIG. 45 is a perspective view of a chip capacitor 511 according to a tenth preferred embodiment of the present invention. With the chip capacitor 511, arrangements corresponding to arrangements of the chip capacitor 401 shall be provided with the same reference symbols and description thereof shall be omitted.

Referring to FIG. 45, with the chip capacitor 511, a first common external terminal 512 and a second common external terminal 513 are formed on the first major surface 403 of the chip main body 402. The first common external terminal 512 integrally includes the first external terminal 418 and the third external terminal 420. The second common external terminal 513 integrally includes the second external terminal 419 and the fourth external terminal 421.

Figure 46:
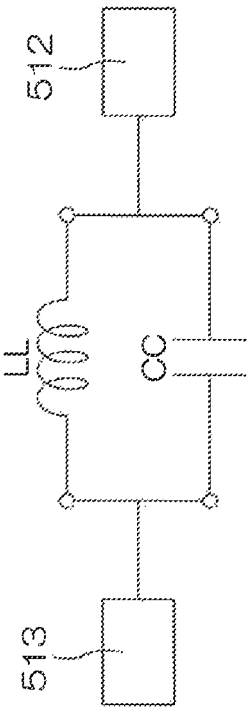
FIG. 46 is a circuit diagram of an electrical structure of the chip capacitor of FIG. 45.

Referring to FIG. 46, one end of the capacitor CC and one end of the inductor LL are electrically connected to the first common external terminal 512. Another end of the capacitor CC and another end of the inductor LL are electrically connected to the second common external terminal 513.

The chip capacitor 511 can be manufactured by changing the pattern of the openings 388 in the resist mask 387 in the above-described processes of forming the first external terminal 418, the second external terminal 419, the third external terminal 420, and the fourth external terminal 421.

The same effects as the effects described for the chip capacitor 401 can also be exhibited by the chip capacitor 511 described above.

Figure 47:
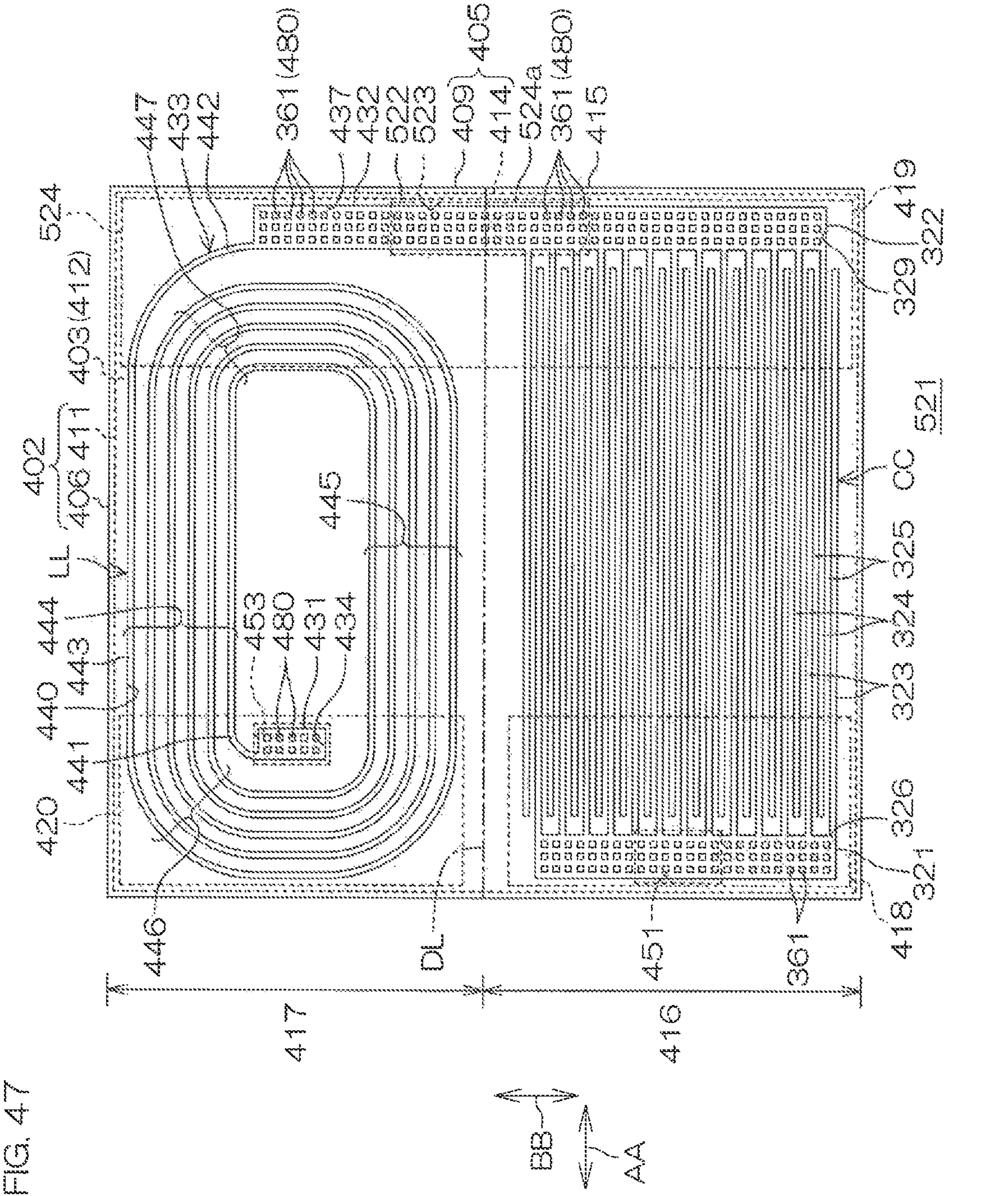
FIG. 47 is a plan view of an internal structure of a chip capacitor according to an eleventh preferred embodiment of the present invention.

FIG. 47 is a plan view of an internal structure of a chip capacitor 521 according to an eleventh preferred embodiment of the present invention. With the chip capacitor 521, arrangements corresponding to arrangements of the chip capacitor 401 shall be provided with the same reference symbols and description thereof shall be omitted.

Referring to FIG. 47, with the chip capacitor 521, a common pad electrode 522, electrically connected to the first capacitor electrodes 323 and the coil electrode 433, is formed on the first major surface 403 of the chip main body 402. The common pad electrode 522 integrally includes the first pad electrode 321 and the third pad electrode 431.

Also, with the chip capacitor 521, a common pad opening 523, exposing a region of a portion of the common pad electrode 522 is formed in the insulating layer 411. The common pad opening 523 may expose substantially an entirety of the common pad electrode 522 instead.

Further, with the chip capacitor 521, a common external terminal 524 is formed on the first major surface 403 of the chip main body 402. The common external terminal 524 integrally includes the first external terminal 418 and the third external terminal 420.

The common external terminal 524 enters into the common pad opening 523 from the first major surface 412 of the insulating layer 411. The common external terminal 524 includes a connecting portion 524*a* directly connected to the common pad electrode 522 inside the common pad opening 523.

The same effects as the effects described for the chip capacitor 401 can also be exhibited by the chip capacitor 521 described above. A structure such as that of the chip capacitor 521 is also applicable to the ninth and tenth preferred embodiments described above.

Figure 48:
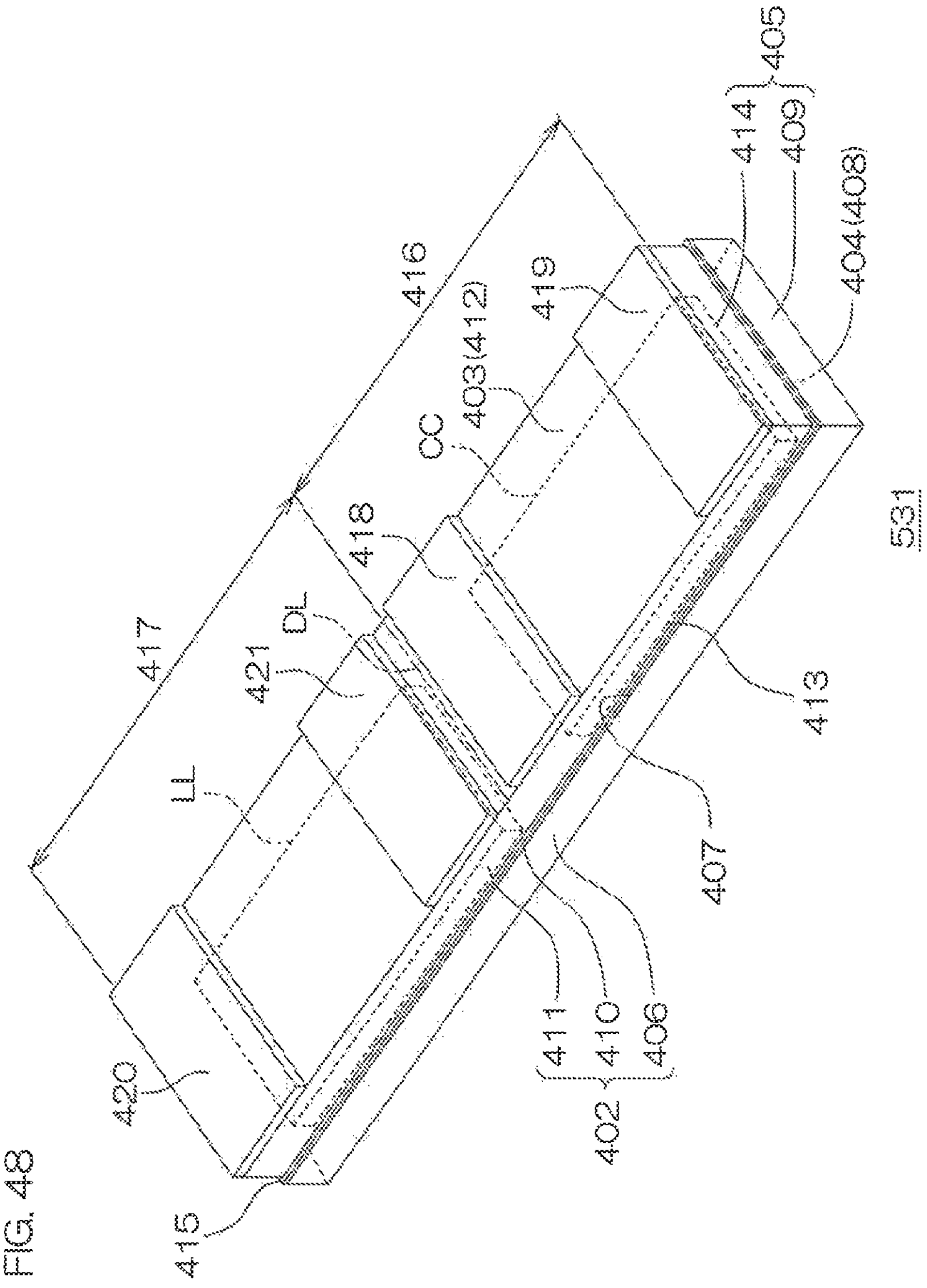
FIG. 48 is a perspective view of a chip capacitor according to a twelfth preferred embodiment of the present invention.

FIG. 48 is a perspective view of a chip capacitor 531 according to a twelfth preferred embodiment of the present invention. With the chip capacitor 531, arrangements corresponding to arrangements of the chip capacitor 401 shall be provided with the same reference symbols and description thereof shall be omitted.

With the chip capacitor 531, the chip main body 402 is formed in an oblong shape in the plan view. The first external terminal 418, the second external terminal 419, the third external terminal 420, and the fourth external terminal 421 are formed across intervals along a long direction of the chip main body 402.

In the present embodiment, the capacitor formation region 416 and the inductor formation region 417 are defined in two regions divided by the dividing line DL that divides the chip main body 402 equally in two portions. The dividing line DL is indicated by an alternate long and two short dashed line in FIG. 48.

The dividing line DL extends in a short direction of the chip main body 402 and divides the chip main body 402 equally in two portions along the long direction. The dividing line DL extends in the short direction of the chip main body 402 in a region between the first external terminal 418 and the fourth external terminal 421.

The capacitor formation region 416 and the inductor formation region 417 are thereby formed across an interval along the long direction of the chip main body 402 in the present embodiment. In FIG. 48, the capacitor CC and the inductor LL are indicated in simplified form by broken lines for convenience of explanation.

The same effects as the effects described for the chip capacitor 401 can also be exhibited by the chip capacitor 531 described above.

With the chip capacitor 531, a design such as that of the ninth preferred embodiment described above may be applied such that the second external terminal 419 and the third external terminal 420 are formed integrally. Also, with the chip capacitor 531, a design such as that of the eleventh preferred embodiment described above may be applied such that the second pad electrode 322 and the third pad electrode 431 are formed integrally. With the structure in these cases, the capacitor CC and the inductor LL are connected in series.

Figure 49:
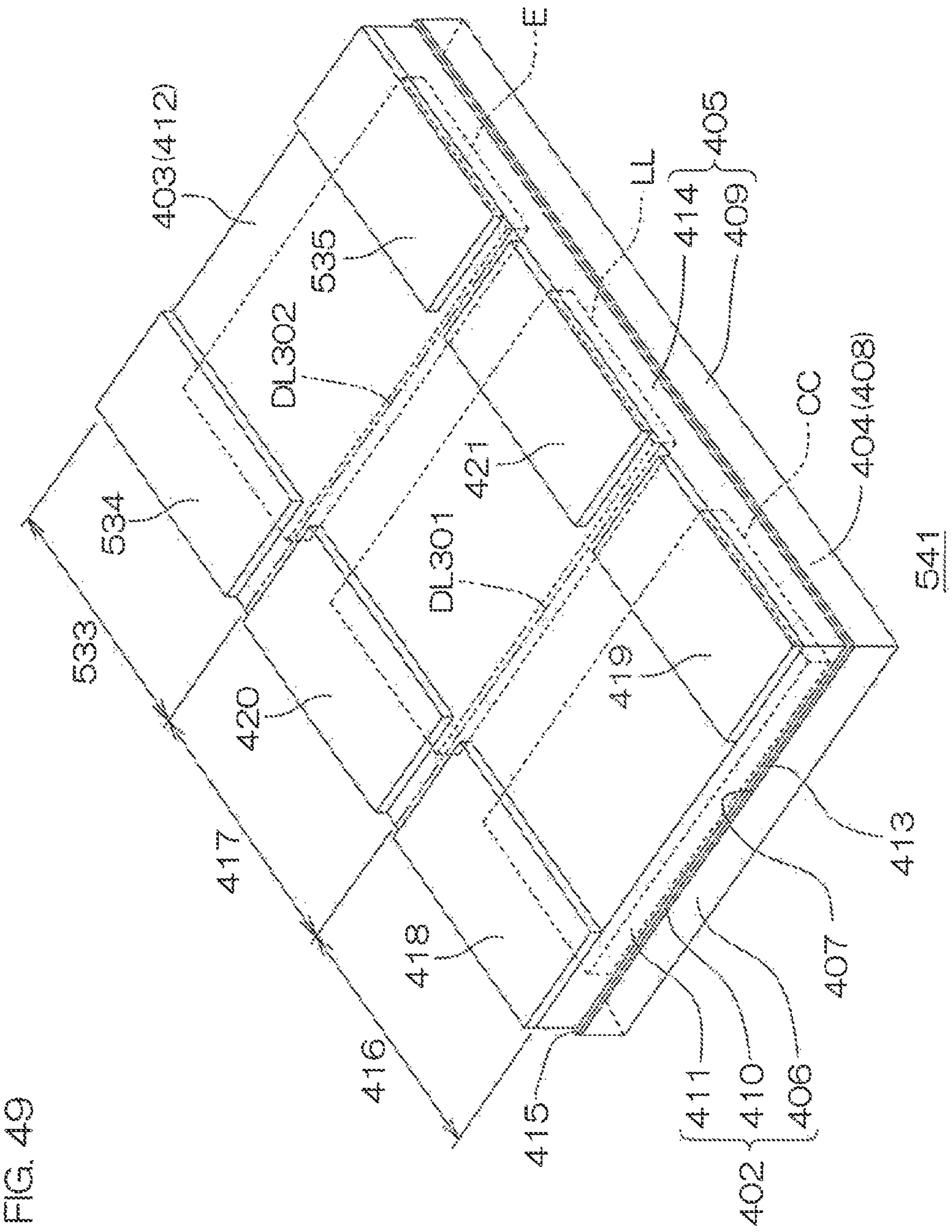
FIG. 49 is a perspective view of a chip capacitor according to a thirteenth preferred embodiment of the present invention.

FIG. 49 is a perspective view of a chip capacitor 541 according to a thirteenth preferred embodiment of the present invention. With the chip capacitor 541, arrangements corresponding to arrangements of the chip capacitor 401 shall be provided with the same reference symbols and description thereof shall be omitted.

With the chip capacitor 541, an element formation region 533, in which yet another functional element E is formed, is defined in the chip main body 402 in addition to the capacitor formation region 416 and the inductor formation region 417. In FIG. 49, the capacitor CC, the inductor LL, and the functional element E are indicated in simplified form by broken lines for convenience of explanation.

The capacitor CC may be formed in the element formation region 533. The first pad electrode 321, the second pad electrode 322, the first capacitor electrodes 323, the second capacitor electrodes 324, and the dielectric body 325 may be formed in the element formation region 533.

In place of the capacitor CC, the inductor LL may be formed in the element formation region 533. The third pad electrode 431, the fourth pad electrode 432, and the coil electrode 433 may be formed in the element formation region 533.

In the present embodiment, the capacitor formation region 416, the inductor formation region 417, and the element formation region 533 are defined in three regions divided by a first dividing line DL1 and a second dividing line DL2 that divide the chip main body 402 equally in three portions.

The first dividing line DL1 and the second dividing line DL2 are indicated by alternate long and two short dashed lines in FIG. 49. The first dividing line DL1 and the second dividing line DL2 are lines that extend in the first direction AA and divide the chip main body 402 equally in three portions along the second direction BB.

The capacitor formation region 416 is defined at the one end portion side in the second direction BB of the chip main body 402. The inductor formation region 417 is defined at the other end portion side in the second direction BB of the chip main body 402 with respect to the capacitor formation region 416. The element formation region 533 is defined at the other end portion side in the second direction BB of the chip main body 402 with respect to the inductor formation region 417.

In the element formation region 533, a fifth external terminal 534 and a sixth external terminal 535 for the functional element E are formed. The fifth external terminal 534 and the sixth external terminal 535 are formed across an interval along the first direction AA from each other.

The fifth external terminal 534 is formed at the one end portion side in the first direction AA of the first major surface 403. The fifth external terminal 534 is formed in an oblong shape extending along the second direction BB in the plan view. The fifth external terminal 534 is electrically connected to the functional element E via an unillustrated pad opening.

The sixth external terminal 535 is formed at the other end portion side in the first direction AA of the first major surface 403. The sixth external terminal 535 is formed in an oblong shape extending along the second direction BB in the plan view. The sixth external terminal 535 is electrically connected to the functional element E via an unillustrated pad opening.

The structure at the element formation region 533 side is substantially the same as the structure at the capacitor formation region 416 side or the structure at the inductor formation region 417 side and therefore a specific description shall be omitted.

The chip capacitor 521 can be manufactured by appropriately changing layouts of the masks in the manufacturing method according to the eighth preferred embodiment described above.

The same effects as the effects described for the chip capacitor 401 can also be exhibited by the chip capacitor 541 described above.

Although the seventh preferred embodiment to the thirteenth preferred embodiment of the present invention were described above, the present invention may be implemented in modes besides the seventh preferred embodiment to the thirteenth preferred embodiment.

With each of the eighth preferred embodiment to the twelfth preferred embodiment described above, a capacitor formation region 416 may be formed in place of the inductor formation region 417. That is, a plurality of capacitor formation regions 416 may be formed in the chip main body 402.

Obviously, with each of the eighth preferred embodiment to the twelfth preferred embodiment described above, an inductor formation region 417 may be formed in place of the capacitor formation region 416. That is, a plurality of inductor formation regions 417 may be formed in the chip main body 402. In this case, a chip inductor can be provided in place of a chip capacitor.

With each of the seventh preferred embodiment to the twelfth preferred embodiment described above, the substrate 306 or 406 may be a semiconductor substrate used for forming a semiconductor device. A silicon substrate, a nitride semiconductor substrate, an SiC substrate, a diamond substrate, etc., can be cited as examples of a semiconductor substrate. The semiconductor substrate may be a high resistance substrate without an impurity added. If the substrate 306 or 406 is made of a semiconductor substrate, the substrate 306 or 406 can be processed readily using a manufacturing process for a semiconductor device.

With each of the seventh preferred embodiment to the twelfth preferred embodiment described above, the substrate 306 or 406 may be an insulated substrate. A glass substrate, a ceramic substrate, a resin substrate, etc., can be cited as examples of an insulated substrate. If the substrate 306 or 406 is made of an insulated substrate, the dielectric body 325 can be formed using a region of a portion of the insulated substrate. It is therefore made unnecessary to form the surface insulating film 310 or 410 and the inner wall insulating films 338 on the first major surface 303 or 403 of the substrate 306 or 406.

Besides the above, various design changes may be applied within the scope of the matters described in the claims.

Examples of features that can be extracted from the present specification and the drawings (FIG. 29 to FIG. 49) are indicated below.

A laminated ceramic capacitor is disclosed in Japanese Patent Application Publication No. 2006-347782. The laminated ceramic capacitor includes a first internal electrode, a second internal electrode, facing the first internal electrode across a dielectric ceramic layer, a first external electrode, electrically connected to the first internal electrode, and a second external electrode, electrically connected to the second internal electrode.

Examples of a chip capacitor that can be miniaturized and a method for manufacturing the same are indicated below.

[Clause 1] A chip capacitor including a substrate having a major surface, a first pad electrode embedded in the major surface of the substrate, a second pad electrode embedded in the major surface of the substrate across an interval from the first pad electrode, a first capacitor electrode embedded in the major surface of the substrate and lead out from the first pad electrode toward the second pad electrode side, a second capacitor electrode embedded in the major surface of the substrate and lead out from the second pad electrode toward the first pad electrode side so as to face the first capacitor electrode in an intersecting direction intersecting a facing direction of the first pad electrode and the second pad electrode, and a dielectric body embedded in a region of the major surface of the substrate between the first capacitor electrode and the second capacitor electrode.

With the present chip capacitor, the first capacitor electrode, the second capacitor electrode, and the dielectric body are embedded in the major surface of the substrate. It is thereby made unnecessary to laminate the first capacitor electrode, the second capacitor electrode, and the dielectric body along a normal direction of the major surface of the substrate.

Also, with the present chip capacitor, electrode layers to be formed on the major surface of the substrate can be reduced because the first pad electrode and the second pad electrode are also embedded in the major surface of the substrate. The chip capacitor can thereby be suppressed from enlarging along the normal direction of the major surface of the substrate. A chip capacitor that can be miniaturized can thus be provided.

[Clause 2] The chip capacitor according to Clause 1, further including a first external terminal having a first connecting portion connected to the first pad electrode, and a second external terminal having a second connecting portion connected to the second pad electrode.

[Clause 3] The chip capacitor according to Clause 2, further including an insulating layer covering the major surface of the substrate, wherein the first external terminal is connected to the first pad electrode upon penetrating through the insulating layer from a surface of the insulating layer, and the second external terminal is connected to the second pad electrode upon penetrating through the insulating layer from the surface of the insulating layer.

[Clause 4] The chip capacitor according to Clause 3, wherein the insulating layer has a single layer structure made of a resin layer.

[Clause 5] The chip capacitor according to Clause 3 or 4, wherein the insulating layer is made of a negative type photoresist layer.

[Clause 6] The chip capacitor according to any one of Clauses 3 to 5, wherein the insulating layer has a thickness of not less than 10 μm.

[Clause 7] A chip capacitor including a substrate having a major surface and having capacitor formation region including a capacitor, and an inductor formation region including an inductor, wherein the capacitor formation region includes a first pad electrode embedded in the major surface of the substrate, a second pad electrode embedded in the major surface of the substrate across an interval from the first pad electrode, a first capacitor electrode embedded in the major surface of the substrate and lead out from the first pad electrode toward the second pad electrode side, a second capacitor electrode embedded in the major surface of the substrate and lead out from the second pad electrode toward the first pad electrode side so as to face the first capacitor electrode in an intersecting direction intersecting a facing direction of the first pad electrode and the second pad electrode, and a dielectric body embedded in a region of the major surface of the substrate between the first capacitor electrode and the second capacitor electrode, and the inductor formation region includes a third pad electrode embedded in the major surface of the substrate, a fourth pad electrode embedded in the major surface of the substrate across an interval from the third pad electrode, and a coil electrode having one end portion connected to the third pad electrode and another end portion connected to the fourth pad electrode and being embedded in the major surface of the substrate so as to be routed spirally in a plan view of viewing from a normal direction of the major surface of the substrate.

The present chip capacitor is formed as a composite type chip part that includes the inductor formation region in addition to the capacitor formation region. In the capacitor formation region, the first capacitor electrode, the second capacitor electrode, and the dielectric body are embedded in the major surface of the substrate, and in the inductor formation region, the coil electrode is embedded in the major surface of the substrate.

It is thereby made unnecessary to laminate the first capacitor electrode, the second capacitor electrode, the dielectric body, and the coil electrode along the normal direction of the major surface of the substrate. Also, with the present chip capacitor, the first pad electrode, the second pad electrode, the third pad electrode, and the fourth pad electrode are also embedded in the major surface of the substrate.

Electrode layers to be formed on the major surface of the substrate can thus be reduced. The chip capacitor can thereby be suppressed from enlarging along the normal direction of the major surface of the substrate. A chip capacitor that can be miniaturized can thus be provided.

[Clause 8] The chip capacitor according to Clause 7, wherein the capacitor formation region further includes a first external terminal having a first connecting portion connected to the first pad electrode, and a second external terminal having a second connecting portion connected to the second pad electrode, and the inductor formation region further includes a third external terminal having a third connecting portion connected to the third pad electrode, and a fourth external terminal having a fourth connecting portion connected to the fourth pad electrode.

[Clause 9] The chip capacitor according to Clause 8, further including an insulating layer covering the major surface of the substrate, wherein the first external terminal is connected to the first pad electrode upon penetrating through the insulating layer from a surface of the insulating layer, the second external terminal is connected to the second pad electrode upon penetrating through the insulating layer from the surface of the insulating layer, the third external terminal is connected to the third pad electrode upon penetrating through the insulating layer from the surface of the insulating layer, and the fourth external terminal is connected to the fourth pad electrode upon penetrating through the insulating layer from the surface of the insulating layer.

[Clause 10] The chip capacitor according to Clause 9, wherein the insulating layer has a single layer structure made of a resin layer.

[Clause 11] The chip capacitor according to Clause 9 or 10, wherein the insulating layer is made of a negative type photoresist layer.

[Clause 12] The chip capacitor according to any one of Clauses 9 to 11, wherein the insulating layer has a thickness of not less than 10 μm.

[Clause 13] A method for manufacturing a chip capacitor including steps of preparing a base substrate having a major surface, forming a first pad trench in the major surface of the base substrate, forming a second pad trench across an interval from the first pad trench in the major surface of the base substrate, forming a first capacitor trench so as to be lead out from the first pad trench toward the second pad trench side in the major surface of the base substrate, forming a second capacitor trench so as to face the first capacitor electrode in an intersecting direction intersecting a facing direction of the first pad trench and the second pad trench and be lead out from the second pad trench toward the first pad trench side in the major surface of the base substrate, forming a dielectric body along an inner wall surface of the first capacitor trench and an inner wall surface of the second capacitor trench, embedding a conductor in the first pad trench to form a first pad electrode, embedding a conductor in the second pad trench to form a second pad electrode, embedding a conductor in the first capacitor trench to form a first capacitor electrode, and embedding a conductor in the second capacitor trench to form a second capacitor electrode.

With the present method for manufacturing the chip capacitor, the first capacitor electrode, the second capacitor electrode, and the dielectric body are embedded in the major surface of the base substrate. It is thereby made unnecessary to laminate the first capacitor electrode, the second capacitor electrode, and the dielectric body along a normal direction of the major surface of the substrate.

Also, with the present method for manufacturing the chip capacitor, the first pad electrode and the second pad electrode are also embedded in the major surface of the base substrate. Therefore, electrode layers to be formed on the major surface of the base substrate can be reduced. The chip capacitor can thereby be suppressed from enlarging along the normal direction of the major surface of the base substrate. A chip capacitor that can be miniaturized can thus be manufactured and provided.

[Clause 14] The method for manufacturing the chip capacitor according to Clause 13, further including steps of forming an insulating layer on the major surface of the base substrate so as to cover the first pad electrode, the second pad electrode, the first capacitor electrode, and the second capacitor electrode embedded in the major surface of the base substrate, forming a first opening exposing the first pad electrode in the insulating layer, forming a second opening exposing the second pad electrode in the insulating layer, filling the first opening of the insulating layer with a conductor to form a first external terminal having a connecting portion connected to the first pad electrode, and filling the second opening of the insulating layer with a conductor to form a second external terminal having a connecting portion connected to the second pad electrode.

[Clause 15] The method for manufacturing the chip capacitor according to Clause 14, wherein the step of forming the insulating layer includes a step of forming a resin layer made of a photosensitive resin as the insulating layer on the major surface of the base substrate, the first opening is formed in the step of forming the first opening by selectively exposing and thereafter developing the resin layer, and the second opening is formed in the step of forming the second opening by selectively exposing and thereafter developing the resin layer.

[Clause 16] The method for manufacturing the chip capacitor according to Clause 14 or 15, wherein the step of forming the first pad trench, the step of forming the second pad trench, the step of forming the first capacitor trench, and the step of forming the second capacitor trench are executed at the same time.

[Clause 17] The method for manufacturing the chip capacitor according to any one of Clauses 14 to 16, wherein the step of forming the first pad electrode, the step of forming the second pad electrode, the step of forming the first capacitor electrode, and the step of forming the second capacitor electrode are executed at the same time.

The present application corresponds to Japanese Patent Application No. 2017-068593 filed in the Japan Patent Office on Mar. 30, 2017, Japanese Patent Application No. 2017-070627 filed in the Japan Patent Office on Mar. 31, 2017, and Japanese Patent Application No. 2018-015350 filed in the Japan Patent Office on Jan. 31, 2018 and the entire disclosures of these applications are incorporated herein by reference.

While preferred embodiments of the present invention have been described in detail above, these are merely specific examples used to clarify the technical content of the present invention, and the present invention should not be interpreted as being limited to these specific examples, and the scope of the present invention shall be limited only by the appended claims.

What is claimed is:

1. A chip component comprising:

a sealing body having mounting surface and a non-mounting surface that are formed in oblong shapes, the sealing body further having a first connecting surface and a second connecting surface connected to short sides of the mounting surface, and a third connecting surface and a fourth connecting surface connected to long sides of the mounting surface;

an inductor that is sealed inside the sealing body; and a capacitor that is sealed inside the sealing body together with the inductor, wherein the sealing body has a laminated structure in which a plurality of insulating layers are laminated from the third connecting surface to the fourth connecting surface, the capacitor includes a first conductor and a second conductor that face each other across a dielectric portion in an orthogonal direction to a lamination direction of the plurality of insulating layers, and the first conductor and the second conductor are formed in a plate shape extending along the lamination direction.

2. The chip component according to claim 1, wherein the sealing body consists of an insulator.

3. The chip component according to claim 2, wherein the inductor is sealed by the plurality of insulating layers inside the sealing body, and the capacitor is sealed by the plurality of insulating layers inside the sealing body.

4. The chip component according to claim 2, wherein the insulator consists of a resin.

5. The chip component according to claim 1, wherein the capacitor is electrically connected to the inductor inside the sealing body.

6. The chip component according to claim 5, wherein the capacitor constitutes a parallel circuit with the inductor.

7. The chip component according to claim 5, wherein the capacitor constitutes a series circuit with the inductor.

8. The chip component according to claim 1, wherein the capacitor includes a same conductive material as a conductive material of the inductor.

9. The chip component according to claim 1, further comprising:

a first external terminal arranged at least on the mounting surface such as to be electrically connected to the inductor and the capacitor; and a second external terminal arranged at least on the mounting surface at an interval from the first external terminal such as to be electrically connected to the inductor and the capacitor.

10. The chip component according to claim 9, wherein the first external terminal has a laminated structure that includes a Nickel film, a palladium film and a gold film that are laminated in that order from the sealing body side, and the second external terminal has a laminated structure that includes a Nickel film, a palladium film and a gold film that are laminated in that order from the sealing body side.

11. The chip component according to claim 1, wherein the dielectric portion consists of a part of the sealing body.

12. The chip component according to claim 1, wherein the inductor includes a first end that is exposed from the mounting surface, a second end that is exposed from the mounting surface, and a spiral portion that is spirally routed along a normal direction of the mounting surface.

13. The chip component according to claim 12, wherein the first end includes a plurality of first projections that are formed at an interval along the mounting surface such as to be exposed from the mounting surface, and the second end includes a plurality of second projections that are formed at an interval along the mounting surface such as to be exposed from the mounting surface.

14. The chip component according to claim 13, wherein the first end includes a first end extension portion that extends along the mounting surface inside the sealing body, and the plurality of first projections that project from the first end extension portion such as to be exposed from the mounting surface, and the second end includes a second end extension portion that extends along the mounting surface inside the sealing body, and the plurality of second projections that project from the second end extension portion such as to be exposed from the mounting surface.

15. The chip component according to claim 13, wherein the plurality of first projections are exposed from the mounting surface in a stripe manner, and the plurality of second projections are exposed from the mounting surface in a stripe manner.

16. The chip component according to claim 13, further comprising:

a first external terminal arranged on the sealing body such as to cover the plurality of first projections; and a second external terminal arranged on the sealing body such as to cover the plurality of second projections.

17. The chip component according to claim 12, wherein the first end is formed as a first external terminal that is to be externally connected, and the second end is formed as a second external terminal that is to be externally connected.

18. The chip component according to claim 12, wherein the spiral portion including, a first spiral portion that is spirally routed along the normal direction from the first end and has a first sub-end arranged inside the sealing body, a second spiral portion that is spirally routed along the normal direction from the second end such as to face the first spiral portion along a winding axis direction of the spiral portion and has a second sub-end arranged inside the sealing body, and a connecting portion that connects the first sub-end of the first spiral portion and the second sub-end of the second spiral portion inside the sealing body.

19. The chip component according to claim 18, wherein the second sub-end faces the first sub-end along the winding axis direction, and the connecting portion is interposed in a region between the first sub-end and the second sub-end.

* * * * *